(12) United States Patent
Matsuura et al.

(10) Patent No.: US 10,882,189 B2
(45) Date of Patent: Jan. 5, 2021

(54) CONTROL DEVICE AND ROBOT SYSTEM

(71) Applicant: Seiko Epson Corporation, Tokyo (JP)

(72) Inventors: Kenji Matsuura, Matsumoto (JP); Meguru Yamauchi, Azumino (JP)

(73) Assignee: Seiko Epson Corporation

( * ) Notice: Subject to any disclaimer, the term of this patent is extended or adjusted under 35 U.S.C. 154(b) by 332 days.

(21) Appl. No.: 15/954,949

(22) Filed: Apr. 17, 2018

(65) Prior Publication Data

US 2018/0304467 A1 Oct. 25, 2018

(30) Foreign Application Priority Data

Apr. 21, 2017 (JP) ................................ 2017-084801

(51) Int. Cl.
| | |
|---|---|
| *G05B 19/04* | (2006.01) |
| *G05B 19/18* | (2006.01) |
| *B25J 9/16* | (2006.01) |
| *B25J 13/06* | (2006.01) |

(52) U.S. Cl.
CPC ........... *B25J 9/1692* (2013.01); *B25J 9/1671* (2013.01); *B25J 9/1687* (2013.01); *B25J 9/1697* (2013.01); *B25J 13/06* (2013.01); *Y10S 901/09* (2013.01)

(58) Field of Classification Search
CPC ........ B25J 13/06; B25J 9/1671; B25J 9/1687; B25J 9/1692; B25J 9/1697; Y10S 901/09
See application file for complete search history.

(56) References Cited

U.S. PATENT DOCUMENTS

| | | | | |
|---|---|---|---|---|
| 2009/0289591 A1* | 11/2009 | Kassow | ................... | B25J 18/00 318/568.13 |
| 2011/0010009 A1* | 1/2011 | Saito | ..................... | B25J 9/1612 700/253 |
| 2011/0066393 A1* | 3/2011 | Groll | ...................... | B25J 9/1676 702/94 |
| 2013/0123983 A1* | 5/2013 | Brog Rdh | ................ | B25J 9/162 700/254 |
| 2014/0229005 A1* | 8/2014 | Suzuki | ................... | B25J 9/1697 700/254 |
| 2015/0158180 A1* | 6/2015 | Trompeter | ............. | B25J 9/1692 700/254 |
| 2015/0266183 A1* | 9/2015 | Alifragkis | .............. | B25J 9/1692 700/254 |
| 2016/0059419 A1* | 3/2016 | Suzuki | ................... | B25J 9/1697 700/114 |
| 2016/0151915 A1* | 6/2016 | Nishi | ..................... | B25J 9/1692 700/247 |
| 2016/0288332 A1* | 10/2016 | Motoyoshi | ............. | B25J 9/1697 |
| 2016/0332297 A1* | 11/2016 | Sugaya | ............... | G06F 3/04842 |
| 2017/0072566 A1* | 3/2017 | Murata | .................. | B25J 9/1692 |
| 2018/0354137 A1* | 12/2018 | Sirkett | .................. | B25J 9/1692 |

FOREIGN PATENT DOCUMENTS

| | | |
|---|---|---|
| JP | 08-085083 A | 4/1996 |
| JP | 2016-182648 A | 10/2016 |

* cited by examiner

*Primary Examiner* — Harry Y Oh

(74) *Attorney, Agent, or Firm* — Harness, Dickey & Pierce, P.L.C.

(57) ABSTRACT

A control device that controls driving of a robot, the control device includes a processor that is configured to execute computer-executable instructions so as to control a robot, wherein the processor is configured to: display a posture setting guide for guiding information input for obtaining a posture offset of a tool provided on the robot, on a display; and control the driving of the robot based on the posture offset of the tool.

20 Claims, 70 Drawing Sheets

FIG. 43

FINISH OF CALIBRATION WIZARD

PREVIOUS RESULT
- X mm PER PIXEL:
- MAXIMUM X DIRECTION ERROR:
- AVERAGE X DIRECTION ERROR:
- X TILT:
- Y mm PER PIXEL:
- MAXIMUM Y DIRECTION ERROR:
- AVERAGE Y DIRECTION ERROR:
- Y TILT:
- SIZE OF FIELD OF VIEW

CURRENT RESULT
- X mm PER PIXEL: 0.1545
- MAXIMUM X DIRECTION ERROR: 0.0686
- AVERAGE X DIRECTION ERROR: 0.0000
- X TILT: 0.92
- Y mm PER PIXEL: 0.1551
- MAXIMUM Y DIRECTION ERROR: 0.0660
- AVERAGE Y DIRECTION ERROR: 0.0000
- Y TILT: −0.35
- SIZE OF FIELD OF VIEW: 98.91 mm × 74.47 mm

OK — 683
CANCEL — 684

STEP WIZARD

Step 1: SELECT VISION OPERATION TYPE

PLEASE SELECT VISION OPERATION TYPE DESIRED TO BE RUN:

| OPERATION | DESCRIPTION |
|---|---|
| DETECT | DETERMINE COORDINATE VALUE OF PART. |
| COUNT | COUNT THE NUMBER OF PARTS. |
| EXAMINE | DETECT DEFECT OR MEASURE DISTANCE AND ANGLE. |
| READ | READ BARCODE OR CHARACTER. |
| IMAGE | CHANGE IMAGE. |

CANCEL  < BACK(B)  NEXT(N) >  FINISH(E)

CONTROL DEVICE AND ROBOT SYSTEM

BACKGROUND

1. Technical Field

The present invention relates to a control device, and a robot system.

2. Related Art

In the related art, processing of setting an offset of a tool with respect to a robot arm is performed before processing a workpiece using the tool installed on the robot arm. JP-A-8-85083 discloses a method of running an operation for positioning the tool installed on the robot arm to a reference point of a real space a plurality of times while changing a posture of the robot arm, and deriving the offset of the tool with respect to the robot arm based on the result thereof.

When the workpiece is processed by the tool, the tool is required to bring into contact with or close to the workpiece in an appropriate posture. However, in the method disclosed in JP-A-8-85083, since the offset is derived by positioning one point of the tool to the reference point, it is not possible to set a posture offset of the tool with respect to the robot arm even though it is possible to set the position offset of the tool with respect to the robot arm. When the posture offset of the tool with respect to the robot arm is not set, since the posture of the tool with respect to the workpiece cannot be appropriately controlled, it is difficult to achieve a desired posture.

SUMMARY

An advantage of some aspects of the invention can be realized by the following.

According to an aspect of the invention, there is provided a control device that is capable of controlling driving of a robot and includes a display control unit that displays a posture setting guide screen for guiding information input for obtaining a posture offset of a tool provided on the robot on a display unit, and a control unit that controls the driving of the robot based on the posture offset of the tool.

In this case, it is possible to easily and quickly perform an operation to input the information for obtaining the posture offset of the tool.

It is possible to easily and accurately set the tool in a desired posture according to a posture of the tool with respect to a robot arm included in the robot by obtaining the posture offset of the tool.

In the device, it is preferable that the information include a shape of the tool.

Accordingly, it is possible to accurately obtain the posture offset of the tool.

In the device, it is preferable that the shape include at least one of a bar shape and a planar shape.

Accordingly, it is possible to accurately obtain the posture offset in the tool having the shape of at least one of the bar shape and the planar shape.

In the device, it is preferable that the posture setting guide screens subsequently guide a place where the tool is brought into contact with a specific point.

Accordingly, it is possible to easily and accurately perform an operation for obtaining the posture offset of the tool.

In the device, it is preferable that the display control unit display a calling unit that calls a position setting guide screen for guiding information input for obtaining a position offset of the tool in the posture setting guide screen.

Accordingly, since a user can call the position setting guide screen through the calling unit, it is possible to easily and quickly perform an operation to input the information for obtaining the position offset.

According to another aspect of the invention, there is provided a robot provided with a tool and controlled by the control device of the invention.

In this case, it is possible to easily and accurately set the tool in a desired posture according to a posture of the tool with respect to a robot arm included in the robot under control of the control device.

According to still another aspect of the invention, there is provided a robot system including the control device of the invention and a robot provided with a tool and controlled by the control device.

In this case, it is possible to easily and quickly perform an operation to input information for obtaining a posture offset of the tool.

It is possible to easily and accurately set the tool in a desired posture according to a posture of the tool with respect to the robot arm included in the robot by obtaining the posture offset of the tool.

BRIEF DESCRIPTION OF THE DRAWINGS

The invention will be described with reference to the accompanying drawings, wherein like numbers reference like elements.

FIG. 43 is a screen displayed on the display device in step S545 illustrated in FIG. 29.

FIG. 51 is a guide screen in the sub-window displayed on the display device illustrated in FIG. 1.

DESCRIPTION OF EXEMPLARY EMBODIMENTS

Hereinafter, a control device, a robot, and a robot system of the invention will be described in detail based on preferable embodiments illustrated in accompanying drawings.

First Embodiment

Configuration of Robot Vision System (Robot System)

Figure 1:
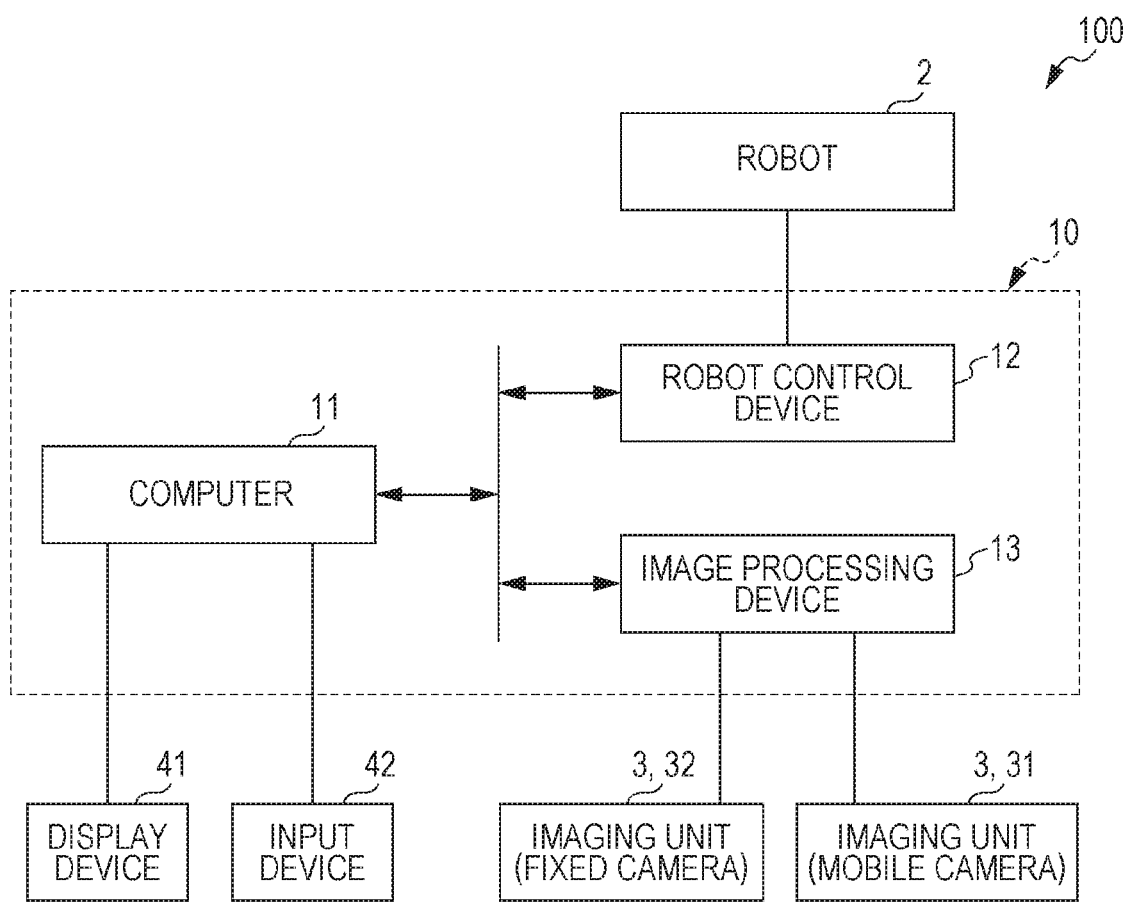
FIG. 1 is a network diagram of a robot vision system according to a first embodiment of the invention.
Figure 2:
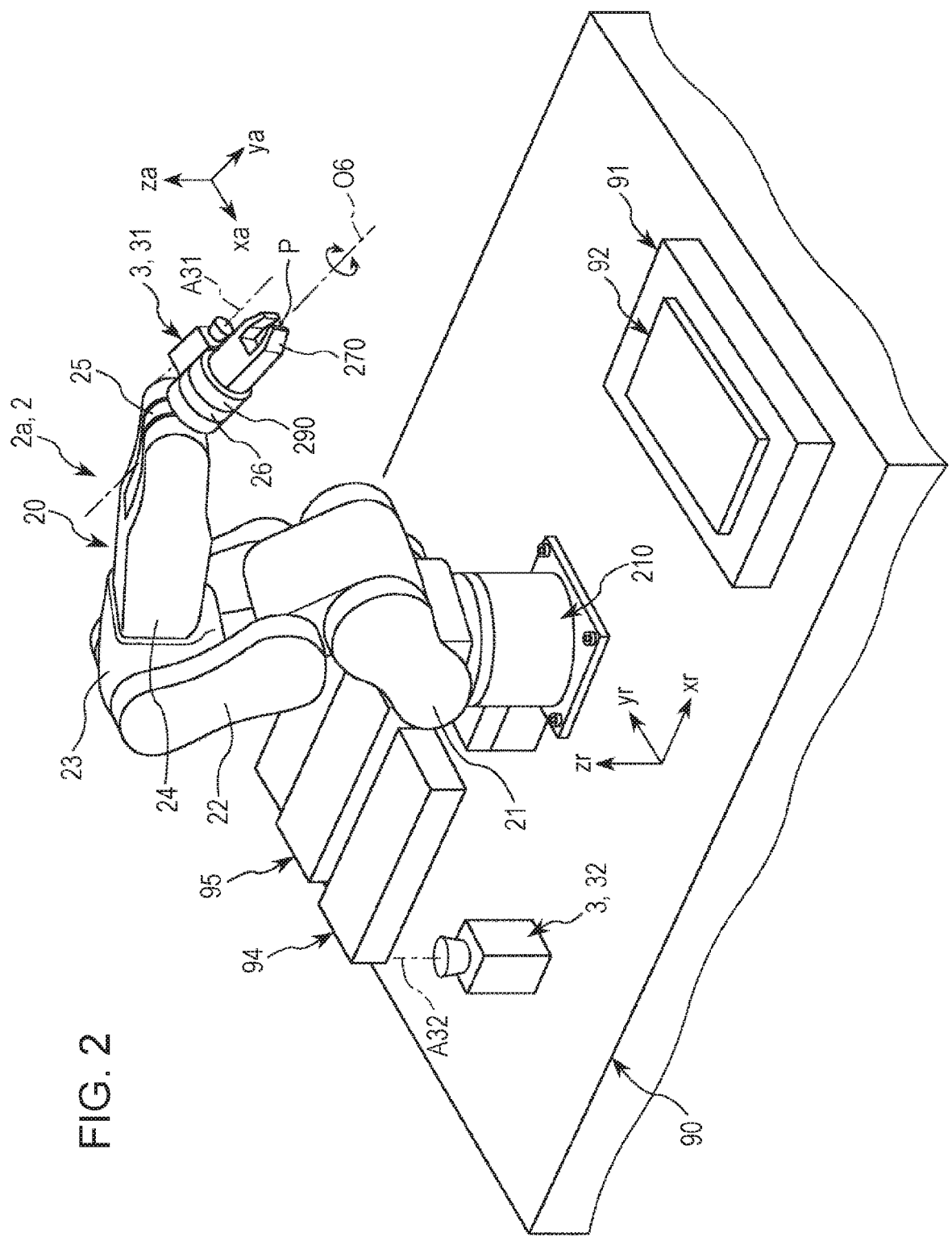
FIG. 2 is a perspective view illustrating an example of a robot included in the robot vision system illustrated in FIG. 1.
Figure 3:
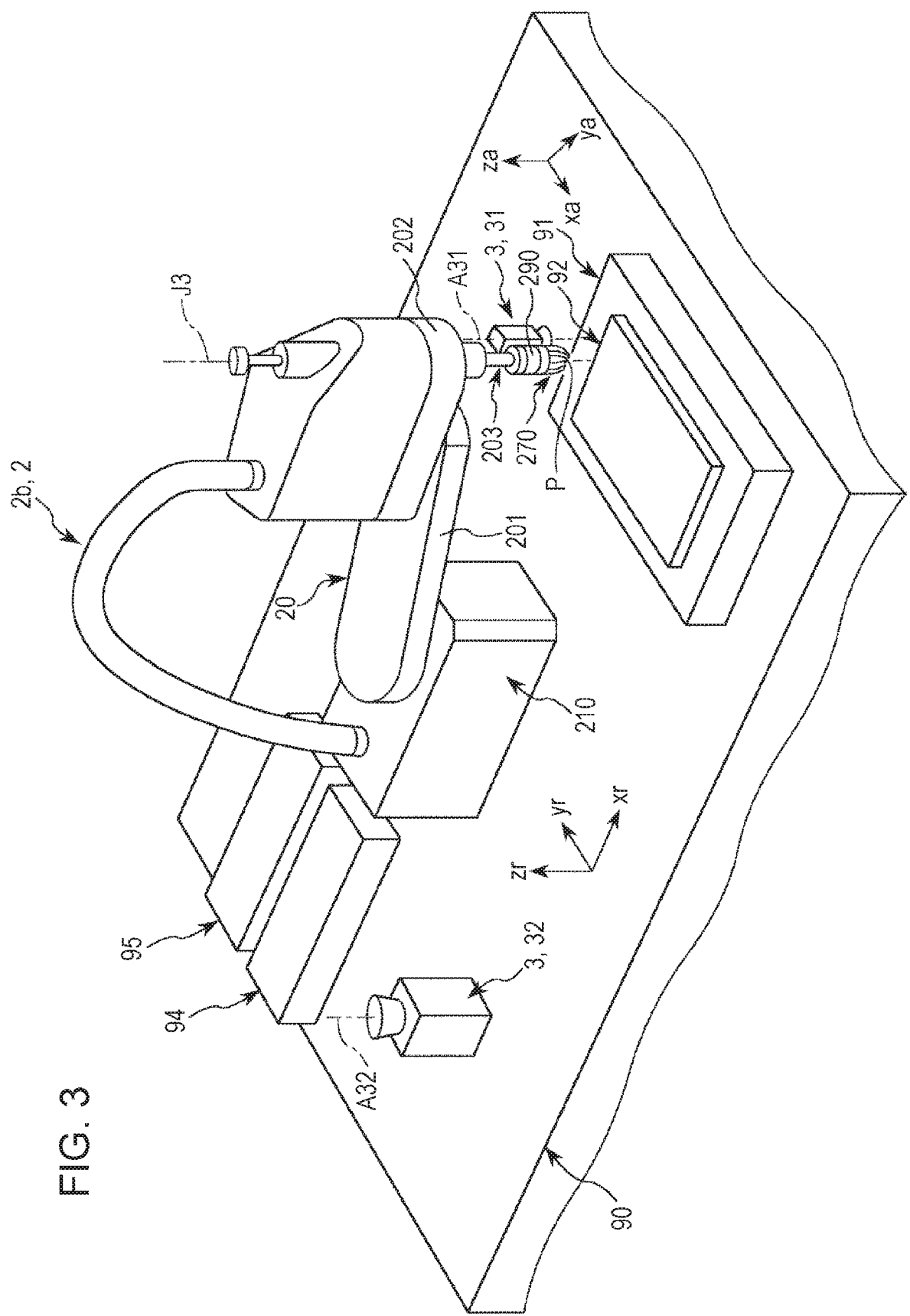
FIG. 3 is a perspective view illustrating an example of a robot included in the robot vision system illustrated in FIG. 1.
Figure 4:
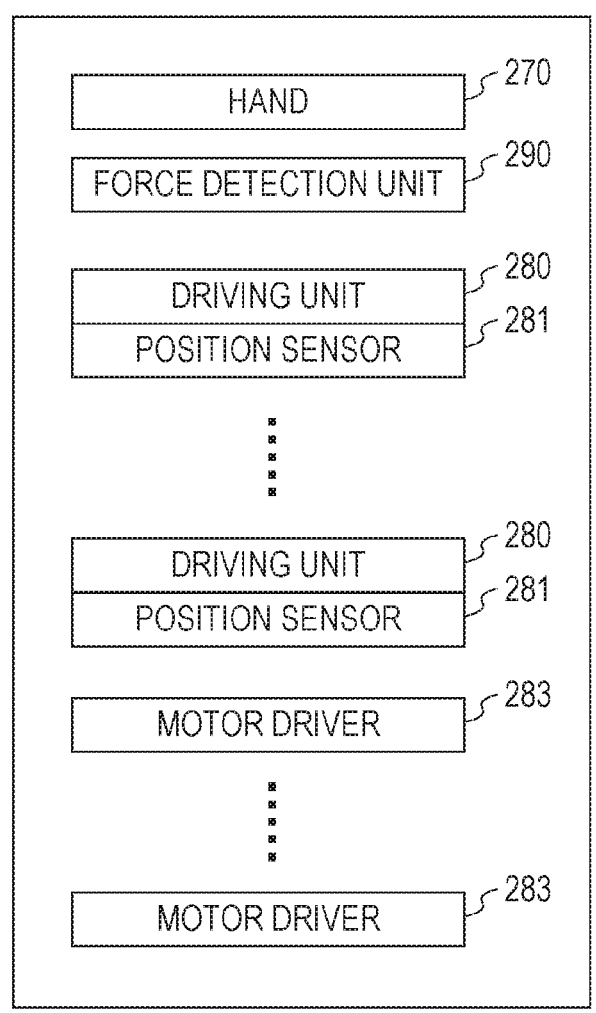
FIG. 4 is a system configuration diagram of the robot illustrated in FIG. 2 or FIG. 3.
Figure 5:
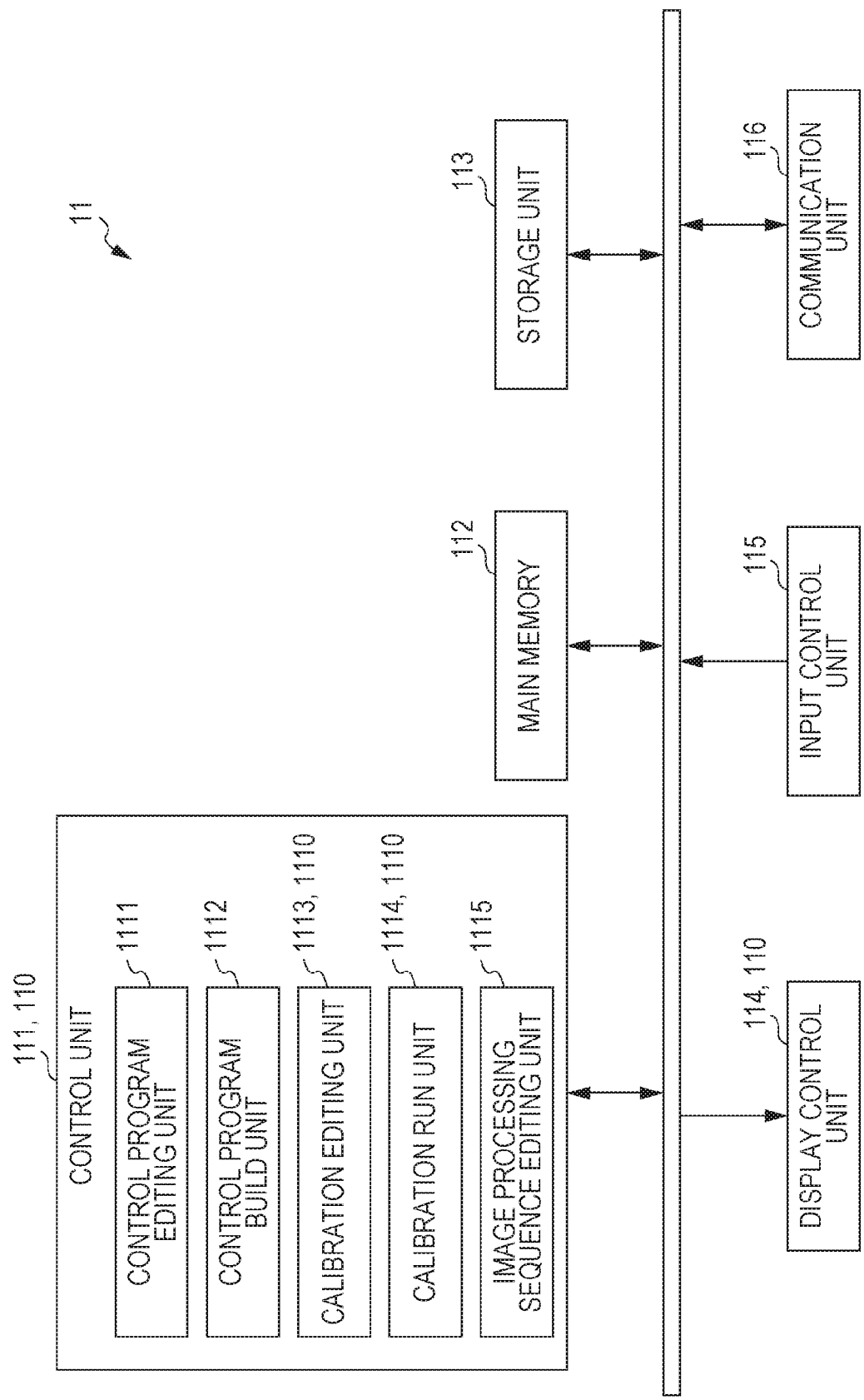
FIG. 5 is a system configuration diagram of a computer included in a robot system illustrated in FIG. 1.
Figure 6:
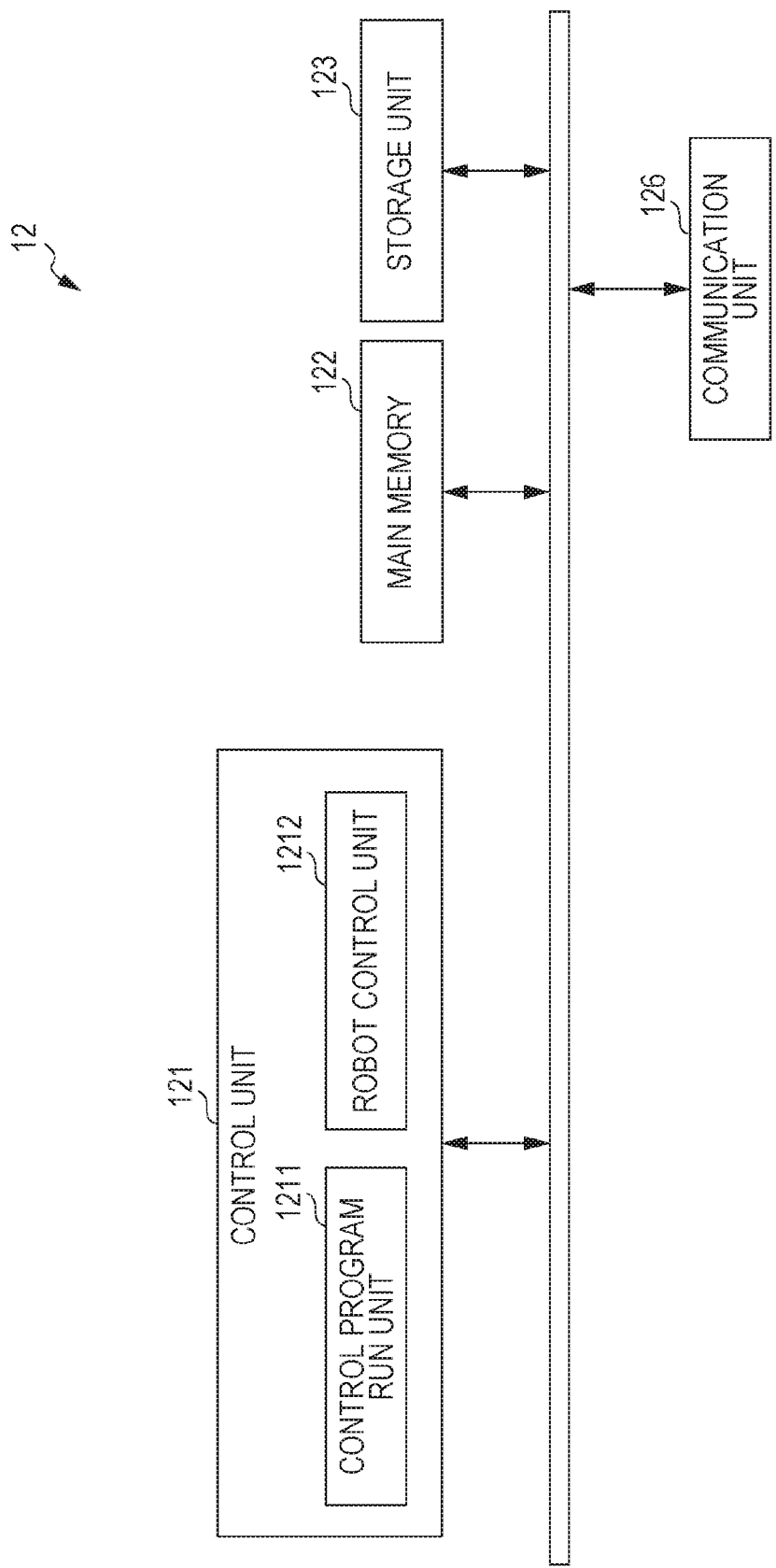
FIG. 6 is a system configuration diagram of a robot control device included in the robot system illustrated in FIG. 1.
Figure 7:
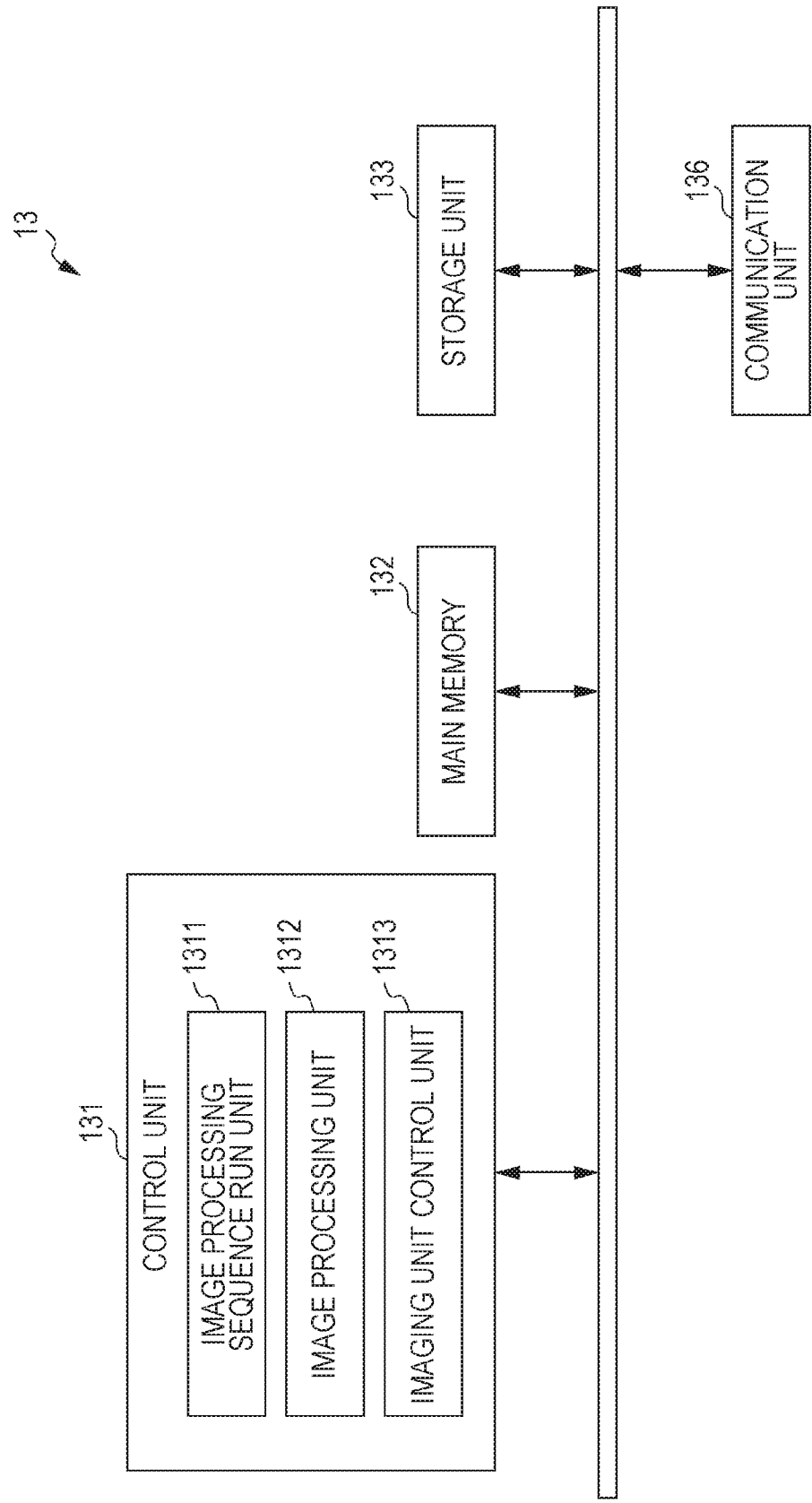
FIG. 7 is a system configuration diagram of an image processing device included in the robot system illustrated in FIG. 1.

FIG. 1 is a network diagram of a robot vision system according to a first embodiment of the invention. FIG. 2 is a perspective view illustrating an example of a robot included in the robot vision system illustrated in FIG. 1. FIG. 3 is a perspective view illustrating an example of a robot included in the robot vision system illustrated in FIG. 1. FIG. 4 is a system configuration diagram of the robot illustrated in FIG. 2 or FIG. 3. FIG. 5 is a system configuration diagram of a computer included in a robot system illustrated in FIG. 1. FIG. 6 is a system configuration diagram of a robot control device included in the robot system illustrated in FIG. 1. FIG. 7 is a system configuration diagram of an image processing device included in the robot system illustrated in FIG. 1.

In the following description, the upper side of FIGS. 2 and 3 is referred to as "upper", and the lower side thereof is referred to as "lower" for the convenience of description. A base 210 side of FIGS. 2 and 3 is referred to as "base end", and an opposite side (hand 270 side as end effector) thereof is referred to as "tip end". The upper and lower direction of FIG. 2 or FIG. 3 is set as "vertical direction", and the left and right direction thereof is set as "horizontal direction". In the specification, "horizontal" includes not only a case where it is perfectly horizontal but also a case where it is inclined within ±5° with respect to the horizontal. Similarly, in the specification, "vertical" includes not only a case where it is perfectly vertical but also a case where it is inclined within ±5° with respect to the vertical. In the specification, "parallel" includes not only a case where two lines (include axes) or planes are perfectly parallel to each other but also a case where they are inclined within ±5°. In the specification, "orthogonal" includes not only a case where two lines (include axes) or planes are perfectly orthogonal to each other but also a case where they are inclined within ±5°.

A robot vision system 100 (robot system) illustrated in FIG. 1 is, for example, a device used for work such as holding, transportation, assembly, and examination of a workpiece such as electronic part and electronic apparatus. The robot vision system 100 includes a control system 10 (control device), at least one robot 2, a plurality of imaging units 3 having an imaging function, a display device 41 (display unit), and an input device 42 (input unit). The control system 10 includes a computer 11 (main control device, first control device), a robot control device 12 (second control device), and an image processing device 13 (third control device). In a case where the robot vision system 100 includes a plurality of robots 2, a plurality of robots 2 (for example, any one of robot 2a or robot 2b) having the same type (same kind) may be included or a plurality of robots 2 (for example, robot 2a and robot 2b) having different type (different kind) may be included.

The computer 11, the robot control device 12 and the image processing device 13 are connected to each other by wired or wireless communication (hereinafter, also simply referred to as "connection"). The display device 41 and the input device 42 are respectively connected to the computer 11 by wired or wireless communication. The robot 2 is connected to the robot control device 12 by wired or wireless communication. The plurality of imaging units 3 are respectively connected to the image processing device 13 by wired or wireless communication. The imaging unit 3, the display device 41, and the input device 42 may be respectively connected to the image processing device 13.

In the robot vision system 100, for example, the imaging unit 3 images the workpiece or the like, and the robot 2 performs the work with respect to the workpiece or the like based on a captured image (image data) captured by the imaging unit 3 under the control of the control system 10. The robot vision system 100 performs, for example, the creation of an image processing sequence or the like in order to recognize the workpiece in the imaging unit 3 and calibration for associating an imaging coordinate system with a robot coordinate system (tip end coordinate system or base coordinate system) under the control of the control system 10 in order to allow the robot 2 to perform appropriate work.

Hereinafter, each unit configuring the robot vision system 100 will be described.

Robot

As illustrated in FIG. 1, the robot 2 is connected to the robot control device 12. A type of the robot 2 connectable to the robot control device 12 is not particularly limited. The type may be, for example, a robot 2a (robot 2) as a vertical articulated robot illustrated in FIG. 2 or a robot 2b (robot 2) as a horizontal articulated robot illustrated in FIG. 3. Here, the "horizontal articulated robot" refers to a robot in which an arm (except for spline shaft 203) moves in the horizontal direction. The "vertical articulated robot" refers to a robot in which the number of axes (number of arms) is three or more and two axes of the three axes are intersect (orthogonal) to each other.

Hereinafter, the robots 2a and 2b will be briefly described.

Robot 2a

As illustrated in FIG. 2, the robot 2a (robot 2) is mounted, for example, on a worktable 90. The robot 2a is a so-called 6-axis vertical articulated robot (6 degrees of freedom). The robot 2a has the base 210 attached on the worktable 90, a robot arm 20 connected to the base 210, a force measurement unit 290 attached on the tip end of the robot arm 20, and a hand 270 (end effector) attached on the tip end of the force measurement unit 290.

The robot arm 20 of the robot 2a has a first arm 21 (arm), a second arm 22 (arm), a third arm 23 (arm), a fourth arm 24 (arm), a fifth arm 25 (arm), and a sixth arm 26 (arm). The arms 21 to 26 are connected in this order from a base end side toward a tip end side. The force measurement unit 290 is configured to have, for example, a force sensor (for example, 6-axis force sensor) that measures force (including moment) applied to the hand 270 and the like. The hand 270 has two fingers that can grip the workpiece and rotates as the sixth arm 26 rotates. The hand 270 is attached such that the central axis of the hand 270 coincides with a rotation axis O6 of the sixth arm 26 (tip end arm) in terms of design. Here, a tip end center of the hand 270 is referred to as a tool center point P. In the embodiment, the tool center point P is the center of an area between the two fingers of the hand 270. A tip end center of the robot arm 20 is denoted by a "tip end axis coordinate".

As illustrated in FIG. 4, the robot 2a has a driving unit 280 that rotates (drives) one arm with respect to the other arm (or base 210). The driving unit 280 includes a motor (not illustrated) that generates driving force and a speed reducer (not illustrated) that reduces the driving force of the motor. As the motor included in the driving unit 280, for example, a servo motor such as an AC servo motor and a DC servo motor can be used. As the speed reducer included in the unit, for example, a planetary gear type reducer, a strain wave gearing device, or the like can be used. Each driving unit 280 is provided with a position sensor 281 (angle sensor) that measures a rotation angle of a rotation axis of the motor or the speed reducer. In the embodiment, the robot 2a has six driving units 280 and six position sensors 281 which are the same number as the six arms 21 to 26. Each driving unit 280 is electrically connected to a motor driver 283 and controlled by the robot control device 12 through the motor driver 283.

As illustrated in FIG. 2, in the robot 2a having above configuration, a three-dimensional orthogonal coordinate system determined by xr-axis and yr-axis which are respectively parallel to the horizontal direction, and zr-axis which is orthogonal to the horizontal direction and sets the vertical upward direction as the positive direction is set as a base coordinate system with the base 210 as the reference. In the embodiment, the base coordinate system sets a central point of a lower end surface of the base 210 as the original point. A translation component with respect to xr-axis is set as "component xr", the translation component with respect to yr-axis is set as "component yr", the translation component with respect to zr-axis is set as "component zr", a rotation component around zr-axis is set as "component ur", the rotation component around yr-axis is set as "component vr", and the rotation component around xr-axis is set as "component wr". The unit of the length (magnitude) of the component xr, component yr, and component zr is "mm", and the unit of the angle (magnitude) of the component ur, component vr, and component wr is "°".

In the robot 2a, a tip end coordinate system is set with a tip end portion of the hand 270 as the reference. The tip end coordinate system is the three-dimensional orthogonal coordinate system determined by xa-axis, ya-axis, and za-axis which are respectively orthogonal to each other. In the embodiment, the tip end coordinate system sets a tip end axis coordinate of the robot 2a as the original point. The calibration between the base coordinate system and the tip end coordinate system is already completed, and a coordinate of the tip end coordinate system with the base coordinate system as the reference can be calculated. The translation component with respect to xa-axis is set as "component xa", the translation component with respect to ya-axis is set as "component ya", the translation component with respect to za-axis is set as "component za", the rotation component around za-axis is set as "component ua", the rotation component around ya-axis is set as "component va", and the rotation component around xa-axis is set as "component wa". The unit of the length (magnitude) of the component xa, component ya, and component za is "mm", and the unit of the angle (magnitude) of the component ua, component va, and component wa is "°".

Here, in the specification, the base coordinate system and the tip end coordinate system are also referred to as the robot coordinate system, respectively. That is, in the specification, a coordinate set with any place of the robot 2 as the reference is referred to as "coordinate system of robot (robot coordinate system)".

Robot 2b

As illustrated in FIG. 3, similarly to the robot 2a, the robot 2b (robot 2) is also mounted, for example, on the worktable 90. Similarly to the robot 2a, the robot 2b has also the base 210 attached on the worktable 90, a robot arm 20 connected to the base 210, a force measurement unit 290 attached on the tip end of the robot arm 20, and a hand 270 (end effector) which is attached on the tip end of the force measurement unit 290 and can grip the workpiece. In the robot 2b, description of the same configuration as that of the robot 2a will be omitted, and differences from the robot 2a will be mainly described.

The robot arm 20 of the robot 2b has a first arm 201 (arm), a second arm 202 (arm) provided at the tip end portion of arm 201, and a spline shaft 203 (arm) provided at the tip end portion of the second arm 202. The hand 270 is attached such that the central axis of the hand 270 coincides with axis J3 of the spline shaft 203 in terms of design. The hand 270 rotates as the spline shaft 203 rotates.

Similarly to the robot 2a, the robot 2b has also three driving units 280 and three position sensors 281 which are the same number as the three arms (refer to FIGS. 3 and 4). The spline shaft 203 is connected to a spline nut and a ball screw nut (not illustrated) as a power transmission mechanism that transmits power of the driving unit 280. Therefore, the spline shaft 203 is rotatable around axis J3 thereof and movable in the upper and lower direction (up and down).

Similarly to the robot 2a, in the robot 2b, the base coordinate system (three-dimensional orthogonal coordinate system determined by xr-axis, yr-axis, and zr-axis) and the tip end coordinate system (three-dimensional orthogonal coordinate system determined by xa-axis, ya-axis, and za-axis) are also set.

The configuration of the robot 2 (robot 2a and 2b) has been briefly described. The robot 2 controlled by the control system 10 is not limited to the configurations illustrated in FIGS. 2 and 3. For example, the number of arms is not limited to the number of arms described above and is predetermined. An end effector for performing the work with respect to the workpiece is not limited to the hand 270 and may have any configuration.

Imaging Unit

As illustrated in FIG. 1, the plurality of imaging units 3 are respectively connected to the image processing device 13. In the embodiment, as illustrated in FIGS. 2 and 3, the robot vision system 100 includes a fixed camera 32 (imaging unit 3) disposed around the robot 2 and a mobile camera 31 (imaging unit 3) fixed to the robot arm 20 of the robot 2. In FIGS. 2 and 3, the mobile camera 31 is attached to the tip end portion of the robot arm 20. Specifically, the mobile camera 31 is attached to the sixth arm 26 in the robot 2a illustrated in FIG. 2 and is attached to the tip end portion of the spline shaft 203 in the robot 2b illustrated in FIG. 3.

Hereinafter, the fixed camera 32 and the mobile camera 31 will be briefly described.

Fixed Camera 32

The fixed camera 32 illustrated in FIGS. 2 and 3 is fixed on the worktable 90 and is provided within a movable range of the hand 270 of the robot 2. The fixed camera 32 has the imaging function and is mounted so as to be able to image the upper part in the vertical direction.

The fixed camera 32 includes, for example, an imaging element configured of a charge coupled device (CCD) image sensor having a plurality of pixels and a lens (optical system) (not illustrated). The fixed camera 32 images light reflected by an imaging object on a light receiving surface (sensor surface) of the imaging element by the lens, converts the light into an electrical signal, and output the electrical signal to the control system 10 (image processing device 13 in the embodiment). Here, the light receiving surface is a surface of the imaging element and a surface on which the light is imaged. The fixed camera 32 is provided such that optical axis A32 (optical axis of lens) thereof is along the vertical direction of a plane (upper surface) of the worktable 90 in terms of design.

In the fixed camera 32, a two-dimensional orthogonal coordinate system determined by xc-axis and yc-axis which are respectively parallel to the in-plane direction of the captured image is set as an image coordinate system (coordinate system of captured image output from fixed camera 32) (not illustrated). The translation component with respect to xc-axis is set as "component xc", the translation component with respect to yc-axis is set as "component yc", and the rotation component around the normal of a xc-yc plane is set as "component uc". The unit of the length (magnitude) of the component xc and component yc is "pixel", and the unit of the angle (magnitude) of the component uc is "°". An image coordinate system of the fixed camera 32 is the two-dimensional orthogonal coordinate system in which a three-dimensional orthogonal coordinate appeared in the camera field of view of the fixed camera 32 is nonlinearly converted by taking into account optical characteristics (for example, focal distance and distortion) of the lens and the number of pixels and size of the imaging element.

Mobile Camera 31

The mobile camera 31 illustrated in FIGS. 2 and 3 is fixed to the robot arm 20 as described above. The mobile camera 31 has the imaging function and is mounted so as to be able to image a tip end side of the robot arm 20 in the embodiment.

The mobile camera 31 includes, for example, an imaging element configured of a CCD image sensor having a plurality of pixels and a lens (optical system) (not illustrated). The mobile camera 31 images light reflected by an imaging object on a light receiving surface (sensor surface) of the imaging element by the lens, converts the light into an electrical signal, and output the electrical signal to the control system 10 (image processing device 13 in the embodiment). Here, the light receiving surface is a surface of the imaging element and a surface on which the light is imaged. The mobile camera 31 is provided such that optical axis A31 (optical axis of lens) thereof is along a tip end axis (rotation axis O6 of the sixth arm 26 in the case of the robot 2a and axis J3 of spline shaft 203 in the case of the robot 2b) of the robot arm 20 in terms of design.

In the mobile camera 31, a two-dimensional orthogonal coordinate system determined by xb-axis and yb-axis which are respectively parallel to the in-plane direction of the captured image is set as an image coordinate system (coordinate system of captured image output from mobile camera 31) of the mobile camera 31 (not illustrated). The translation component with respect to xb-axis is set as "component xb", the translation component with respect to yb-axis is set as "component yb", and the rotation component around the normal of an xb-yb plane is set as "component ub". The unit of the length (magnitude) of the component xb and component yb is "pixel", and the unit of the angle (magnitude) of the component ub is "°". The image coordinate system of the mobile camera 31 is the two-dimensional orthogonal coordinate system in which a three-dimensional orthogonal coordinate appeared in the camera field of view of the mobile camera 31 is nonlinearly converted by taking into account optical characteristics (for example, focal distance and distortion) of the lens and the number of pixels and size of the imaging element.

The configuration of the imaging unit 3 has been briefly described. The imaging unit 3 controlled by the control system 10 is not limited to the illustrated configuration. An attachment place (mounting place) of the imaging unit 3 controlled by the control system 10 is not limited to the illustrated place. For example, the attachment place of the mobile camera 31 may be the fifth arm 25 of the robot 2a illustrated in FIG. 2, the second arm 202 of the robot 2b illustrated in FIG. 3, or the like. The fixed camera 32 may be mounted on a ceiling or the like located on the upper part of the robot 2 or on a wall, a pillar, or the like mounted around the robot 2 in a lateral direction (not illustrated). An imaging direction of the imaging unit 3 is not limited to the direction described above and is predetermined. The number of imaging units 3 is respectively two in FIGS. 2 and 3, but the number of imaging units 3 is not particularly limited and may be one or may be three or more.

Display Device 41

The display device 41 (display unit) illustrated in FIG. 1 includes a monitor (not illustrated) configured of, for example, a liquid crystal display or the like and has a function of displaying, for example, the captured image captured by the imaging unit 3, various screens (for example, operation window and screen relating to processing result), and the like. Therefore, a user can grasp the captured image, the work of the robot 2, and the like.

Input Device 42

The input device 42 (input unit) is configured of, for example, a mouse, a keyboard, and the like. Therefore, the user can give an instruction of various types of processing or the like to the control system 10 by operating the input device 42.

In the embodiment, a display input device (not illustrated) having both the display device 41 and the input device 42 may be provided instead of the display device 41 and the input device 42. For example, a touch panel (capacitive touch panel or pressure sensitive touch panel) or the like can be used as the display input device. The input device 42 may be configured to recognize sound (including voice).

Control System (Control Device)

As described above, the control system 10 includes the computer 11, the robot control device 12, and the image processing device 13 (refer to FIG. 1). The control system 10 controls driving of the robot 2, the plurality of imaging units 3, and the display device 41. The control system 10 is mounted, for example, outside the worktable 90 (not illustrated in FIGS. 2 and 3).

Hereinafter, the control system 10, the computer 11, and the robot control device 12 will be sequentially described.

Computer

The computer 11 is configured of, for example, a computer (for example, personal computer (PC) or programmable logic controller (PLC)) in which a program (operating system: OS) is installed. The computer 11 includes, for example, a central processing unit (CPU) and a graphics processing unit (GPU) as a processor, a random access memory (RAM), and a read only memory (ROM) in which a program is stored.

Hereinafter, each function (function unit) of the computer 11 will be described.

As illustrated in FIG. 5, the computer 11 includes a control unit 111, a main memory 112, a storage unit 113, a display control unit 114, an input control unit 115 (acceptance unit), and a communication unit 116, and is configured to be able to mutually exchange data (communication) therebetween. Here, in the specification, the control unit 111 and the display control unit 114 configure a processing unit 110.

The function of the control unit 111 can be realized, for example, by running various programs stored in the main memory 112 and the storage unit 113 by the CPU and the GPU. The control unit 111 includes, for example, a control program editing unit 1111, a control program build unit 1112, a calibration editing unit 1113, a calibration run unit 1114, and an image processing sequence editing unit 1115. The function unit (element) included in the control unit 111 is not limited thereto. Any of the function units may be omitted or another function unit may be added.

The control program editing unit 1111 creates and edits a control program (including work program for robot 2 to perform various types of work) for driving the robot 2. For example, the control program editing unit 1111 (computer 11) can designate various commands having predetermined arguments in the control program. The control program build unit 1112 builds the control program and converts the control program into a language (data string) that can be interpreted by the robot control device 12.

The calibration editing unit 1113 creates and edits a calibration program relating to the calibration. That is, the calibration editing unit 1113 has a function of editing setting content relating to the calibration. The calibration run unit 1114 runs the calibration program. More specifically, the calibration run unit 1114 transfers an instruction based on the calibration program to the robot control device 12 and the image processing device 13 and causes the robot 2 and the imaging unit 3 to perform an operation related to the calibration. Here, in the specification, the calibration editing unit 1113 and the calibration run unit 1114 configure a calibration control unit 1110.

The image processing sequence editing unit 1115 creates and edits an image processing program relating to the image processing sequence by the imaging unit 3. That is, the image processing sequence editing unit 1115 has a function of editing setting content relating to the image processing sequence.

In addition, the control unit 111 performs various calculations, a determination, an instruction to each function unit included in the computer 11, an instruction to the robot control device 12, an instruction to the image processing device 13, and the like in response to an instruction of the user received by the input control unit 115.

The main memory 112 is a work area of the control unit 111. The function of the main memory 112 can be realized by, for example, the RAM.

The storage unit 113 has a function of recording various types of data (including program). The function of the storage unit 113 can be realized by the ROM and the like or a so-called external storage device (not illustrated). The storage unit 113 stores software (for example, application software) including, for example, the control program for driving the robot 2, the calibration program relating to the calibration, the image processing program relating to the image processing sequence by the imaging unit 3, and the like. In other words, the software described above is installed in the computer 11. The software includes a program relating to the tool setting, a program relating to a local setting (setting of local coordinate system), a program for driving various robots 2 by various commands to run various types of processing (for example, tool setting, local setting, calibration creation and run (calibration), and image processing sequence creation and run (creation of image processing sequence)), and a program for setting various parameters in force control based on an output from the force measurement unit 290. The software described above is stored in a recording medium (not illustrated) such as a CD-ROM, and may be provided from the recording medium or may be provided through a network.

The display control unit 114 is connected to the display device 41 and has a function of displaying the captured image or various screens (for example, operation window or screen relating to processing result) on the monitor of the display device 41. That is, the display control unit 114 controls the driving of the display device 41. The function of the display control unit 114 can be realized by, for example, the GPU. For example, the display control unit 114 sequentially displays a plurality of guide screens relating to the image processing sequence on the display device 41 in an interactive manner (interactively) with the user. The display control unit 114 sequentially displays a plurality of calibration creation screens relating to the calibration, a plurality of tool setting screens relating to the tool setting, and a plurality of local setting screens relating to the setting of a local coordinate system on the display device 41 in an interactive manner with the user, respectively.

The input control unit 115 is connected to the input device 42 and has a function of accepting an input from the input device 42. The function of the input control unit 115 can be realized by, for example, an interface circuit. For example, in a case where the touch panel is used, the input control unit 115 has a function as an input detection unit that detects contact of a finger of the user to the touch panel or the like.

The communication unit 116 has a function of exchanging data with the outside of the robot control device 12, the image processing device 13, and the like. The function of the communication unit 116 can be realized by, for example, an interface circuit or the like.

Robot Control Device

The robot control device 12 controls the driving of the robot 2 based on, for example, an instruction from the computer 11. The robot control device 12 is a computer in which a program (OS and the like) is installed. The robot control device 12 includes, for example, a CPU as a processor, a RAM, and a ROM in which the program is stored.

Hereinafter, each function (function unit) of the robot control device 12 will be described.

As illustrated in FIG. 6, the robot control device has a control unit 121 (robot control unit), a main memory 122, a storage unit 123, and a communication unit 126, and is configured to be able to mutually exchange data therebetween.

The function of the control unit 121 can be realized, for example, by running various programs stored in the main memory 122 or the storage unit 123 by the CPU. The control unit 121 includes, for example, a control program run unit 1211 and a robot control unit 1212. The function unit (element) included in the control unit 121 is not limited thereto. Any of the function units may be omitted or another function unit may be added.

The control program run unit 1211 runs the control program for driving the robot 2 based on an instruction from the computer 11. For example, the control program run unit 1211 runs various types of processing (for example, tool setting, local setting, calibration processing (calibration), and image processing sequence run instruction) to the robot 2 by various commands. The robot control unit 1212 controls the driving of each driving unit 280 to drive or stop the robot arm 20. For example, the control unit 121 derives a target value of a motor (not illustrated) included in each driving unit 280 in order to move the hand 270 to a target position based on information output from the position sensor 281 or the force measurement unit 290. In addition, the control unit 121 has a function of performing processing such as various calculations and a determination, a function of performing an instruction of the robot control device 12, and the like.

The main memory 122 is a work area of the control unit 121. The function of the main memory 122 can be realized by, for example, the RAM. The storage unit 123 has a function of recording various types of data (including program). The storage unit 123 records, for example, the control program and the like. The function of the storage unit 123 can be realized by the ROM and the like or a so-called external storage device (not illustrated). The communication unit 126 has a function of exchanging data with the outside of the robot 2, the computer 11, the image processing device 13, and the like. The function of the communication unit 126 can be realized, for example, by an interface circuit or the like.

Image Processing Device

The image processing device 13, for example, controls the driving of the imaging unit 3 based on an instruction from the computer 11 and performs processing (image processing) of the captured image captured by the imaging unit 3. The image processing device 13 is, for example, a computer in which a program (OS and the like) is installed. The image processing device 13 includes, for example, a CPU and a GPU as a processor, a RAM, and a ROM in which the program is stored.

Hereinafter, each function (function unit) of the image processing device 13 will be described.

As illustrated in FIG. 7, the image processing device 13 has a control unit 131 (imaging unit control unit), a main memory 132, a storage unit 133, and a communication unit 136, and is configured to be able to mutually exchange data therebetween.

The function of the control unit 131 can be realized, for example, by running various programs stored in the main memory 132 or the storage unit 133 by the CPU and the GPU. The control unit 131 includes, for example, an image processing sequence run unit 1311, an image processing unit 1312, and an imaging unit control unit 1313. The function unit (element) included in the control unit 131 is not limited thereto. Any of the function units may be omitted or another function unit may be added.

The image processing sequence run unit 1311 has a function of running the image processing sequence based on an instruction (order) from the computer 11. The image processing unit 1312 has a function of performing image processing such as an extraction of various types of information from the captured image. Specifically, the image processing unit 1312 performs processing such as various calculations, various determinations, and the like, for example, based on the captured image (image data) from the imaging unit 3. For example, the image processing unit 1312 calculates coordinates (components xb, yb, and ub or components xc, yc, and uc) of the imaging object in the image coordinate system based on the captured image. For example, the image processing unit 1312 converts the coordinate (image coordinate) in the image coordinate system into a coordinate (tip end coordinate) in the tip end coordinate system of the robot 2 or a coordinate (base coordinate) in the base coordinate system of the robot 2. A correction parameter used for the conversion is obtained by, for example, the computer 11 or the robot control device 12. The correction parameter used for the conversion may be obtained by the image processing device 13. The imaging unit control unit 1313 has a function of, for example, controlling the driving of the imaging unit 3 and acquiring the captured image (image data) from the imaging unit 3.

In addition, the control unit 131 has a function of performing processing such as various calculations, a determination, and the like in response to an instruction from the computer 11, a function of performing an instruction to each function unit included in the image processing device 13, and the like.

The main memory 132 is a work area of the control unit 131. The function of the main memory 132 can be realized by, for example, the RAM.

The storage unit 133 has a function of recording various types of data (including program). The storage unit 133 records, for example, a program relating to the image processing sequence and the like. The function of the storage unit 133 can be realized by the ROM and the like or a so-called external storage device (not illustrated).

The communication unit 136 has a function of exchanging data with the outside of the imaging unit 3, the robot control device 12, the computer 11, and the like. The function of the communication unit 136 can be realized, for example, by an interface circuit or the like.

The configuration and the function of the control system 10 have been described. Each function of the computer 11, the robot control device 12, and the image processing device 13 described above may be included in any one of the computer 11, the robot control device 12, and the image processing device 13. The computer 11, the robot control device 12, and the image processing device 13 may be integrated. For example, the image processing sequence run unit 1311, the image processing unit 1312, and the imaging unit control unit 1313 included in the image processing device 13 may be included in the control unit 111 of the computer 11. The display control unit 114 and the input control unit 115 included in the computer 11 may be included in the image processing device 13. The control system 10 may not include the image processing device 13, and the computer 11 can include each function included in the image processing device 13 in the case. The calibration run unit 1114 included in the computer 11 may be included in the control unit 121 of the robot control device 12.

The basic configuration of the robot vision system 100 has been briefly described.

Next, an example of work program creation and teaching will be described. In the following description, a case of using the robot 2a illustrated in FIG. 2 as the robot 2 will be mainly described as an example.

Creation of Work Program

Figure 8:
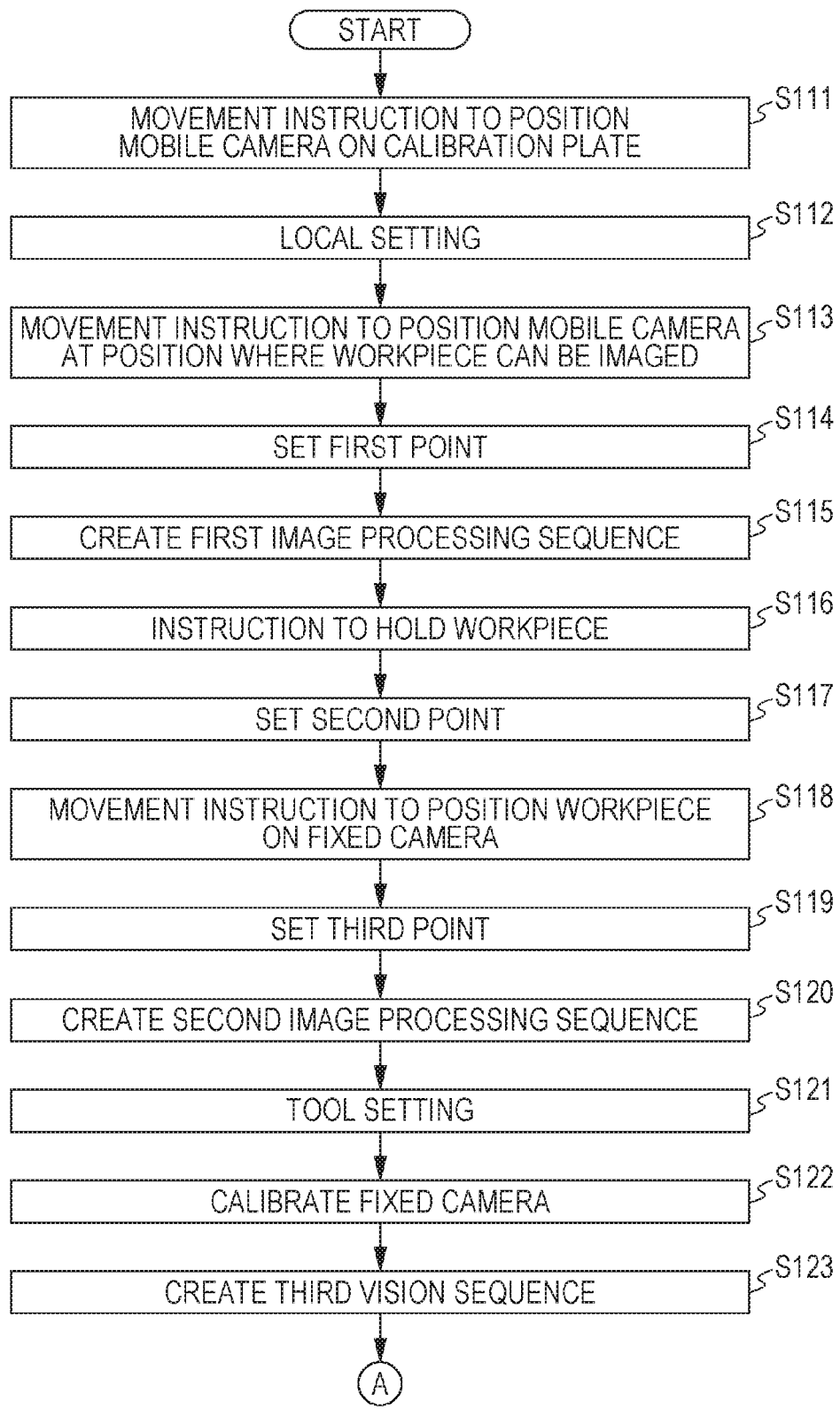
FIG. 8 is a flow diagram illustrating a flow of creating a work program by a control system illustrated in FIG. 1.
Figure 9:
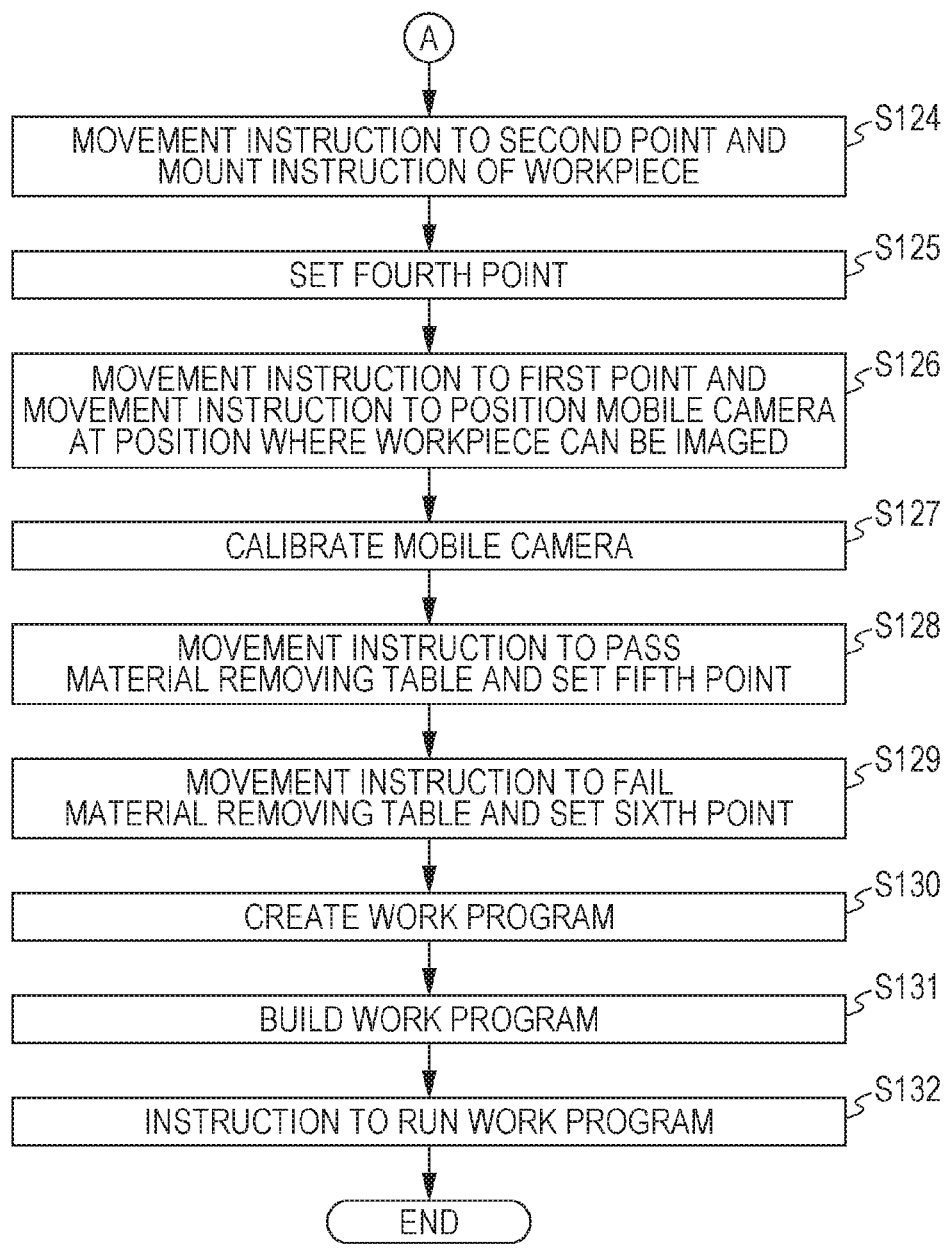
FIG. 9 is a flow diagram illustrating the flow of creating the work program by the control system illustrated in FIG. 1.
Figure 10:
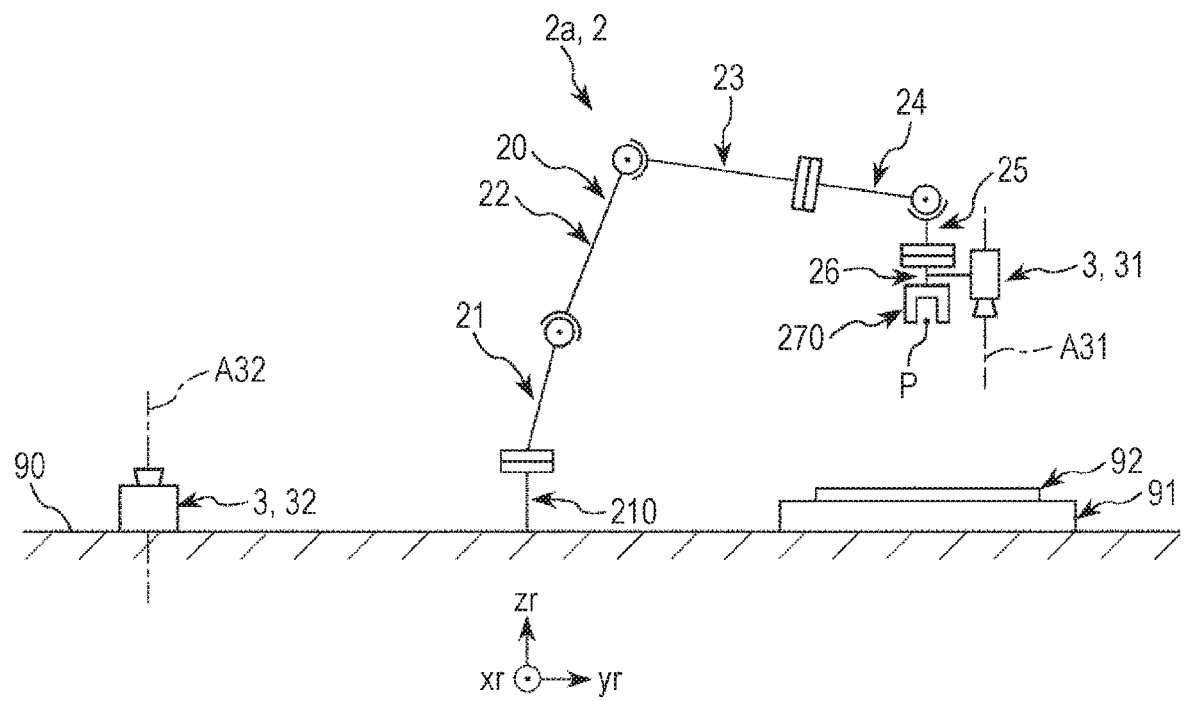
FIG. 10 is a diagram for describing step S111 of FIG. 8.
Figure 11:
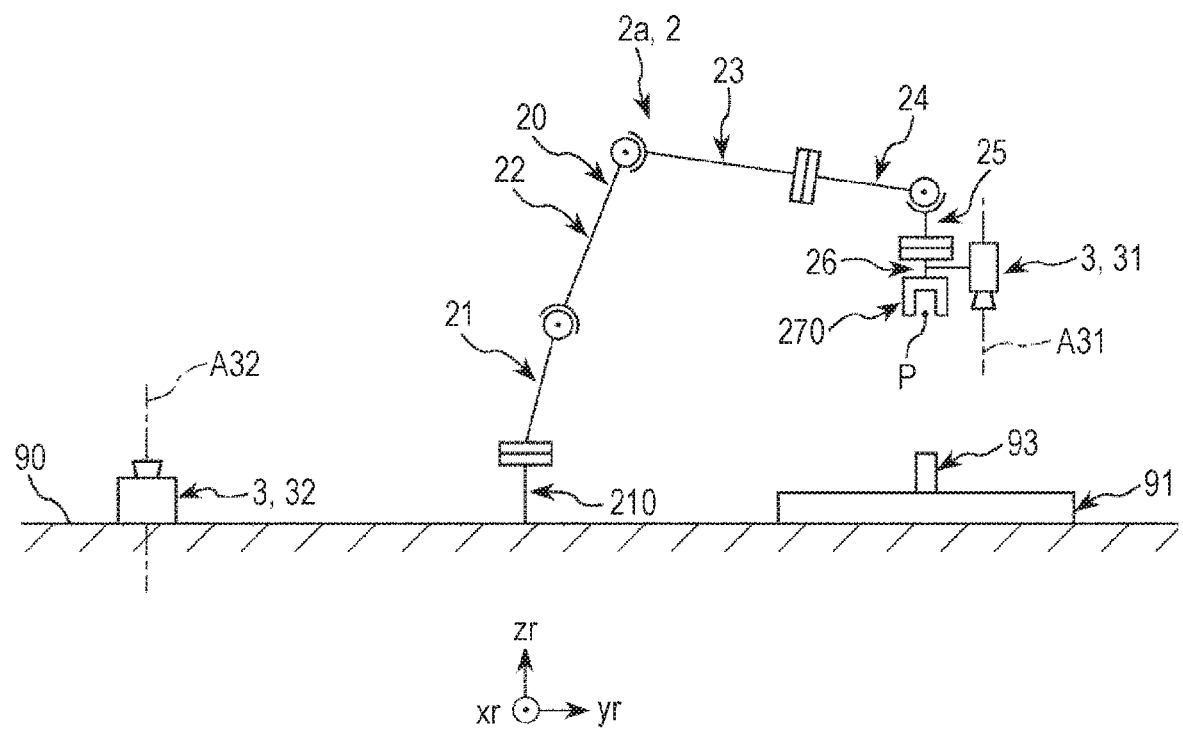
FIG. 11 is a diagram for describing step S113 of FIG. 8.
Figure 12:
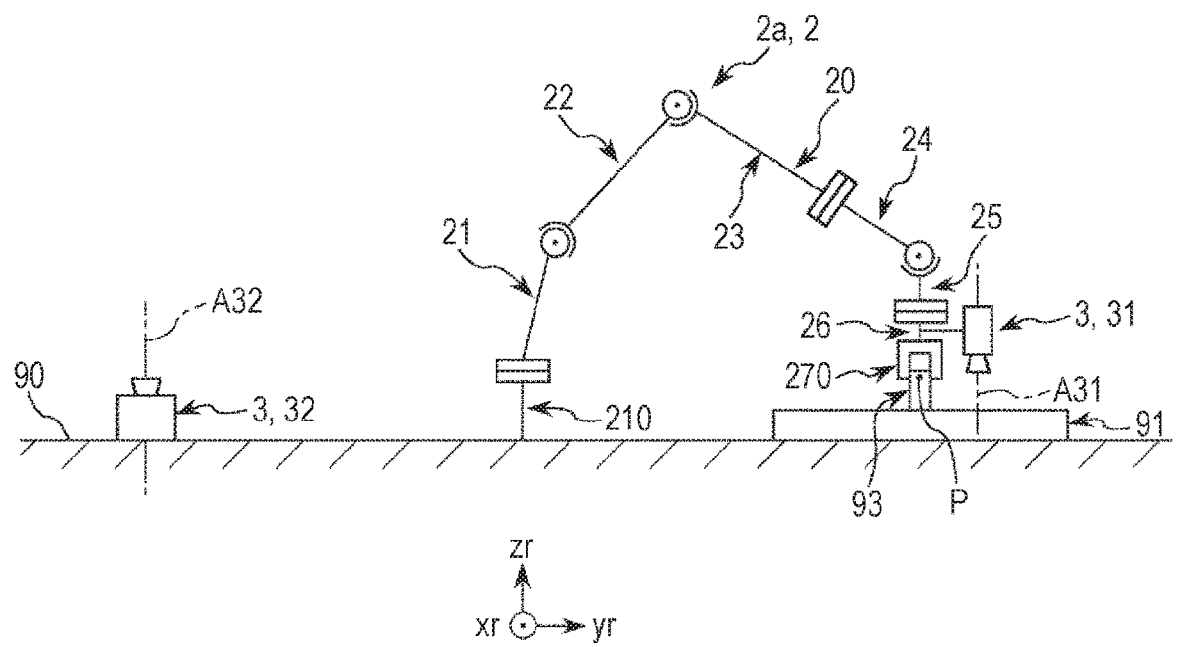
FIG. 12 is a diagram for describing step S116 of FIG. 8.
Figure 13:
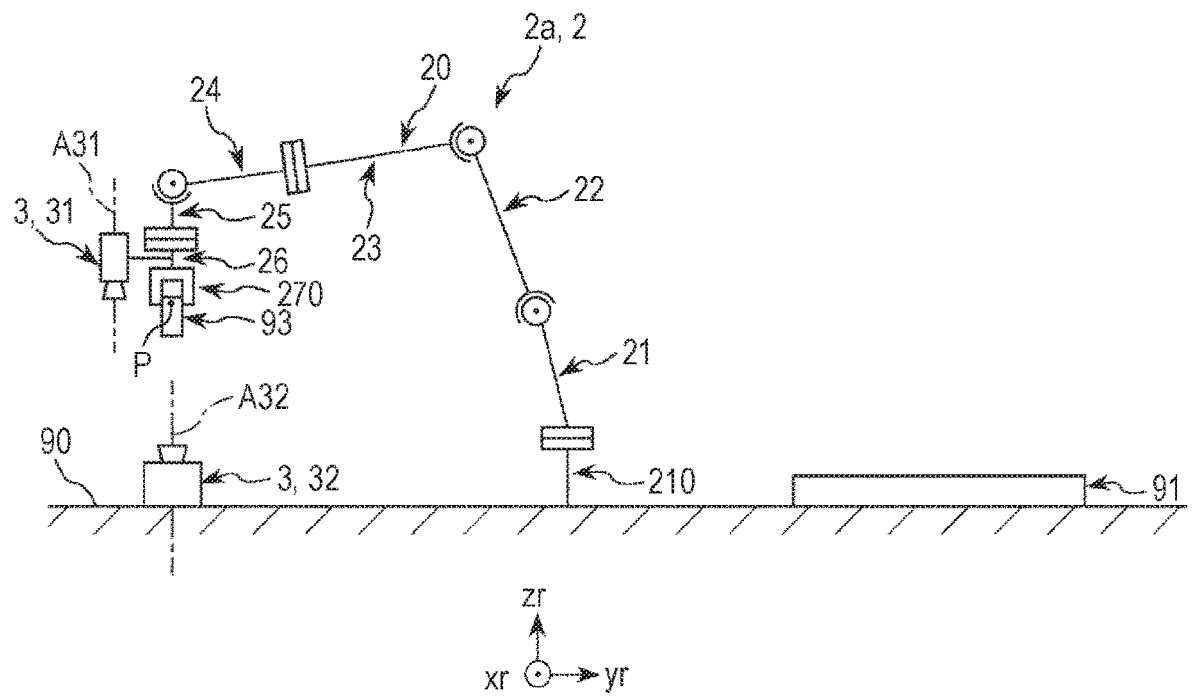
FIG. 13 is a diagram for describing step S118 of FIG. 8.
Figure 14:
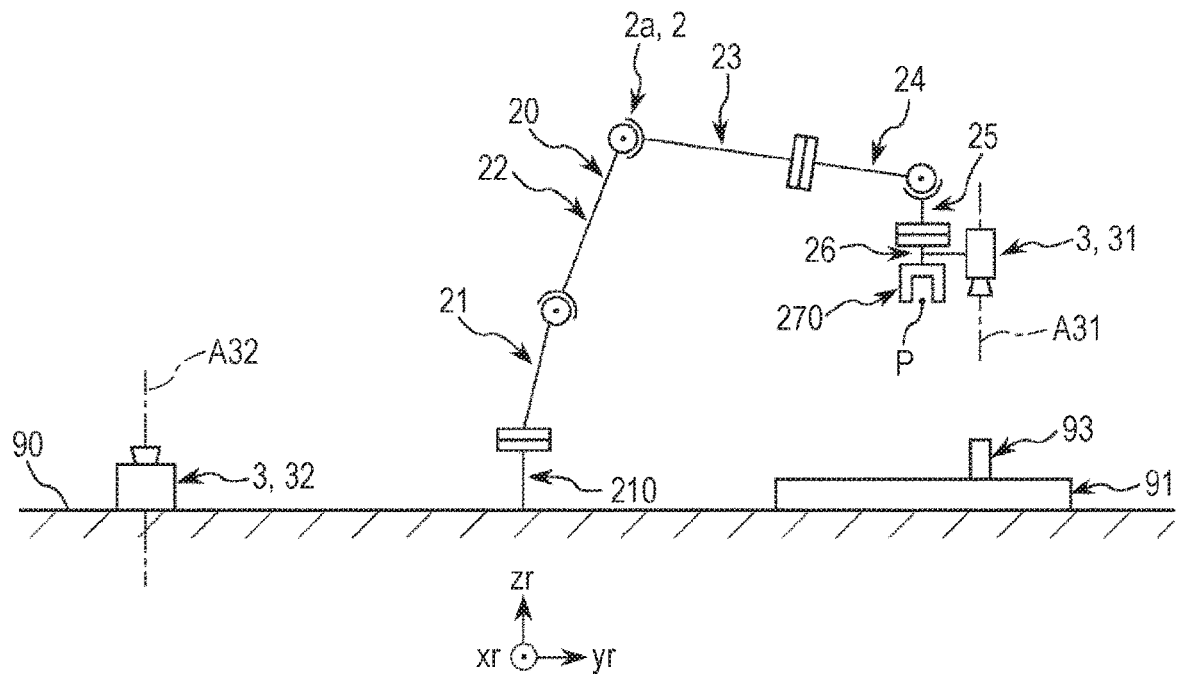
FIG. 14 is a diagram for describing step S126 of FIG. 9.
Figure 15:
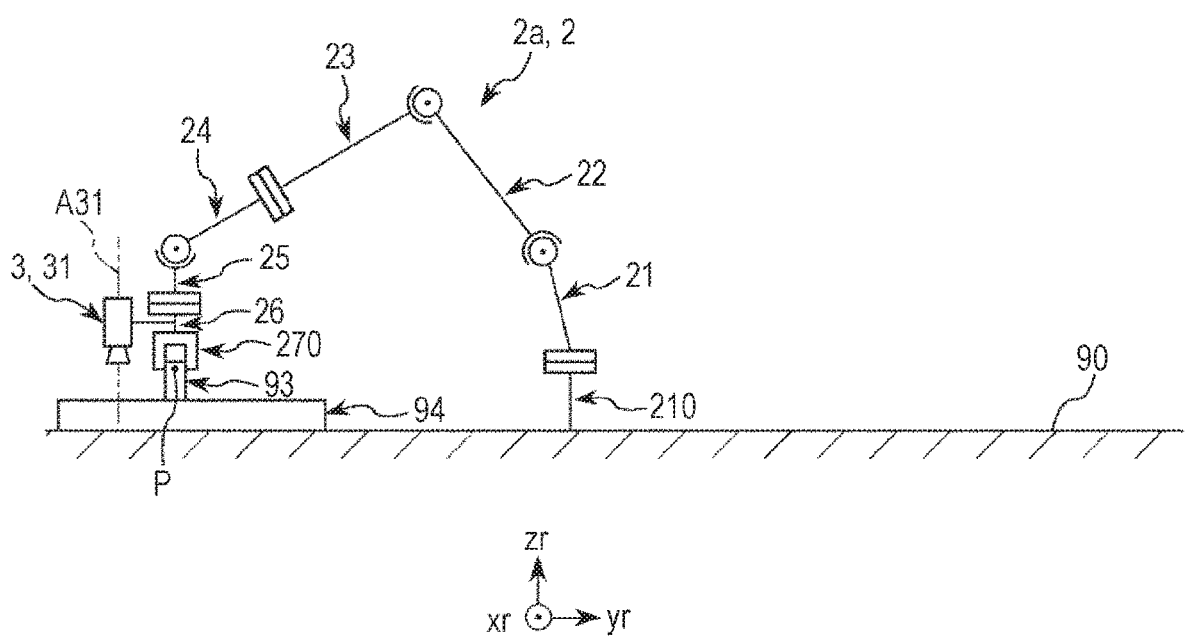
FIG. 15 is a diagram for describing steps S128 and S129 of FIG. 9.

FIGS. 8 and 9 are flow diagrams illustrating a flow of creating a work program by a control system illustrated in FIG. 1, respectively. FIG. 10 is a diagram for describing step S111 of FIG. 8. FIG. 11 is a diagram for describing step S113 of FIG. 8. FIG. 12 is a diagram for describing step S116 of FIG. 8. FIG. 13 is a diagram for describing step S118 of FIG. 8. FIG. 14 is a diagram for describing step S126 of FIG. 9. FIG. 15 is a diagram for describing steps S128 and S129 of FIG. 9.

In the following description, a work program is generated for work of the robot 2a illustrated in FIG. 2, for example, to grip a workpiece (not illustrated in FIG. 2) on a material feeding table 91 mounted on the worktable 90, perform an examination (for example, visual examination) of the workpiece on the fixed camera 32, and mount the workpiece on a pass material removing table 94 or a fail material removing table 95 based on the examination result. Various types of processing necessary for creating the work program are performed. For example, the calibration between the image coordinate system of the mobile camera 31 and the robot coordinate system (tip end coordinate system or base coordinate system) of the robot 2a, and the calibration between the image coordinate system of the fixed camera 32 and the robot coordinate system (tip end coordinate system or base coordinate system) of the robot 2a are performed as the various types of processing. For example, the teaching of each place with respect to the robot 2a is performed. For example, a tool setting for obtaining an offset in the tool center point P and the tip end axis coordinate (the other offset with respect to one of tool center point P and tip end axis coordinate) of the robot 2a is performed. The setting of a local coordinate system (local setting) different from the robot coordinate system is performed. The creation of the image processing sequence (image processing sequence) such as the image processing sequence creation, run, and reflection of a result thereof is performed.

Here, the user mounts a calibration plate 92 (calibration member) on the material feeding table 91 mounted on the worktable 90 as illustrated in FIG. 2 before running the creation of the work program. The display control unit 114 displays a main window 50 (instruction screen) on the display device 41 (refer to FIG. 17 or FIG. 18). The main window 50 will be described below in detail.

After this, the user gives an instruction to the control system 10 by an operation of clicking with the mouse of the input device 42 on various screens (windows) displayed on the display device 41 and by an operation of inputting a character, a number, or the like with the keyboard of the input device 42 on an instruction screen displayed on the display device 41. That is, the following control (processing) by the control system 10 in the creation of the work program is performed based on the instruction by the user using the input device 42. Hereinafter, the instruction by the user using the input device 42 (that is, input by input device 42) is referred to as "operation instruction". An operation instruction includes a selection operation for selecting desired content from contents displayed on the instruction screen by the input device 42 and an input operation for inputting the character, the number, or the like on the instruction screen by the input device 42.

Hereinafter, the work program creation will be described based on the flow diagrams illustrated in FIGS. 8 and 9.

First, the computer 11 issues a movement instruction to position the mobile camera 31 on the calibration plate 92 with respect to the robot control device 12 (FIG. 8: step S111). When receiving the movement instruction, the robot control device 12 drives the robot arm 20 to position the mobile camera 31 on the calibration plate 92 (refer to FIG. 10). In the embodiment, the mobile camera 31 faces the calibration plate 92 such that the optical axis A31 of the mobile camera 31 is approximately orthogonal to the calibration plate 92. The mobile camera is positioned such that focus of the mobile camera 31 matches a marker (not illustrated) attached to the calibration plate 92.

Next, the computer 11 performs the setting of the local coordinate system, that is, the local setting (FIG. 8: step S112). The local coordinate system is a coordinate system different from the robot coordinate system (base coordinate system or tip end coordinate system) and is the three-dimensional orthogonal coordinate system determined by the original point defined by the robot coordinate system, xd-axis, yd-axis, and zd-axis. In the embodiment, a local plane (virtual plane) including xd-axis and yd-axis of the local coordinate system is set on a plane parallel to the upper surface of the calibration plate 92 using the mobile camera 31 as a plane parallel to the worktable 90. Accordingly, for example, even in a case where the upper surface of the material feeding table 91 is inclined with respect to the horizontal plane, the robot 2a can perform accurate work on the upper surface of the material feeding table 91. In a case of using the robot 2b illustrated in FIG. 3, the setting of the local coordinate system may be omitted. The local setting described above is to set the local coordinate system described above and means to include the setting of the local coordinate system by performing various settings (including display processing) in the local setting, running local setting processing, and reflecting a local setting result.

A specific method of setting the local setting is not particularly limited, but there is a method of obtaining the setting method, for example, based on captured images obtained by imaging at least three markers (not illustrated) attached to the calibration plate 92 one by one and a tip end coordinate of the tool center point P at the time of the imaging.

The local setting is performed by display processing using instruction screens described below. The display processing in the local setting will be described below.

When the setting of the local coordinate system ends, the user removes the calibration plate 92 from the material feeding table 91 and mounts a workpiece 93 on the material feeding table 91 (refer to FIG. 11).

Next, the computer 11 issues a movement instruction to position the mobile camera 31 at a position where the workpiece 93 can be imaged with respect to the robot control device 12 (FIG. 8: step S113). When receiving the movement instruction, the robot control device 12 moves the robot arm 20 to position the mobile camera 31 at the position where the workpiece 93 can be imaged (refer to FIG. 11). The mobile camera 31 is moved to a posture in which the optical axis A31 (tip end axis of robot 2a) thereof is orthogonal to the local plane, and then the mobile camera 31 is moved into the local plane without changing the posture of the mobile camera 31 to perform the movement. The mobile camera is also moved to a direction orthogonal to the local plane such that the focus matches the upper surface of the workpiece 93.

Next, the computer 11 sets a tip end axis coordinate (components xr, yr, zr, ur, vr, and wr) of the robot 2a in step S113 as a first point and stores the point in the storage unit 113 (FIG. 8: step S114).

Next, the computer 11 issues instructions (order) with respect to the robot control device 12 and the image processing device 13 to create a first image processing sequence relating to a marker (not illustrated) attached to the center of the upper surface of the workpiece 93 (FIG. 8: step S115).

Here, the image processing sequence is a summary of methods and procedures for capturing an image from the imaging unit 3, processing the captured image, detecting and examining a predetermined part appeared in the captured image, and the like. The creation of the image processing sequence means to include various settings of the image processing sequence, teaching of the part, and run and reflection of the image processing sequence. The first image processing sequence indicates the image processing sequence relating to the marker attached to the center of the upper surface of the workpiece 93 as the part.

The creation of the first image processing sequence and the like are performed by display processing using instruction screens described below. The display processing in the first image processing sequence will be described below.

Next, the computer 11 issues a gripping instruction to grip the workpiece 93 with respect to the robot control device 12 (FIG. 8: step S116). When receiving the gripping instruction, the robot control unit 1212 causes the robot 2*a* to drive the robot arm 20 to grip the workpiece 93 by the hand 270 (refer to FIG. 12). Next, the computer 11 sets a tip end axis coordinate (components xr, yr, zr, ur, vr, and wr) of the robot 2*a* in step S116 as a second point and stores the point in the storage unit 113 (FIG. 8: step S117). Here, the position at which the workpiece 93 is gripped is used as a position of the tool center point P (component za).

Next, the computer 11 issues a movement instruction to position the workpiece 93 on the fixed camera 32 with respect to the robot control device 12 (FIG. 8: step S118). When receiving the movement instruction, the robot control device 12 moves the robot arm 20 to position the workpiece at a position where the focus matches the workpiece 93 within the field of view of the fixed camera 32 (refer to FIG. 13). Next, the computer 11 sets a tip end axis coordinate (components xr, yr, zr, ur, vr, and wr) of the robot 2*a* in step S118 as a third point and stores the point in the storage unit 113 (FIG. 8: step S119).

Next, the computer 11 issues instructions with respect to the robot control device 12 and the image processing device 13 to create a second image processing sequence (second vision sequence) of a marker (not illustrated) attached to the center of the lower surface of the workpiece 93 (FIG. 8: step S120). Here, the second image processing sequence is an image processing sequence relating to the marker attached to the center of the lower surface of the workpiece 93 as the part.

Since it is difficult to respectively provide markers at completely the same positions as the center of the upper surface and the center of the lower surface of the workpiece 93, the same target such as a through hole provided in the workpiece 93 is recognized from upper and lower of the workpiece 93.

The creation of the second image processing sequence and the like are performed by display processing using instruction screens described below. The display processing in the second image processing sequence will be described below.

Next, the computer 11 issues instructions with respect to the robot control device 12 and the image processing device 13 to perform the tool setting (FIG. 8: step S121). Here, the tool setting is to obtain an offset between an axis coordinate such as the tip end axis and the like of the robot and a coordinate of a predetermined portion of the tool (relationship of position posture), and means to include various settings (including display processing) in the tool setting, run of tool setting processing, and reflection of a tool setting result. Accordingly, it is possible to know a robot coordinate of the predetermined portion of the tool. The tool may be any subject as long as it is provided on the robot 2*a*, and there are, for example, the imaging unit 3 and the workpiece 93. In step S121, the tool is set as the workpiece 93, and an offset between a tip end axis coordinate of the robot 2*a* and the center of the workpiece 93 is obtained. Accordingly, since the robot coordinate at the center of the workpiece 93 in various robot postures can be calculated, it is possible to accurately perform a gripping of another workpiece 93, a movement and an examination of the gripped workpiece 93, and the like.

A method of obtaining the offset is not particularly limited, but there is a method of obtaining the offset, for example, by moving (for example, rotating) any one position of the tip end axis coordinate of the robot 2*a* and the center of the workpiece 93 in a state where the other position thereof is fixed, and using tip end coordinates of the tool center point P and the center of the workpiece 93, and a movement amount (for example, rotation angle) before and after the movement (for example, before and after rotation).

The tool setting is performed by display processing using instruction screens described below. The display processing in the tool setting will be described below.

Next, the computer 11 issues instructions with respect to the robot control device 12 and the image processing device 13 to perform calibration for associating the image coordinate system of the fixed camera 32 with the local coordinate (robot coordinate system) using the marker attached to the center of the lower surface of the workpiece 93 (FIG. 8: step S122). Here, the calibration is to associate the image coordinate system with the robot coordinate system and means to include associating the image coordinate system with the robot coordinate system by performing various settings (including display processing) in the calibration, that is, calibration creation, teaching a camera point, running the calibration, and reflecting a calibration result. Here, a local coordinate set parallel to the worktable 90 of the robot coordinate systems is associated with the image coordinate system.

A specific method of the calibration is not particularly limited, but there is a method, for example, of using a transformation matrix between the image coordinate and the robot coordinate obtained by positioning a target (imaging object) such as one marker to at least three or more camera points in the captured image and using an image coordinate based on the captured image at each camera point and a robot coordinate of the target such as a marker at the time of the imaging. The robot coordinate of the marker or the like at each camera point can be calculated using a position posture of the axis coordinate such as the tip end axis and the like of the robot and the tool setting (offset) described above. Accordingly, it is possible to associate the image coordinate system with the robot coordinate system and converts the image coordinate into the robot coordinate. Therefore, it is possible to obtain the robot coordinate of the imaging object appeared in the captured image. In step S122, nine camera points are set.

The calibration of the fixed camera 32 is performed by display processing using instruction screens described below. Display processing in the calibration will be described below.

Next, the computer 11 issues instructions with respect to the robot control device 12 and the image processing device 13 to create a third image processing sequence (third vision sequence) for detecting two points of an A point (not illustrated) and a B point (not illustrated) attached to the lower surface of the workpiece 93 and the like (FIG. 8: step S123). Here, the third image processing sequence indicates the image processing sequence relating to the detection of the A point (part) and the B point (part) attached to the lower surface of the workpiece 93. In step S123, an examination is performed by running image processing using an image processing sequence created by associating the third image processing sequence with the calibration result of the fixed camera 32. Here, as the examination, a distance between the A point and the B point is measured, and it is determined as pass when the distance is within a predetermined threshold and it is determined as fail when the distance is out of the predetermined threshold. Here, the distance between the A point and the B point can be determined not by the unit of the length (pixel) on the image, but by the unit of the robot coordinate (mm) by associating the image coordinate with the calibration using the robot coordinate (calibration result).

The creation of the third image processing sequence is performed by display processing using instruction screens described below. The display processing in the third image processing sequence will be described below.

Next, the computer 11 issues a movement instruction to move to the second point set in step S117 and issues a mount instruction to mount the workpiece 93 on the material feeding table 91 with respect to the robot control device 12 (FIG. 9: step S124). When receiving the movement instruction, the robot control device 12 causes the robot 2*a* to drive the robot arm 20 to position the tip end axis coordinate (components xr, yr, zr, ur, vr, and wr) of the robot 2*a* to the second point, and mount the workpiece 93 on the material feeding table 91 by the hand 270 (refer to FIG. 14). Next, the computer 11 sets a position of the center (components xr, yr, zr, ur, vr, and wr) of the workpiece 93 as a fourth point based on the tool setting in step S121 and stores the point in the storage unit 113 (FIG. 9: step S125).

Next, the computer 11 issues a movement instruction to release the workpiece 93 on the material feeding table 91, and then move to the first point obtained in step S114, and position the mobile camera 31 at a position where the workpiece 93 mounted on the material feeding table 91 can be imaged with respect to the robot control device 12 (FIG. 9: step S126). When receiving such movement instruction, the robot control device 12 causes the robot 2*a* to release the workpiece 93 on the material feeding table 91 by the hand 270, and then position the tool center point P to the first point, and position the mobile camera 31 at the position where the workpiece 93 can be imaged.

Next, the computer 11 issues instructions with respect to the robot control device 12 and the image processing device 13 to perform calibration between the image coordinate system of the mobile camera 31 and the robot coordinate system using the marker attached to the center of the upper surface of the workpiece 93 and a robot coordinate stored as the fourth point (at the fourth point) (FIG. 9: step S127).

In the calibration in step S127, the mobile camera 31 is moved with respect to the workpiece 93 such that a marker is imaged at nine camera points in the captured image using the marker attached to the center of the upper surface of the workpiece 93 as the one target (imaging object). A transformation matrix between the image coordinate and the tip end coordinate is obtained using image coordinates based on captured images at the nine camera points and a robot coordinate of a marker attached to the upper surface of the workpiece 93 stored as the fourth point (at the fourth point). Accordingly, it is possible to convert the image coordinate of the mobile camera 31 into the robot coordinate.

In the calibration in step S127, the first image processing sequence and a calibration result of the mobile camera 31 are associated with each other in order to accurately grip the workpiece 93 with respect to the robot 2*a*.

The calibration of the mobile camera 31 is performed by display processing using instruction screens described below. Display processing in the calibration will be described below.

Next, the computer 11 issues a movement instruction to position the tool center point P on the pass material removing table 94 with respect to the robot control device 12, mounts the workpiece 93, sets a tip end axis coordinate (components xr, yr, zr, ur, vr, and wr) of the robot 2*a* as a fifth point, and stores the point in the storage unit 113 (FIG. 9: step S128). When receiving the movement instruction, the robot control unit 1212 causes the robot 2*a* to drive the robot arm 20 to position a tip end axis of the robot 2*a* on the pass material removing table 94, and then mount the workpiece 93 on the pass material removing table 94 (refer to FIG. 15).

Next, the computer 11 issues a movement instruction to position the tip end axis of the robot 2*a* on the fail material removing table 95 with respect to the robot control device 12, mounts the workpiece 93, sets a tip end axis coordinate (components xr, yr, zr, ur, vr, and wr) of the robot 2*a* as a sixth point, and stores the point in the storage unit 113 (FIG. 9: step S129). When receiving the movement instruction, the robot control unit 1212 causes the robot 2*a* to drive the robot arm 20 to position the tip end axis of the robot 2*a* on the fail material removing table 95, and then mount the workpiece 93 on the fail material removing table 95 (refer to FIGS. 2 and 15).

Next, the computer 11 (control program editing unit 1111) creates a work program of the robot 2*a* based on steps S111 to S129 (FIG. 9: step S130). Next, the computer 11 (control program build unit 1112) builds the work program created in step S113 and converts the work program into a language (data string) that can be interpreted by the robot control device 12 (FIG. 9: step S131). Next, the computer 11 transfers the compiled work program to the robot control device 12 and the image processing device 13 and issues instructions to run the work program with respect to the robot control device 12 and the image processing device 13 (FIG. 9: step S132).

Thus, the creation of the work program ends.

In the related art, when a normal teaching of a work coordinate is performed, the workpiece 93 is gripped by the hand 270, and then the user jog-feeds the hand 270 to insert and mount the workpiece 93 into a mounting position or the like of a work object, thereby teaching the work coordinate. However, there are the following problems such as (1) and (2) in such teaching work.

(1) In a case where it is necessary to insert and mount the workpiece 93 into a work position with high accuracy, it takes a long time for the user to manually jog the workpiece 93 into the place and to insert and mount the workpiece with high accuracy.

(2) In a case where a plurality of work positions are taught, since the user manually jogs, inserts, and mounts the workpiece 93 from the start to the end with respect to all teaching points, it is difficult to realize automation in the related art.

In order to solve the problems described above, the pieces of processing from step S116 to step S125 excluding steps S122 and S123 can also be used for teaching the work position (work coordinate) where the work is performed, respectively. In such teaching work, it is possible to omit the jog-feeding of the hand 270 that requires a time for accurate positioning by gripping and pulling out the workpiece 93 manually and accurately mounted by the user later with the hand 270 and significantly reduce the teaching time. Even in the case where the plurality of work coordinates are taught, it is possible to easily automate acquiring processing of the work coordinate thereafter by mounting the workpiece 93 at each work position in advance and teaching a coordinate at which each workpiece 93 is gripped.

In a case of repeating the teaching, the teaching is run (implemented) only at the first time for steps S119 and S120 of the pieces of processing from step S116 to step S125 and a value at the first time can be used in the subsequent teaching. Further, steps S124 and S125 are not necessarily required pieces of processing, and a coordinate of the fourth point may be calculated from a coordinate set at the second point and a tool offset acquired in the tool setting.

Next, the run of the work program by the robot control device 12 and the image processing device 13 will be described based on a run instruction in step S132.

Run of Work Program

Figure 16:
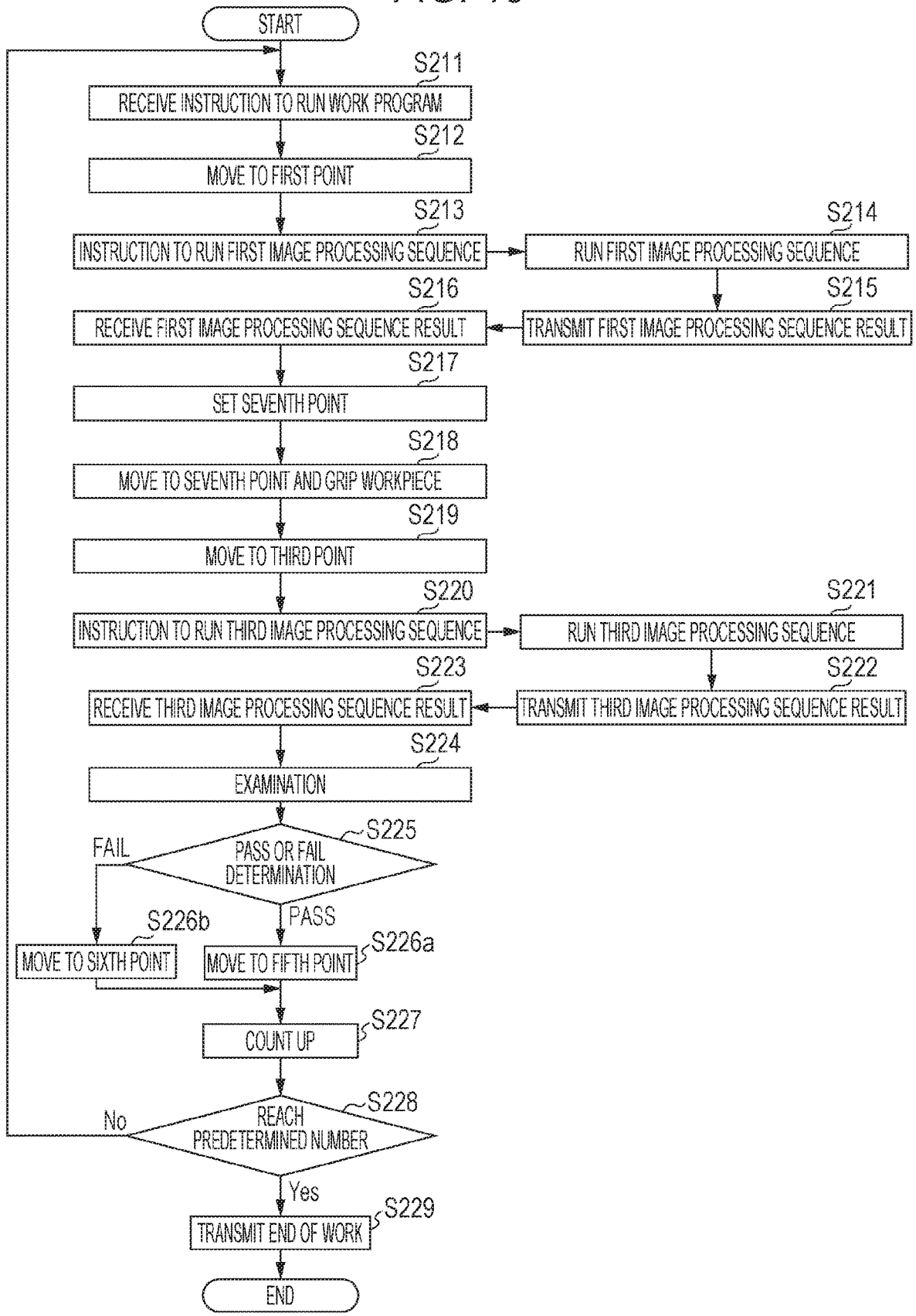
FIG. 16 is a flow diagram illustrating a flow of a run of the work program created based on the flow diagrams illustrated in FIGS. 8 and 9.

FIG. 16 is a flow diagram illustrating a flow of a run of the work program created based on the flow diagrams illustrated in FIGS. 8 and 9.

In running the work program, the workpiece 93 is first mounted on the material feeding table 91.

As illustrated in FIG. 16, the robot control device receives the instruction to run the work program (step S211) and drives the robot arm 20 to move the tip end axis of the robot 2a to the first point (step S212).

Next, the robot control device 12 issues an instruction to run the first image processing sequence with respect to the image processing device 13 (step S213). The image processing device 13 receives the run instruction and runs the first image processing sequence for detecting the workpiece 93 with the mobile camera 31 (step S214). In step S214, the image processing device 13 runs the first image processing sequence, performs the image processing based on a captured image (image data) obtained by imaging the workpiece 93 with the mobile camera 31, and detects a center position of the workpiece 93. The image processing device 13 converts the center position of the workpiece 93 appeared in the captured image into a local coordinate (components xd, yd, and ud) using the calibration of the mobile camera 31.

Next, the image processing device 13 transmits a first image processing sequence result (for example, robot coordinate of image detection point) to the robot control device 12 (step S215). When receiving the first image processing sequence result (step S216), the robot control device 12 sets the center position (components xd, yd, zd, and ud) of the workpiece 93 based on the local coordinate system as a seventh point based on the result and records the point in the storage unit 113 (step S217). Here, a position of the workpiece 93 (component zd) uses a position of the second point (component zd).

Next, the robot control device 12 drives the robot arm 20 to move the tool center point P to the seventh point based on the tool setting and to grip the workpiece 93 by the hand 270 (step S218). Next, the robot control device 12 drives the robot arm 20 to move the tip end axis of the robot 2a to the third point (step S219). Next, the robot control device 12 issues an instruction to run the third image processing sequence with respect to the image processing device 13 (step S220). The image processing device 13 receives the run instruction and runs the third image processing sequence for detecting the workpiece 93 with the fixed camera 32 (step S221). In step S221, the image processing device 13 runs the third image processing sequence, performs the image processing based on a captured image (image data) obtained by imaging the workpiece 93 with the fixed camera 32, and detects points A and B of the workpiece 93. The image processing device 13 converts the positions of points A and B of the workpiece 93 appeared in the captured image into a robot coordinate (base coordinate) using the calibration result of the fixed camera 32. Next, the image processing device 13 transmits a third image processing sequence result (each robot coordinate of points A and B) to the robot control device 12 (step S222). When receiving the third image processing sequence result (step S223), based on the result, the robot control device 12 performs an examination to measure a distance between points A and B of the workpiece 93 based on the local coordinate system (step S224).

Next, the robot control device 12 performs pass or fail determination that it is determined as pass when the distance between points A and B is within a predetermined threshold and it is determined as fail when the distance is out of the predetermined threshold (step S225). In a case of pass, the robot control device 12 proceeds to step S226a and drives the robot arm 20 to move the tip end axis of the robot 2a to the fifth point. On the other hand, in a case of fail, the step proceeds to step S226b, and the robot control device 12 drives the robot arm 20 to move the tip end axis of the robot 2a to the sixth point.

Next, the robot control device 12 counts up (step S227) and determines whether the number of workpieces 93 reaches the predetermined number (step S228). When the number of workpieces reaches the predetermined number, the robot control device 12 proceeds to step S229, transmits the end of the work to the computer 11 (step S229), and ends the work. On the other hand, when the number of workpieces does not reach the predetermined number, the robot control device returns to step S211 and repeats steps S211 to S228 before the predetermined number is reached.

In this manner, the work ends. The computer 11 recreates the work program described above based on a work result (for example, success or failure of gripping of workpiece 93, variation in a gripping position, and success or failure of image sequence run). For example, when it is determined that the gripping of the workpiece 93 frequently fails, the computer 11 recreates (rewrites) the work program and performs the work again. In this manner, it is possible to enhance work accuracy by the robot 2a by creating (updating) the work program and performing the work based on the work program before the gripping of the workpiece 93 is stabilized. The computer 11 may recreate only a part of the work program, not all of the work program. For example, in a case where gripping accuracy of the workpiece 93 is not within a predetermined threshold, it is also possible to recreate only the calibration of the mobile camera 31 (FIG. 9: step S127). In this manner, it is possible to efficiently perform resetting (editing) of the work program by recreating only a part of the work program.

The creation of the work program for performing such work and the setting of various types of processing necessary therefor are run by the control system 10 based on the operation instruction (input by input device 42) by the user using various instruction screens as described above. Hereinafter, various instruction screens, an operation of the instruction screen by the user (input by input device 42), and display processing by the computer 11 (display control unit 114) will be described. In the following description, various settings and the like by the control system 10 based on the operation instruction (input by input device 42) by the user using various instruction screens is referred to as "display processing".

Main Window and Display Processing

Figure 17:
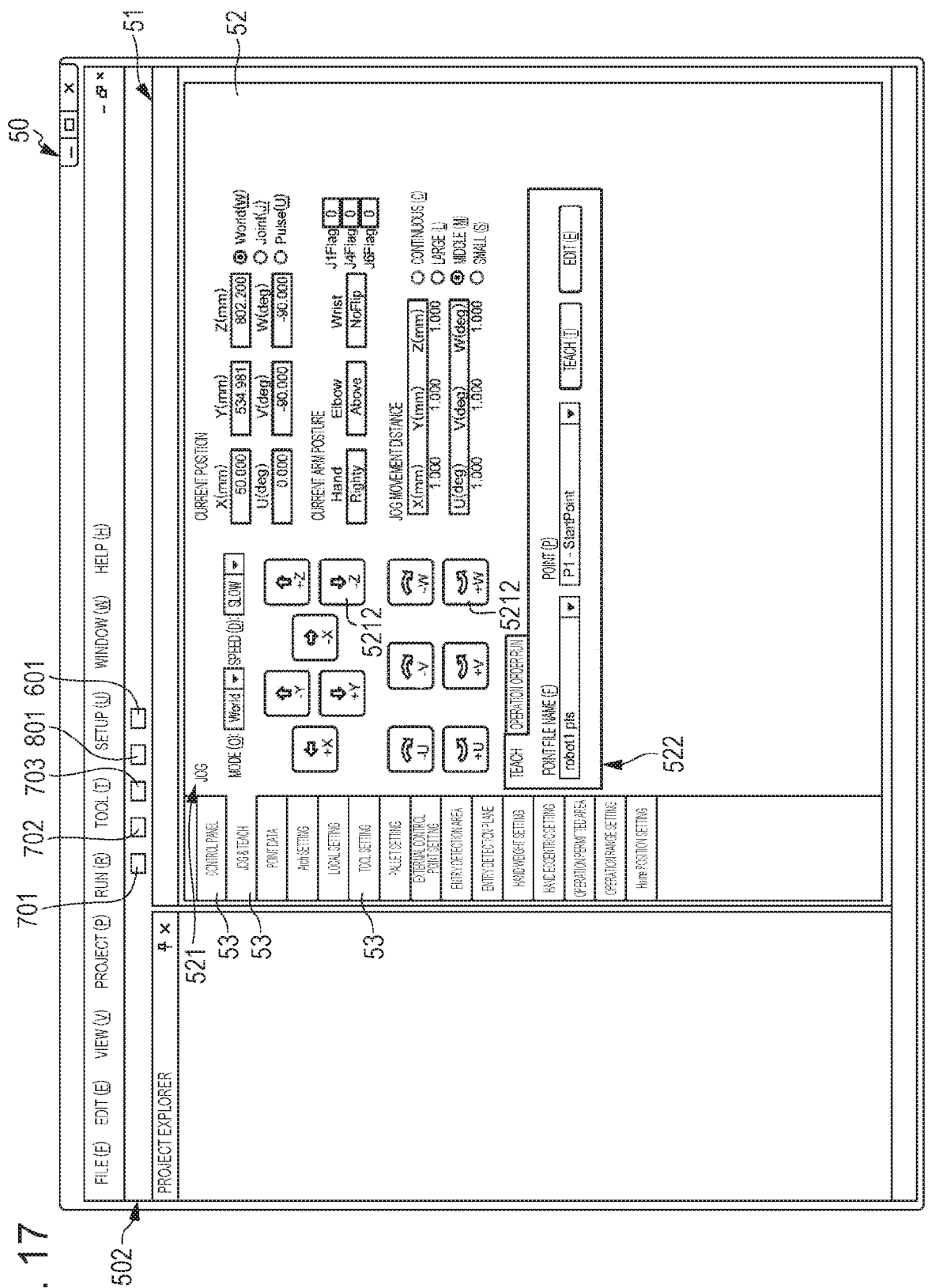
FIG. 17 is a diagram illustrating a main window and a sub-window for a robot operation displayed on a display device illustrated in FIG. 1.
Figure 18:
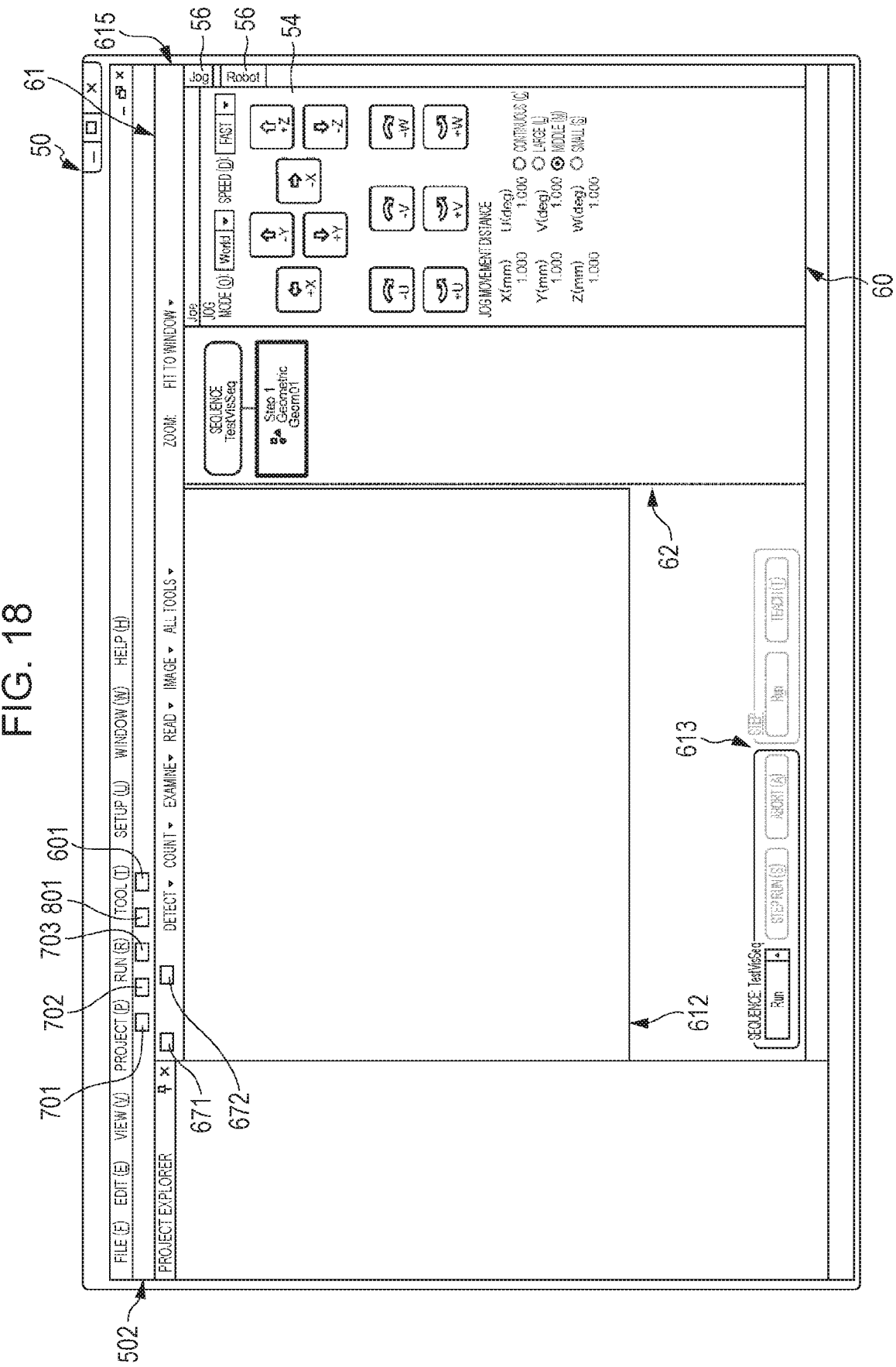
FIG. 18 is a diagram illustrating the main window and a sub-window for an image processing displayed on the display device illustrated in FIG. 1.

FIG. 17 is a diagram illustrating a main window and a sub-window for a robot operation displayed on the display device illustrated in FIG. 1. FIG. 18 is a diagram illustrating the main window and a sub-window for an image processing displayed on the display device illustrated in FIG. 1.

As illustrated in FIG. 17, the main window 50 includes at least a toolbar 502. The toolbar 502 includes a tool setting icon 701, a local setting icon 702, a calibration creation icon 703, an icon 601 used for displaying an image processing sub-window 61, and a command input icon 801. The display of the icons (for example, drawing) is not particularly limited, but it is preferable that the use of the display is easily recognized by the user. The use of each icon will be described below.

The display control unit 114 can display a robot operation sub-window 51 illustrated in FIG. 17 and the image processing sub-window 61 illustrated in FIG. 18 simultaneously with the main window 50 on the display device 41. In addition, the display control unit 114 can display a command input sub-window and a sub-window for setting various parameters in force control simultaneously with the main window 50 on the display device 41 (not illustrated). The display control unit 114 displays a desired sub-window of the sub-windows (including sub-windows 51 and 61) on the foreground by the operation instruction of the user. The sub-windows may be displayed side by side.

The robot operation sub-window 51 illustrated in FIG. 17 includes a panel 52 having a jog operation group 521 (area) and a teach group 522. A sub-window 51 includes a plurality of panels (not illustrated) such as a panel for setting various parameters (for example, the movement speed) of the robot 2 in addition to the panel 52. The sub-window includes a plurality of tabs 53 used for displaying a desired panel on the foreground.

The jog operation group 521 includes a plurality of buttons S212 for receiving an operation instruction to jog-operate a predetermined portion of the robot 2 by the user. In this manner, since the jog operation group 521 includes the buttons S212 which are visually easy to understand, the user can easily instruct jog-feeding of the robot 2. The jog operation group 521 is used in steps S111, S113, S116, S118, S124, S126, S128, and S129 in the creation of the work program described above. Specifically, for example, in step S111, when the input control unit 115 receives operation instructions to the plurality of buttons S212 from the user, the control unit 111 issues a movement order to position the mobile camera 31 on the calibration plate 92 to the robot control device 12 (FIG. 8: step S111).

The teach group 522 is used for setting a teaching point by the user. The teach group 522 is used in steps S114, S117, S119, S125, S128, and S129 in the creation of the work program described above. Specifically, for example, in step S114, when the input control unit 115 performs an operation instruction with respect to a teach button of the user, the control unit 111 sets the first point and records the first point in the storage unit 113 (FIG. 8: step S114).

The image processing sub-window 61 illustrated in FIG. 18 includes a toolbar 615, a picture image display unit 612, a run group 613, and a flowchart display unit 62. The image processing sub-window 61 is displayed when the user performs an operation instruction with respect to the icon 601 in the main window 50.

The toolbar 615 includes an icon 671 used for displaying a group of screens for the creation of the image processing sequence. The picture image display unit 612 displays the captured image captured by the imaging unit 3 and an image processing result. The run group 613 includes various buttons for receiving an operation instruction to run the image processing sequence by the user. The flowchart display unit 62 displays an image processing procedure of the image processing sequence, a teaching procedure of the calibration, and the like.

The sub-window 61 includes a jog panel 54 having the same configuration as that of the jog operation group 521 and a panel (not illustrated) for setting various parameters (for example, movement speed) of the robot 2. The sub-window 61 includes two tabs 56 used for displaying any one of the panel for setting various parameters of the robot 2 and the jog panel 54 on the foreground. The panels may be displayed side by side.

In this manner, since the sub-window 61 includes the jog panel 54, the user can perform the robot operation in the image processing sub-window 61. Similarly, since the sub-window 61 includes the panel for setting various parameters of the robot 2, the user can set various parameters of the robot 2 in the image processing sub-window 61.

Figure 39:
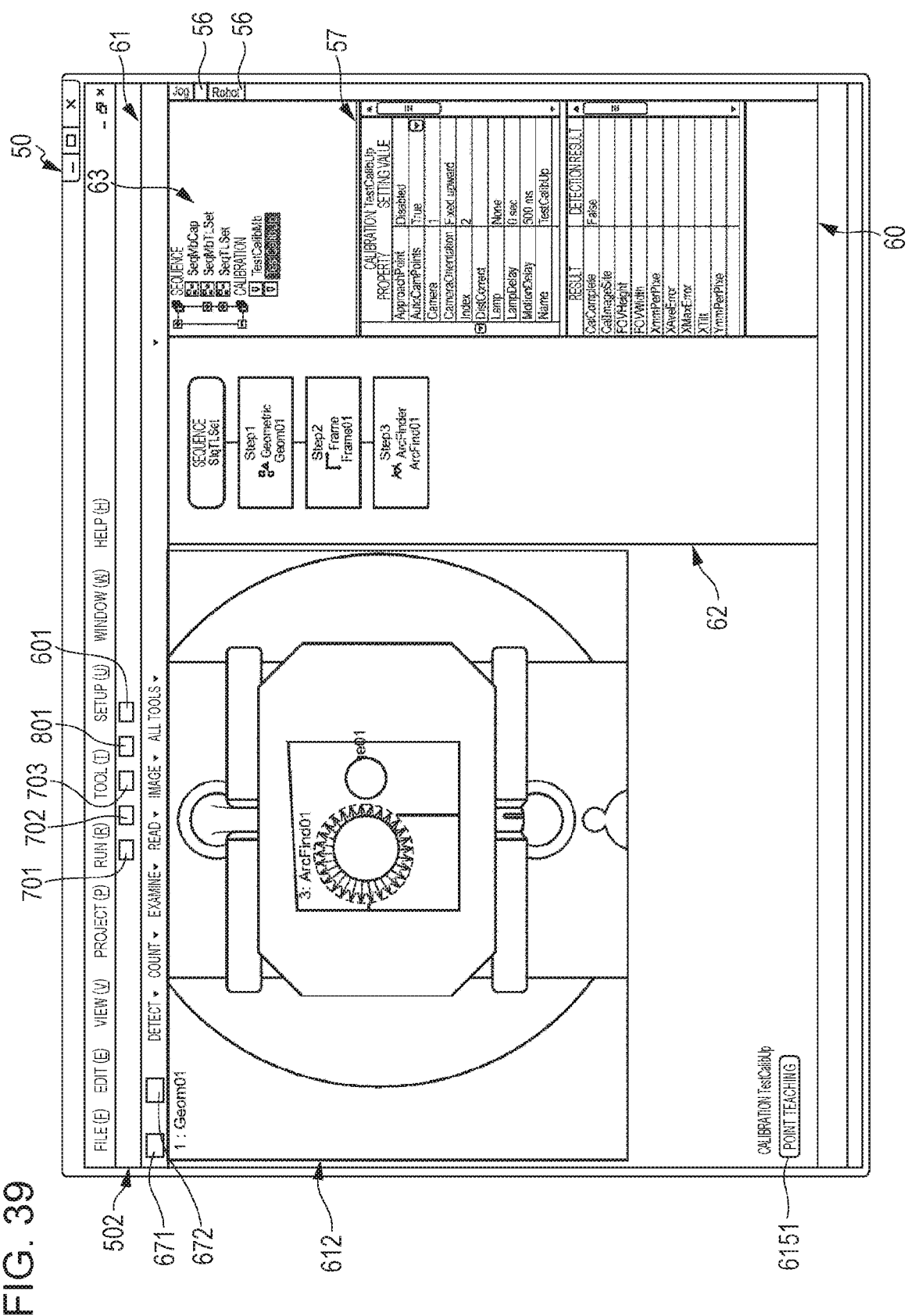
FIG. 39 is a diagram illustrating a state where a property setting window is displayed on the sub-window illustrated in FIG. 18.

The sub-window 61 includes a property setting window 60 for displaying and editing a calibration setting (name of created calibration and various setting contents) and an image processing sequence setting (name of created image processing sequence and various setting contents), not illustrated in FIG. 18 (refer to FIG. 39). The property setting window 60 is displayed on the area where the jog panel 54 is displayed (refer to FIG. 18). The property setting window 60 will be described below in detail.

As described above, since the display control unit 114 can display a plurality of types of sub-windows (including sub-windows 51 and 61) simultaneously with one main window 50 in an overlapped manner or side by side under the control of the control unit 111, the user can efficiently perform a plurality of types of work. In particular, as described above, in the embodiment, since it is possible to display the robot operation sub-window 51, the image processing sub-window 61, the command input sub-window, and the sub-window relating to the force control on the display device 41, the convenience is particularly high.

As described above, the display control unit 114 can display a panel (not illustrated) for setting the various parameters of the robot 2 and the jog panel 54 for performing a jog operation of the robot 2 on the image processing sub-window 61 in an overlapped manner or side by side. Therefore, the user can accurately and efficiently operate the robot 2 at the time of running the image processing sequence.

Next, the local setting in the work program and the display processing in the local setting described above will be described.

Local Setting and Display Processing

Figure 19:
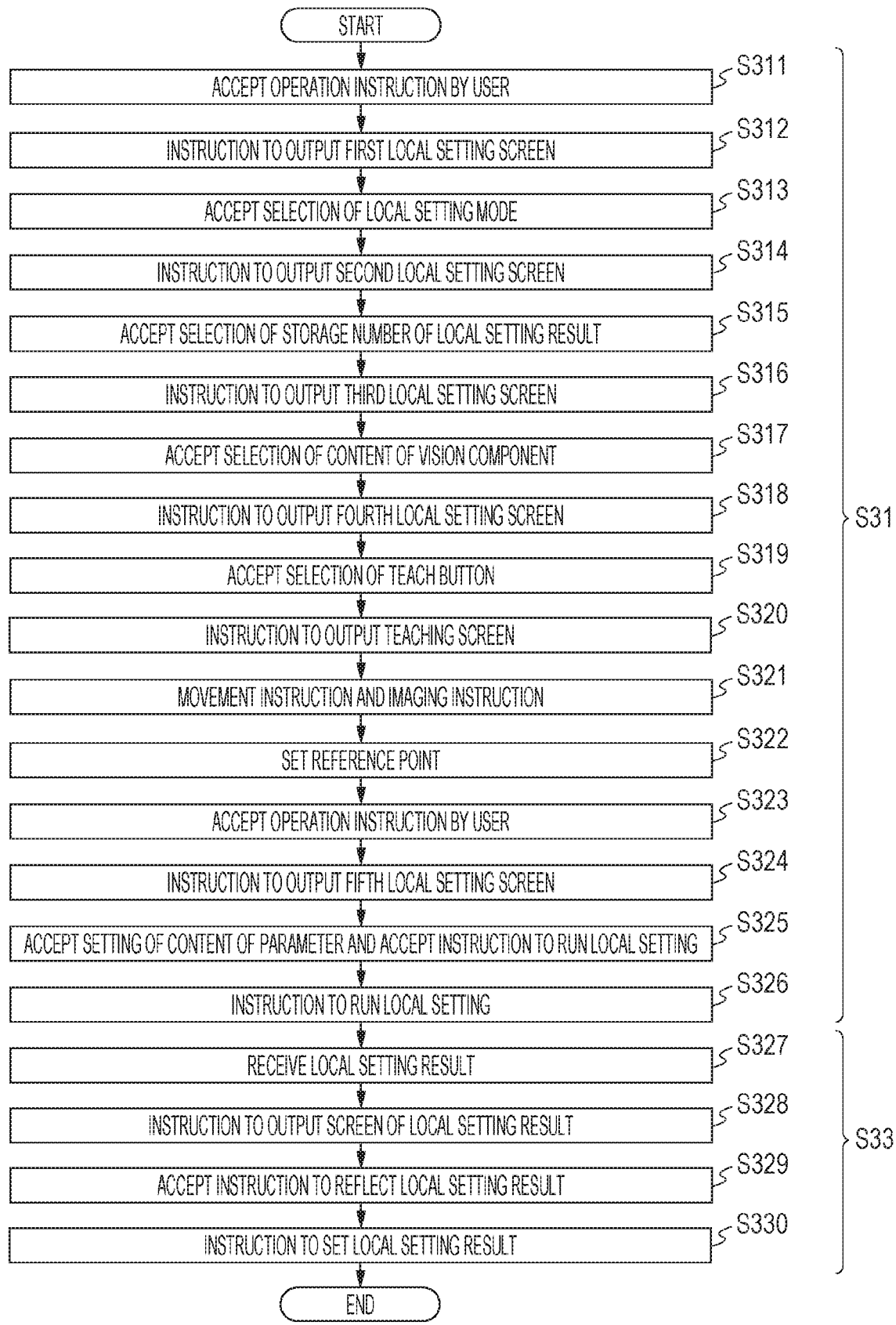
FIG. 19 is a flow diagram illustrating a flow of setting a local coordinate system illustrated in FIG. 8.
Figure 20:
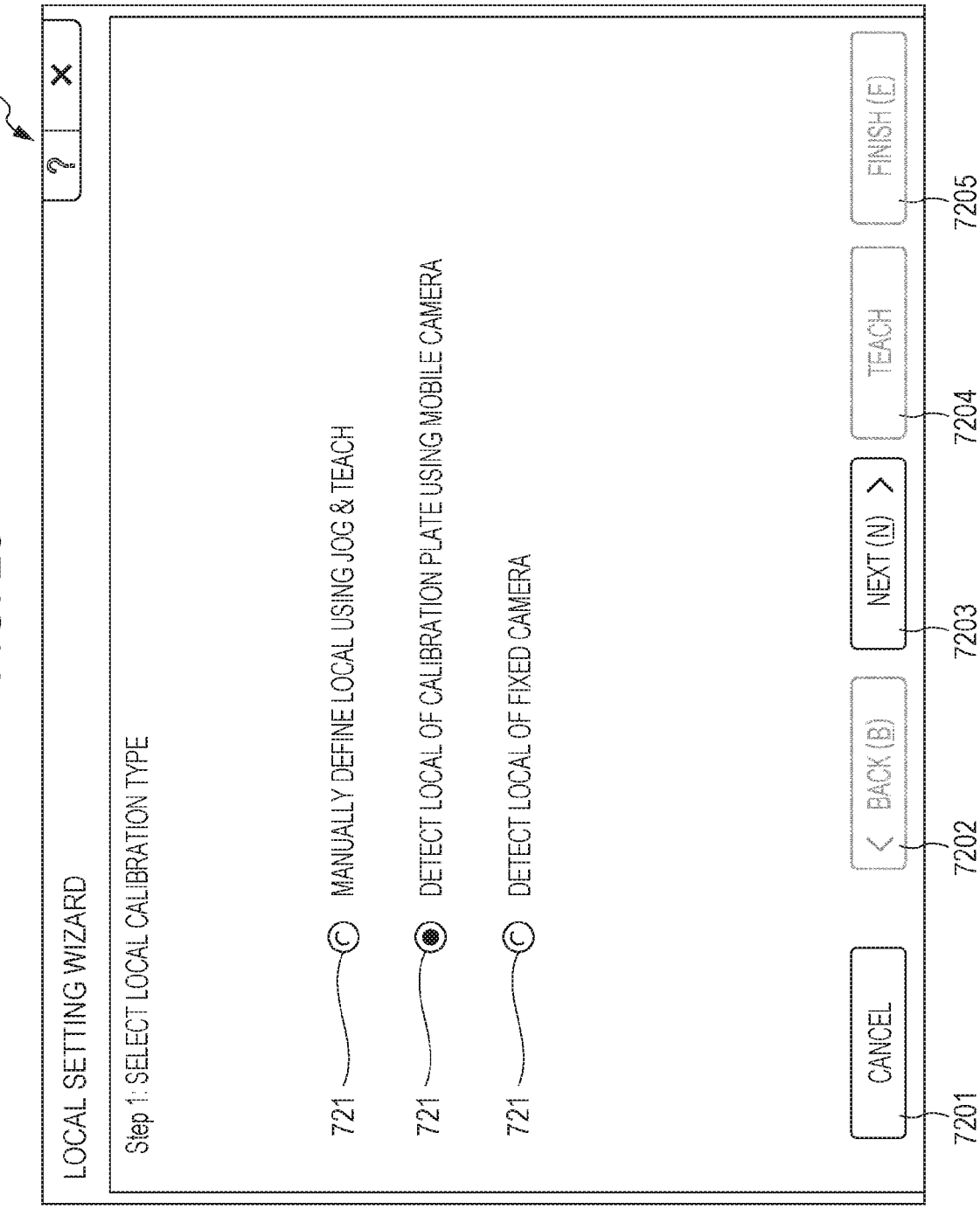
FIG. 20 is a local setting screen displayed on the display device illustrated in FIG. 1.
Figure 21:
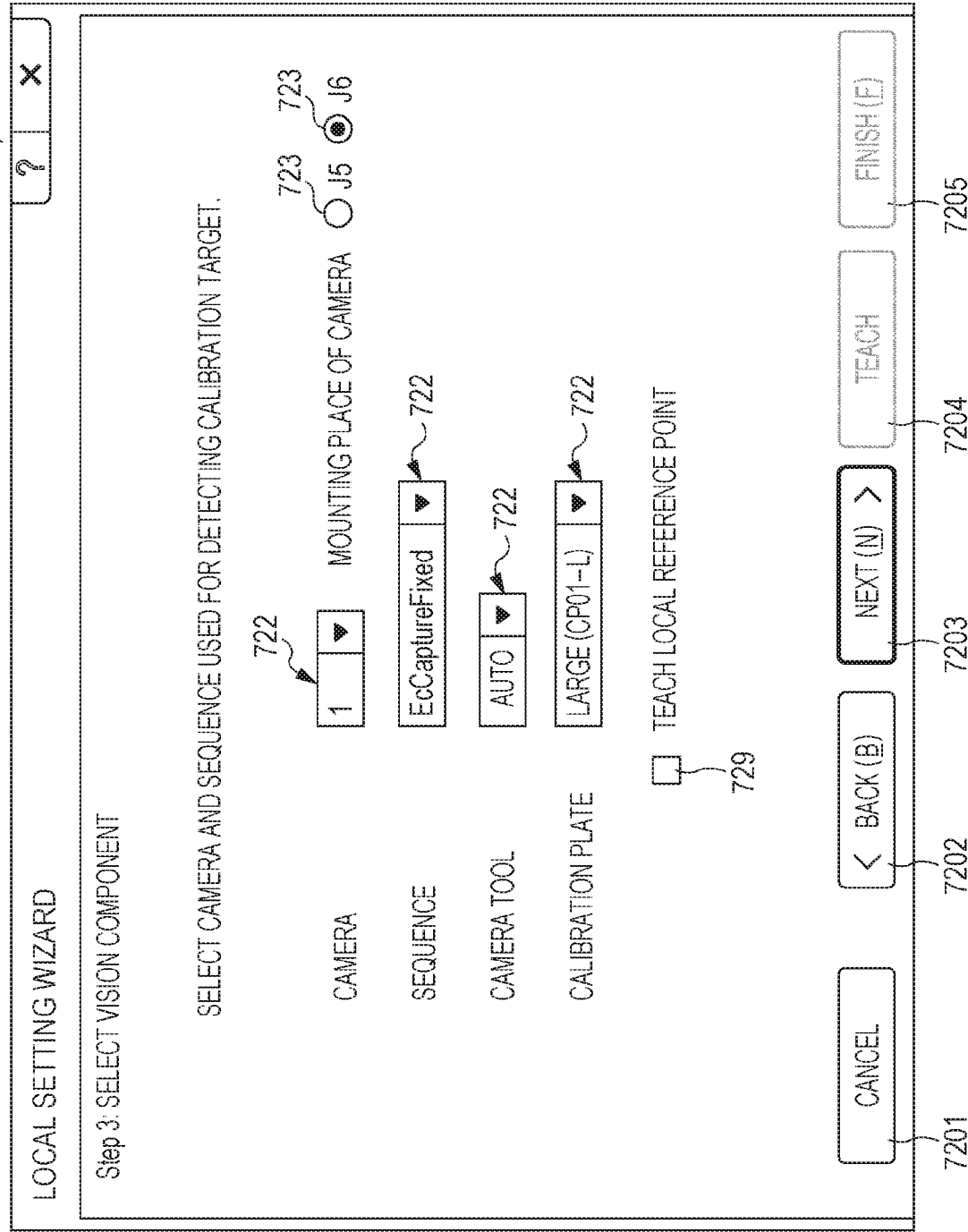
FIG. 21 is a local setting screen displayed on the display device illustrated in FIG. 1.
Figure 22:
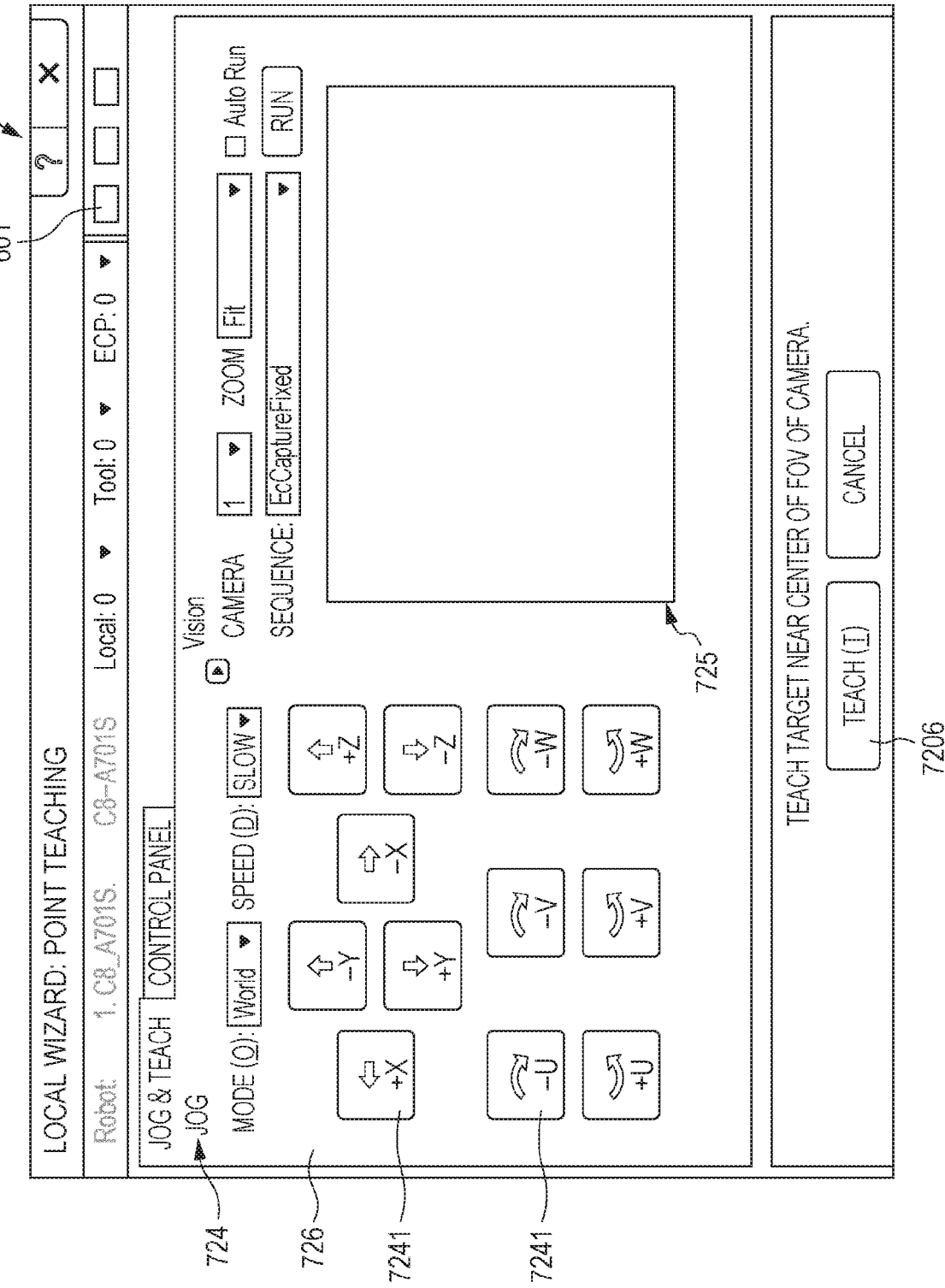
FIG. 22 is a teaching screen displayed on the display device illustrated in FIG. 1.
Figure 23:
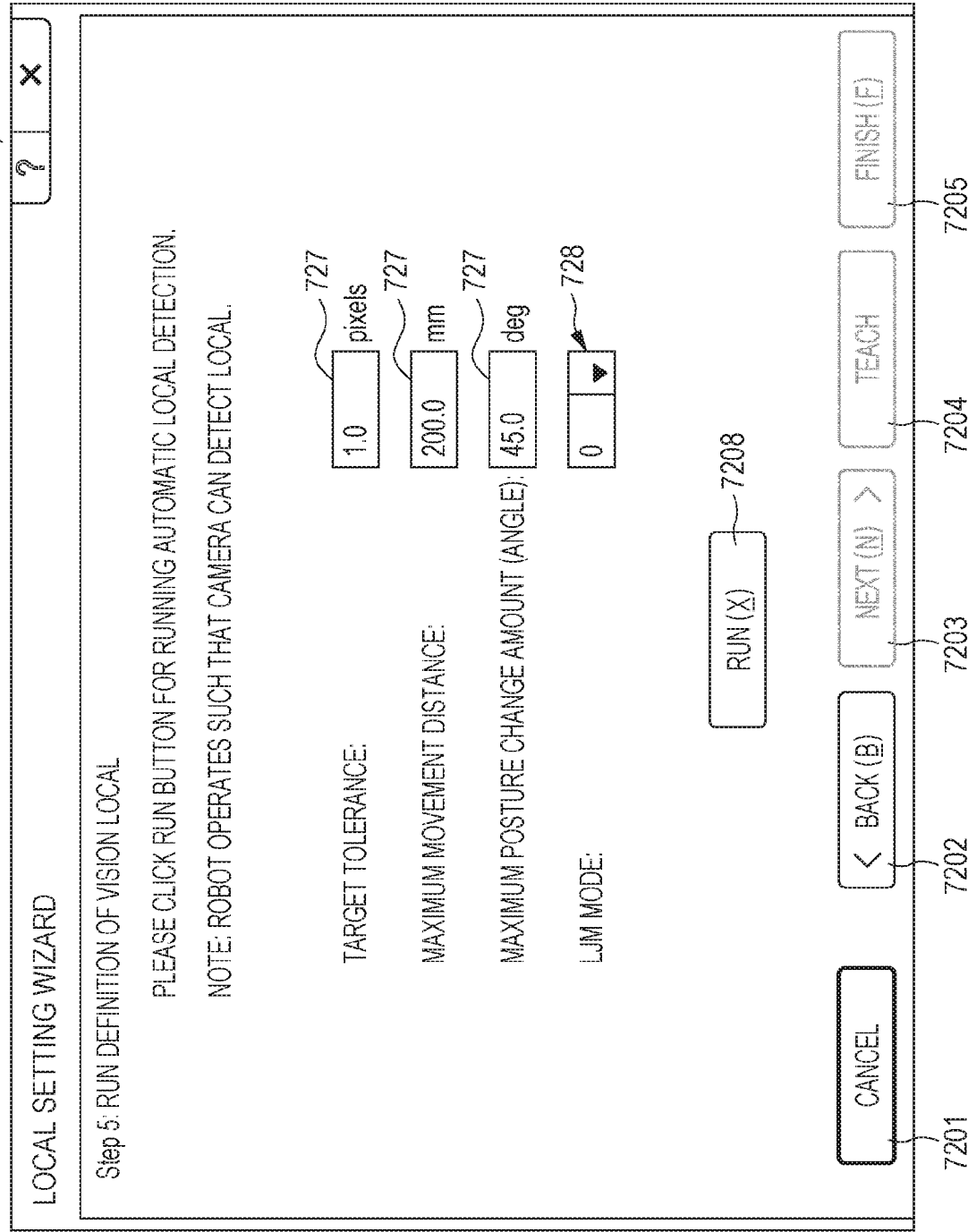
FIG. 23 is a local setting screen displayed on the display device illustrated in FIG. 1.

FIG. 19 is a flow diagram illustrating a flow of setting a local coordinate system illustrated in FIG. 8. FIGS. 20, 21, and 23 are local setting screens displayed on the display device illustrated in FIG. 1, respectively. FIG. 22 is a teaching screen displayed on the display device illustrated in FIG. 1.

Hereinafter, the setting of the local coordinate system in the creation of the work program described above (step S112) will be described with reference to the flow diagram illustrated in FIG. 19. The setting of the local coordinate system (local setting) includes [1A] various settings in local setting (step S31), [2A] run of local setting processing (step S32 (not illustrated)), and [3A] reflection of local setting result (step S33). Here, as described above, the local setting means to include the setting of the local coordinate system by performing the various settings (including display processing) in the local setting, running the local setting processing, and reflecting the local setting result.

[1A] Various Settings in Local Setting (Step S31)

The control system 10 first runs the various settings in the local setting based on an input by the input device 42.

Specifically, when the user first performs (clicks) an operation instruction with respect to the local setting icon 702 of the main window 50 illustrated in FIG. 17, the input control unit 115 receives the operation instruction (instruction to start local setting) (FIG. 19: step S311). Accordingly, the control unit 111 starts display processing of a group of screens for the local setting for displaying a plurality (five in the embodiment) of local setting screens 72 (instruction screen) in an interactive manner with the user and issues an instruction to output a first local setting screen 72*a* (local setting screen 72) illustrated in FIG. 20 with respect to the display control unit 114 (FIG. 19: step S312). When receiving the output instruction, the display control unit 114 displays the first local setting screen 72*a* on the display device 41.

First Local Setting Screen

As illustrated in FIG. 20, the first local setting screen 72*a* is a screen for selecting a local setting mode (local calibration type). The local setting mode indicates a method of setting the local coordinate system. That is, the local setting mode indicates what kind of means or what kind of the local setting (for example, local setting by manual work or local setting parallel to fixed camera 32) is to be performed. In the embodiment, the local setting screen 72*a* includes a plurality of radio buttons 721 and is configured to be able to receive a selection of any one of three local setting modes illustrated in FIG. 20. In this manner, since the local setting screen 72*a* is configured to guide one selection from the plurality of modes, the user can prevent selecting two or more types of modes. The type of the local setting mode is not limited to the three modes illustrated in FIG. 20, and another mode may be further added or any one of the three modes illustrated in FIG. 20 may be omitted.

The local setting screen 72*a* includes a button 7201 displayed as "cancel", a button 7202 displayed as "back", a button 7203 displayed as "next", a button 7204 (teach button) displayed as "teach", and a button 7205 displayed as "finish". The button 7201 is used to cancel a local setting wizard. The button 7202 is used to return to one previous local setting screen 72 in subsequently displayed local setting screens 72. The button 7203 is used to proceed to a next local setting screen 72 in the subsequently displayed local setting screens 72. Since the local setting screen 72*a* is the first screen of the subsequently displayed local setting screens 72, the button 7202 is grayed out. The buttons 7204 and 7205 are also grayed out.

When the user performs an operation instruction to select a desired mode (clicks or touches a desired one radio button 721) with respect to the local setting screen 72*a* and performs an operation instruction with respect to the button 7203 displayed as "next", the input control unit 115 receives the selection of the local setting mode (FIG. 19: step S313). Accordingly, the control unit 111 stores the selected local setting mode in the storage unit 113 and issues an instruction to output a second local setting screen (not illustrated) with respect to the display control unit 114 (FIG. 19: step S314). When receiving the output instruction, the display control unit 114 displays the second local setting screen (not illustrated) on the display device 41.

Second Local Setting Screen

The second local setting screen (not illustrated) is a screen for selecting (setting) a storage number (local number) that stores the local setting result. The second local setting screen has substantially the same display form as that of the first local setting screen 72*a* except that the selection of the storage number is displayed instead of the display of the selection of the local setting mode.

For example, a list box or the like can be used for the display to select the storage number in the second local setting screen. Since such second local setting screen is configured to accept the selection of the storage number, it is possible to prevent an input error by the user. A storage name may be selected instead of the storage number. The second local setting screen also includes the same buttons as the buttons 7201 to 7205 included in the first local setting screen 72*a* (not illustrated).

When the user performs an operation instruction to select a desired storage number with respect to such second local setting screen and then performs an operation instruction with respect to the button displayed as "next" (button corresponding to button 7203), the input control unit 115 receives the selection of the storage number of the local setting result (FIG. 19: step S315). Accordingly, the control unit 111 stores the selected storage number in the storage unit 113 and issues an instruction to output a third local setting screen 72*b* (local setting screen 72) illustrated in FIG. 21 with respect to the display control unit 114 (FIG. 19: step S316). When receiving the output instruction, the display control unit 114 displays the third local setting screen 72*b* on the display device 41.

Third Local Setting Screen

As illustrated in FIG. 21, the third local setting screen 72*b* is a screen for selecting contents of various vision components. The vision component in the local setting indicates elements relating to the image processing such as a type of the imaging unit 3 used for the setting of the local coordinate system, a mounting position (camera tool), and the image processing method. In the embodiment, as illustrated in FIG. 21, the local setting screen 72*b* is configured to select respective contents of five vision components of the imaging unit 3, the mounting place of the imaging unit 3, the image processing sequence, the camera tool, and the calibration plate. Specifically, the local setting screen 72*b* includes a plurality of drop-down lists 722 and a plurality of radio buttons 723 for selecting one content from a plurality of contents (information) relating to the vision component. The illustration of a list of the drop-down list 722 is omitted (the same in other drawings). The vision component in the local setting is not limited to the five vision components described above, and another vision component may be further added or any one of the vision components described above may be omitted.

The local setting screen 72*b* includes a checkbox 729 for selecting whether to teach a local reference point. When receiving the selection, the control unit 111 sets the local plane including the local coordinate system to a position passing a designated teaching point. Accordingly, the convenience is enhanced when the robot 2*a* uses the set local coordinate.

Here, display content of the third local setting screen 72*b* changes according to the type (selection) of the imaging unit 3 of the first local setting screen 72*a*. Specifically, the display content of the drop-down list 722 changes according to the type (selection) of the imaging unit 3 of the first local setting screen 72*a*. For example, in step S112 in the generation of the work program described above, the local setting is performed using the mobile camera 31. Therefore, when the input control unit 115 receives the selection of a second radio button 721 from the top in the figure of the first local setting screen 72*a* by the user, the display control unit 114 displays the local setting screen 72*b* having a drop-down list 722 of display content related to the mobile camera 31 on the display device 41. For example, when the input control unit 115 receives the selection of a third radio button 721 from the top in the figure of the first local setting screen 72*a*, the display control unit 114 displays the local setting screen 72*b* having the drop-down list 722 of display content related to the fixed camera 32 on the display device 41.

In this manner, since the local setting screen 72*b* to be displayed later displays limited content according to the selection in the local setting screen 72*a* previously displayed, it is possible to reduce a selection error by the user.

When the user performs an operation instruction to select the content of each vision component with respect to such third local setting screen 72*b* and performs an operation instruction with respect to the button 7203 displayed as "next", the input control unit 115 receives the selection of the content of each vision component (FIG. 19: step S317). Accordingly, the control unit 111 stores the selected vision component in the storage unit 113, and issues an instruction to output a fourth local setting screen (not illustrated) with respect to the display control unit 114 (FIG. 19: step S318). When receiving the output instruction, the display control unit 114 displays the fourth local setting screen (not illustrated) on the display device 41.

Fourth Local Setting Screen

The fourth local setting screen is a screen for setting a camera point (start position) at which the local setting is started and the local reference point (not illustrated). The local reference point is set only in a case where a selection to teach the local reference point is made on the third local setting screen. The fourth local setting screen has substantially the same display form as that of the first local setting screen 72*a* except that the selection content (setting content) is different. The fourth local setting screen also includes the same buttons as the buttons 7201 to 7205 included in the first local setting screen 72*a*.

When the user performs an operation instruction with respect to the teach button (button corresponding to button 7204 in which the gray-out is released) to the fourth local setting screen, the input control unit 115 receives the operation instruction (FIG. 19: step S319). Accordingly, the control unit 111 issues an instruction to output a teaching screen 720 with respect to the display control unit 114 (FIG. 19: step S320). When receiving the output instruction, the display control unit 114 displays the teaching screen 720 in a pop-up manner on the display device 41.

Teaching Screen

As illustrated in FIG. 22, the teaching screen 720 is a screen used for teaching the camera point at which the local setting is started and a position of the local reference point that determines a height of a local plane to be set. The screen 720 includes at least a jog & teach panel 726 and a teach button 7206. The jog & teach panel 726 includes a jog group 724 having a plurality of buttons 7241 for receiving an operation instruction to jog-operate a predetermined portion of the robot 2*a* and a picture image display unit 725 that displays the captured image of the imaging unit 3.

The user performs an instruction (operation instruction) to move a predetermined portion of the robot 2*a* using the plurality of buttons 7241, for example, so as to position the calibration plate to the center of the picture image display unit 725 (the center of captured image) using such screen 720. When the input control unit 115 receives the operation instruction of the user, the control unit 111 issues a movement instruction to move the hand 270 with respect to the robot control device 12 based on the operation instruction. By issuing an imaging instruction to capture an image of the imaging unit 3 with respect to the image processing device 13 in addition to the movement instruction and displaying the captured image in the picture image display unit 725, the user moves the imaging unit to a position at which an imaging object appropriately appears and teaches the camera point at which the local setting is started (FIG. 19: step S321). Then, in the case where the selection is made so as to teach the local reference point in the third local setting screen, when the hand 270 of the robot 2*a* and the like is moved to a point through which the local plane to be set is required to pass and then the user performs an operation instruction with respect to the teach button 7206, the input control unit 115 receives the operation instruction of the teach button 7206 by the user. Accordingly, the control unit 111 sets the local reference point (reference point) through which the local plane to be locally set passes (FIG. 19: step S322). The control unit 111 stores the camera point and the local reference point in the storage unit 113. Then, the control unit 111 issues an instruction to delete the teaching screen 720 with respect to the display control unit 114, and the display control unit 114 deletes the teaching screen 720 from the display device 41.

Next, when the user performs an operation instruction with respect to a button (corresponding to button 7203) displayed as "next" of the fourth local setting screen (not illustrated), the input control unit 115 receives the operation instruction by the user (FIG. 19: step S323). Then, the control unit 111 issues an instruction to output a fifth local setting screen 72*c* with respect to the display control unit 114 (FIG. 19: step S324). Accordingly, the display control unit 114 displays the fifth local setting screen 72*c* on the display device 41.

Fifth Local Setting Screen

As illustrated in FIG. 23, the fifth local setting screen 72*c* is a screen for selecting contents of various parameters for automatically running the local setting. In the embodiment, as illustrated in FIG. 23, the local setting screen 72*c* is configured to select respective contents of four parameters of target tolerance, maximum movement distance, maximum posture change amount (angle), and LJM mode. Specifically, the local setting screen 72*c* includes text boxes 727 for inputting contents relating to the parameters and a drop-down list 728 for selecting one content from a plurality of contents (information) relating to the parameters. The parameters are not limited to the four parameters described above, and another parameter may be further added or any one of parameters described above may be omitted.

The local setting screen 72*c* includes the buttons 7201 to 7205 similarly to the first local setting screen 72*a*, and the buttons 7203 to 7205 are grayed out. Since the fifth local setting screen 72*c* is the last local setting screen of the group of screens for the local setting, the button 7203 is grayed out.

The local setting screen 72*c* includes a button 7208 displayed as "run".

When the user performs an operation instruction to select the contents of various parameters with respect to the local setting screen 72*c* and performs an operation instruction with respect to the button 7208 displayed as "run", the input control unit 115 receives the selection of the content of each parameter and an instruction to run the local setting from the user (FIG. 19: step S325). Accordingly, the control unit 111 stores the content of the selected parameter in the storage unit 113 and issues instructions to run the local setting with respect to the robot control device 12 and the image processing device 13 (FIG. 19: step S326). In this manner, the various settings of the local setting by the display the local setting processing are finished.

[2A] Run of Local Setting Processing (Step S32)

Next, the control system 10 runs the local setting processing.

Specifically, the robot control device 12 and the image processing device 13 run the local setting processing based on a run instruction from the control unit 111 in step S326.

When receiving the run instruction, the robot control device 12 first acquires a state (for example, a motor of the driving unit 280 is turned on) of the robot 2a from the robot 2a. Then, the robot control device 12 issues a movement instruction to the robot 2a such that the calibration plate enters the field of view of the mobile camera 31 and the mobile camera 31 is moved to a camera point taught as the start position of the local setting. At the time, the robot 2a returns information on the movement of the robot arm 20 (value of position sensor) and the like to the robot control device 12 every time. Next, the robot control device 12 issues an instruction to run the image processing sequence with respect to the image processing device 13. The image processing device 13 receives the run instruction and runs the image processing sequence for detecting the calibration plate by the mobile camera 31 (imaging unit 3). The image processing sequence runs the image processing sequence accepted by the local setting screen 72b described above. The image processing device 13 runs the image processing sequence, performs the image processing based on a captured image (image data) obtained by imaging the calibration plate with the mobile camera 31, and detects a relative position posture of the calibration plate with respect to the mobile camera 31. Next, when the image processing ends, the image processing device 13 transmits a run result of the image processing sequence (position posture of calibration plate) to the robot control device 12. Then, the robot control device 12 calculates a local coordinate system based on the position posture of the acquired calibration plate and a robot coordinate (base coordinate) of the mobile camera 31 at the time of the imaging. The robot control device 12 transmits a setting result of the local coordinate system (local setting result) to the computer 11. As described above, a specific method for the run contents of the local setting and the like is not particularly limited. The storage unit 113 stores the processing (program) for each setting, and the control unit 111 runs the processing (program) according to the selected setting.

[3A] Reflection of Local Setting Result (Step S33)

Next, the control system 10 reflects the local setting result.

Specifically, when the communication unit 116 of the computer 11 receives the local setting result (FIG. 19: step S327), the control unit 111 issues an instruction to output a screen for displaying the local setting result with respect to the display control unit 114 (FIG. 19: step S328). Accordingly, the display control unit 114 displays the screen (not illustrated) in which the local setting result is displayed on the display device 41. The screen (not illustrated) is configured to allow the user to select whether to reflect the local setting result.

When the input control unit 115 accepts a selection of reflecting the local setting result by the user (FIG. 19: step S329), the control unit 111 issues an instruction to set the local setting result with respect to the robot control device 12 (FIG. 19: step S330). When receiving the instruction, the robot control device 12 sets the local setting and stores the setting. Accordingly, the local setting is reflected.

On the other hand, when the user selects not to reflect the local setting result, the control unit 111 performs again, for example, [1A] various settings in local setting (step S31) and [2A] run of local setting processing (step S32) (not illustrated in FIG. 19). At least [2A] run of local setting processing (step S32) may be performed again. In this manner, it is possible to enhance accuracy of the local setting result by repeatedly performing [2A] run of local setting processing (step S32) and the like if necessary.

In the local setting described above, as described above, in [1A] various settings in local setting, the display control unit 114 outputs the group of screens for the local setting for displaying the plurality (five in the embodiment) of local setting screens 72 in an interactive manner with the user. The user instructs various settings to the control system 10 using the plurality of local setting screens 72. Accordingly, since the user can select the setting content (information) in an interactive manner along a predetermined sequence, it is possible to finish the various settings in the local setting easily and simply without a complicated operation. Therefore, it is possible to save the effort of programming various settings, unlike the related art. Since the setting content necessary for the local setting is displayed, it is possible to reduce an insufficient setting of the setting content necessary for the local setting and to reduce, for example, an error or the like in the run of the local setting even for a novice.

As described above, the group of screens for the local setting includes the five local setting screens 72, but the number of the local setting screens 72 is not limited thereto. Another local setting screen may be further added to any one of the five local setting screens 72 may be omitted. The sequence in which the five local setting screens 72 are displayed is not limited to the sequence described above and is predetermined. However, it is preferable that the display content of the local setting screen 72 to be displayed later changes according to the selection content of the local setting screen 72 previously displayed. That is, it is preferable that the display content of the local setting screen 72 to be displayed later is limited content according to the selection content of the local setting screen 72 previously displayed. Therefore, it is preferable that the local setting screen 72b is set to be displayed after the local setting screen 72a described above. Since the user can easily grasp the setting content by displaying the five local setting screens 72 described above in the sequence as described above, it is possible to enhance the convenience for the user.

Next, tool setting in the work program described above and display processing in the tool setting will be described.

Tool Setting and Display Processing

Figure 24:
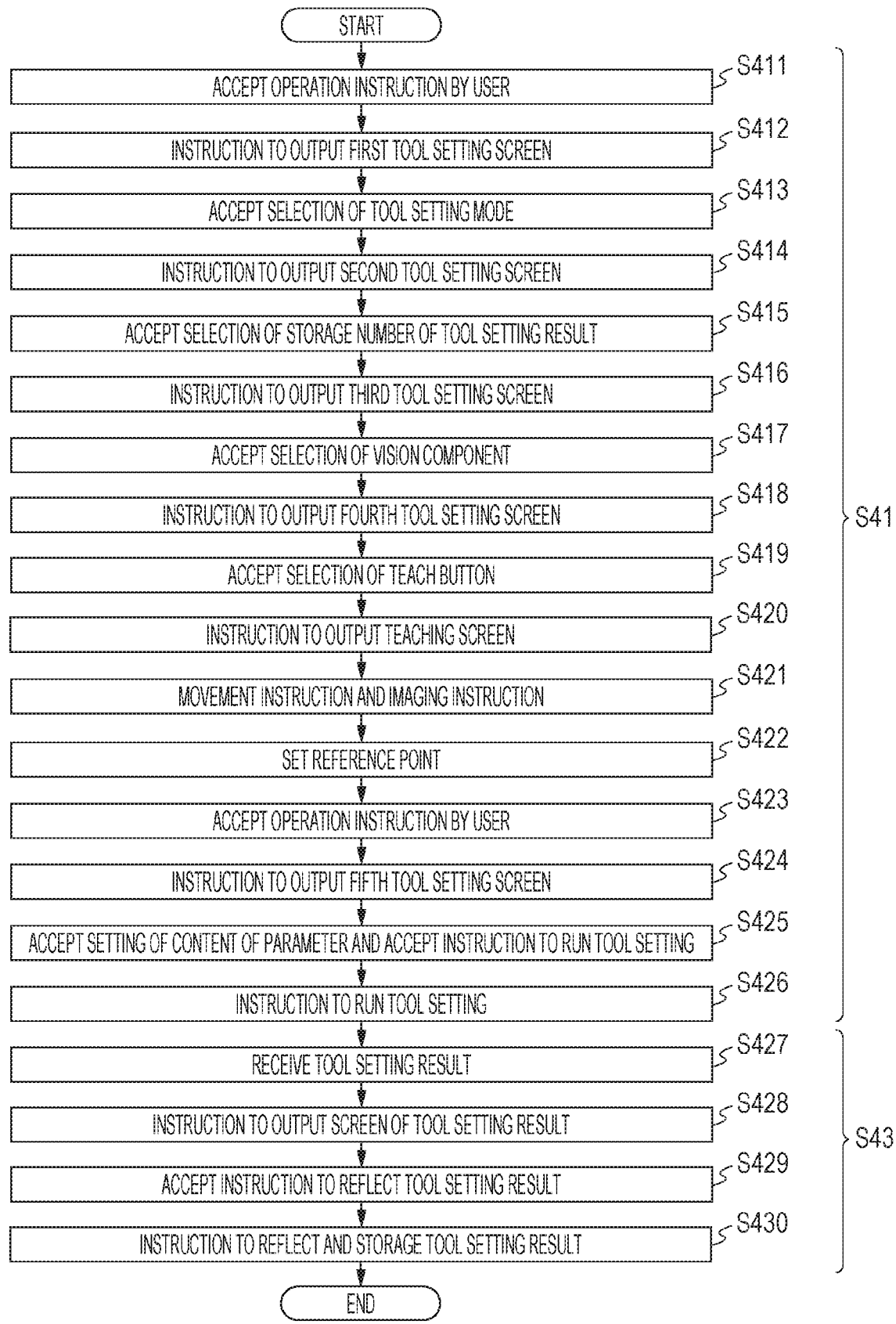
FIG. 24 is a flow diagram illustrating a flow of a tool setting illustrated in FIG. 8.
Figure 25:
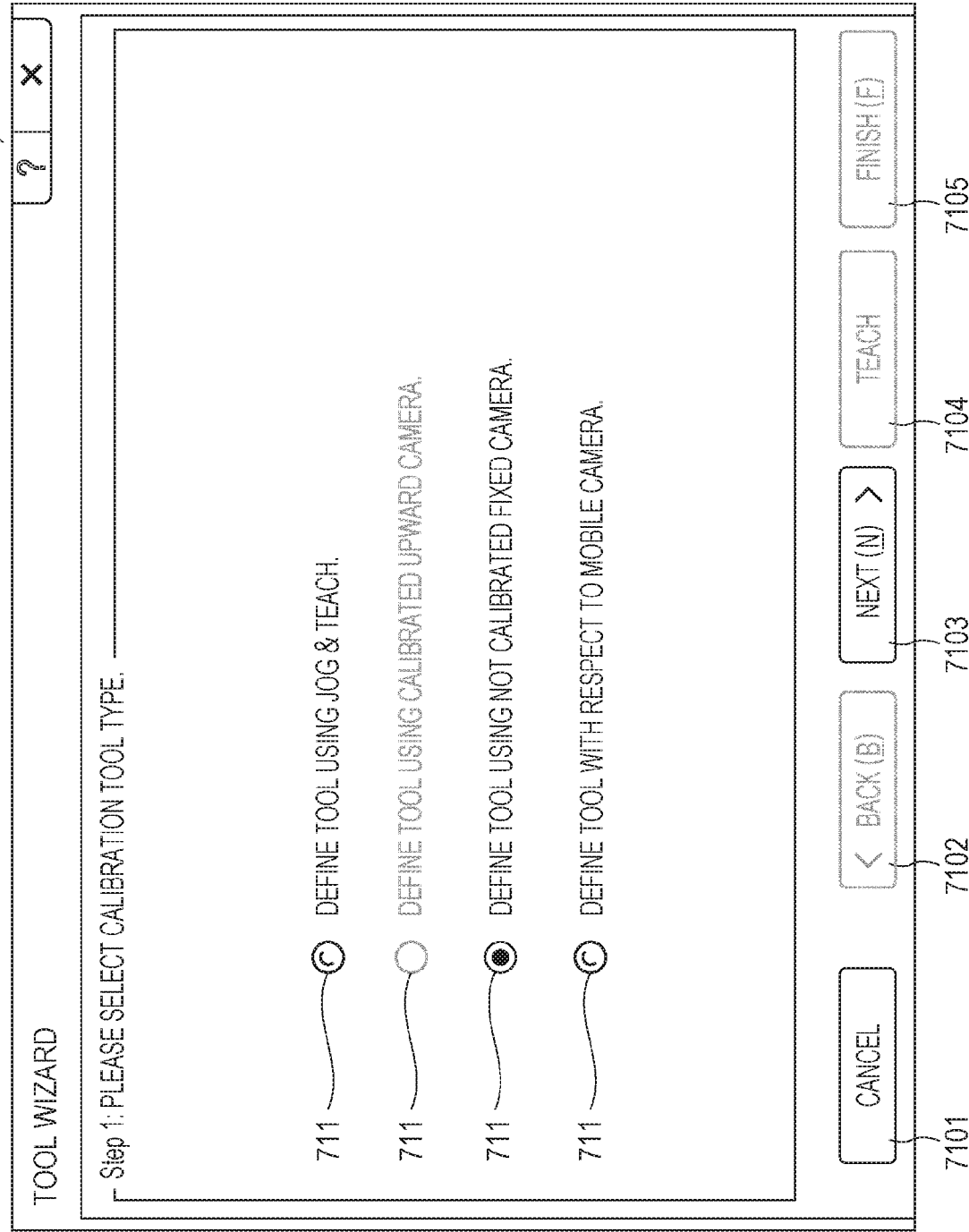
FIG. 25 is a tool setting screen displayed on the display device illustrated in FIG. 1.
Figure 26:
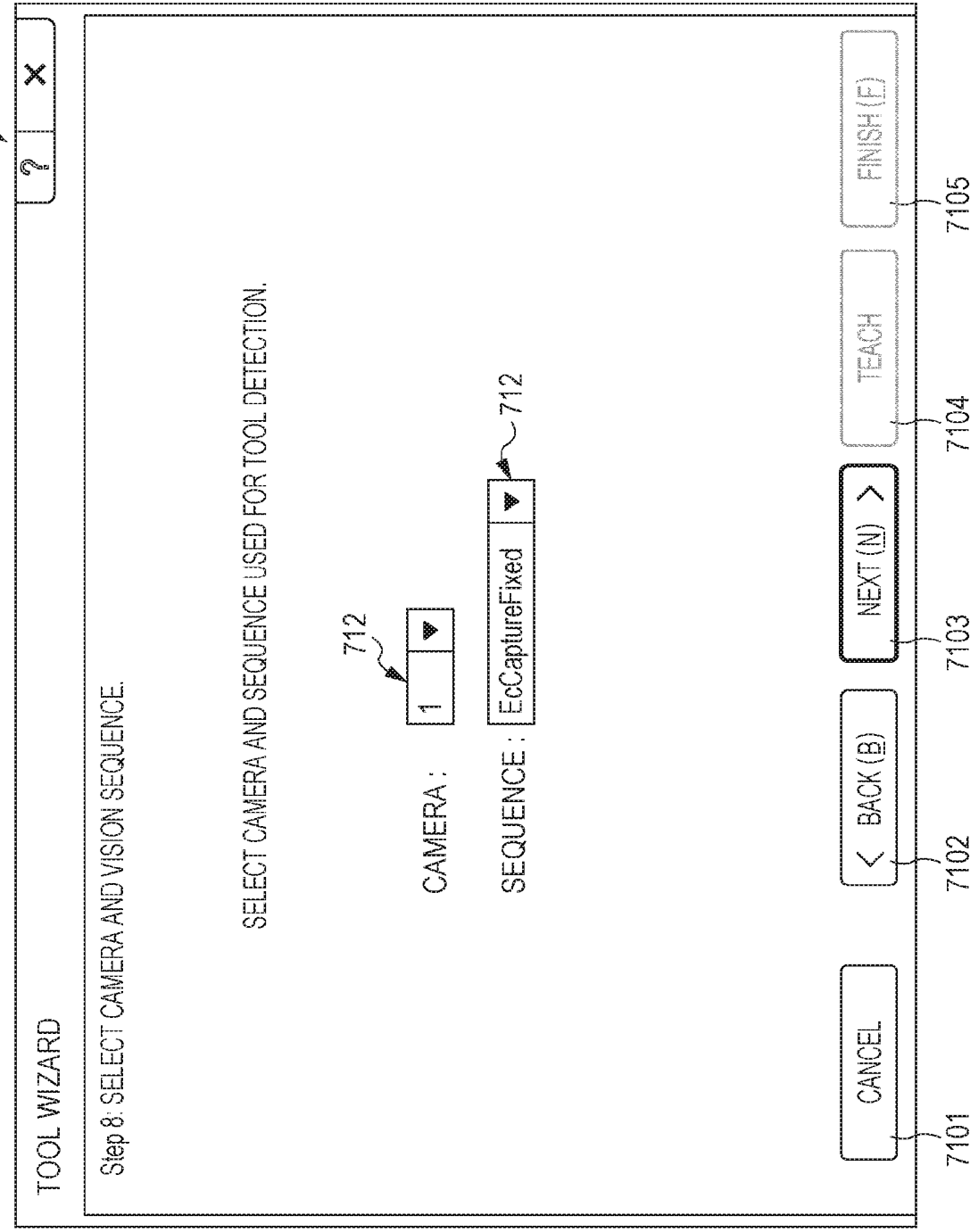
FIG. 26 is a tool setting screen displayed on the display device illustrated in FIG. 1.
Figure 27:
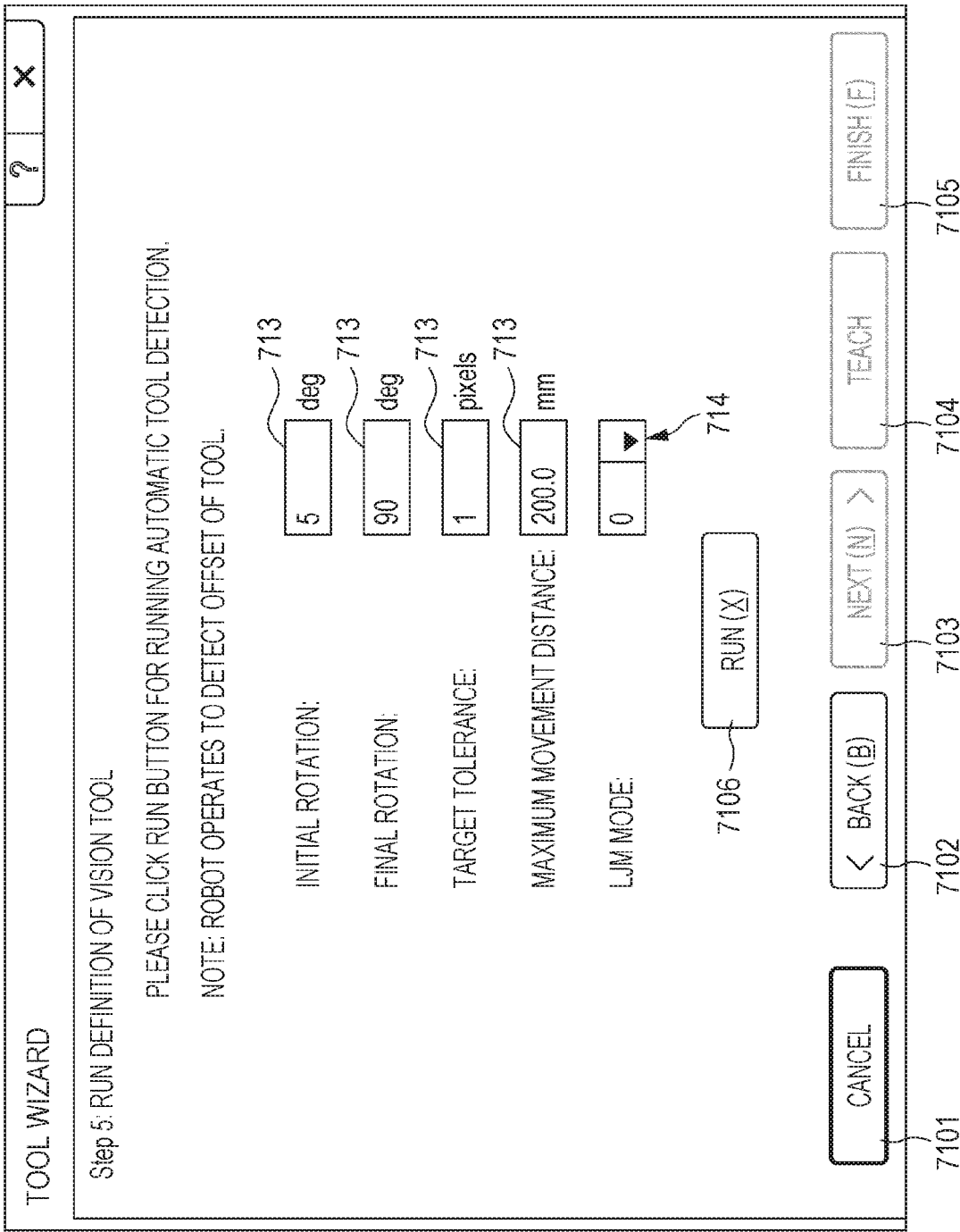
FIG. 27 is a tool setting screen displayed on the display device illustrated in FIG. 1.

FIG. 24 is a flow diagram illustrating a flow of the tool setting illustrated in FIG. 8. FIGS. 25, 26, and 27 are tool setting screens displayed on the display device illustrated in FIG. 1.

Hereinafter, the tool setting (step S121) in the creation of the work program described above will be described with reference to the flow diagram illustrated in FIG. 24. The tool setting includes [1B] various settings in tool setting (step S41), [2B] run of tool setting processing (step S42 (not illustrated)), and [3B] reflection of tool setting result (step S43). Here, the tool setting means to include various settings (including display processing) in the tool setting, run of the tool setting processing, and reflection of the tool setting result.

[1B] Various Settings in Tool Setting (Step S41)

The control system 10 first runs various settings in the tool setting based on an operation instruction by the user.

Specifically, when the user first performs an operation instruction with respect to the tool setting icon 701 of the main window 50 illustrated in FIG. 17, the input control unit 115 receives the operation instruction (instruction at the start of the tool setting) (FIG. 24: step S411). Accordingly, the control unit 111 starts the display processing of a group of screens for the tool setting for displaying a plurality (five in the embodiment) of tool setting screens 71 (instruction screens) in an interactive manner with the user and issues an instruction to output a first tool setting screen 71*a* (tool setting screen 71) illustrated in FIG. 25 with respect to the display control unit 114 (FIG. 24: step S412). Accordingly, the display control unit 114 displays the first tool setting screen 71*a* on the display device 41.

First Tool Setting Screen

As illustrated in FIG. 25, the first tool setting screen 71*a* is a screen for selecting a tool setting mode (calibration tool type). The tool setting mode indicates a type and a method of the tool setting. That is, the tool setting mode indicates what kind of tool offset is to be set and what kind of means to set the tool. In the embodiment, the tool setting screen 71*a* includes a plurality of radio buttons 711 and is configured to be able to receive any one of four tool setting modes illustrated in FIG. 25. In this manner, since the tool setting screen 71*a* is configured to guide one selection from the plurality of modes, the user can prevent selecting two or more types of modes. The type of the tool setting mode is not limited to the four modes illustrated in FIG. 25, and another mode may be further added or any one of the four modes illustrated in FIG. 25 may be omitted.

Similarly to the local setting screen 72*a* described above, the tool setting screen 71*a* includes a button 7101 displayed as "cancel", a button 7102 displayed as "back", a button 7103 displayed as "next", a button 7104 displayed as "teach", and a button 7105 displayed as "finish".

When the user performs an operation instruction to select a desired mode with respect to such tool setting screen 71*a* and performs an operation instruction with respect to the button 7103, and the input control unit 115 receives the selection of the tool setting mode (FIG. 24: step S413). Accordingly, the control unit 111 stores the selected tool setting mode in the storage unit 113 and issues an instruction to output a second tool setting screen (not illustrated) with respect to the display control unit 114 (FIG. 24: step S414). When receiving the output instruction, the display control unit 114 displays the second tool setting screen (not illustrated) on the display device 41.

Second Tool Setting Screen

The second tool setting screen (not illustrated) is a screen for selecting a storage number (tool number) that stores the tool setting result. The second tool setting screen has substantially the same display form as that of the first tool setting screen 71*a* except that the selection content (setting content) is different.

A list box or the like can be used for the display to select the storage number in the second tool setting screen. Since such second tool setting screen is configured to accept the selection of the storage number, it is possible to prevent an input error by the user. A storage name may be selected instead of the storage number. The second tool setting screen also includes the same buttons as the buttons 7101 to 7105 included in the first tool setting screen 71*a* (not illustrated).

When the user performs an operation instruction to select the desired storage number to such second tool setting screen and then performs an operation instruction with respect to the button displayed as "next" (button corresponding to button 7103), the input control unit 115 receives the selection of the storage number of the tool setting result (FIG. 24: step S415). Accordingly, the control unit 111 stores the selected storage number in the storage unit 113 and issues an instruction to output a third tool setting screen 71*b* (tool setting screen 71) illustrated in FIG. 26 with respect to the display control unit 114 (FIG. 24: step S416). When receiving the output instruction, the display control unit 114 displays the third tool setting screen 71*b* on the display device 41.

Third Tool Setting Screen

As illustrated in FIG. 26, the third tool setting screen 71*b* is a screen for selecting contents of various vision components. The vision component in the tool setting indicates elements such as a type of the imaging unit 3 used for detecting the tool in the tool setting, an object of image processing, and a method thereof. In the embodiment, as illustrated in FIG. 26, the tool setting screen 71*b* is configured to select respective contents of two vision components of the imaging unit 3 used for detecting the tool and the image processing sequence used for selecting the tool. Specifically, the tool setting screen 71*b* includes a plurality of drop-down lists 712 for selecting one content from a plurality of contents (information) relating to the vision component. The vision component in the tool setting is not limited to the two vision components described above, and another vision component may be further added or any one of the vision components described above may be omitted.

Here, display content of the third tool setting screen 71*b* changes according to the type (selection) of the imaging unit 3 of the first tool setting screen 71*a*. Specifically, the display content of the drop-down list 712 changes according to the type (selection) of the imaging unit 3 of the first tool setting screen 71*a*. For example, in step S121 in the generation of the work program described above, the tool setting is performed using the fixed camera 32 which is not calibrated. Therefore, when the input control unit 115 receives the selection of a third radio button 711 from the top in the figure of the first tool setting screen 71*a* by the user, the display control unit 114 displays the third tool setting screen 71*b* having the drop-down list 712 of display content related to the fixed camera 32 on the display device 41.

In this manner, since the tool setting screen 71*b* to be displayed later displays limited content according to the selection in the tool setting screen 71*a* previously displayed, it is possible to reduce a selection error by the user.

When the user performs an operation instruction to select the content of each vision component with respect to such third tool setting screen 71*b* and performs an operation instruction with respect to the button 7103 displayed as "next", the input control unit 115 receives the selection of the content of each vision component (FIG. 24: step S417). Accordingly, the control unit 111 stores the selected vision component in the storage unit 113, and issues an instruction to output a fourth tool setting screen (not illustrated) with respect to the display control unit 114 (FIG. 24: step S418). When receiving the output instruction, the display control unit 114 displays the fourth tool setting screen (not illustrated) on the display device 41.

Fourth Tool Setting Screen

The fourth tool setting screen (not illustrated) is a screen for receiving the teaching of a camera point at which the tool setting is started. The fourth tool setting screen has substantially the same display form as that of the first tool setting screen 71*a* except that the selection content (setting content) is different. The fourth tool setting screen also includes the same buttons as the buttons 7101 to 7105 included in the first tool setting screen 71*a*.

When the user performs an operation instruction with respect to a teach button (button corresponding to button 7104 in which the gray-out is released) to such fourth tool setting screen (not illustrated), the input control unit 115 receives the operation instruction (FIG. 24: step S419). Accordingly, the control unit 111 issues an instruction to output a teaching screen (not illustrated) with respect to the display control unit 114 (FIG. 24: step S420). When receiving the output instruction, the display control unit 114 displays the teaching screen in a pop-up manner on the display device 41. The teaching screen has substantially the same display form as that of the teaching screen 720 in the local setting described above (refer to FIG. 24).

The user performs an instruction (operation instruction) to position, for example, a marker (target) attached to the workpiece 93 gripped by the hand 270 as the tool near the center of the captured image using the teaching screen. When the input control unit 115 receives the operation instruction of the user, the control unit 111 issues a movement instruction to move the hand 270 with respect to the robot control device 12 and issues an imaging instruction to image the marker by the imaging unit 3 with respect to the image processing device 13 based on the instruction (FIG. 24: step S421). Then, the marker is positioned near the center of the captured image, and then the input control unit 115 receives an operation instruction of a teach button (button corresponding to button 7104) by the user. Accordingly, the control unit 111 sets a tip end axis coordinate of the robot 2a when the marker is positioned at the center of the captured image as a camera point at the start of the tool setting (FIG. 24: step S422). The control unit 111 stores the camera point in the storage unit 113. Then, the control unit 111 issues an instruction to delete the teaching screen with respect to the display control unit 114, and the display control unit 114 deletes the teaching screen from the display device 41.

Next, when the user performs an operation instruction with respect to a button displayed as "next" (corresponding to button 7103) of the fourth tool setting screen (not illustrated) described above, the input control unit 115 receives the selection by the user (FIG. 24: step S423). Then, the control unit 111 issues an instruction to output a fifth tool setting screen 71c with respect to the display control unit 114 (FIG. 24: step S424). Accordingly, the display control unit 114 displays the fifth tool setting screen 71c on the display device 41.

Fifth Tool Setting Screen

As illustrated in FIG. 27, the fifth tool setting screen 71c is a screen for selecting contents of various parameters for automatically running the tool setting. In the embodiment, as illustrated in FIG. 27, the tool setting screen 71c is configured to select respective contents of five parameters of initial rotation, final rotation, target tolerance, maximum movement distance, and LJM mode. Specifically, the tool setting screen 71c includes text boxes 713 for inputting contents relating to the parameters and a drop-down list 714 for selecting one content from a plurality of contents (information) relating to the parameters. The parameters are not limited to the five parameters described above, and another parameter may be further added or any one of parameters described above may be omitted.

Similarly to the first tool setting screen 71a, the tool setting screen 71c includes the buttons 7101 to 7105. The tool setting screen 71c includes a button 7106 displayed as "run".

When the user performs an operation instruction to select the contents of various parameters with respect to the tool setting screen 71c and performs an operation instruction with respect to the button 7106 displayed as "run", the input control unit 115 receives the selection of the content of each parameter and an instruction to run the tool setting from the user (FIG. 24: step S425). Accordingly, the control unit 111 stores the content of the selected parameter in the storage unit 113 and issues instructions to run the tool setting with respect to the robot control device 12 and the image processing device 13 (FIG. 24: step S426). In this manner, the various settings of the tool setting by the display the tool setting processing are finished.

[2B] Run of Tool Setting Processing (Step S42)

Next, the control system 10 runs the tool setting processing.

Specifically, the robot control device 12 and the image processing device 13 run the tool setting processing based on a run instruction from the control unit 111 in step S425.

When receiving the run instruction, the robot control device 12 first acquires a state of the robot 2a from the robot 2a. Then, the robot control device 12 issues a movement instruction to the robot 2a such that the marker attached to the workpiece 93 is imaged by the fixed camera 32 to perform the tool setting. Here, the movement instruction is issued, for example, such that the marker is positioned at the center of the captured image. At the time, the robot 2a returns information on the movement of the robot arm 20 (value of position sensor) and the like to the robot control device 12 every time. Next, the robot control device 12 issues an instruction to run the image processing sequence with respect to the image processing device 13. The image processing device 13 receives the run instruction, detects the marker with the fixed camera 32, and runs the image processing sequence. Here, the image processing sequence accepted by the tool setting screen 71b described above is run. The image processing device 13 runs the image processing sequence and performs the image processing based on a captured image (image data) obtained by imaging the marker with the fixed camera 32. Next, the robot control device 12 issues a movement instruction to the robot 2a, for example, so as to rotate an axis coordinate with the center of the captured image as the rotation center. Then, the image processing device 13 receives the run instruction, detects the marker with the fixed camera 32, and runs the image processing sequence. The robot control device 12 may rotate the marker with respect to the axis coordinate or may further rotate the axis coordinate in addition to the processing described above. Next, the image processing device 13 transmits a run result of the image processing sequence (detection result of marker) to the robot control device 12. Then, the robot control device 12 calculates an offset based on the acquired detection result of the marker, a robot coordinate at the time of the imaging, and the like. The robot control device 12 transmits a tool setting result to the computer 11. As described above, a specific method for the run contents of the tool setting and the like is not particularly limited. The storage unit 113 stores the processing (program) for each setting, and the control unit 111 runs the processing (program) according to the selected setting.

[3B] Reflection of Tool Setting Result (Step S43)

Next, the control system 10 reflects the tool setting result and runs the setting.

Specifically, when the communication unit 116 of the computer 11 receives the tool setting result by the user (FIG. 24: step S427), the control unit 111 issues an instruction to output a screen for displaying the tool setting result with respect to the display control unit 114 (FIG. 24: step S428). Accordingly, the display control unit 114 displays the screen in which the tool setting result is displayed on the display device 41. The screen (not illustrated) is configured to allow the user to select whether to reflect the tool setting result.

When the input control unit 115 accepts a selection of reflecting the tool setting result (FIG. 24: step S429), the control unit 111 issues an instruction to reflect and store the tool setting result with respect to the robot control device 12 (FIG. 24: step S430). When receiving the instruction, the robot control device 12 reflects and stores the tool setting and stores the setting.

On the other hand, when the user selects not to reflect the tool setting result, the control unit 111 performs again, for example, [1B] various settings in tool setting (step S41) and [2B] run of tool setting processing (step S42) (not illustrated in FIG. 24). At least [2B] run of tool setting processing (step S42) may be performed again. In this manner, it is possible to enhance accuracy of the tool setting result by repeatedly performing [2B] run of tool setting processing (step S42) and the like if necessary.

In the tool setting described above, as described above, in [1B] various settings of tool setting, the display control unit 114 displays a group of screens for the tool setting for displaying a plurality (five in the embodiment) of tool setting screens 71 in an interactive manner with the user. The user instructs various settings to the control system 10 using the plurality of tool setting screens 71. Accordingly, since the user can select the setting content (information) in an interactive manner along a predetermined sequence, it is possible to finish the various settings in the tool setting easily and simply without a complicated operation. Therefore, it is possible to save the effort of programming various settings, unlike the related art. Since the setting content necessary for the tool setting is displayed, it is possible to reduce an insufficient setting of the setting content necessary for the tool setting and to reduce, for example, an error or the like in the run of the tool setting even for a novice.

As described above, the group of screens for the tool setting includes the five tool setting screens 71, but the number of the tool setting screens 71 is not limited thereto. Another tool setting screen may be further added to any one of the five tool setting screens 71 may be omitted. The sequence in which the five tool setting screens 71 are displayed is not limited to the sequence described above and is predetermined. However, it is preferable that the display content of the tool setting screen 71 to be displayed later changes according to the selection content of the tool setting screen 71 previously displayed. That is, it is preferable that the display content of the tool setting screen 71 to be displayed later is limited content according to the selection content of the tool setting screen 71 previously displayed. Therefore, it is preferable that the tool setting screen 71*b* is set to be displayed after the tool setting screen 71*a* described above. Since the user can easily grasp the setting content by displaying the five tool setting screens 71 described above in the sequence as described above, it is possible to enhance the convenience for the user.

Next, the calibration in the work program and the display processing in the calibration described above will be described.

Calibration Creation and Display Processing

Figure 28:
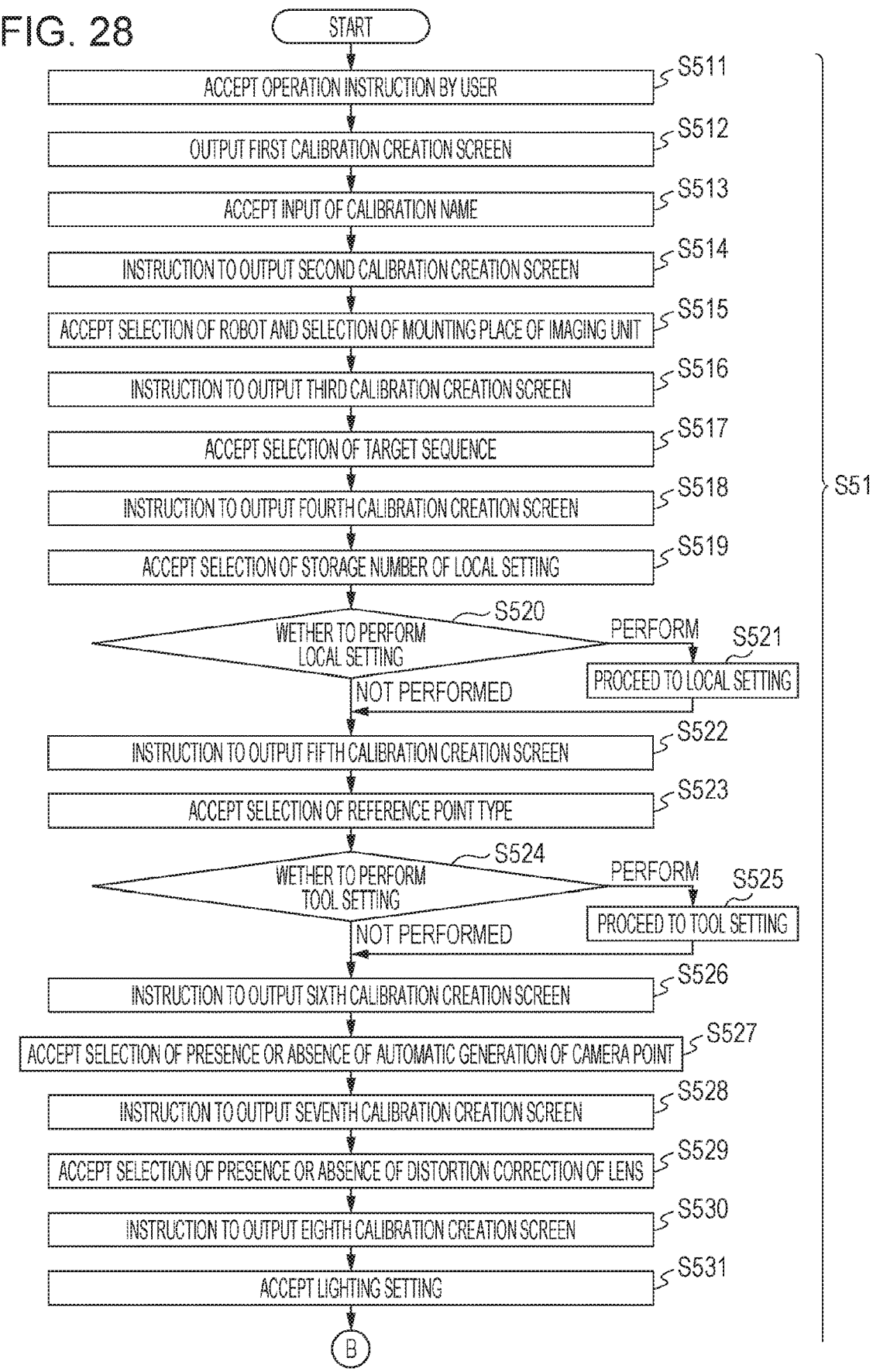
FIG. 28 is a flow diagram illustrating a flow of calibration illustrated in FIG. 9.
Figure 29:
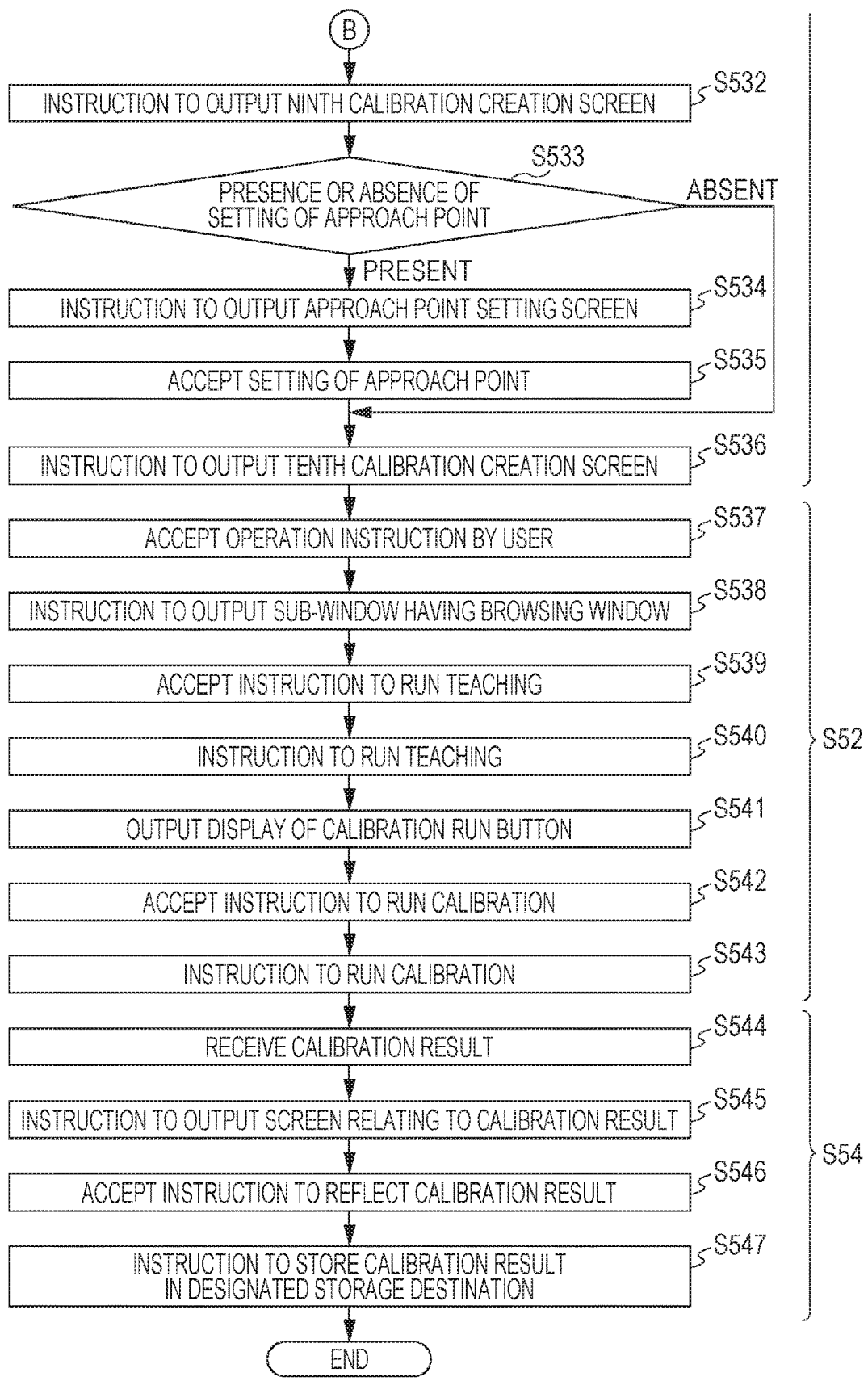
FIG. 29 is a flow diagram illustrating the flow of the calibration illustrated in FIG. 9.
Figure 40:
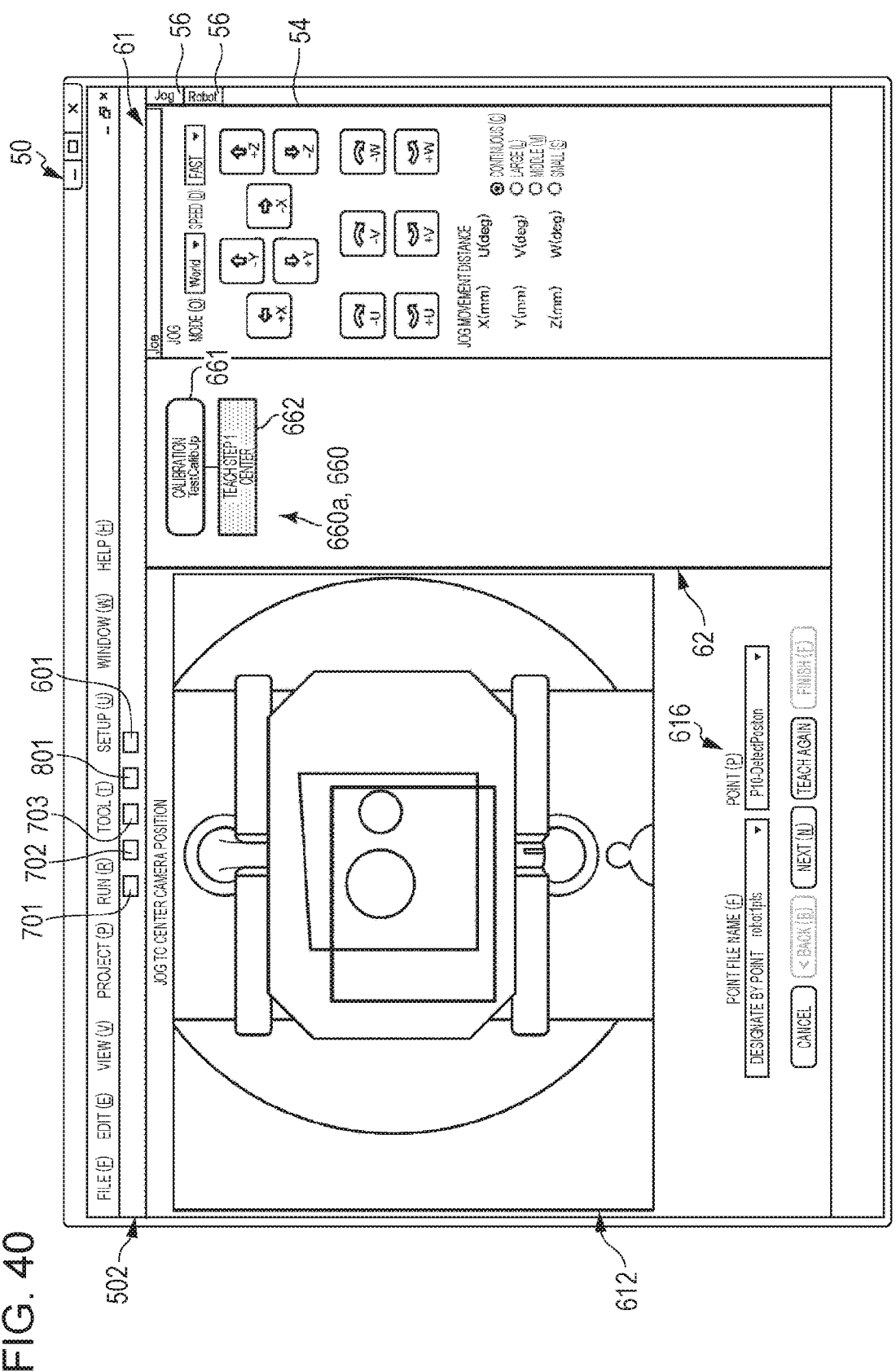
FIG. 40 is a diagram illustrating a state where a teaching flow is displayed on the sub-window illustrated in FIG. 18.
Figure 41:
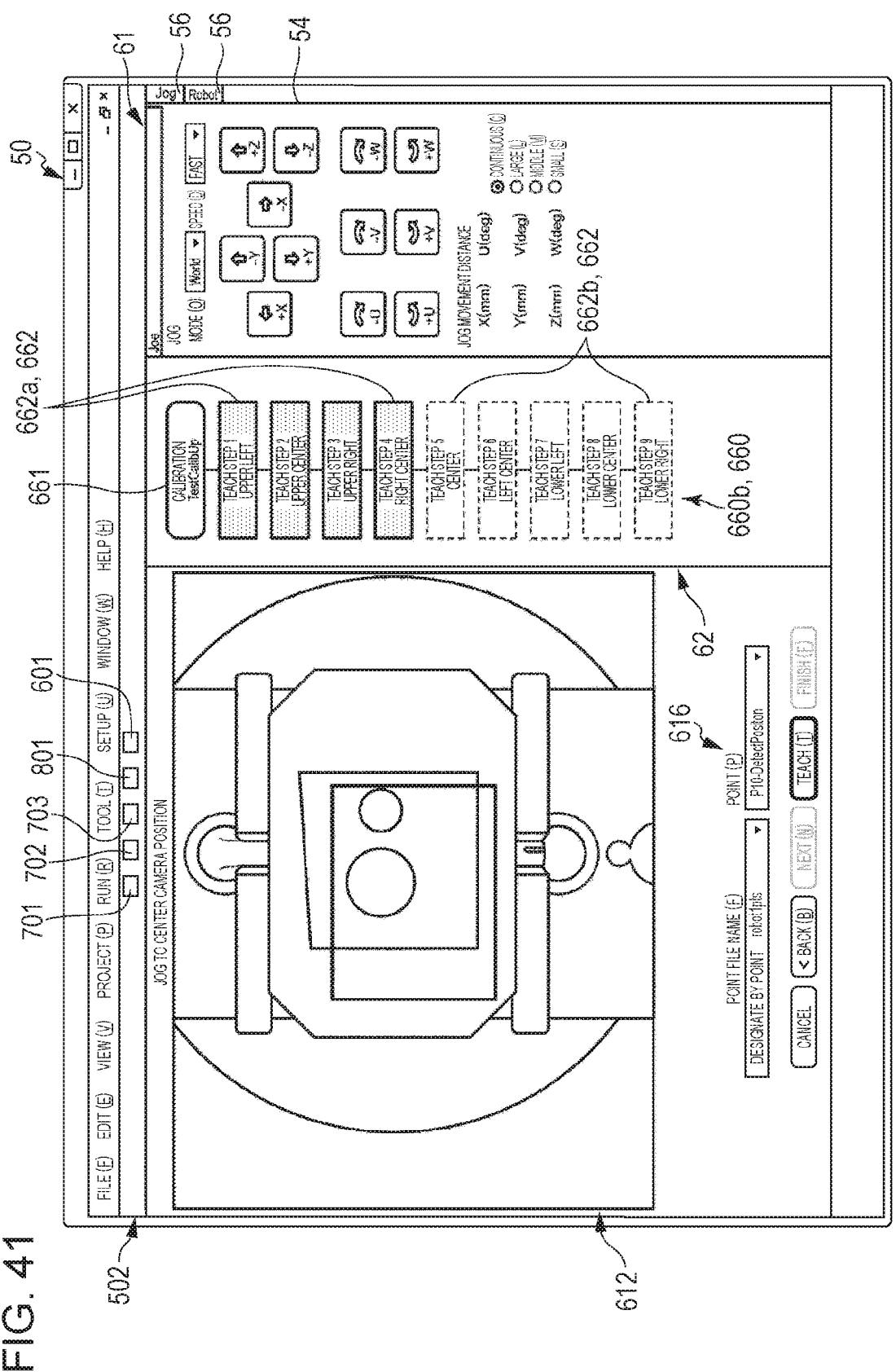
FIG. 41 is a diagram illustrating a state where a teaching flow is displayed on the sub-window illustrated in FIG. 18.
Figure 42:
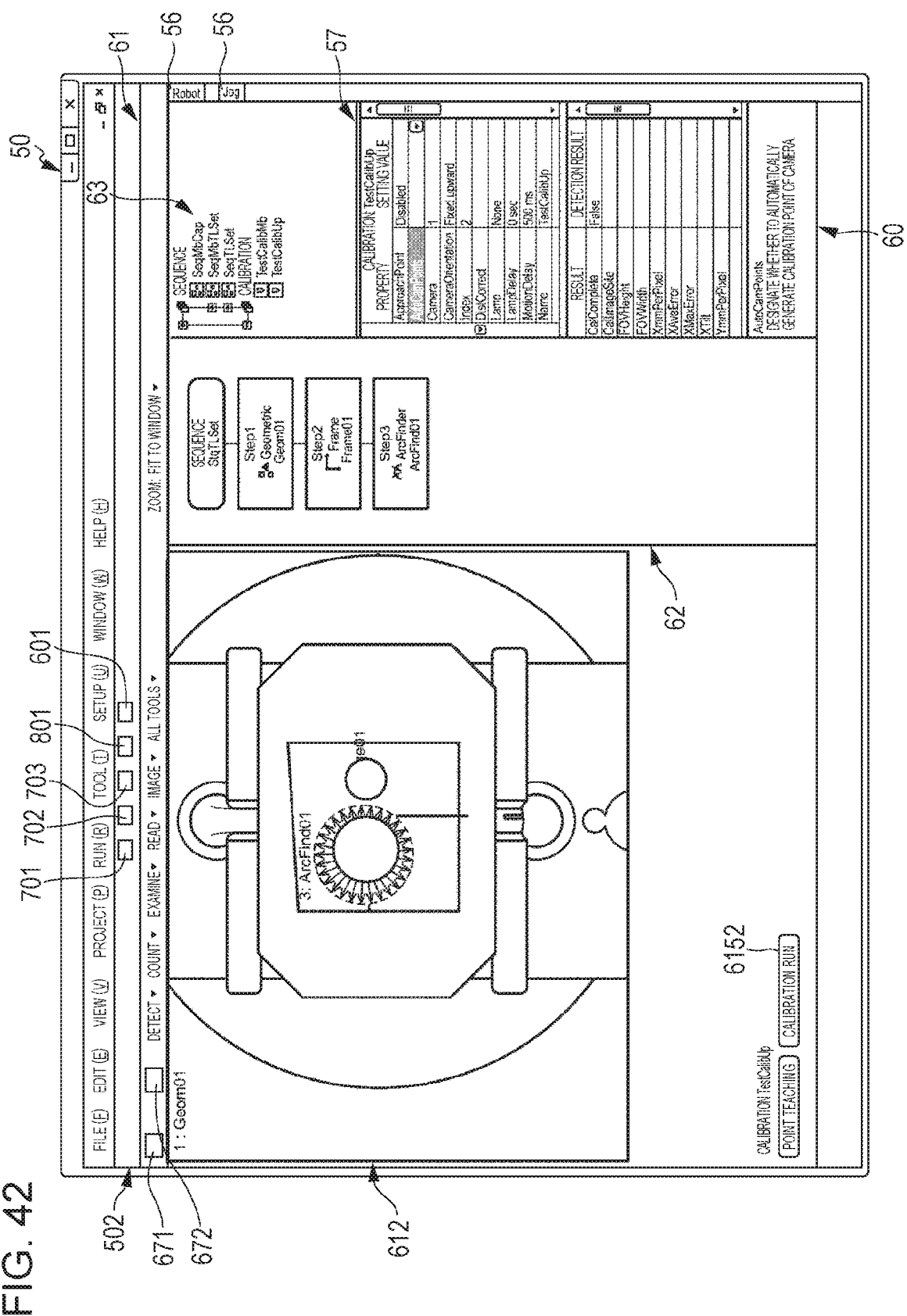
FIG. 42 is a diagram illustrating a state where a calibration run button is displayed on the sub-window illustrated in FIG. 18.

FIGS. 28 and 29 are flow diagrams illustrating a flow of calibration illustrated in FIG. 9, respectively. FIGS. 30 to 37 are calibration creation screens displayed on the display device illustrated in FIG. 1, respectively. FIG. 38 is a teaching screen displayed on the display device illustrated in FIG. 1. FIG. 39 is a diagram illustrating a state where a property setting window is displayed on the sub-window illustrated in FIG. 18. FIGS. 40 and 41 are diagrams illustrating states where teaching flows are displayed on the sub-window illustrated in FIG. 18. FIG. 42 is a diagram illustrating a state where a calibration run button is displayed on the sub-window illustrated in FIG. 18. FIG. 43 is a screen displayed on the display device in step S545 illustrated in FIG. 29.

Hereinafter, the calibration in the creation of the work program described above (steps S122 and S127) will be described with reference to flow diagrams illustrated in FIGS. 28, and 29. The calibration mainly includes [1C] various settings in calibration (step S51), [2C] teaching of camera point (step S52), [3C] run of calibration (step S53 (not illustrated)), and [4C] reflection of calibration result (step S54). Here, as described above, the calibration means to include associating the coordinate system (image coordinate system) of the imaging unit 3 with the robot coordinate system by performing various settings (including display processing) in the calibration, that is, calibration creation, teaching a camera point and the reference point, running the calibration, and reflecting the calibration result.

[1C] Various Settings in Calibration (Step S51)

The control system 10 first runs various settings in the calibration, that is, the calibration creation based on an operation instruction by the user.

Specifically, when the user first performs an operation instruction with respect to the calibration creation icon 703 of the main window 50 illustrated in FIG. 17, the input control unit 115 receives the operation instruction (instruction at the start of the calibration) (FIG. 28: step S511). Accordingly, the control unit 111 starts the display processing of a group of screens for the calibration creation for displaying a plurality (ten in the embodiment) of calibration creation screens 73 (instruction screen) in an interactive manner with the user and issues an instruction to output a first calibration creation screen 73*a* (calibration creation screen 73) illustrated in FIG. 30 with respect to the display control unit 114 (FIG. 28: step S512). Accordingly, the display control unit 114 displays the first calibration creation screen 73*a* on the display device 41.

First Calibration Creation Screen

Figure 30:
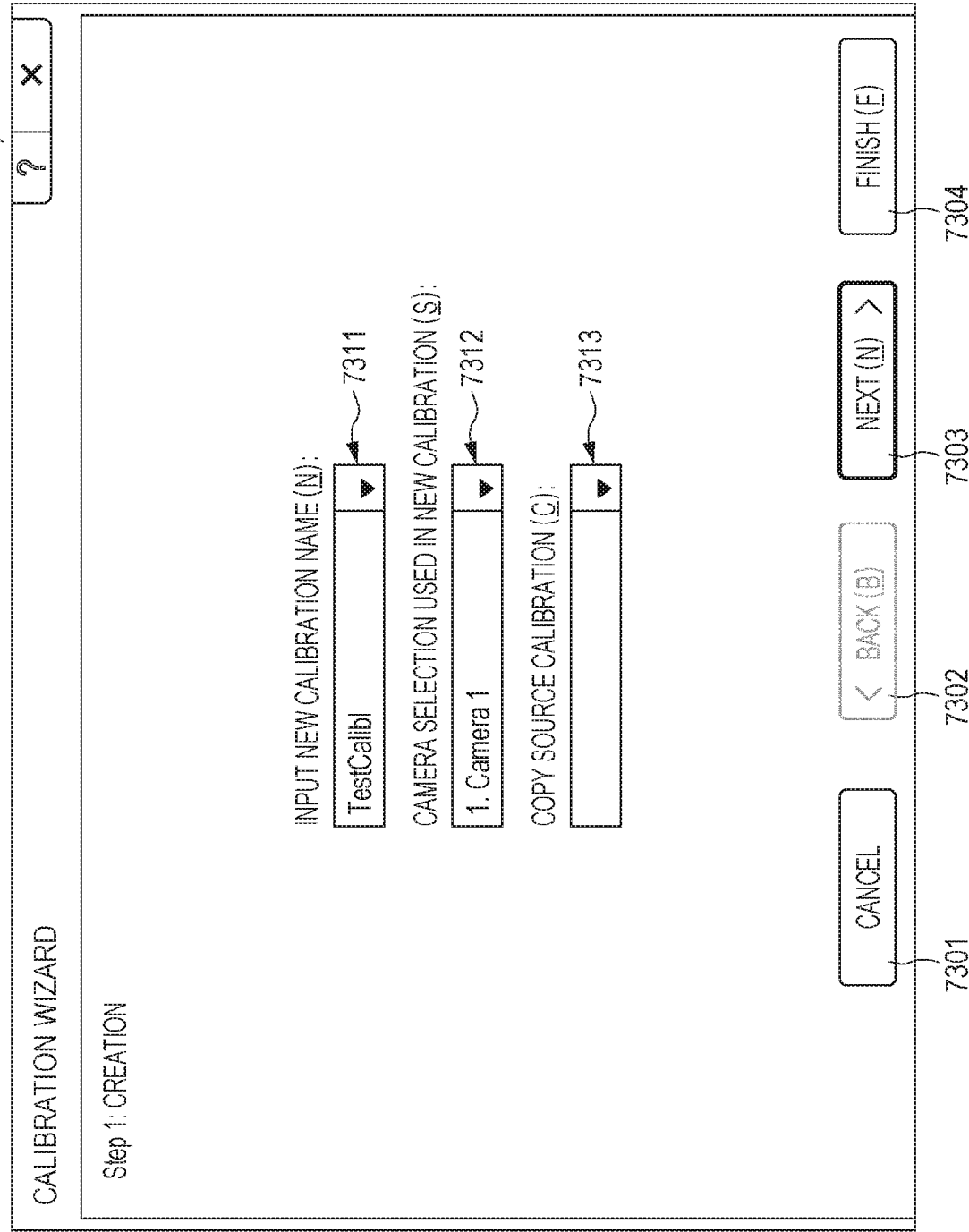
FIG. 30 is a calibration creation screen displayed on the display device illustrated in FIG. 1.

As illustrated in FIG. 30, the first calibration creation screen 73*a* is a screen for selecting a setting of a calibration name to be set from now and a type of the imaging unit 3 to be calibrated. In the embodiment, the calibration creation screen 73*a* includes a drop-down list 7311 for selecting the calibration name, a drop-down list 7312 for selecting the imaging unit 3, and a drop-down list 7313 for selecting calibration of a copy source.

In a case where calibration which is already set is stored, it is possible to copy a setting of the calibration of the copy source by using the drop-down list 7313. Accordingly, setting content of the calibration of the copy source is displayed on the plurality of calibration creation screens 73 displayed after the calibration creation screen 73*a*. Therefore, when it is desired to create new calibration by slightly modifying various contents of an already set calibration, the user can easily perform the modification by designating the calibration of the copy source.

Similarly to the local setting screen 72*a*, the calibration creation screen 73*a* includes a button 7301 displayed as "cancel", a button 7302 displayed as "back", a button 7303 displayed as "next", and a button 7304 displayed as "finish".

When the user performs an operation instruction to input the calibration name and the like with respect to such calibration creation screen 73*a* and performs an operation instruction with respect to the button 7303, the input control unit 115 receives the input of the calibration name and the like (FIG. 28: step S513). Accordingly, the control unit 111 stores the calibration name and the like in the storage unit 113 and issues an instruction to output a second calibration creation screen illustrated in FIG. 31 or FIG. 32 with respect to the display control unit 114 (FIG. 28: step S514). When receiving the output instruction, the display control unit 114 displays the second calibration creation screen 73b (calibration creation screen 73) on the display device 41.

Second Calibration Creation Screen

Figure 31:
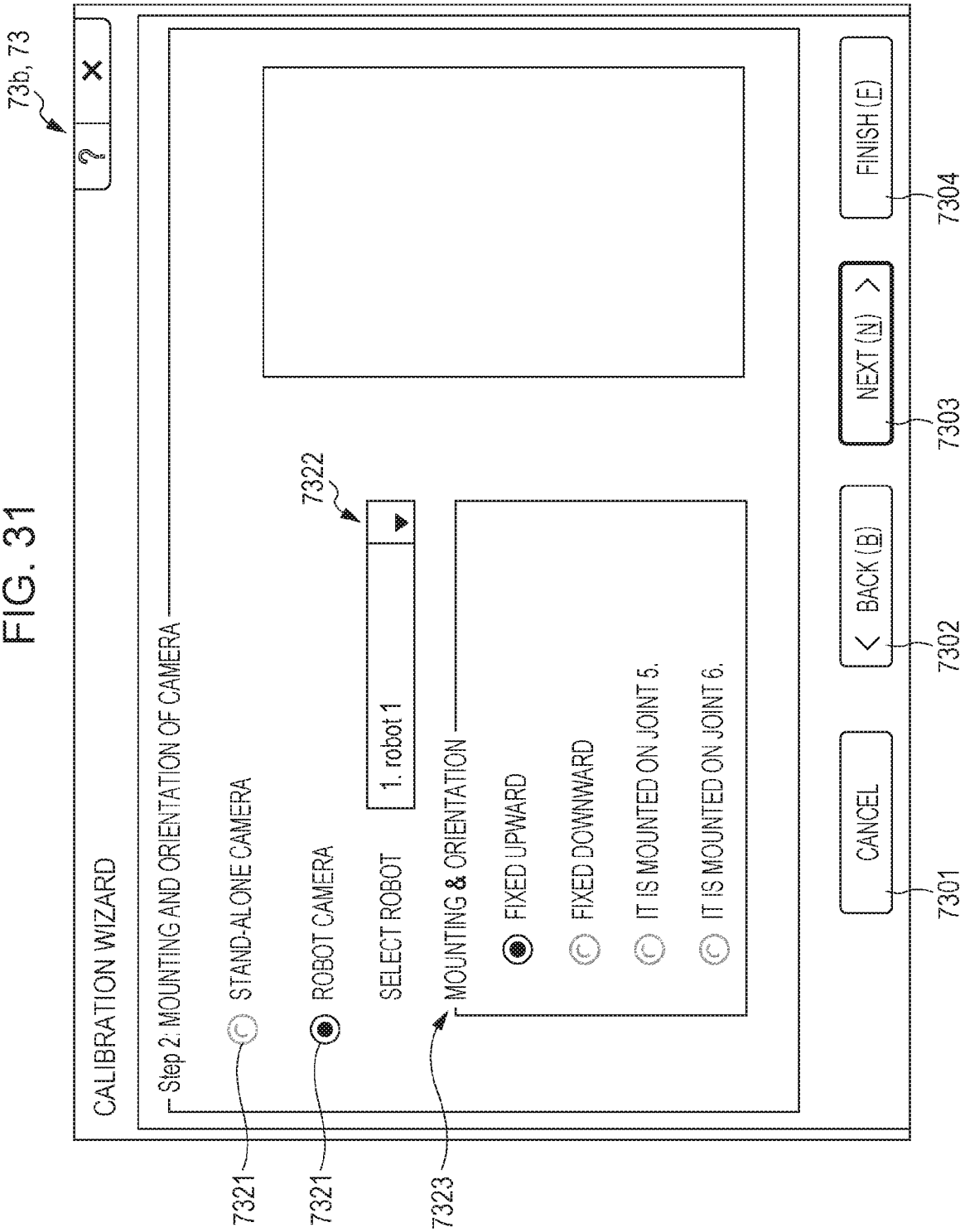
FIG. 31 is a calibration creation screen displayed on the display device illustrated in FIG. 1.
Figure 32:
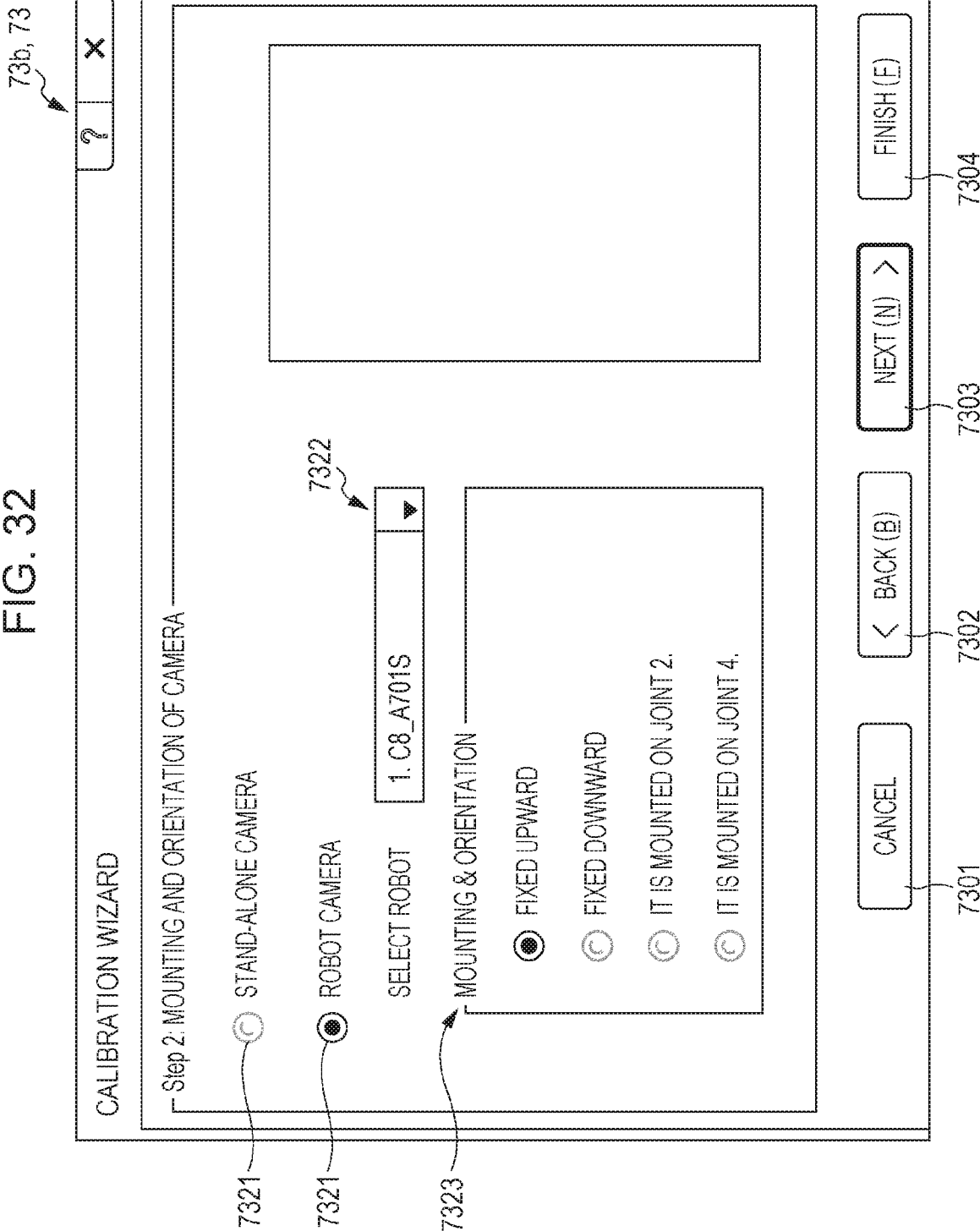
FIG. 32 is a calibration creation screen displayed on the display device illustrated in FIG. 1.

As illustrated in FIG. 31 or FIG. 32, the second calibration creation screen 73b is a screen for selecting a stand-alone camera or a robot camera and includes two radio buttons 7321 for receiving any one selection of the stand-alone camera and the robot camera. The "selection of stand-alone camera" is to perform calibration to associate a coordinate system in real space with the coordinate system (image coordinate system) of the imaging unit 3. The "selection of robot camera" is to perform calibration to associate the coordinate system (image coordinate system) of the imaging unit 3 with a coordinate system of the robot 2.

The calibration creation screen 73b includes a drop-down list 7322 for selecting one robot 2 from a plurality of types of robots 2 and a group 7323 (area) for receiving a selection of the attachment place of the imaging unit 3. Here, in the specification, the attachment place of the imaging unit 3 includes the mounting place at which the imaging unit 3 is mounted and an imaging direction (orientation) of the imaging unit 3.

In the embodiment, the display content of the drop-down list 7322 is the robot 2a as the vertical articulated robot and the robot 2b as the horizontal articulated robot. The calibration creation screen 73b is configured to be able to select any one of the robots 2a and 2b. In the embodiment, the group 7323 includes four radio buttons 7324 and is configured to be able to accept any one of four attachment places of the imaging unit 3 illustrated in FIG. 31 or FIG. 32. Accordingly, the user can prevent selecting two or more types of attachment places. The selection of the type of the robot 2 and the selection of the attachment place of the imaging unit 3 are used in the case where the robot camera is selected.

Here, display content of the second calibration creation screen 73b changes according to the selection content (type) of the robot 2. Specifically, the attachment place of the group 7323 of the second calibration creation screen 73b changes according to selection content of the robot 2 (refer to FIGS. 31 and 32). For example, when the input control unit 115 receives the selection of the robot 2a as the vertical articulated robot, the display control unit 114 displays the group 7323 having the attachment place related to the robot 2a on the display device 41 (refer to FIG. 31). For example, when the input control unit 115 receives the selection of the robot 2b as the horizontal articulated robot, the display control unit 114 displays the group 7323 having the attachment place related to the robot 2b on the display device 41 (refer to FIG. 32).

For example, in step S122 in the generation of the work program described above, the robot coordinate system of the robot 2a as the vertical articulated robot and the image coordinate system of the fixed camera 32 are calibrated. Therefore, when the input control unit 115 receives the selection of the robot 2a, the display control unit 114 displays the group 7323 having the attachment place related to the robot 2a illustrated in FIG. 31 on the display device 41 in the calibration creation screen 73b.

In this manner, since information on the display content of the group 7323, that is, the mounting place of the imaging unit 3 or the like is limitedly displayed according to the type of the robot 2, it is possible to reduce a selection error by the user.

As described above, when the user performs an operation instruction to select the desired robot 2 and attachment place of the imaging unit 3 with respect to such second calibration creation screen 73b and performs an operation instruction with respect to the button 7303 displayed as "next", the input control unit 115 receives the selection of the robot 2 and the mounting place of the imaging unit 3 (FIG. 28: step S515). Accordingly, the control unit 111 stores the selected mounting place of the imaging unit 3 in the storage unit 113, and issues an instruction to output a third calibration creation screen 73c illustrated in FIG. 33 with respect to the display control unit 114 (FIG. 28: step S516). When receiving the output instruction, the display control unit 114 displays the third calibration creation screen 73c on the display device 41.

Here, in the following description, the setting of the calibration in step S122 will be mainly described. That is, the calibration relating to the fixed camera 32 will be mainly described. Therefore, in the following description, it is assumed that the user selects the robot 2a and an upward fixed camera 32 (fixed upward) in the calibration creation screen 73b of FIG. 31 described above. The following third to tenth calibration creation screens 73 display contents according to the selection contents of the calibration creation screens 73a and 73b. Accordingly, the third to tenth calibration creation screens 73 display the content according to the upward fixed camera 32.

Third Calibration Creation Screen

Figure 33:
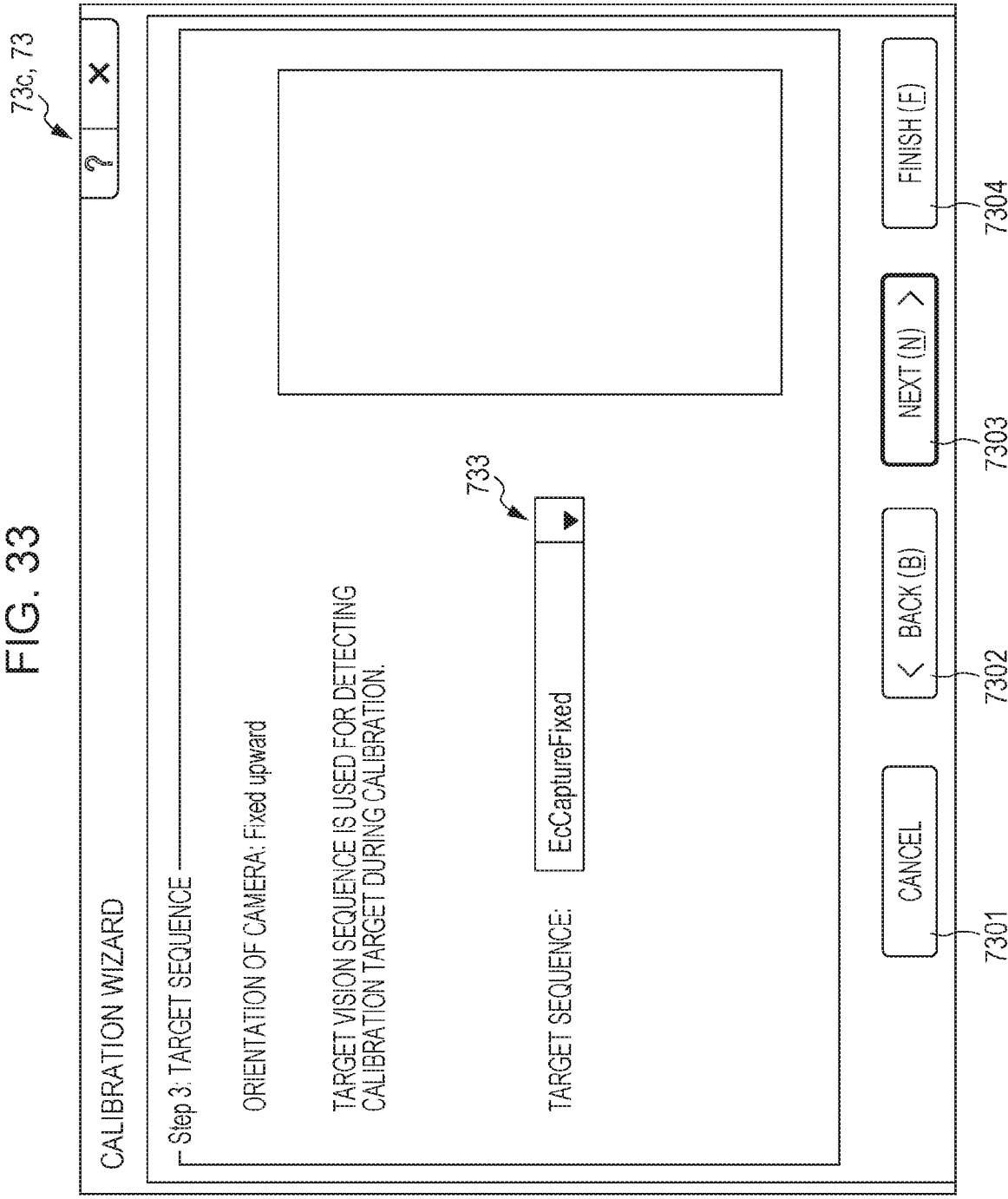
FIG. 33 is a calibration creation screen displayed on the display device illustrated in FIG. 1.

As illustrated in FIG. 33, the third calibration creation screen 73c is a screen for selecting content of a target sequence. The target sequence is an image processing sequence relating to a target such as a marker imaged by the imaging unit 3 at the time of running the calibration. In the embodiment, the calibration creation screen 73c includes a drop-down list 733 for selecting one target sequence from a plurality of target sequence types.

The display content of the drop-down list 733 changes according to the type (selection) of the imaging unit 3 of the first calibration creation screen 73a. For example, when the input control unit 115 receives the selection of the fixed camera 32 in the first calibration creation screen 73a, the display control unit 114 displays the calibration creation screen 73c having the drop-down list 733 of the display content related to the fixed camera 32 on the display device 41. In a case where the mobile camera 31 is selected in the first calibration creation screen 73a, the drop-down list 733 displays the content related to the mobile camera 31. In this manner, since the display content of the drop-down list 733 of the calibration creation screen 73c to be displayed later is limited content according to the selection in the calibration creation screen 73a previously displayed, it is possible to reduce a selection error by the user.

When the user performs an operation instruction to select the target sequence with respect to such calibration creation screen 73c and performs an operation instruction with respect to the button 7303 displayed as "next", the input control unit 115 receives the selection of the target sequence (FIG. 28: step S517). Accordingly, the control unit 111 stores the selected target sequence in the storage unit 113. At the time, the control unit 111 stores the selected target sequence and currently set calibration in association with each other in the storage unit 113. The control unit 111 issues an instruction to output a fourth calibration creation screen 73d (calibration creation screen 73) illustrated in FIG. 34 with respect to the display control unit 114 (FIG. 28: step S518).

When receiving the output instruction, the display control unit 114 displays the fourth calibration creation screen 73*d* on the display device 41.

Fourth Calibration Creation Screen

Figure 34:
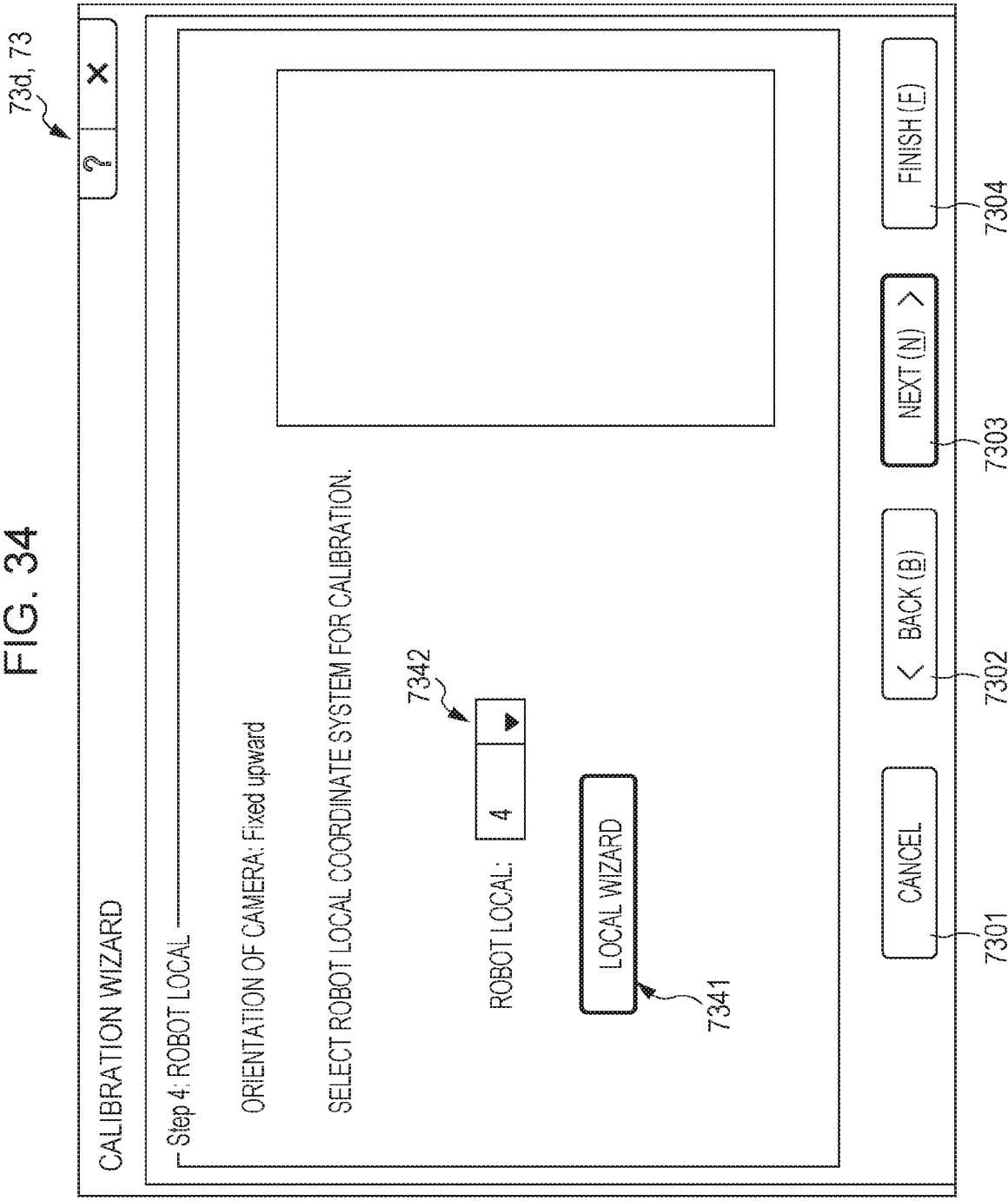
FIG. 34 is a calibration creation screen displayed on the display device illustrated in FIG. 1.

As illustrated in FIG. 34, the fourth calibration creation screen 73*d* is a screen for selecting the local coordinate system (robot local) to be associated with the image coordinate in the calibration. In the embodiment, the calibration creation screen 73*d* includes a drop-down list 7342 for selecting a storage number of the local setting and a local wizard button 7341.

The drop-down list 7342 displays a storage number of the local setting already set and a storage number of the local setting to be set and stored from now (storage number of local setting which is not set). The local wizard button 7341 is used to activate the group of screens for the local setting having the plurality of local setting screens 72 described above.

When the user performs an operation instruction to select a storage number of the local setting already set from the drop-down list 7342 with respect to such calibration creation screen 73*d* without performing an operation instruction with respect to the local wizard button 7341 and performs an operation instruction with respect to the button 7303 displayed as "next", the input control unit 115 receives the selection of the storage number of the local setting (FIG. 28: step S519). Accordingly, the control unit 111 determines not to perform the local setting (FIG. 28: step S520), stores the selected local coordinate system in the storage unit 113, and issues an instruction to output a fifth calibration creation screen 73*e* (calibration creation screen 73) illustrated in FIG. 35 with respect to the display control unit 114 (FIG. 28: step S522). When receiving the output instruction, the display control unit 114 displays the fifth calibration creation screen 73*e* on the display device 41.

On the other hand, when the user selects the storage number of the local setting which is not set from the drop-down list 7342 to the calibration creation screen 73*d* and performs the operation instruction with respect to the local wizard button 7341, the input control unit 115 receives the operation instruction by the user (FIG. 28: step S519). Accordingly, when it is determined to perform the local setting (FIG. 28: step S520), the control unit 111 proceeds to the local setting described above and activates the group of screens for the local setting having the plurality of local setting screens 72 (FIG. 28: step S521). Then, when the local setting described above ends and then the input control unit 115 receives an operation instruction with respect to the button 7303 displayed as "next" of the calibration creation screen 73*d* by the user, the control unit 111 stores the set local setting in the storage unit 113 and issues an instruction to output the fifth calibration creation screen 73*e* illustrated in FIG. 35 with respect to the display control unit 114 (FIG. 28: step S522).

Fifth Calibration Creation Screen

Figure 35:
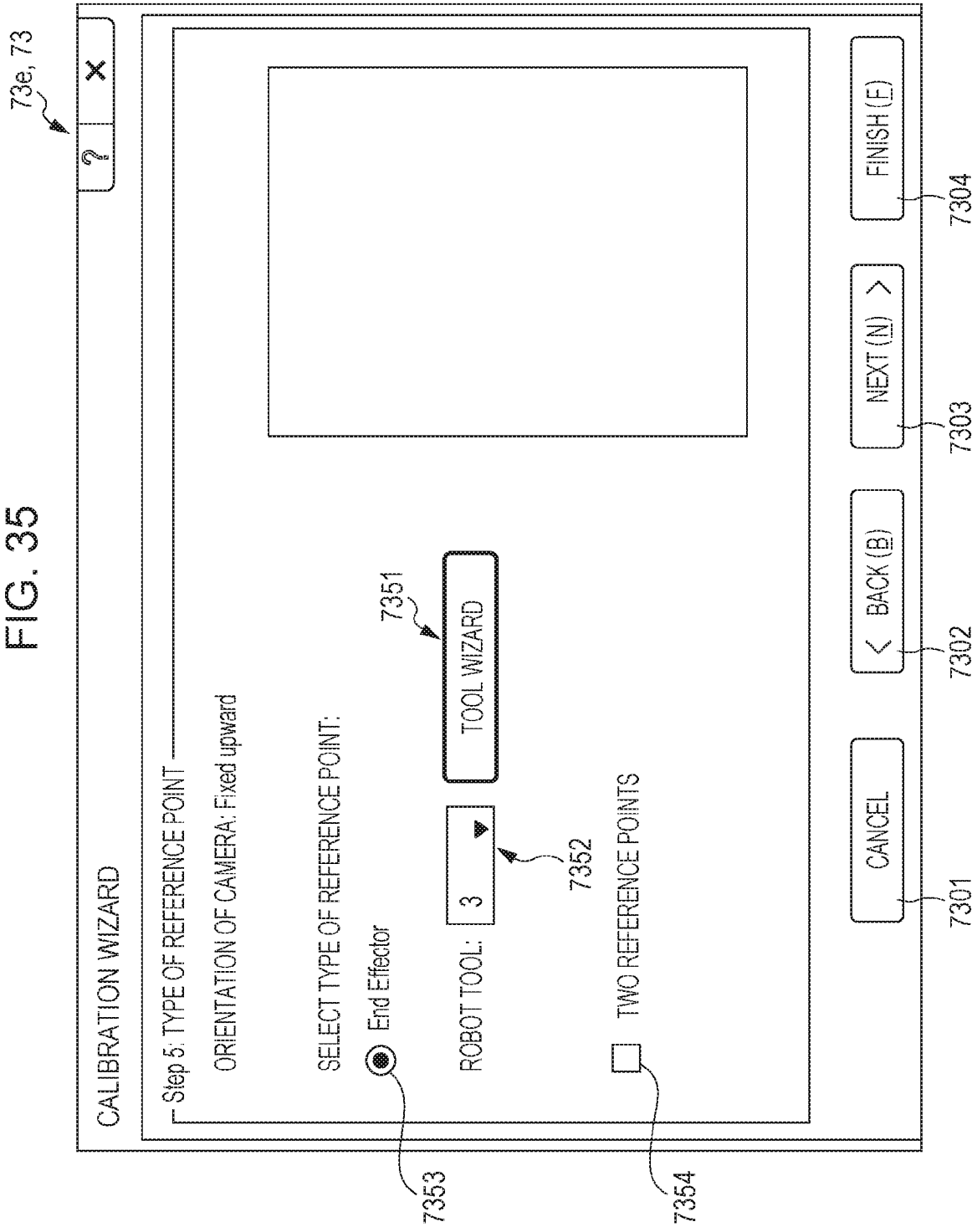
FIG. 35 is a calibration creation screen displayed on the display device illustrated in FIG. 1.

As illustrated in FIG. 35, the fifth calibration creation screen 73*e* is a screen for accepting a setting (selection) of an acquisition type of the reference point used at the time of running the calibration. In a case where the upward camera (fixed camera 32) is calibrated, only end effector can be selected as the acquisition type of the reference point. That is, in the upward calibration, a local coordinate (robot coordinate) of the target such as a marker attached to the end effector and an image coordinate where the target is detected are associated with each other. The calibration creation screen 73*e* is a screen for receiving a setting of the tool setting (robot tool) for holding an offset of the target attached to the end effector in the tip end axis coordinate of the robot 2*a*.

The calibration creation screen 73*e* includes a radio button 7353 for receiving the selection of the end effector, a drop-down list 7352 for selecting the storage number of the tool setting, a tool wizard button 7351, and a checkbox 7354 for receiving the use of two reference points.

The radio button 7353 is displayed in a case where the calibration relating to the fixed camera 32 is performed. The drop-down list 7352 displays a storage number of the tool setting already set and a storage number of the tool setting to be set and stored from now (storage number of tool setting which is not set). In the embodiment, for example, a target attached to the workpiece gripped by the hand 270 can be set as the reference point, not limited to the target provided in the hand 270 as the end effector. A storage number of the tool setting for holding the offset of the target reference point in the tip end axis coordinate of the robot 2*a* is selected in the drop-down list 7352. In a case where the tool setting of the target reference point described above is not set, the tool wizard button 7351 is used for activating the group of screens for the tool setting having the plurality of tool setting screens 71 described above to perform the tool setting.

For example, when the user performs an operation instruction to select the acquisition type of the reference point (end effector and storage number of the tool setting) already set from the drop-down list 7352 with respect to the calibration creation screen 73*e* without performing an operation instruction with respect to the tool wizard button 7351 and performs an operation instruction with respect to the button 7303 displayed as "next", the input control unit 115 receives the selection of the acquisition type of the reference point (end effector and storage number of the tool setting) (FIG. 28: step S523). Accordingly, the control unit 111 determines not to perform the tool setting (FIG. 28: step S524), stores the selected tool setting in the storage unit 113, and issues an instruction to output a sixth calibration creation screen 73*f* (calibration creation screen 73) illustrated in FIG. 36 with respect to the display control unit 114 (FIG. 28: step S526). When receiving the output instruction, the display control unit 114 displays the sixth calibration creation screen 73*f* on the display device 41.

On the other hand, when the user selects the storage number of the tool setting which is not set from the drop-down list 7352 to the calibration creation screen 73*e* and performs an operation instruction with respect to the tool wizard button 7351, the input control unit 115 receives the operation instruction by the user (FIG. 28: step S523). Accordingly, when it is determined to perform the tool setting (FIG. 28: step S524), the control unit 111 proceeds to the tool setting described above and activates the group of screens for the tool setting having the plurality of tool setting screens 71 (FIG. 28: step S525). Then, when the tool setting described above ends and then the input control unit 115 receives an operation instruction with respect to the button 7303 displayed as "next" of the calibration creation screen 73*e* by the user, the control unit 111 stores the set tool setting in the storage unit 113 and issues an instruction to output the sixth calibration creation screen 73*f* illustrated in FIG. 36 with respect to the display control unit 114 (FIG. 28: step S526).

Sixth Calibration Creation Screen

Figure 36:
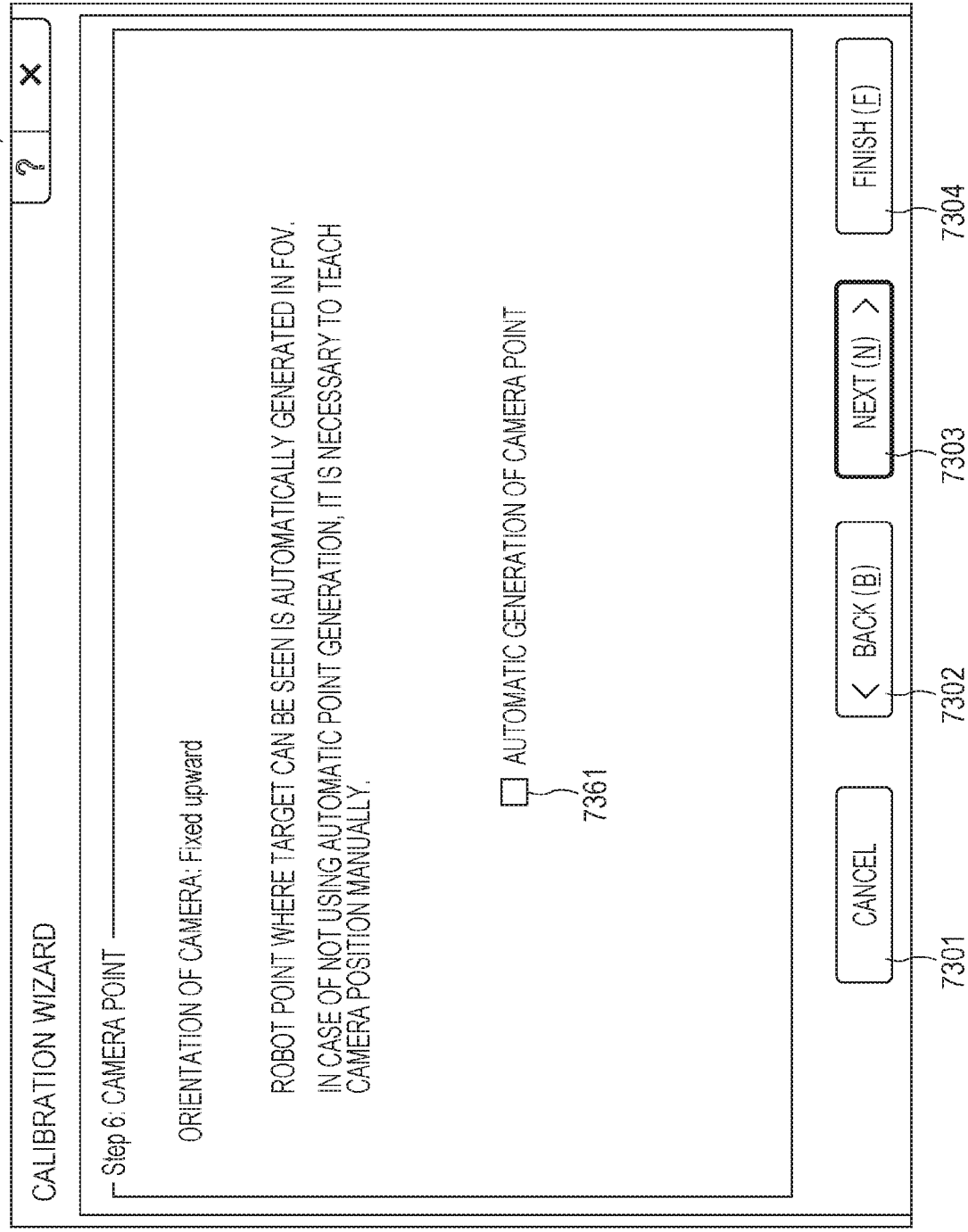
FIG. 36 is a calibration creation screen displayed on the display device illustrated in FIG. 1.

As illustrated in FIG. 36, the sixth calibration creation screen 73*f* is a screen for selecting whether to automatically generate a camera point and includes a checkbox 736. The camera point is within the captured image and positions the target (reference point) or the imaging unit 3 at the time of running the calibration. The number of camera points is not particularly limited, but it is preferable that there is three or more and nine camera points are set in the embodiment.

When the user checks the checkbox 736 with respect to the calibration creation screen 73f and performs an operation instruction with respect to the button 7303 displayed as "next", the input control unit 115 receives the selection of performing the automatic generation of the camera point (FIG. 28: step S527). On the other hand, when the user does not check the checkbox 736 and performs an operation instruction with respect to the button 7303 displayed as "next", the input control unit 115 receives the selection of not performing the automatic generation of the camera point (FIG. 28: step S527). The control unit 111 stores the presence or absence of the automatic generation of the camera point in the storage unit 113 and issues an instruction to output a seventh calibration creation screen (not illustrated) with respect to the display control unit 114 (FIG. 28: step S528). When receiving the output instruction, the display control unit 114 displays the seventh calibration creation screen on the display device 41.

Seventh Calibration Creation Screen

The seventh calibration creation screen (not illustrated) is a screen for selecting whether to correct lens distortion of the imaging unit 3 and setting an image processing sequence in a case of performing the distortion correction. The seventh calibration creation screen has substantially the same configuration as that of the first calibration creation screen 73a except that the selection content (setting content) is different.

When the user selects the presence or absence of the distortion correction of the lens, selects the image processing sequence in a case of performing the distortion correction with respect to such seventh calibration creation screen (not illustrated), and performs an operation instruction with respect to the button 7303 displayed as "next", the input control unit 115 receives the presence or absence of the distortion correction of the lens (FIG. 28: step S529). The control unit 111 stores the presence or absence of the distortion correction of the lens in the storage unit 113 and issues an instruction to output an eighth calibration creation screen (not illustrated) with respect to the display control unit 114 (FIG. 28: step S530). When receiving the output instruction, the display control unit 114 displays the eighth calibration creation screen on the display device 41.

Eighth Calibration Creation Screen

The eighth calibration creation screen (not illustrated) is a screen for setting lighting at the time of running the calibration. In the eighth calibration creation screen, it is possible to set a waiting time before the lighting is turned on, an output bit to turn on the lighting, and the like. The eighth calibration creation screen has substantially the same configuration as that of the first calibration creation screen 73a except that the selection content (setting content) is different.

When the user sets the lighting with respect to such eighth calibration creation screen (not illustrated), and performs an operation instruction with respect to the button 7303 displayed as "next", the input control unit 115 receives the lighting setting (FIG. 28: step S531). The control unit 111 stores the lighting setting in the storage unit 113 and issues an instruction to output a ninth calibration creation screen 73g (calibration creation screen 73) illustrated in FIG. 37 with respect to the display control unit 114 (FIG. 29: step S532). When receiving the output instruction, the display control unit 114 displays the ninth calibration creation screen on the display device 41.

Ninth Calibration Creation Screen

Figure 37:
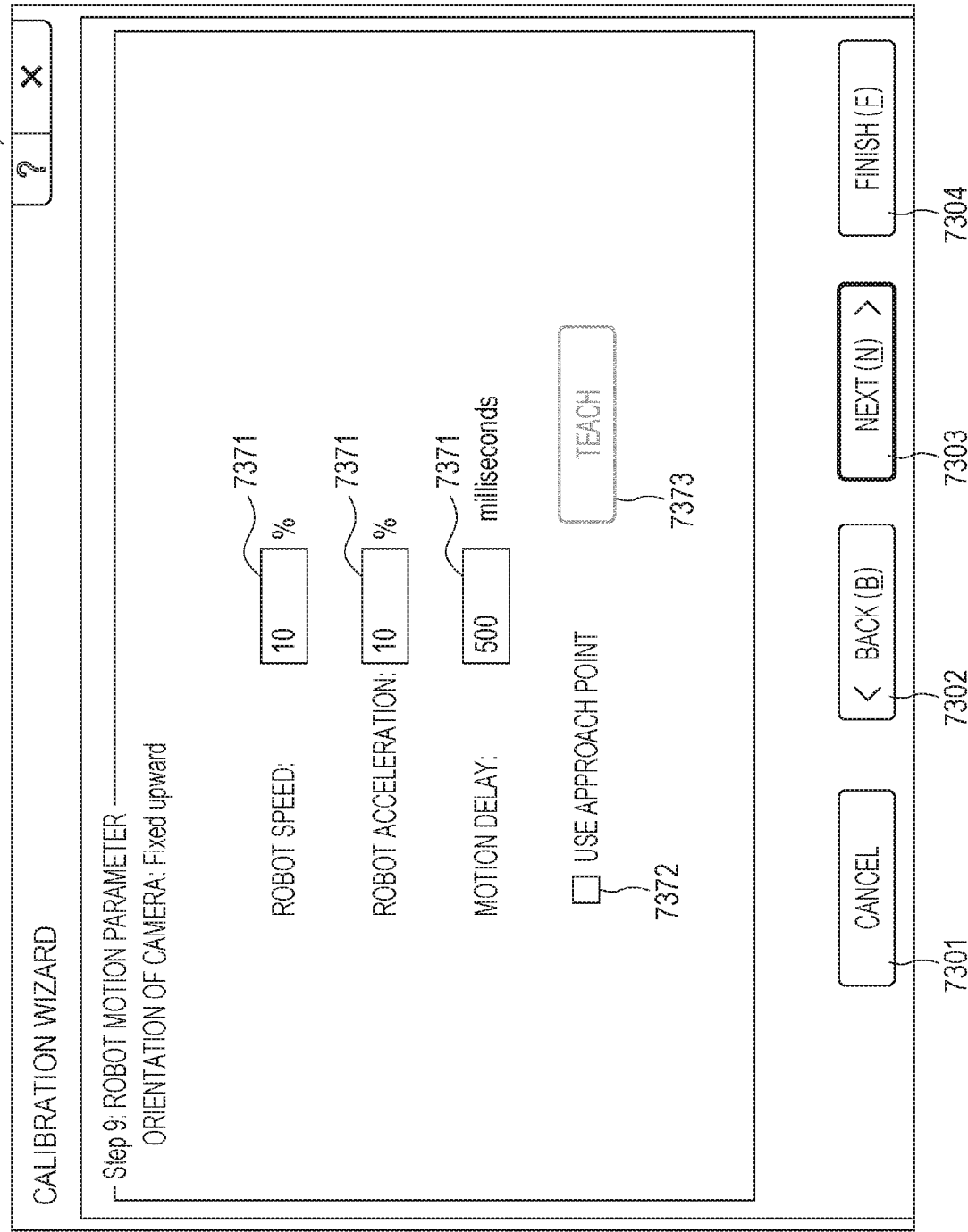
FIG. 37 is a calibration creation screen displayed on the display device illustrated in FIG. 1.
Figure 38:
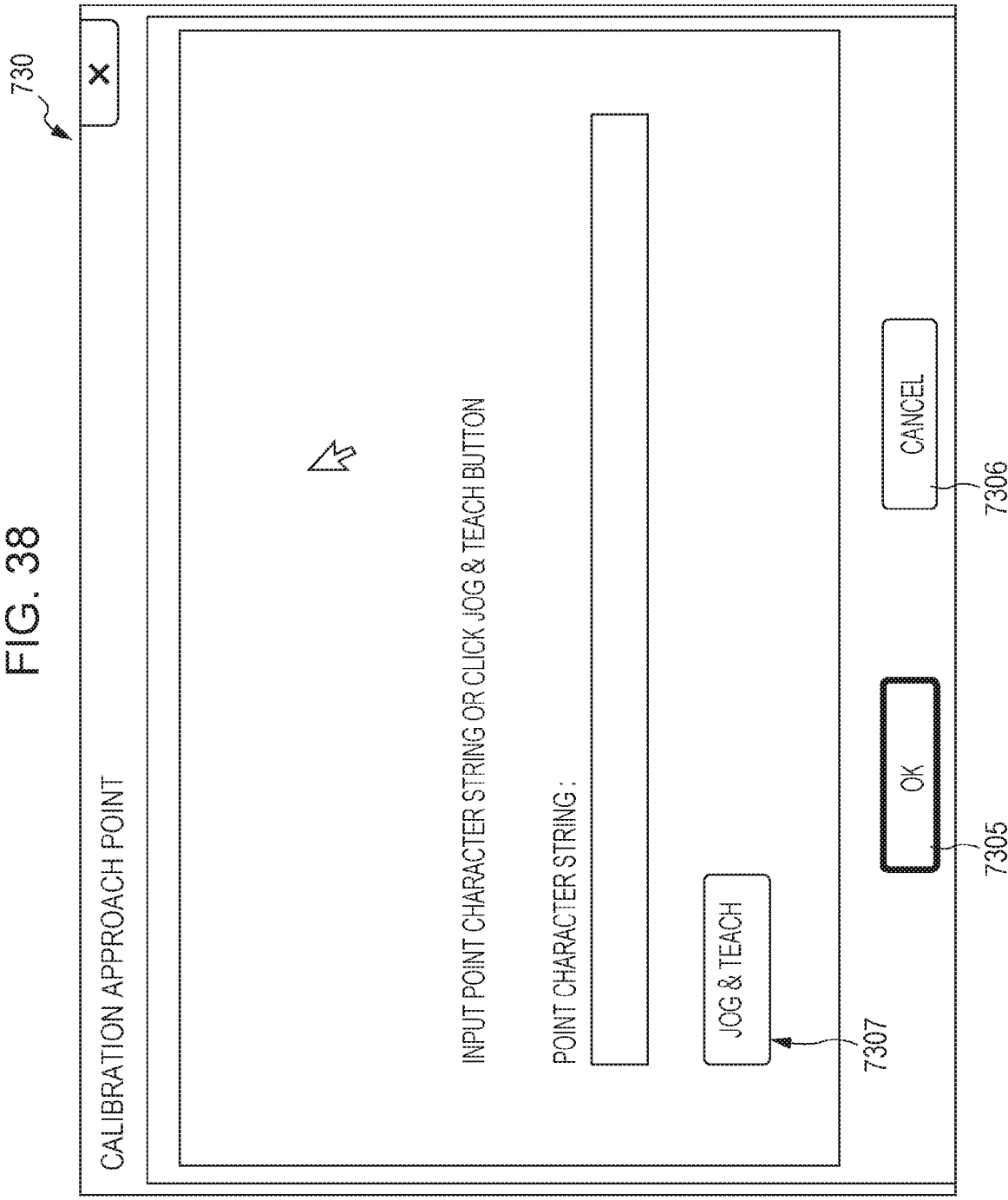
FIG. 38 is a teaching screen displayed on the display device illustrated in FIG. 1.

As illustrated in FIG. 37, the ninth calibration creation screen 73g is a screen for selecting contents of various parameters relating to the robot operation during the calibration. In the embodiment, as illustrated in FIG. 37, the calibration creation screen 73g is configured to select each content of three parameters of robot speed (movement speed of predetermined portion of robot 2), the robot acceleration (movement acceleration of predetermined portion of robot 2), and motion delay (how many seconds later to start imaging after predetermined portion of robot 2 stops). Specifically, the calibration creation screen 73g includes a plurality of text boxes 7371 for inputting contents (information) relating to the parameters. The parameters are not limited to the three parameters described above, and another parameter may be further added or any one of parameters described above may be omitted.

The calibration creation screen 73g includes a checkbox 7372 for selecting the presence or absence of the use of an approach point and a teach button 7373. The approach point is a base point of the movement of the camera point at the time of running the calibration. A predetermined portion of the robot 2 is always moved from the approach point to the camera point at the time of running the calibration by using the approach point. Therefore, it is possible to enhance position stability at the camera point of the robot 2 and as a result, it is possible to further enhance accuracy of the calibration result.

For example, when the user checks the checkbox 7372 with respect to the calibration creation screen 73g and performs an operation instruction with respect to the teach button 7373, the input control unit 115 receives the operation instruction from the user. Accordingly, the control unit 111 determines to perform the setting of the approach point (FIG. 29: step S533) and issues an instruction to output a screen 730 for setting the approach point with respect to the display control unit 114 (FIG. 29: step S534). Accordingly, the display control unit 114 displays the screen 730 in a pop-up manner on the display device 41.

As illustrated in FIG. 38, the screen 730 is a screen for inputting a character string (robot coordinate) of the approach point. The screen 730 includes an OK button 7305, a cancel button 7306, and a button 7307 (jog & teach button) used for displaying a screen (not illustrated) for receiving the operation instruction to jog-operate. When the input control unit 115 receives the selection of the button 7307, the display control unit 114 displays the screen (screen corresponding to screen 720 illustrated in FIG. 22) for receiving the operation instruction to jog-operate (not illustrated) on the display device 41 under the control of the control unit 111. Accordingly, the user can set the approach point by performing the operation instruction to jog-operate instead of inputting the character string.

When the user performs the setting of the approach point using such screen 730 and screen (not illustrated) for receiving the operation instruction to jog-operate and performs an operation instruction with respect to the OK button 7305 of the screen 730, the input control unit 115 accepts the setting of the approach point (FIG. 29: step S535). Accordingly, the control unit 111 stores the approach point in the storage unit 113 and issues an instruction to delete the screen 730 with respect to the display control unit 114, and the display control unit 114 deletes the screen 730 from the display device 41.

Then, when the user performs an operation instruction with respect to the button 7303 displayed as "next" of the calibration creation screen 73g illustrated in FIG. 37, the input control unit 115 receives the operation instruction.

Accordingly, the control unit 111 issues an instruction to output a tenth calibration creation screen (not illustrated) with respect to the display control unit 114 (FIG. 29: step S536). When receiving the output instruction, the display control unit 114 displays the tenth calibration creation screen on the display device 41.

When the user does not check the checkbox 7372 with respect to the calibration creation screen 73g and performs an operation instruction with respect to the button 7303 displayed as "next", the input control unit 115 receives the operation instruction by the user. Accordingly, the control unit 111 determines not to perform the setting of the approach point (FIG. 29: step S533) and issues an instruction to output the tenth calibration creation screen (not illustrated) with respect to the display control unit 114 (FIG. 29: step S536).

Tenth Calibration Creation Screen

The tenth calibration creation screen (not illustrated) is a screen in which the contents set on the first to ninth calibration creation screens are listed. The tenth calibration creation screen has substantially the same configuration as that of the first calibration creation screen 73a except that the selection content (setting content) is different. The user can confirm the setting content of the calibration at a glance by viewing such tenth calibration creation screen.

Similarly to the first calibration creation screen 73a, the tenth calibration creation screen includes buttons corresponding to the buttons 7301 to 7304. Therefore, when the input control unit 115 accepts an operation instruction with respect to a button displayed as "back", the control unit 111 performs again the setting. When the input control unit 115 receives an operation instruction with respect to a button displayed as "cancel", the control unit 111 discards the set calibration. When the input control unit 115 receives an operation instruction with respect to a button displayed as "finish", the control unit 111 stores the calibration set by the display processing using one to ten calibration creation screens in the storage unit 113.

When the input control unit 115 receives an operation instruction with respect to the button displayed as "cancel" or the button displayed as "finish", the control unit 111 ends the display processing of the group of screens for the calibration creation and issues an instruction to delete the calibration creation screen 73 from the display device 41 with respect to the display control unit 114. Accordingly, the display control unit 114 deletes the calibration creation screen 73 from the display device 41.

Thus, various settings of the calibration by the display processing of the calibration (calibration creation) are finished.

[2C] Teaching of Camera Point (Step S52)

Next, the control system 10 runs teaching of a plurality of camera points.

As described above, the input control unit 115 receives the operation instruction with respect to the button displayed as "finish" by the user (FIG. 29: step S537), the control unit 111 issues an instruction to delete the calibration creation screen 73 from the display device 41 with respect to the display control unit 114 and issues an instruction to output the sub-window 61 having the property setting window 60 (FIG. 29: step S538). Accordingly, the display control unit 114 displays the sub-window 61 having the property setting window 60 illustrated in FIG. 39 on the display device 41.

Sub-Window

When the various settings of the calibration is finished, the sub-window 61 displays the property setting window 60, a teach button 6151, and the picture image display unit 612.

An example of the workpiece 93 appears in the picture image display unit 612 illustrated in FIG. 39 (the same in FIGS. 40 to 42).

The property setting window 60 includes a browsing unit 63 and a list 57 (property list).

The browsing unit 63 is an area for displaying together the created calibration setting (calibration name) and the image processing sequence (image processing sequence name) created by display processing described below. In the embodiment, the display form of the browsing unit 63 is a tree display that hierarchically displays the calibration setting and the image processing sequence setting, respectively. Accordingly, the user can easily grasp a plurality of calibration settings and a plurality of image processing sequences at a glance. Therefore, it is easy to select a desired calibration setting and a desired image processing sequence. The display form of the browsing unit 63 is not limited thereto and may be, for example, a list display in which the calibration setting and the image processing sequence setting are respectively enumerated in parallel.

The list 57 is an area for displaying various setting contents of the calibration setting and the image processing sequence selected by the browsing unit 63. The property list is configured so as to accept an operation instruction (input) by the user. Therefore, the user can set (change) specific setting contents of the calibration setting using the property list.

When the user performs an operation instruction with respect to the teach button 6151 with respect to the sub-window 61, the input control unit 115 receives the operation instruction (instruction to run teaching) (FIG. 29: step S539). Accordingly, the control unit 111 issues an instruction to run the teaching of one or a plurality of camera points and the reference point with respect to the robot control device 12 and the image processing device 13 (FIG. 29: step S540). The control unit 111 issues an instruction to output a teach group 616 with respect to the display control unit 114. Accordingly, the display control unit 114 displays the sub-window 61 having the teach group 616 illustrated in FIG. 40 or FIG. 41 on the display device 41.

For example, in a case of receiving a selection to automatically generate the camera point in step S527 described above, the computer 11 issues an instruction to run the teaching of one camera point with respect to the robot control device 12 and the image processing device 13. In the case, the control unit 111 issues an output instruction to display a flowchart 660a (flowchart 660) and the jog panel 54 with respect to the display control unit 114 (refer to FIG. 40). Accordingly, the flowchart display unit 62 of the sub-window 61 displays the flowchart 660a for setting one camera point (refer to FIG. 40). Then, when the user issues an operation instruction with respect to various buttons included in the teach group 616, various buttons included in the jog panel 54, and the like with respect to the sub-window 61 illustrated in FIG. 40, the computer 11 receives the operation instruction by the user. The robot control device 12 and the image processing device 13 drive the imaging unit 3 and the robot 2, and for example, position a target attached to the workpiece gripped by the hand 270 to the center (camera point) of the picture image display unit 612 illustrated in FIG. 40.

On the other hand, in a case of receiving a selection not to automatically generate the camera point in step S527 described above, the computer 11 issues an instruction to run the teaching of predetermined all camera points (nine camera points in the embodiment) with respect to the robot control device 12 and the image processing device 13. In the case, the control unit 111 issues an output instruction to display a flowchart 660b (flowchart 660) and the jog panel 54 with respect to the display control unit 114 (refer to FIG. 41). Accordingly, the flowchart display unit 62 of the sub-window 61 displays the flowchart 660b for setting nine camera points (refer to FIG. 41). Then, when the user issues an operation instruction with respect to various buttons included in the teach group 616, various buttons included in the jog panel 54, and the like with respect to the sub-window 61 illustrated in FIG. 41, the computer 11 receives the operation instruction by the user. The robot control device 12 and the image processing device 13 drive the imaging unit 3 and the robot 2, and for example, position a target attached to the workpiece gripped by the hand 270 to the predetermined nine places (camera point) of the picture image display unit 612 illustrated in FIG. 41.

Here, the flowcharts 660a and 660b respectively illustrate flows of teaching processing and illustrate calibration settings (calibration name) in which the head flow 661 is selected. A second from the top in the figure and subsequent flows 662 illustrate teaching steps included in the selected calibration setting.

For example, as illustrated in FIG. 41, the display form of a flow 662a (flow 662) in which the teaching is already completed is different from the display form of a flow 662b (flow 662) in which the teaching is not yet completed. In the embodiment, a background color of the flow 662a and the flow 662b is changed. Accordingly, the user can distinguish between the reference point in which the teaching is already completed and the reference point in which the teaching is not yet completed at a glance.

When the teaching of all flows 662 of the flowchart 660a or the flowchart 660b is finished, that is, the teaching of all reference points is finished, the control unit 111 issues an order to output the display of a calibration run button 6152 illustrated in FIG. 42 with respect to the display control unit 114 (FIG. 29: step S541). Accordingly, the display control unit 114 displays the calibration run button 6152 on the sub-window 61 (refer to FIG. 42).

Then, when the user performs an operation instruction with respect to the calibration run button 6152, the input control unit 115 receives the operation instruction (instruction to run calibration) (FIG. 29: step S542). Accordingly, the control unit 111 issues an instruction to run the calibration with respect to the robot control device 12 and the image processing device 13 (FIG. 29: step S543).

In this manner, the teaching of the camera point is finished.

[3C] Run of Calibration (Step S53)

Next, the control system 10 runs the calibration.

Specifically, the robot control device 12 and the image processing device 13 run the calibration based on a run instruction from the control unit 111 in step S543.

When receiving the run instruction, the robot control device 12 first acquires a state of the robot 2a from the robot 2a. Then, the robot control device 12 issues a movement instruction to the robot 2a such that the target is positioned at a first camera point. At the time, the robot 2a returns information on the movement of the robot arm 20 (value of position sensor) and the like to the robot control device 12 every time. Next, the robot control device 12 issues an instruction to run the image processing sequence with respect to the image processing device 13. The image processing device 13 receives the run instruction, detects the target (for example, marker) with the fixed camera 32 (imaging unit 3), and runs the image processing sequence. The image processing device 13 runs the image processing sequence and performs the image processing based on a captured image (image data) obtained by imaging the target with the fixed camera 32. Next, when the image processing ends, the image processing device 13 transmits a run result of the image processing sequence (detection result of target) to the robot control device 12. Accordingly, the robot control device 12 acquires the run result of the image processing sequence in the first camera point. Next, the robot control device 12 performs the same processing as a series of pieces of processing for acquiring the run result of the image processing sequence of the first camera point described above with respect to the remaining second to ninth camera points. Then, the robot control device 12 calculates calibration results in which the image coordinate system of the fixed camera 32 (imaging unit 3) and the local coordinates (robot coordinates) of the robot 2a (robot 2) are associated with each other based on the run results of the image processing sequences of the reference points from first to ninth and the local coordinates (robot coordinates) of the target in the first to ninth camera points. The robot control device 12 transmits the calculated calibration results to the computer 11. As described above, a specific method for the run contents of the calibration and the like is not particularly limited. The storage unit 113 stores the processing (program) for each setting, and the control unit 111 runs the processing (program) according to the selected setting.

In this manner, the run of the calibration is finished.

[4C] Reflection of Calibration Result (Step S54)

Next, the control system 10 runs the reflection of the calibration result and the setting.

Specifically, when the communication unit 116 of the computer 11 receives the calibration result (FIG. 29: step S544), the control unit 111 issues an instruction to output a screen 68 for displaying the calibration result with respect to the display control unit 114 (FIG. 29: step S545). Accordingly, the display control unit 114 displays the screen 68 on the display device 41.

The screen 68 includes an area 681 for displaying a previous calibration result, an area 682 for displaying a current calibration result, an OK button 683, and a cancel button 684. Since the OK button 683 and the cancel button 684 are included, the user can select the OK button 683 in a case of reflecting the calibration result and can select the cancel button 684 in a case of not reflecting the calibration result. In this manner, the screen 68 is configured to allow the user to select whether to reflect the calibration result. Since the areas 681 and 682 are included, the user can select whether to reflect the current calibration result while comparing the current result with content of the previous calibration result.

When the input control unit 115 accepts an operation instruction of the selection to reflect the calibration result by the user, that is, to the OK button 683 with respect to the screen 68 (FIG. 29: step S546), the control unit 111 issues an instruction to store the calibration result with respect to the robot control device 12 (FIG. 29: step S547). When receiving the instruction, the computer 11 reflects and stores the calibration result. The robot control device 12 may reflect and store the calibration result.

On the other hand, when the user selects not to reflect the calibration result, the control unit 111 performs again, for example, [1C] various settings in calibration (step S51), [2C] teaching of camera point (step S52), and [3C] run of calibration (step S53) (not illustrated FIG. 29). At least [3C] run of calibration (step S53) may be performed again. In this manner, it is possible to enhance the accuracy of the calibration result by repeatedly performing [3C] run of calibration (step S53) and the like if necessary. As described above, since it is possible for the user to compare the previous calibration result with the current calibration result using the screen 68, it is possible to easily determine whether to reflect the calibration result.

As described above, in [1C] various settings in calibration, the display control unit 114 displays the calibration creation screen 73 as "calibration guide screen" for guiding information input for performing the calibration on the display device 41 as "display unit". Accordingly, the user can finish the setting of the calibration easily and simply without a complicated operation by selecting the information (setting content) according to the content displayed on the calibration creation screen 73. Therefore, it is possible to easily perform the setting of the calibration even for a novice.

As described above, the control system 10 in the embodiment includes the input device 42 as "acceptance unit" that accepts the input. The display control unit 114 sequentially displays the plurality of calibration creation screens 73 as "calibration guide screens" on the display device 41 as "display unit" based on the input accepted from the input device 42. In the embodiment, the display control unit 114 displays the group of screens for the local setting for displaying the plurality (ten in the embodiment) of local setting screens 72 in an interactive manner with the user. Accordingly, the user can select the information (setting content) in an interactive manner (wizard manner) according to sequentially displayed calibration creation screens 73 (wizard screen). In this manner, since the user can select the setting content (information) in an interactive manner along a predetermined sequence, it is possible to finish the setting of the calibration easily and simply without a complicated operation. Therefore, it is possible to reduce an input error, an insufficient input, and the like. It is possible to save the effort of programming various settings, unlike the related art. Since only the setting content necessary for the calibration creation is limitedly displayed, it is possible to reduce an insufficient setting of the setting content necessary for the calibration creation even for a novice. Therefore, it is possible to reduce, for example, an error or the like in the run of the calibration.

As described above, the group of screens for the calibration creation includes ten calibration creation screens 73, but the number of calibration creation screens 73 is not limited thereto. Another calibration creation screen may be further added or any one of ten calibration creation screens 73 may be omitted. The sequence in which the ten calibration creation screens 73 are displayed is not limited to the sequence described above and is predetermined. However, it is preferable that the display content of the calibration creation screen 73 to be displayed later changes according to the selection content of the calibration creation screen 73 previously displayed. That is, it is preferable that the display content of the calibration creation screen 73 to be displayed later is limited content according to the selection content of the calibration creation screen 73 previously displayed. In particular, since the user can easily grasp the setting content by displaying the ten calibration creation screens 73 described above in the sequence as described above, it is possible to enhance the convenience for the user.

Here, as described above, the control system 10 is "control device" that is capable of controlling the driving of the robot 2, the imaging unit 3, and the display device 41 as "display unit" based on the input of the input device 42 as "input unit". As described above, the control system 10 includes the display control unit 114 for displaying the calibration creation screen 73b as "input screen" for inputting the robot 2 to be controlled on the display device 41 and displaying the group 7323 (area) as "imaging unit input unit" for guiding the input of the attachment position (mounting position) of the imaging unit 3 corresponding to the input robot 2 (for example, robot 2a) on the display device 41, the calibration editing unit 1113 as "calibration control unit" that performs the calibration to associate the coordinate system of the robot 2 (robot coordinate system) with the coordinate system of the imaging unit 3 (image coordinate system) based on the input attachment position of the imaging unit 3, and the calibration run unit 1114. That is, each processing of the calibration described above (steps S51 to S54) is mainly performed by the calibration editing unit 1113 and the calibration run unit 1114 of the control unit 111.

According to such control system 10, the display device 41 displays the attachment position of the imaging unit 3 corresponding to the input (selected) robot 2. That is, the attachment position of the imaging unit 3 not corresponding to the input robot 2 is not displayed. For example, as described above, in the group 7323 of the calibration creation screen 73b, only the attachment position of the imaging unit 3 corresponding to the robot 2 selected using the drop-down list 7322 is displayed, and the attachment position of the imaging unit 3 not corresponding to the selected robot is not displayed. Accordingly, the user can easily select the attachment position of the imaging unit 3 corresponding to the input robot 2. As a result, it is possible to easily and appropriately perform the various settings for performing the calibration.

Here, "input" includes "select". In the input of the robot 2, the user may input the robot 2 by, for example, the keyboard or the like, or may select the robot 2.

In particular, as described above, the display control unit 114 can display the vertical articulated robot and the horizontal articulated robot on the calibration creation screen 73b as "input screen", and the display form of the group 7323 (area) as "imaging unit input unit" is different between a case where the robot 2a is input as an example of "vertical articulated robot" and a case where the robot 2b is input as an example of "horizontal articulated robot". Accordingly, it is possible to easily select the attachment position of the imaging unit 3 corresponding to the robot 2a and select the attachment position of the imaging unit 3 corresponding to the robot 2b, respectively. According to the control system 10 (application software installed in control system 10), it is possible to perform the calibration relating to a plurality of types of robots 2 and is excellent in the convenience with one control system 10 (one application software) without preparing control systems (application software) corresponding to the robot 2a and the robot 2b, respectively.

As described above, the display control unit 114 displays the local wizard button 7341 as "local setting calling unit" for calling the local setting screen 72 as "local setting guide screen" that guides the information input for setting the local coordinate system different from the coordinate system (robot coordinate system) of the robot 2 on the calibration creation screen 73d as "calibration guide screen". Accordingly, the user can easily call the local setting screen 72 by performing an operation instruction (click or touch) to call the local setting screen 72 through the local wizard button 7341. Therefore, for example, it is possible to save the effort to once cancel the setting by the calibration creation screen 73 for performing the local setting, perform the local setting, and then perform again the setting of the calibration from the start. Therefore, it is possible to significantly save the effort of the user.

In particular, in the embodiment, the display control unit 114 sequentially displays the plurality of local setting screens 72 on the display device 41 based on the operation instruction with respect to the local wizard button 7341 accepted by the input control unit 115. Accordingly, the user can perform the local setting easily and simply without a complicated operation by selecting the information (setting content) in an interactive manner according to sequentially displayed local setting screens 72.

As described above, the display control unit 114 displays the tool wizard button 7351 as "tool setting calling unit" for calling the tool setting screen 71 as "tool setting guide screen" that guides the input of the information for obtaining an offset of a tool (for example, workpiece 93) attached to the robot 2 (information for the tool setting for obtaining the offset) on the calibration creation screen 73e as "calibration guide screen". Accordingly, the user can easily call the tool setting screen 71 by performing an instruction to call the tool setting screen 71 through the tool wizard button 7351. Therefore, for example, it is possible to save the effort to once cancel the setting by the calibration creation screen 73 for performing the tool setting, perform the tool setting, and then perform again the setting of the calibration from the start. Therefore, it is possible to significantly save the effort of the user.

In particular, in the embodiment, the display control unit 114 sequentially displays the plurality of tool setting screens 71 on the display device 41 based on the operation instruction with respect to the tool wizard button 7351 accepted by the input control unit 115. Accordingly, the user can perform the tool setting easily and simply without a complicated operation by selecting the information (setting content) in an interactive manner according to sequentially displayed tool setting screens 71.

As described above, the display control unit 114 displays the checkbox 736 as "calibration point selection unit" for selecting whether to automatically generate the camera point as "calibration point" using the calibration on the calibration creation screen 73f as "calibration guide screen". Accordingly, the user can select whether to automatically generate the camera point easily and according to the purpose of the user through the checkbox 736. For example, the user can reduce time and trouble of setting the plurality of camera points by automatically generating the camera points. On the other hand, for example, in a case where a drive range of the robot arm 20 is limited, it is effective not to automatically generate the camera point. The user can set each camera point in an area where the robot arm 20 does not interfere with a peripheral apparatus by not automatically generating the camera point. In this manner, since the calibration creation screen 73f includes the checkbox 736, the user can easily perform the setting according to the purpose of the user.

As described above, the display control unit 114 displays the checkbox 7372 as "approach point selection unit" for selecting whether to automatically generate the approach point which is the base point of the movement to the camera point as "calibration point" of a predetermined portion (for example, tool center point P) of the robot 2 on the calibration creation screen 73g as "calibration guide screen". Accordingly, the user can select whether to automatically generate the approach point easily and according to the purpose of the user by performing the operation instruction through the checkbox 7372. For example, since the robot 2 always moves from the approach point to the camera point by automatically generating the approach point, it is possible to enhance the position stability at the camera point of the robot 2. As a result, it is possible to further enhance the accuracy of the calibration result. On the other hand, in a case where the approach point is not automatically generated, it is possible to run the calibration more quickly. In this manner, since the calibration creation screen 73g includes the checkbox 7372, the user can easily perform the setting according to the purpose of the user.

In particular, as described above, the processing unit 110 includes the display control unit 114 that controls the driving of the display device 41 as "display unit", and the display control unit 114 calls (displays) the plurality of image processing sequences edited by the image processing sequence editing unit 1115 on the calibration creation screen 73c as "calibration guide screen" that guides the input of the setting content relating to the calibration. In the embodiment, the display control unit 114 displays the plurality of the edited (existing) image processing sequences on the drop-down list 733 of the calibration creation screen 73c. Accordingly, the user can select the desired image processing sequence from the plurality of image processing sequences through the drop-down list 733. That is, it is possible to call the existing image processing sequence edited by the user in the setting of the calibration using the calibration creation screen 73. Therefore, for example, in a case where it is desired to set the plurality of calibrations, since it is possible to save the effort to create the image processing sequence in each calibration setting, it is possible to omit the creation of the image processing sequence for each calibration setting. As a result, the setting of the calibration is simplified, and it is possible to significantly improve usability for the user.

As described above, in the embodiment, it is possible to select (change) the desired image processing sequence also in the list 57 of the property setting window 60 illustrated in FIG. 39. Therefore, even after the calibration creation is performed using the plurality of calibration creation screens 73, the user can change the image processing sequence in the calibration.

In this manner, the control system 10 is "control device" that is capable of controlling the driving of the robot 2 and the imaging unit 3, and includes the processing unit 110 including the image processing sequence editing unit 1115 that edits the setting content relating to the image processing sequence including the image processing of the captured image (image data) captured by the imaging unit 3 and the calibration editing unit 1113 that edits the setting content relating to the calibration to associate the coordinate system of the robot 2 (robot coordinate system) with the coordinate system of the imaging unit 3 (image coordinate system). The processing unit 110 can call an image processing sequence edited by the image processing sequence editing unit 1115 in the (at the time of) editing of the setting content relating to the calibration (calibration creation) by the calibration editing unit 1113. According to such control system 10, in a case where the plurality of calibrations are required, since it is possible to call the existing (edited) image processing sequence in each calibration setting, it is possible to save the effort to create the image processing sequence for each calibration setting. Therefore, it is possible to reduce time and labor required for the calibration setting. It is possible to call the edited image processing sequence also in processing using a command described below. In the specification, "call image processing sequence" includes displaying on the display unit and making the image processing sequence runnable in the control program.

The processing unit 110 includes the display control unit 114 that controls the driving of the display device 41 as "display unit", and the display control unit 114 displays the calibration setting in which the setting content relating to the calibration is edited and the image processing sequence setting in which the setting content relating to the image processing sequence is edited in the property setting window 60 as the same "screen" on the display device 41 (refer to browsing unit 63 in FIGS. 39 and 42). Accordingly, the user can grasp the existing calibration setting and the existing image processing sequence setting at a glance.

In particular, the display control unit 114 displays the calibration setting and the image processing sequence setting in a tree manner (refer to browsing unit 63 in FIGS. 39 and 42). Accordingly, the user can grasp the type and the number of the existing calibration settings, and the type and the number of the existing image processing sequence settings at a glance.

Further, the display control unit 114 displays the calibration setting and the image processing sequence setting that are related to each other (refer to browsing unit 63 in FIGS. 39 and 42). Accordingly, the user easily grasps the calibration setting and the image processing sequence setting that are associated with each other. Therefore, it is easy to modify at least any one of the calibration setting and the image processing sequence setting if necessary.

Next, creation of the image processing sequence (vision processing sequence) will be described.

Creation of Image Processing Sequence

Figure 44:
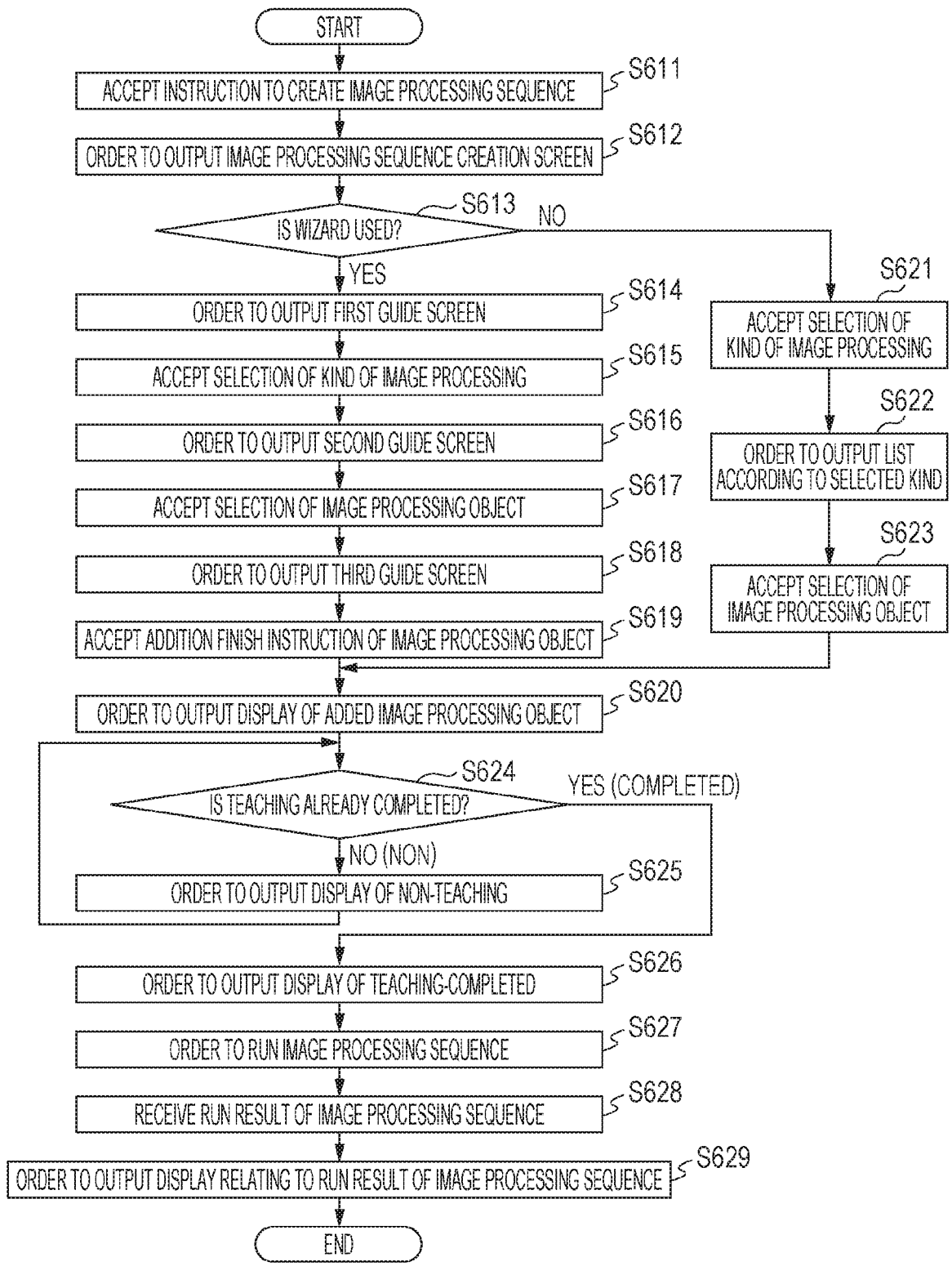
FIG. 44 is a flow diagram illustrating a flow of display processing in creation of an image processing sequence illustrated in FIG. 8.
Figure 45:
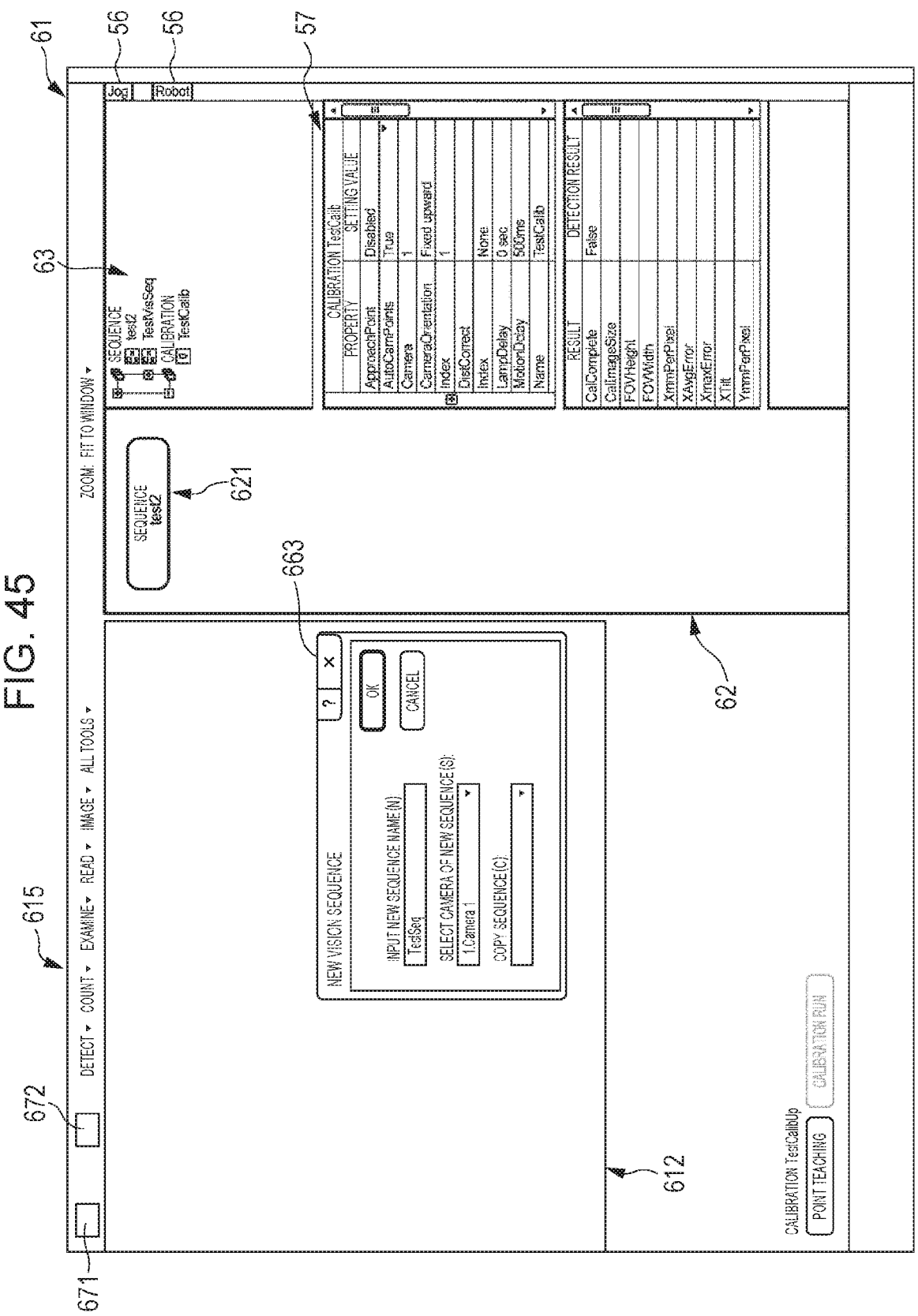
FIG. 45 is a diagram illustrating a sub-window displayed on the display device illustrated in FIG. 1.
Figure 52:
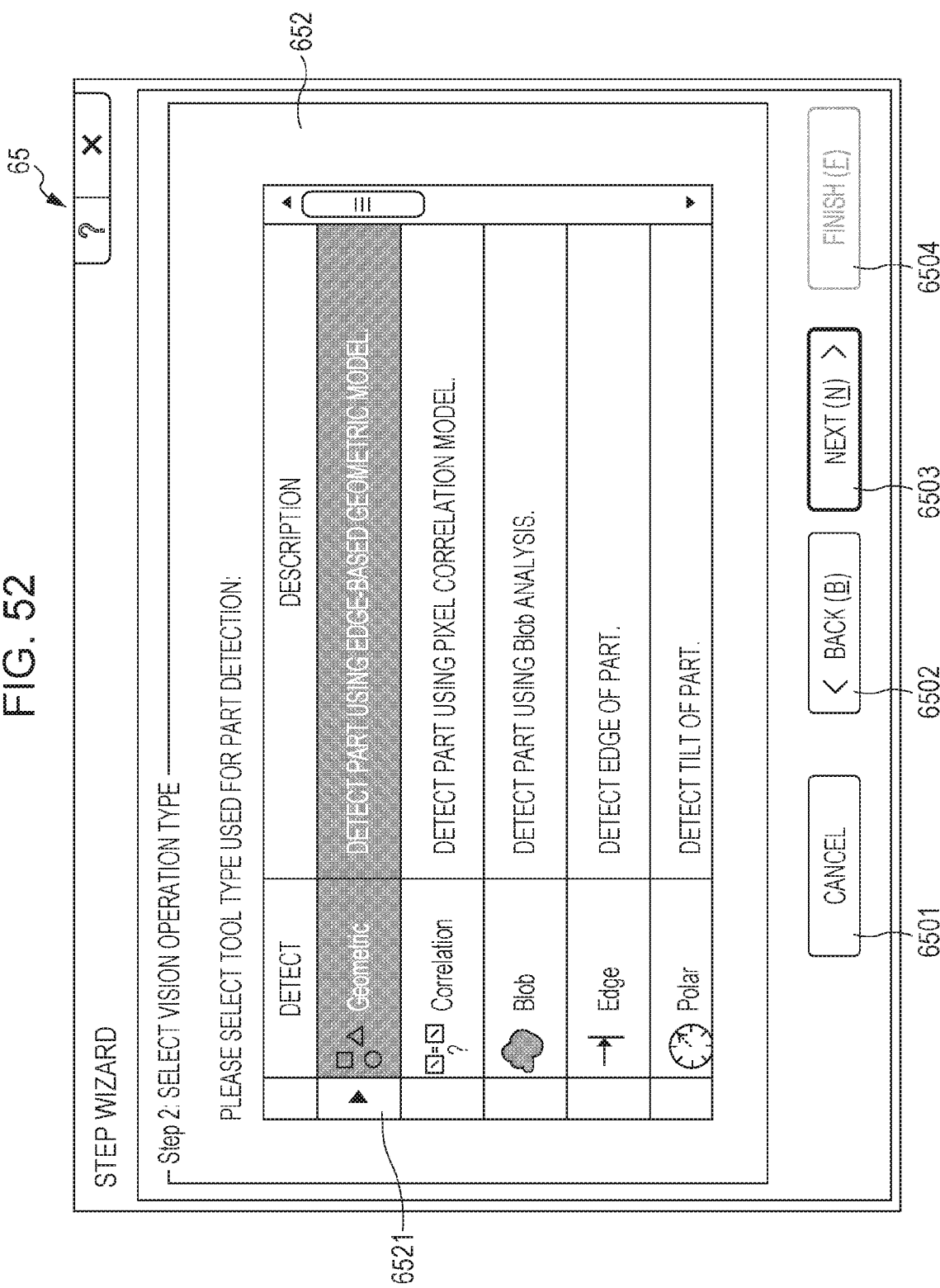
FIG. 52 is a guide screen in the sub-window displayed on the display device illustrated in FIG. 1.
Figure 53:
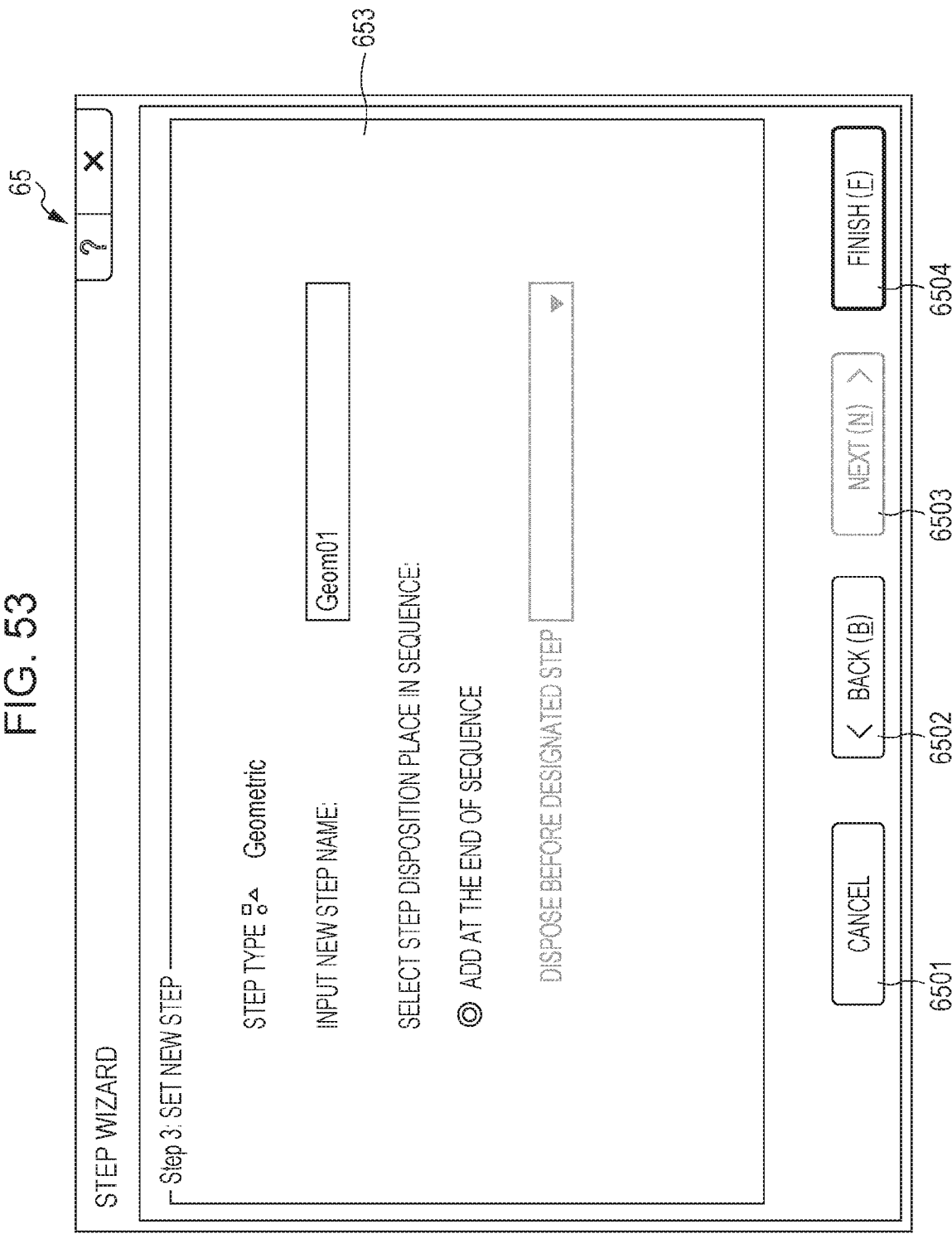
FIG. 53 is a guide screen in the sub-window displayed on the display device illustrated in FIG. 1.
Figure 54:
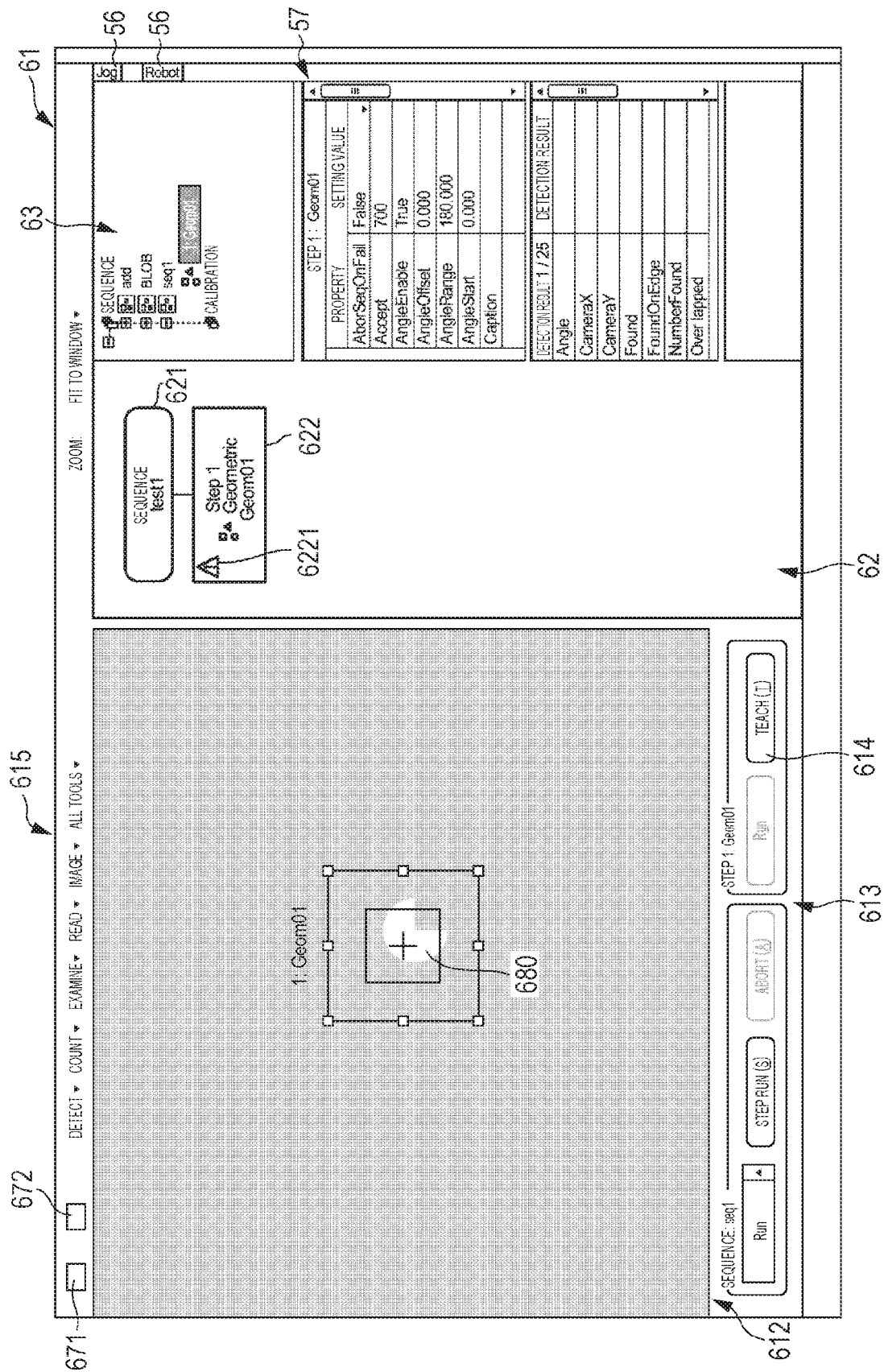
FIG. 54 is the sub-window displayed on the display device illustrated in FIG. 1 and a diagram illustrating a display different from the display in FIG. 45.
Figure 55:
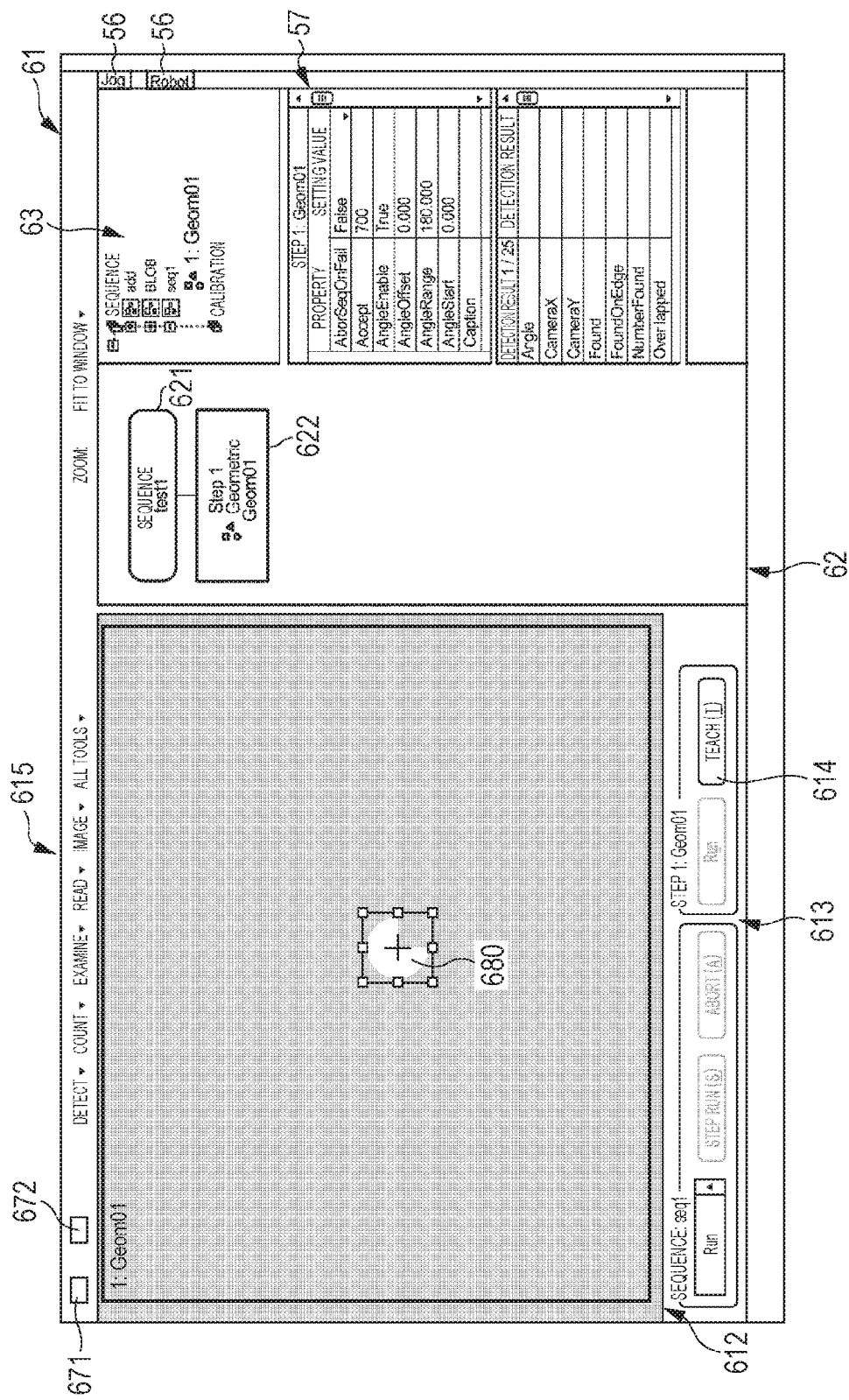
FIG. 55 is the sub-window displayed on the display device illustrated in FIG. 1 and a diagram illustrating a display different from the display in FIG. 45.

FIG. 44 is a flow diagram illustrating a flow of display processing in creation of an image processing sequence illustrated in FIG. 8. FIG. 45 is a diagram illustrating a sub-window displayed on the display device illustrated in FIG. 1. FIGS. 46 to 50 are diagrams illustrating lists displayed on the display device illustrated in FIG. 1, respectively. FIGS. 51 to 53 are guide screens in the sub-window displayed on the display device illustrated in FIG. 1, respectively. FIGS. 54 and 55 are the sub-windows displayed on the display device illustrated in FIG. 1 and diagrams illustrating displays different from the display in FIG. 45, respectively.

In the following description, the upper side of FIGS. 45 to 55 is referred to as "upper", and the lower side thereof is referred to as "lower" for the convenience of description.

In the creation of the image processing sequence, input of an image processing sequence item, addition of an image processing object to the image processing sequence, run of the image processing sequence, and reflection of a run result (detection result) of the image processing sequence are sequentially run. Various settings of the image processing sequence are performed by inputting the item of the image processing sequence and adding the image processing object to the image processing sequence, and image detection (image processing) for detecting a target such as a marker is realized. Hereinafter, the creation of the image processing sequence will be described.

Input of Image Processing Sequence Item

In the creation of the image processing sequence, the item of the image processing sequence is input.

The user performs an operation instruction with respect to the icon 601 in the main window 50 illustrated in FIG. 17. When the input control unit 115 (acceptance unit) of the computer 11 receives the operation instruction (image processing sequence creation instruction) to the icon 601 by the user (step S611), the image processing sequence editing unit 1115 performs an order to output the sub-window 61 (step S612), and the display control unit 114 displays the sub-window 61 illustrated in FIG. 45 on the display device 41 (display unit) instead of the robot operation sub-window 51 in the main window 50 illustrated in FIG. 17.

As illustrated in FIG. 45, the browsing unit 63, the flowchart display unit 62, two tabs 56, the list 57, the picture image display unit 612, the icon 671 used for displaying the group of screens for the creation of the image processing sequence, an wizard selection icon 672, and the toolbar 615 are displayed in the sub-window 61. The toolbar 615 is configured to have icons indicating "detect", "count", "examine", "image", "read", and "all tools".

Next, the user performs an operation instruction with respect to the icon 671 in the sub-window 61 illustrated in FIG. 45 displayed on the display device 41. When the input control unit 115 receives the operation instruction with respect to the icon 671 by the user, the display control unit 114 displays a dialog box 663 on the display device 41.

Next, the user inputs (performs operation instruction) a necessary item among respective items such as "sequence name", "camera used in sequence", and "sequence of copy source" using the dialog box 663 in the sub-window 61. In a case of copying an existing image processing sequence, "sequence of copy source" is input (designated).

When the input control unit 115 of the computer 11 receives the operation instruction by the user, the image processing sequence editing unit 1115 starts the creation of the image processing sequence.

At the stage, the image processing sequence is created halfway. When the image processing sequence of the copy source is designated, a setting of the image processing sequence of the copy source is copied. Therefore, the sub-window 61, the guide screen 65, and the like display the setting content of the image processing sequence of the copy source. Therefore, in a case where it is desired to create an image processing sequence in which various contents of an already set image processing sequence are slightly changed, the user can easily create the changed sequence by designating the image processing sequence of the copy source.

Here, the flowchart display unit 62 displays a flowchart. A currently selected sequence is displayed on the display unit 621 of the head (uppermost portion) of the flowchart. An image processing object included in the currently selected image processing sequence is displayed on a second display unit 622 (refer to FIG. 54) and subsequent display unit (not illustrated) of the flowchart.

The browsing unit 63 displays an image processing sequence setting in which the setting content relating to the image processing sequence is edited and a calibration setting in which the setting content relating to the calibration is edited in a tree manner, respectively. Accordingly, the user can grasp the type and the number of the calibration settings, and the type and the number of the image processing sequence settings at a glance.

The browsing unit 63 displays the image processing sequence setting and the calibration setting that are related to each other. In the embodiment, the image processing sequence setting is displayed on the upper side of the browsing unit 63, and the calibration setting is displayed on the lower side of the image processing sequence setting.

All sequences in which the editing (setting) is performed is displayed in the tree of the image processing sequence setting, and all calibrations in which the editing (setting) is performed is displayed in the tree of the calibration setting.

When the input control unit 115 receives an operation instruction by the user with respect to "sequence" of the flowchart or "sequence" of the tree of the image processing sequence (creation of image processing sequence), the display control unit 114 displays the list 57 (sequence window) on the display device 41. The list 57 displays, for example, a property of the image processing sequence, the run result of the image processing sequence, and the like. It is possible to set the property of the image processing sequence and the like using the list 57.

When the input control unit 115 receives an operation instruction by the user with respect to "object" of the flowchart or "object" of the tree of the image processing object, the display control unit 114 displays the list 57 (object window) on the display device 41. The list 57 displays, for example, the property of the image processing sequence, the run result of the image processing object when running the image processing object or the image processing sequence, and the like. It is possible to set the property of the image processing object and the like using the list 57.

When the input control unit 115 receives an operation instruction by the user with respect to the tree of the calibration, the display control unit 114 displays the list 57 (calibration window) on the display device 41. The list 57 displays, for example, calibration setting, the run result of the calibration, and the like. It is possible to set the property of the calibration and the like using the list 57.

Addition of Image Processing Object to Image Processing Sequence

A predetermined image processing object is added to the image processing sequence in order to designate the image processing in the image processing sequence.

In the case, there are two methods for adding the image processing object, that is, a method (first method) using the toolbar 615 and a method (second method) using a guide screen for guiding information input, that is, using an image processing selection wizard (step wizard).

First, a first method will be described.

The first method adds the image processing object using the toolbar 615.

In a case of using the first method, the user does not perform an operation instruction with respect to the icon 672 in the sub-window illustrated in FIG. 45 displayed on the display device 41. In a case where the input control unit 115 does not receive the operation instruction with respect to the icon 672 by the user, that is, receives an instruction to select a predetermined toolbar item from a plurality of toolbar items of the toolbar 615 by the user described below, the image processing sequence editing unit 1115 runs the first method. That is, the image processing sequence editing unit 1115 determines whether to use the image processing selection wizard (step S613) and runs the first method in a case where it is determined not to use the image processing selection wizard.

In the first method, the user first selects a predetermined image processing type from an image processing guide menu (the plurality of toolbar items of toolbar 615) indicating types (operation types) of the image processing (image detection) and then selects the predetermined image processing object (function relating to image processing) from the plurality of image processing objects in the type of the selected image processing.

Specifically, the user performs an operation to select the predetermined toolbar item from the plurality of toolbar items of the toolbar 615 in the sub-window 61. When the input control unit 115 receives an operation instruction (selection of image processing type) with respect to the predetermined toolbar item (step S621) by the user, the image processing sequence editing unit 1115 performs an order to output lists 6540 according to the selected type (step S622). The display control unit 114 receives the output order and displays the corresponding lists 6540 illustrated in FIGS. 46, 47, 48, 49, and 50 on the display device 41. Each item (indicated by character string 6542) listed in the lists 6540 is a specific example of the image processing object.

Figure 46:
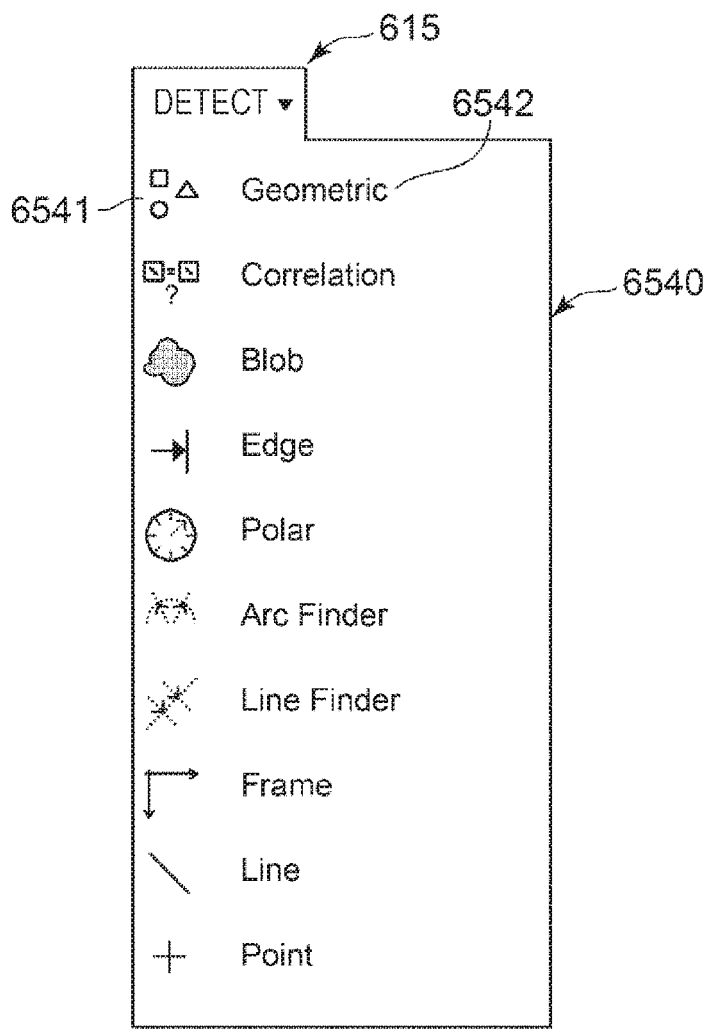
FIG. 46 is a diagram illustrating a list displayed on the display device illustrated in FIG. 1.
Figure 47:
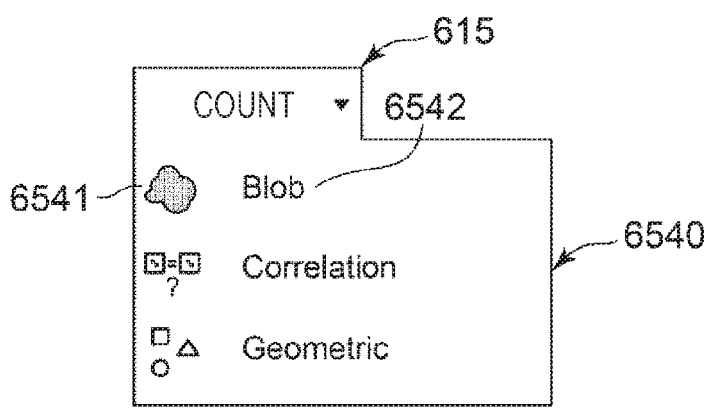
FIG. 47 is a diagram illustrating a list displayed on the display device illustrated in FIG. 1.
Figure 48:
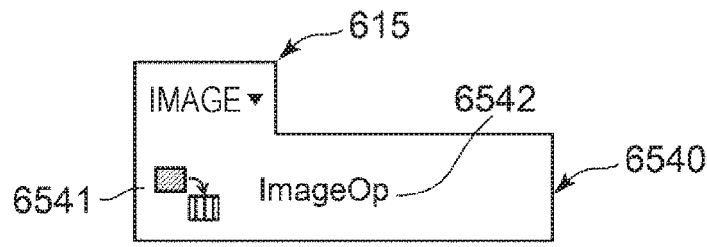
FIG. 48 is a diagram illustrating a list displayed on the display device illustrated in FIG. 1.
Figure 49:
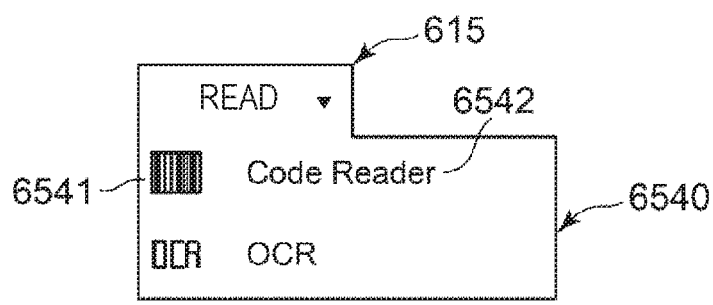
FIG. 49 is a diagram illustrating a list displayed on the display device illustrated in FIG. 1.
Figure 50:
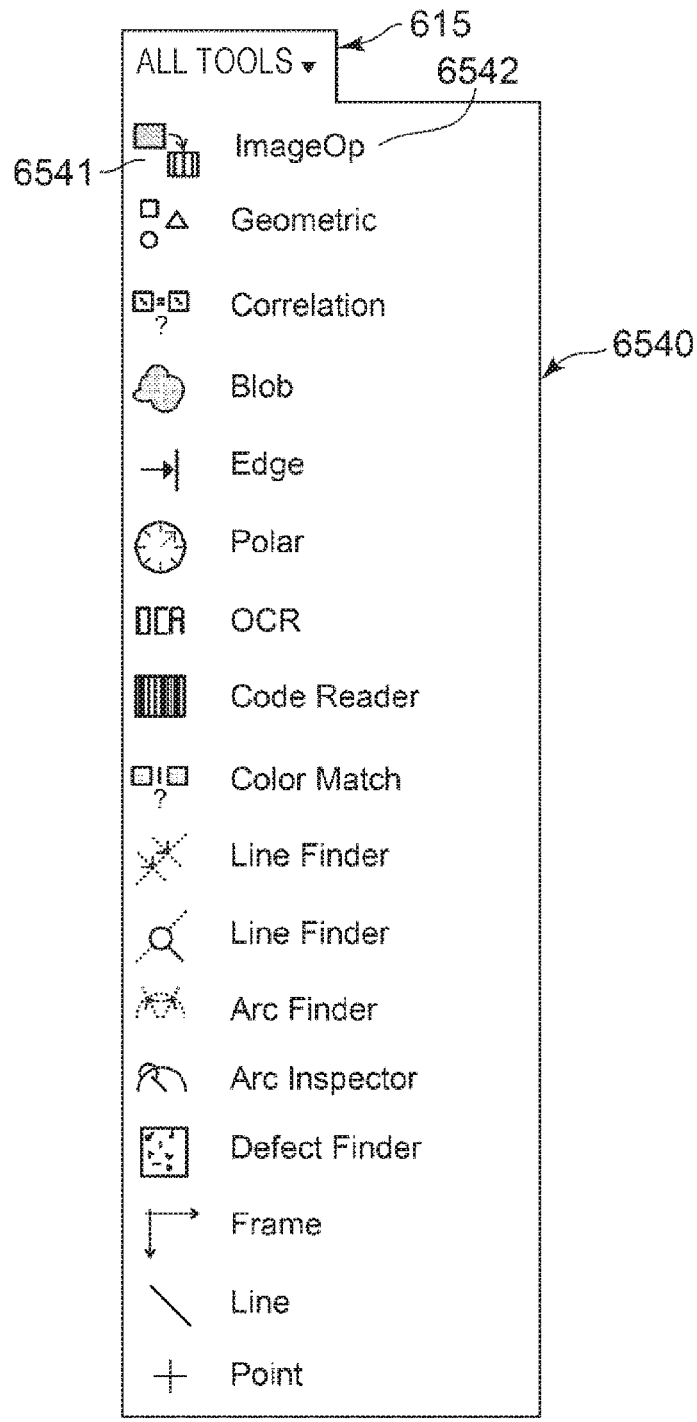
FIG. 50 is a diagram illustrating a list displayed on the display device illustrated in FIG. 1.

In a case where "detect" is selected, the list 6540 illustrated in FIG. 46 is displayed on the display device 41. In a case where "count" is selected, the list 6540 illustrated in FIG. 47 is displayed on the display device 41. In a case where "image" is selected, the list 6540 illustrated in FIG. 48 is displayed on the display device 41. In a case where "read" is selected, the list 6540 illustrated in FIG. 49 is displayed on the display device 41. In a case where "all tools" is selected, the list 6540 illustrated in FIG. 50 is displayed on the display device 41.

An item in which an icon 6541 and a character string 6542 are associated with each other is displayed in each list 6540. As one example, in the case of selecting "detect", a character string 6542 of "Geometric" and an icon 6541 consisted of a predetermined figure are associated with each other and displayed in the list 6540.

The user selects (designates) the item in which a predetermined icon 6541 and the character string 6542 are associated with each other using a necessary list 6540 among respective lists 6540 to perform an operation to add the image processing object corresponding to the item. When the input control unit 115 receives the operation instruction (selection of image processing object) by the user (step S623), the image processing sequence editing unit 1115 adds an image processing object designated as a current image processing sequence. The setting of the image processing sequence has been finished. In a step of adding the image processing object, for example, model registration (teaching) of a marker 680 (mark) and the like are performed.

Next, a second method will be described.

The second method adds the image processing object using the image processing selection wizard (step wizard). As the type of the image processing (image detection), there are, for example, detect, count, examine, read, image processing (image), all tools, and the like.

In a case of using the second method, the user performs the operation instruction with respect to the icon 672 in the sub-window 61. When the input control unit 115 receives the operation instruction with respect to the icon 672 by the user, the image processing sequence editing unit 1115 runs the second method. That is, the image processing sequence editing unit 1115 determines whether to use the image processing selection wizard (step S613) and runs the second method in a case where it is determined to use the image processing selection wizard.

In the second method, the image processing sequence editing unit 1115 first performs an order to output a first guide screen (step S614), and the display control unit 114 displays a guide screen 65 (window) illustrated in FIG. 51 on the picture image display unit 612 of the display device 41. The guide screen 65 displays a box 651. The types of the image processing (operation type) are displayed in the box 651, and it is possible to select the type of the image processing in the box 651. The type of the image processing is the same as the first method.

A button 6501 (icon) displayed as "cancel", a button 6502 (icon) displayed as "back (B)", a button 6503 (icon) displayed as "next (N)>", and a button 6504 (icon) displayed as "finish (F)" are displayed in the lower portion of the guide screen 65. In the embodiment, operation instructions (selections) are enabled to the buttons 6501 and 6503 among the buttons 6501, 6502, 6503, and 6504.

The user selects the predetermined image processing type from the plurality of types of the image processing, but in the following description, a case where the "detect" is selected will be described representatively.

When the input control unit 115 receives an operation instruction (selection of image processing type) to select an item 6511 of ["detect", "set coordinate value of part."] by the user (step S615), the display control unit 114 changes a color of a portion of the selected item 6511 to the color different from a color of other portions in the box 651.

Next, when the input control unit 115 receives an operation instruction with respect to the button 6503 displayed as "next (N)>" by the user, the image processing sequence editing unit 1115 performs an order to output a second guide screen (step S616), and the display control unit 114 displays a guide screen 65 illustrated in FIG. 52 on the picture image display unit 612 of the display device 41. The guide screen 65 displays a box 652. The types of a part detection tool (image processing object) are displayed in the box 652, and it is possible to select the type of the part detection tool in the box 652. The types of the part detection tool are the same as the items of the list 6540 of "detect" in the first method. That is, the image processing objects of each list 6540 are the same as the second method, respectively.

In the embodiment, operation instructions (selections) are enabled to the buttons 6501, 6502, and 6503 among the buttons 6501, 6502, 6503, and 6504.

The user selects a predetermined part detection tool type from the plurality of types of the part detection tool, but in the following description, a case where the "Geometric" is selected will be described representatively.

When the input control unit 115 receives an operation instruction (selection of image processing object) to select an item 6521 of "'Geometric', 'detect part using edge-based geometric model.'" by the user (step S617), the display control unit 114 changes a color of a portion of the selected item 6521 to the color different from a color of other portions in the box 652.

Next, when the input control unit 115 receives the operation instruction with respect to the button 6503 displayed as "next (N)>" by the user, the image processing sequence editing unit 1115 performs an order to output a third guide screen (step S618), and the display control unit 114 displays a guide screen 65 illustrated in FIG. 53 on the picture image display unit 612 of the display device 41. The guide screen 65 displays a window 653 provided with an input dialog. It is possible to set a new step in the window 653.

In this manner, the display control unit 114 subsequently displays three guide screens 65 on the display device 41 in an interactive manner with the user based on the input accepted by the input control unit 115. Accordingly, the user can add the image processing object easily, simply, and quickly without a complicated operation by selecting the information (setting content) in an interactive manner according to sequentially displayed guide screens 65.

In the embodiment, operation instructions (selections) are enabled to the buttons 6501, 6502, and 6504 among the buttons 6501, 6502, 6503, and 6504.

The user writes a predetermined name in the input dialog of "input new step name" and performs an operation to designate an insertion place.

Next, when the input control unit 115 receives an operation instruction (addition finish instruction of image processing object) to the button 6504 displayed as "finish (F)" by the user (step S619), the image processing sequence editing unit 1115 adds the image processing object designated as the current image processing sequence.

When the addition of the image processing object to the image processing sequence is finished, the image processing sequence editing unit 1115 performs an order to output the display of the added image processing object (step S620), the display control unit 114 displays the added image processing object in the tree of the image processing sequence displayed in the browsing unit 63 and in the flowchart displayed in the flowchart display unit 62, respectively.

Here, as described above, the image processing sequence includes at least one image processing object. The display control unit 114 can display the image processing object, and a display form of the image processing object in a case where the teaching is not performed is different from a display form of the image processing object in a case where the teaching is performed.

Accordingly, the user can grasp whether the image processing object is taught at a glance. Hereinafter, this will be described in detail.

The image processing sequence editing unit 1115 determines whether the teaching with respect to the added image processing object is performed (step S624) and performs an order to output the display of non-teaching in a case where it is determined that the teaching is not performed (non-teaching) (step S625). The display control unit 114 performs the display of non-teaching with respect to the added non-teaching image processing object. That is, the display form of a non-teaching portion of the flowchart is made different from that of a teaching-completed portion. In the embodiment, an icon 6221 of "!" is displayed in the non-teaching portion of the flowchart. Accordingly, the user can distinguish the non-teaching image processing object at a glance.

A color, for example, the background color of the non-teaching portion of the flowchart may be different from the teaching-completed portion instead of the display of the icon 6221 of "!" or in addition to the display of the icon 6221 of "!".

In a case where the added image processing object is non-teaching, that is, the teaching is required, the user performs an operation instruction with respect to a button 614 (icon) displayed as "teach" with respect to the added image processing object and performs a predetermined teaching.

When the input control unit 115 receives the operation instruction with respect to the button 614 by the user and an instructed teaching is finished with respect to the added non-teaching image processing object, the image processing sequence editing unit 1115 adds finished teaching content. Accordingly, it is possible to run the added image processing object. The setting of the image processing sequence has been finished.

As one example of the teaching, in a case of "Geometric search", there are the model registration of the marker 680 and the like.

In a case where it is determined that the teaching is performed (teaching-completed) in step S624, the image processing sequence editing unit 1115 performs an order to output the display of the teaching-completed (step S626). The display control unit 114 performs the display of the teaching-completed with respect to the added non-teaching image processing object. In the embodiment, the icon 6221 of "!" displayed in the flowchart is deleted. Accordingly, the user can distinguish at a glance that the teaching of the image processing object which is non-teaching is completed.

Run of Image Processing Sequence

The image processing sequence (creation of image processing sequence) includes an examination step based on an image captured by the imaging unit 3.

Accordingly, it is possible to examine an object captured by the imaging unit 3 by the image processing sequence. Hereinafter, this will be described in detail.

When the input control unit 115 first receives an operation instruction (order to run image processing sequence) of "run image processing sequence" by the user (step S627), the image processing sequence editing unit 1115 first transmits the setting content of the image processing sequence to the image processing device 13. In the case, the robot control device 12 may relay or may not relay.

Next, the image processing device 13 receives the setting content of the image processing sequence. The image processing sequence run unit 1311 reflects the setting content of the image processing sequence.

Next, the image processing sequence editing unit 1115 transmits an image processing sequence run order that runs the image processing sequence to the image processing device 13. In the case, the robot control device 12 may relay or may not relay.

Next, the image processing device 13 receives the image processing sequence run order. The image processing sequence run unit 1311 runs the image processing sequence.

In the case, first, the imaging unit 3 is driven by control of the imaging unit control unit 1313. The imaging unit 3, for example, images a predetermined object such as a marker and transmits image data of the captured image to the image processing device 13. Next, the image processing device 13 receives the image data. The image processing unit 1312 performs the predetermined image processing based on the image data.

As a specific example, for example, the marker 680 (geometric model: figure) illustrated in FIG. 54 is imaged as one example of the object, and various types of image processing such as image recognition of the marker 680 are performed. A part or all of the examination using the marker 680 are performed. That is, the creation of the image processing sequence includes a step (examination step) of performing the examination using the marker 680 which is one example of the object.

In the embodiment, in the case of creating the first image processing sequence, a marker 680 attached to the center of the upper surface of the workpiece 93 is imaged by the mobile camera 31, and predetermined processing is performed. As the processing, there are, for example, confirmation of detection accuracy and the like.

In the case of creating the second image processing sequence, a marker 680 attached to the center of the lower surface of the workpiece 93 is imaged by the fixed camera 32, and predetermined processing is performed.

In the case of creating the third image processing sequence, two marks (not illustrated) attached to the lower surface of the workpiece 93, for example, objects obtained by disposing two markers 680 at predetermined space are imaged by the fixed camera 32, and predetermined processing is performed. As the processing, there are, for example, association between the third image processing sequence and the calibration result of the fixed camera 32, examination, and the like.

As a specific example of the examination, there are an examination as to whether a distance between A point and B point is within a predetermined threshold and the like. In the case, the two markers 680 correspond to the A point and the B point in the examination as to whether the distance between the A point and the B point is within the predetermined threshold. In the examination, the distance between the A point and the B point is measured, and it is determined whether the measured distance between the A point and the B point is within the predetermined threshold based on the calibration result of the fixed camera 32 and the captured image. It is determined as "pass" when the measured distance between the A point and the B point is within the predetermined threshold, and it is determined as "fail" when the measured distance between the A point and the B point is not within the predetermined threshold (out of predetermined threshold).

Reflection of Run Result (Detection Result) of Image Processing Sequence

The communication unit 116 receives a run result of the image processing sequence (detection result) transmitted from the image processing device 13 (step S628), the computer 11 reflects the run result of the image processing sequence.

Specifically, the image processing sequence editing unit 1115 first transmits an order to transmit the run result of the image processing sequence for transmitting the run result of the image processing sequence to the image processing device 13. In the case, the robot control device 12 may relay or may not relay.

Next, the image processing device 13 transmits the run result of the image processing sequence to the computer 11. In the case, the robot control device 12 may relay or may not relay.

Next, the computer 11 receives the run result of the image processing sequence by the communication unit 116. The image processing sequence editing unit 1115 reflects the run result of the image processing sequence.

That is, the image processing sequence editing unit 1115 performs an order to output display relating to the run result of the image processing sequence and the like (step S629), and the display control unit 114 displays the run result of the image processing sequence on the display device 41 (reflected in the display). The run result of the image processing sequence is reflected in the property and the like. As the run result of the image processing sequence, there are, for example, an image coordinate at which the marker is detected and the like.

In the creation of the image processing sequence, a window for setting distortion correction of the mobile camera 31, the fixed camera 32, and the like, a window for setting a lighting condition at the time of imaging may be provided.

Next, the tool setting, the local setting, the calibration, the creation of the image processing sequence, and the like using the command will be described.

First, an outline will be briefly described in correspondence with the scope of the aspects and then will be described in detail.

The processing unit 110 includes the control program editing unit 1111 that can edit the control program for driving the robot 2. The control program editing unit 1111 can insert an order to call the edited image processing sequence (command argument in the embodiment) in the control program.

Accordingly, for example, it is possible to call the existing (edited) image processing sequence in the control program that causes the robot 2 to perform a predetermined operation and to perform a predetermined work. Therefore, it is possible to save the effort to create the image processing sequence each time a control program is created.

The robot control device 12 of the control system 10 (control device) includes the control program run unit 1211 that can run the control program for driving the robot 2. The control program run unit 1211 runs the setting of a local coordinate system by a command that can set the local coordinate system different from the coordinate system of the robot 2.

Accordingly, it is possible to set the local coordinate system more quickly. In a case where the calibration is repeatedly run periodically or in a case where various settings of the calibration including the setting of the local coordinate system and the like are repeatedly modified a plurality of times based on the run result after the calibration is run, it is particularly effective to use the command. This is because the modification based on the run result can be easily and quickly performed.

The control program run unit 1211 runs the tool setting by "command VDefTool" which is one example of a command that can perform the tool setting for obtaining the offset of the tool attached to the robot 2.

Accordingly, it is possible to perform the tool setting more quickly. In a case where the calibration is repeatedly run periodically or in a case where various settings of the calibration including the tool setting and the like are repeatedly modified a plurality of times based on the run result after the calibration is run, it is particularly effective to use the command. This is because the modification based on the run result can be easily and quickly performed. Hereinafter, this will be described in detail.

Processing Using Command

The control system 10 can perform processing using the command instead of the display processing using the various operation screens described above.

The command includes an operation order for running target processing. As the command, there are, for example, a processing command for tool setting for performing the tool setting (calculating offset) using the run result of the image processing sequence, a processing command for local setting for performing the local setting using the run result of the image processing sequence, a processing command for calibration for performing the calibration using the run result of the image processing sequence, a command for driving the robot arm 20 such that, for example, the target in the captured image of the imaging unit 3 moves to a predetermined position using the run result of the image processing sequence, and the like.

The command has, for example, an argument designating a parameter.

In the following description, the tool setting will be described representatively as an example, but the local setting, the calibration, and the creation of the image processing sequence can also be performed in the same manner.

Program Creation and Input

The user creates a program using the command and inputs the program to the computer 11 using the input device 42 (input while creating). The input control unit 115 of the computer 11 (acceptance unit) accepts the program input from the input device 42 and stores the program in the storage unit 113. The creation of the program includes a case where a program is newly created and a case where an existing program is rewritten or edited.

One example of the program is as follows. It is assumed that the program can perform the same setting as the tool setting described above.

Function Main
Reset
Motor On
VDefTool 1, VISION_DEFTOOL_FIXEDNOCAL, TestVisSeq, 180, 5
Fend "VDefTool 1, VISION_DEFTOOL_FIXEDNOCAL, TestVisSeq, 180, 5" of the program is a command (each argument is one example).

The "VDefTool" of the command is a command name.

As an argument (argument name) in the command VDefTool, there are, for example, the same parameters and the like as the parameters that can be set in the first tool setting screen 71a, the second tool setting screen (not illustrated), the third tool setting screen 71b, the fourth tool setting screen (not illustrated), and the fifth tool setting screen 71c in the tool setting described above. As a specific example, there are, for example, "toolNumber", "toolDefType", "sequence", "[finalAngle]", "[initialAngle]", "[targetTolerance]", and the like.

The "toolNumber" is a storage number (tool number) that stores a tool setting result. A specific example is 1 to 15.

The "toolDefType" is a tool type. A specific example is as follows.
VISION_DEFTOOL_FIXEDNOCAL: perform a tool setting using a fixed camera which is not calibrated.
VISION_DEFTOOL_J4CAM: calculate the image center of the mobile camera provided on the fourth arm.
VISION_DEFTOOL_J6CAM: calculate the image center of the mobile camera provided on the sixth arm.

The "sequence" is an image processing sequence used for detecting a tool (object).

The "[finalAngle]" is an angle (final rotation angle) for rotating the tool/the camera tool.

The "[initialAngle]" is an angle (initial rotation angle) for rotating the tool/the camera tool at the time of temporal tool setting.

The "[targetTolerance]" is a pixel distance (target tolerance) that the run result of the image processing sequence (detection result) is regarded as coinciding with an object position.

Build Project and Transmission

The created program (project) is built and is converted (compiled) into a language (data string) that can be interpreted by the robot control device 12.

In the case, when the input control unit 115 first receives an operation instruction of "build" by the user, the control program build unit 1112 of the computer 11 builds the program and compiles the program into the language that can be interpreted by the robot control device 12.

Next, the computer 11 transmits the compiled program to the robot control device 12. The robot control device 12 receives the transmitted program from the computer 11 and stores the program in the storage unit 123.

The computer 11 transmits necessary information such as the image processing detection setting to the image processing device 13. In the case, the robot control device 12 may relay or may not relay. The image processing device 13 receives the transmitted image processing detection setting from the computer 11 and stores the detection setting in the storage unit 133.

Run of Tool Setting Processing (Run of Program)

In a case of causing the robot vision system 100 to perform the tool setting processing, the user performs an operation instruction with respect to a predetermined icon (not illustrated) displayed on the display device 41.

The input control unit 115 receives the operation instruction (order to run tool setting processing) of "select main function of program, run start" by the user, the computer 11 first transmits an order of run processing of the program to the robot control device 12.

Next, the image processing device 13 receives the order (instruction) of the run processing of the program. The control program run unit 1211 of the image processing device 13 starts the run processing of the main function of the program. When finding the run processing of command VDefTool, the control program run unit 1211 transmits an order of the run processing of command VDefTool (order to run tool setting processing) together with the argument of command VDefTool to the computer 11.

Next, the computer 11 receives the order of the run processing of command VDefTool and runs (starts) the run processing of command VDefTool, that is, the tool setting processing. Since the run of the tool setting processing is the same as in [2B] described above, the description thereof will be omitted. Since the reflection of the tool setting result is the same as in [3B] described above, the description thereof will be omitted.

It is possible to run each processing of the tool setting and the like easily and quickly by using such command.

In the tool setting using the tool setting screens described above, in a case where the tool setting processing is run, since the five tool setting screens are sequentially displayed on the display device 41 every time, various settings in the tool setting are performed, and then the tool setting processing can be run, it takes time and labor for preparation every time. On the contrary, once the command argument is set by using the command, since the setting is unnecessary from the next time, it is possible to run the tool setting processing easily and quickly.

For example, in a case where the tool setting processing is run and then the calibration is run, it is possible to automatically run the tool setting processing and the calibration continuously by using the command, and the convenience is enhanced.

In a case where the various settings in the tool setting are changed, it is possible to change the various settings by performing simple work of changing a corresponding argument portion of the command.

In the above description, the tool setting is described as an example, but the local setting, the calibration, the creation of the image processing sequence, and the like can also be run by the command in the same manner, respectively.

For example, a command that can set a local coordinate system different from the coordinate system of the robot 2 is created in the local setting. The control program run unit 1211 runs the setting of the local coordinate system by the command. Since the setting of the local coordinate system (run of local setting processing) is the same as in [2A] described above, the description thereof will be omitted. Since the reflection of the local setting result is the same as in [3A] described above, the description thereof will be omitted.

The robot vision system 100 as described above includes the control system 10 as "control device" and the robot 2 and the imaging unit 3 controlled by the control system 10. According to such robot vision system 100, since the control system 10 described above is included, it is possible for the robot 2 to accurately perform the operation related to the calibration based on the captured image (image data) from the imaging unit 3. Therefore, it is possible to enhance accuracy of the calibration. As a result, it is possible to enhance accuracy of the work of the robot 2.

The robot 2 is controlled by the control system 10 as "control device". Therefore, it is possible for the robot 2 to accurately perform the operation related to the calibration under the control of the control system 10.

Second Embodiment

Figure 56:
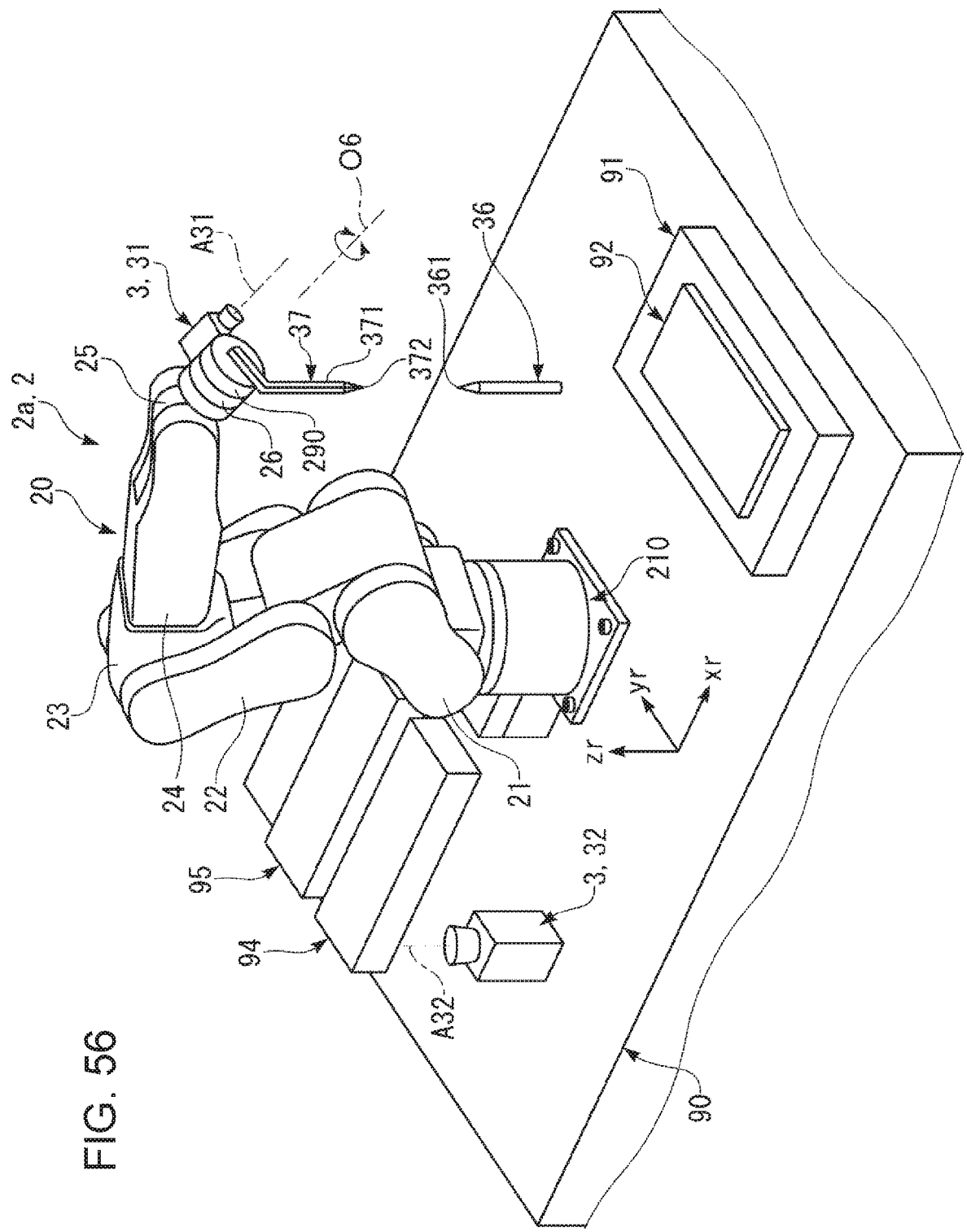
FIG. 56 is a perspective view illustrating an example of a robot, an example of a tool attached on a robot arm, and an example of a teaching tool included in a robot vision system according to a second embodiment of the invention.
Figure 57:
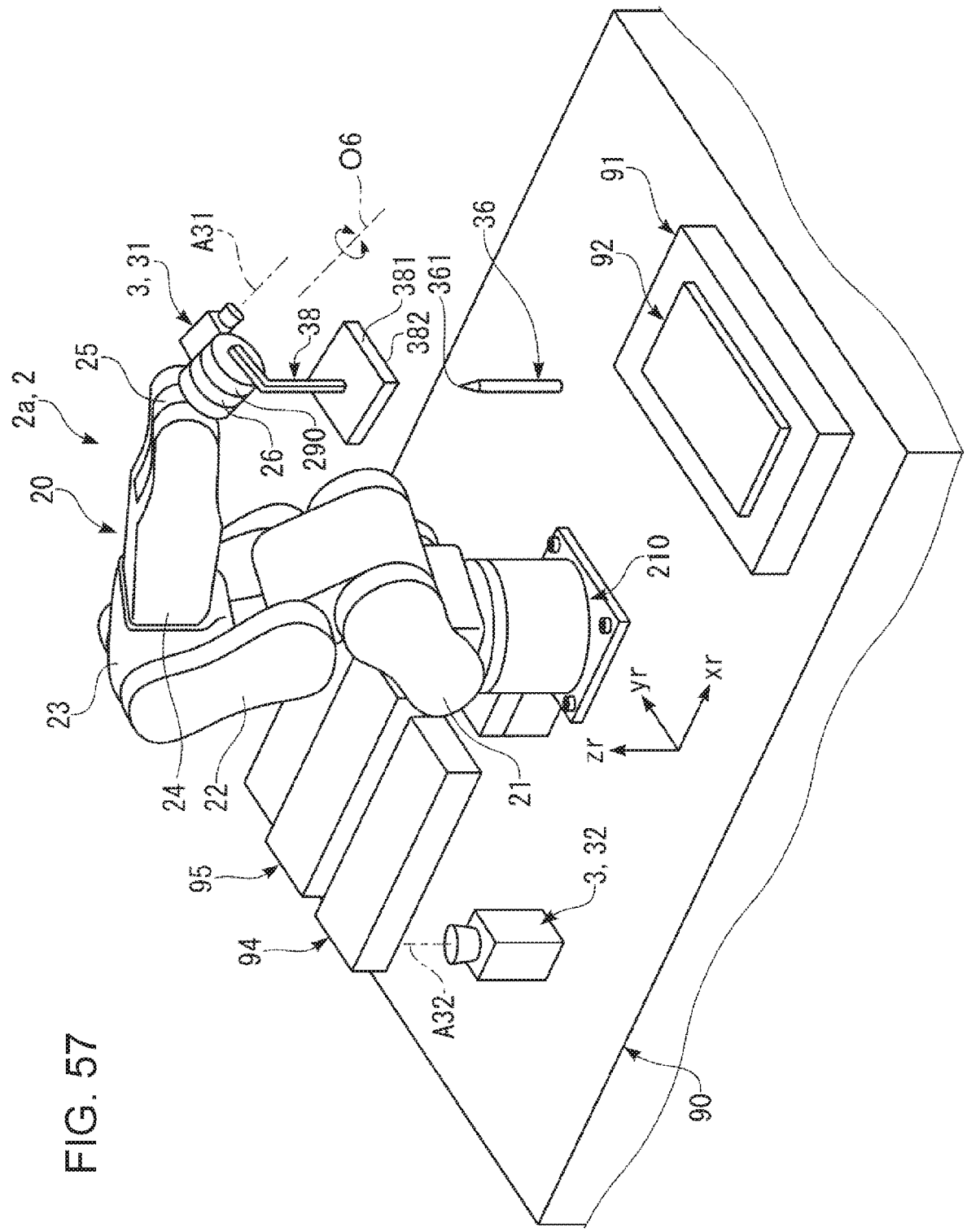
FIG. 57 is a perspective view illustrating an example of the robot, an example of a tool attached on the robot arm, and an example of the teaching tool included in the robot vision system according to the second embodiment of the invention.
Figure 58:
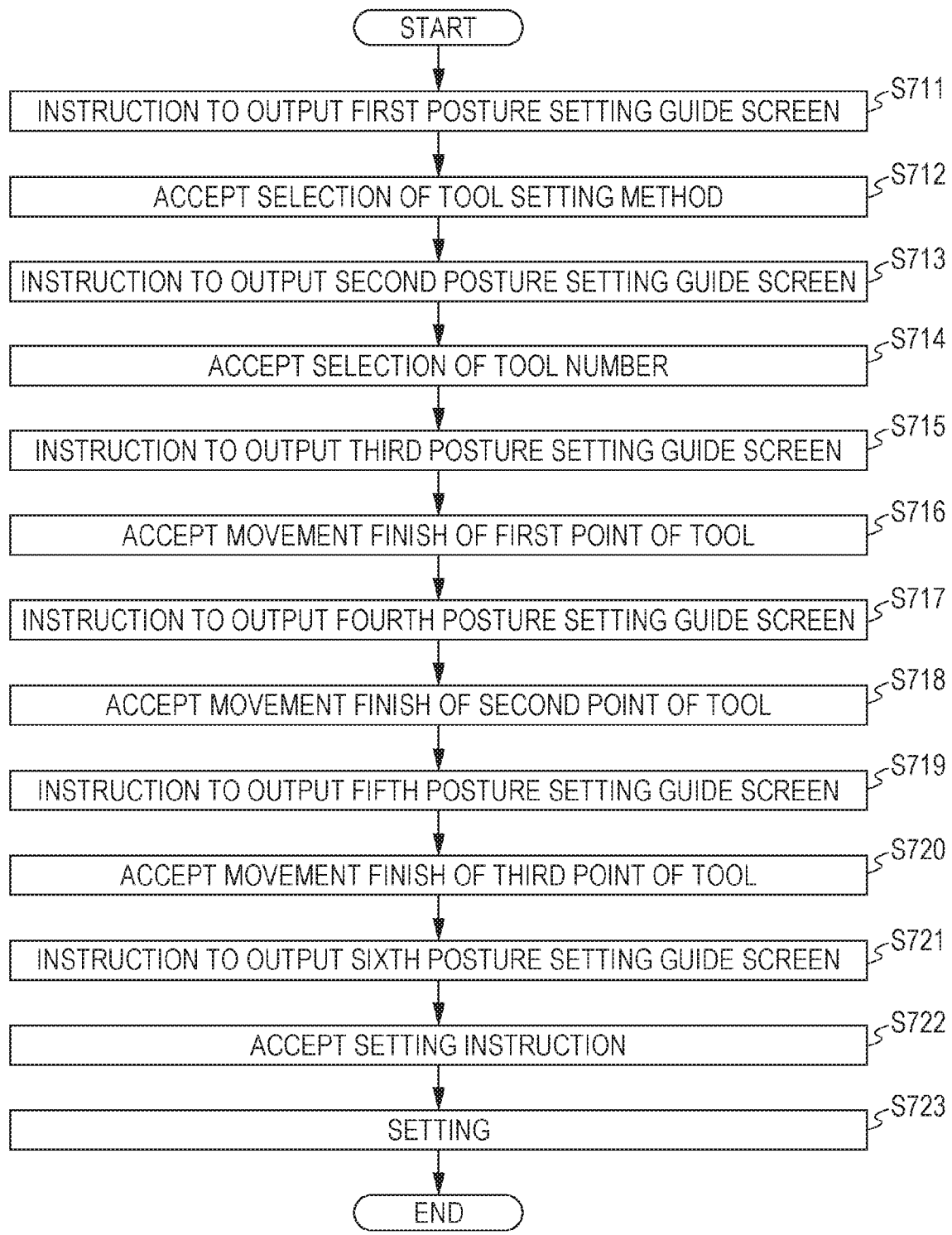
FIG. 58 is a flow diagram illustrating a flow of a tool setting of the robot vision system according to the second embodiment of the invention.

FIGS. 56 and 57 are perspective views illustrating examples of robots, examples of tools attached on robot arms, and examples of teaching tools included in a robot vision system according to a second embodiment of the invention, respectively. FIG. 58 is a flow diagram illustrating a flow of a tool setting of the robot vision system according to the second embodiment of the invention. FIGS. 59 to 70 are posture setting guide screens of the robot vision system according to the second embodiment of the invention, respectively. FIGS. 71 to 76 are diagrams for describing the tool setting of the robot vision system according to the second embodiment of the invention.

In the following description, the upper side of FIGS. 56 to 76 is referred to as "upper", and the lower side thereof is referred to as "lower" for the convenience of description. In FIGS. 71 to 76, a base end side of the tool is omitted.

Hereinafter, the second embodiment will be described, but differences from the embodiment described above will be mainly described and description of the same matters will be omitted. In the embodiment, a case of using the robot 2a illustrated in FIG. 56 as the robot 2 will be described as an example.

First, an outline of the control system 10 (control device), the robot 2a, and the robot vision system 100 (robot system) will be described in correspondence with the scope of the aspects and then will be described in detail.

The control system 10 (control device) is a control device that is capable of controlling driving of the robot 2a. The control system 10 includes the computer 11 having the display control unit 114 that displays posture setting guide screens 81a to 81k that guide information input for obtaining posture offsets of tools 37 and 38 which are examples of tools provided on the robot 2a on the display device 41 (display unit), the robot control device 12 (control unit) that controls the driving of the robot 2a based on the posture offsets of the tools 37 and 38, and the image processing device 13 (refer to FIG. 1). The posture offset of the tools 37 and 38 refers to a deviation amount of actual postures of the tools 37 and 38 with respect to a preset reference posture.

According to such control system 10, it is possible to easily and quickly perform an operation to input the information for obtaining the posture offsets of tools 37 and 38. It is possible to easily and accurately set the tools 37 and 38 in a desired posture according to the postures of the tools 37 and 38 with respect to the robot arm 20 included in the robot 2a by obtaining the posture offsets of the tools 37 and 38.

The information for obtaining the posture offsets of the tools 37 and 38 includes shapes of the tools 37 and 38. Accordingly, it is possible to accurately obtain the posture offsets of the tools 37 and 38. The information for obtaining the posture offsets of the tools 37 and 38 may not include the shapes of the tools 37 and 38.

In the embodiment, the shape of the tool 37 is a bar shape, the shape of the tool 38 is a planar shape, and it is configured such that the posture offsets of the tools 37 and 38 can be set. However, it may be configured such that the posture offset of only one tool of the tools 37 and 38 can be set.

That is, the shape of the tool includes at least one of the bar shape and the planar shape. Accordingly, it is possible to accurately obtain the posture offset in at least one of the bar-shaped tool 37 and the planar-shaped tool 38. The shape of the tool may be a shape other than the bar shape and the planar shape.

The robot 2a is provided with the tools 37 and 38 which are the examples of the tool and is controlled by the control system 10 (control device).

According to such robot 2a, it is possible to easily and accurately set the tools 37 and 38 in a desired posture according to the postures of the tools 37 and 38 with respect to the robot arm 20 included in the robot 2a under the control of the control system 10.

The robot vision system 100 (robot system) includes the control system 10 (control device), the plurality of imaging units 3, the display device 41 (display unit), the input device 42 (input unit), and the robot 2a which is provided with the tools 37 and 38 which are the examples of the tool and which is controlled by the control system 10 (control device) (refer to FIGS. 1, 56, and 57).

According to such robot vision system 100, it is possible to easily and quickly perform the operation to input the information for obtaining the posture offsets of tools 37 and 38. It is possible to easily and accurately set the tools 37 and 38 in a desired posture according to the postures of the tools 37 and 38 with respect to the robot arm 20 included in the robot 2a by obtaining the posture offsets of the tools 37 and 38. Hereinafter, this will be described in detail.

The robot vision system 100 (robot system) of the second embodiment (refer to FIG. 1) is configured to be able to respectively obtain and set a position offset and a posture offset (posture offset with respect to reference posture) of the tool (for example, tool 37 illustrated in FIG. 56 and tool 38 illustrated in FIG. 57) with respect to the robot arm 20 in the tool setting.

First, the position offset of the tool will be described.

The position offset of the tool refers to a deviation amount of an actual tool position with respect to a preset reference position (reference point).

The reference point (original point) of the position offset of the tool, that is, a point at which the position offset of the tool is "position (X) in X-axis direction=0, position (Y) in Y-axis direction=0, and position (Z) in Z-axis direction=0" is not particularly limited and can be appropriately set according to various conditions. In the embodiment, the reference point is set at a point on the tip end of the robot arm 20 (sixth arm 26) and on the rotation axis O6. Therefore, in the embodiment, the position offset is a deviation amount of a position reference point set in the tool with respect to the point (reference point) on the tip end of the robot arm 20 and on the rotation axis O6. The position reference point of the tool is not particularly limited and can be appropriately set according to various conditions. In the embodiment, the position reference point is set at the tip ends of the tools 37 and 38. In a case of the planar-shaped tool 38, the position reference point of the tool 38 is set at a predetermined position (point) of the front end surface of the tool 38.

Next, the posture offset of the tool will be described.

The posture offset of the tool refers to a deviation amount of an actual tool posture with respect to a preset reference posture (reference point).

The reference point (reference posture) of the posture offset of the tool, that is, a reference posture in which the posture offset of the tool is "rotation angle (U) around Z-axis=0, rotation angle (V) around Y-axis=0, and rotation angle (W) around X-axis=0" is not particularly limited and can be appropriately set according to various conditions. In the embodiment, the reference posture of the bar-shaped tool 37 is set to a predetermined posture in which the central axis of the tool 37 coincides with the rotation axis O6, and the reference posture of the planar-shaped tool 38 is set to a predetermined posture in which the normal line passing through the center of a front end surface 382 of the tool 38 coincides with the rotation axis O6.

In the embodiment, the position offset of the tool and the posture offset can be set, but it may be configured to be able to set only the posture offset.

Next, the tool will be described.

As described also in the first embodiment, the tool may be any subject as long as it is provided on the robot arm 20 (robot 2a). The tool may be a configuration element of the robot 2a or may be a configuration element added to the robot 2a, not the configuration element of the robot 2a. As a specific example of the tool, there are, for example, the end effector such as the hand 270 (refer to FIG. 2), the imaging unit 3 (refer to FIG. 2), the object (workpiece) held (supported) by the end effector, and the like.

The tool may be detachable with respect to the robot arm 20 (robot 2a) or may be not detachable. The holding (supporting) includes, for example, gripping, adsorbing, and the like.

Therefore, "provided" in "tool provided on the robot arm 20 (robot 2a)" is, for example, synonymous with "attached (installed)" in the case where the tool is the end effector such as the hand 270 (refer to FIG. 2) and is synonymous with "held (supported)" in a case where the tool is an object (not illustrated) gripped by the hand 270 (refer to FIG. 2).

The shape of the tool is not particularly limited. In the embodiment, the case where the shape of the tool is the bar shape and the case where the shape of the tool is the planar shape will be described as examples. Specifically, in the embodiment, the tool 37 illustrated in FIG. 56 as the bar-shaped tool and the tool 38 illustrated in FIG. 57 as the planar-shaped tool will be described as the examples.

The shape of the tool does not mean only the overall shape of the tool, but also includes a shape of a part of the tool. That is, the fact that the shape of the tool is the bar shape means that the tool has a bar-shaped part (for example, main part of tool is bar shape). The fact that the shape of the tool is the planar shape means that the tool has a planar-shaped part (for example, main part of tool has plane such as flat plate shape).

Figure 71:
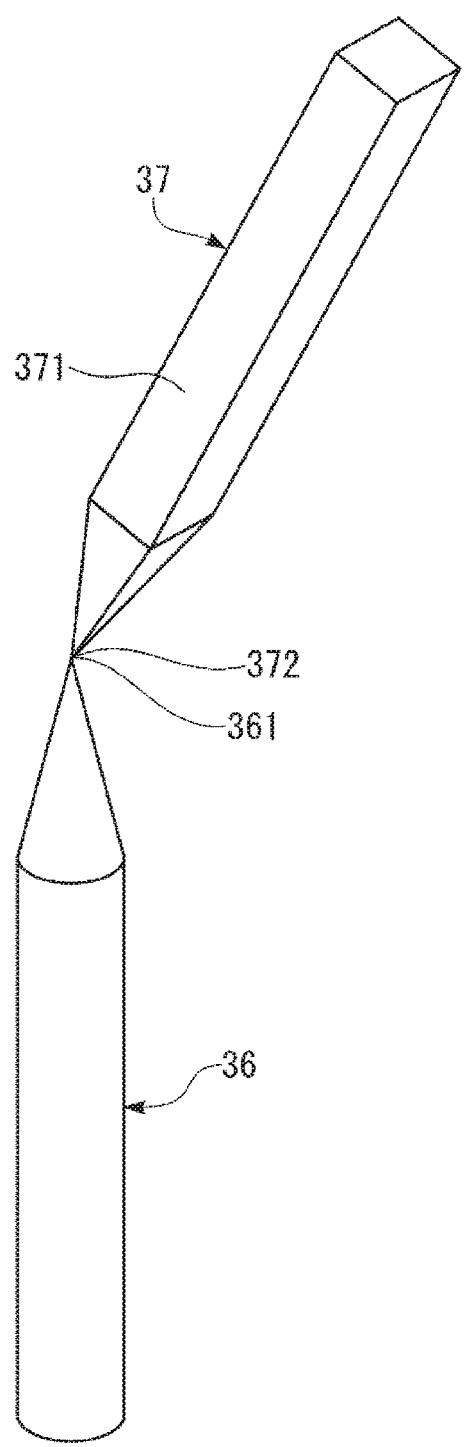
FIG. 71 is a diagram for describing the tool setting of the robot vision system according to the second embodiment of the invention.

As illustrated in FIGS. 56 and 71, in the embodiment, the tool 37 is the end effector, and a bar-shaped portion 371 having the bar shape is included. A tip end 372 of the bar-shaped portion 371 is sharp. A shape of the cross section perpendicular to the longitudinal direction of the bar-shaped portion 371 is a square. The bar-shaped portion 371 is bent in the middle thereof. The tool 37 is attached to the tip end of the force measurement unit 290 of the robot 2a in a detachable manner. The force measurement unit 290 may be omitted, and the tool 37 may be attached to the tip end of the robot arm 20 (sixth arm 26) in a detachable manner.

The bar-shaped tool is not limited to the tool 37 and, for example, the tip end 372 may not be sharp. The bar-shaped portion 371 may not be bent in the middle thereof, and the shape of the cross section perpendicular to the longitudinal direction of the bar-shaped portion 371 is not limited to the square, and there are, for example, another rectangle such as rectangle, a polygon such as pentagon and hexagon, a circle, an ellipse, and the like.

Figure 74:
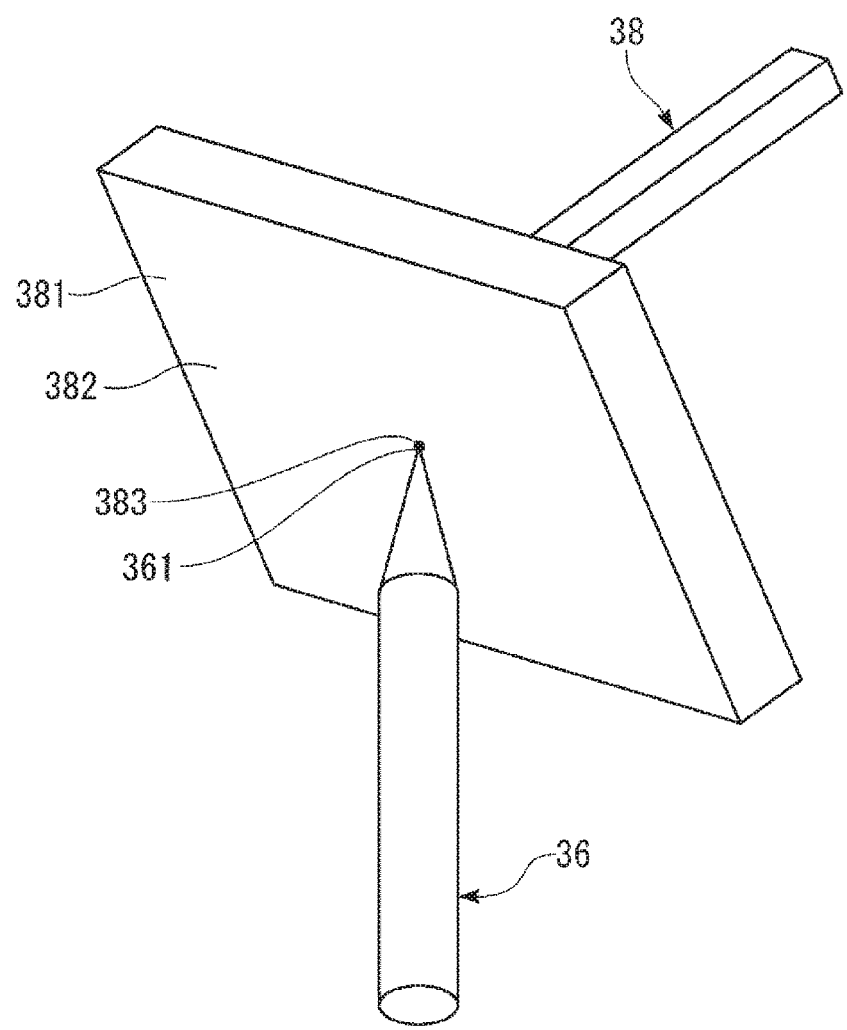
FIG. 74 is a diagram for describing the tool setting of the robot vision system according to the second embodiment of the invention.

As illustrated in FIGS. 57 and 74, in the embodiment, the tool 38 is the end effector, and a plate-shaped portion 381 having a plate shape is included. The front end surface 382 of the plate-shaped portion 381 is a plane. A shape of the plate-shaped portion 381 (front end surface 382) is a square.

The tool 38 is attached to the tip end of the force measurement unit 290 of the robot 2a in a detachable manner. The force measurement unit 290 may be omitted, and the tool 38 may be attached to the tip end of the robot arm 20 (sixth arm 26) in a detachable manner.

The planar-shaped tool is not limited to the tool 38. For example, the shape of the plate-shaped portion 381 (front end surface 382) is not limited to the square, and there are, for example, another rectangle such as rectangle, a polygon such as pentagon and hexagon, a circle, an ellipse, and the like.

Next, a teaching tool 36 will be described.

As illustrated in FIGS. 56 and 57, the teaching tool 36 is mounted at a predetermined position on the worktable 90. The teaching tool 36 is not particularly limited as long as it can recognize a specific point (one point), but in the embodiment, has the bar shape and a tip end 361 thereof is sharp. The tip end 361 of the teaching tool 36 is used as the specific point. The specific point is used when obtaining the posture offsets of the tools 37 and 38 and is a point at which a position is known. For example, a marker such as "point" indicating the specific point may be provided at the predetermined position on the worktable 90 instead of the teaching tool 36.

Next, in a case of setting the posture offsets of the tools 37 and 38 with respect to the robot arm 20, an operation procedure by the user and an operation of the robot vision system 100 will be described based on FIGS. 56 to 76.

When the input control unit 115 of the computer 11 (acceptance unit) receives a predetermined operation instruction by the user, the control unit 111 starts display processing of a group of guide screens (screen group) for posture setting for displaying a plurality of posture setting guide screens 81 (instruction screen which is sub-window) in an interactive manner with the user.

In the case, the posture setting guide screens 81c, 81d, and 81e subsequently guide a place where the tool 37 is brought into contact with the tip end 361 of the teaching tool 36 which is an example of the specific point. Accordingly, it is possible to easily and accurately perform an operation for obtaining the posture offsets of the tools 37 and 38. The posture setting guide screens are not limited to a form in which the place where the tool 37 is brought into contact is subsequently guided, and may be another form. Hereinafter, this will be described in detail.

Figure 59:
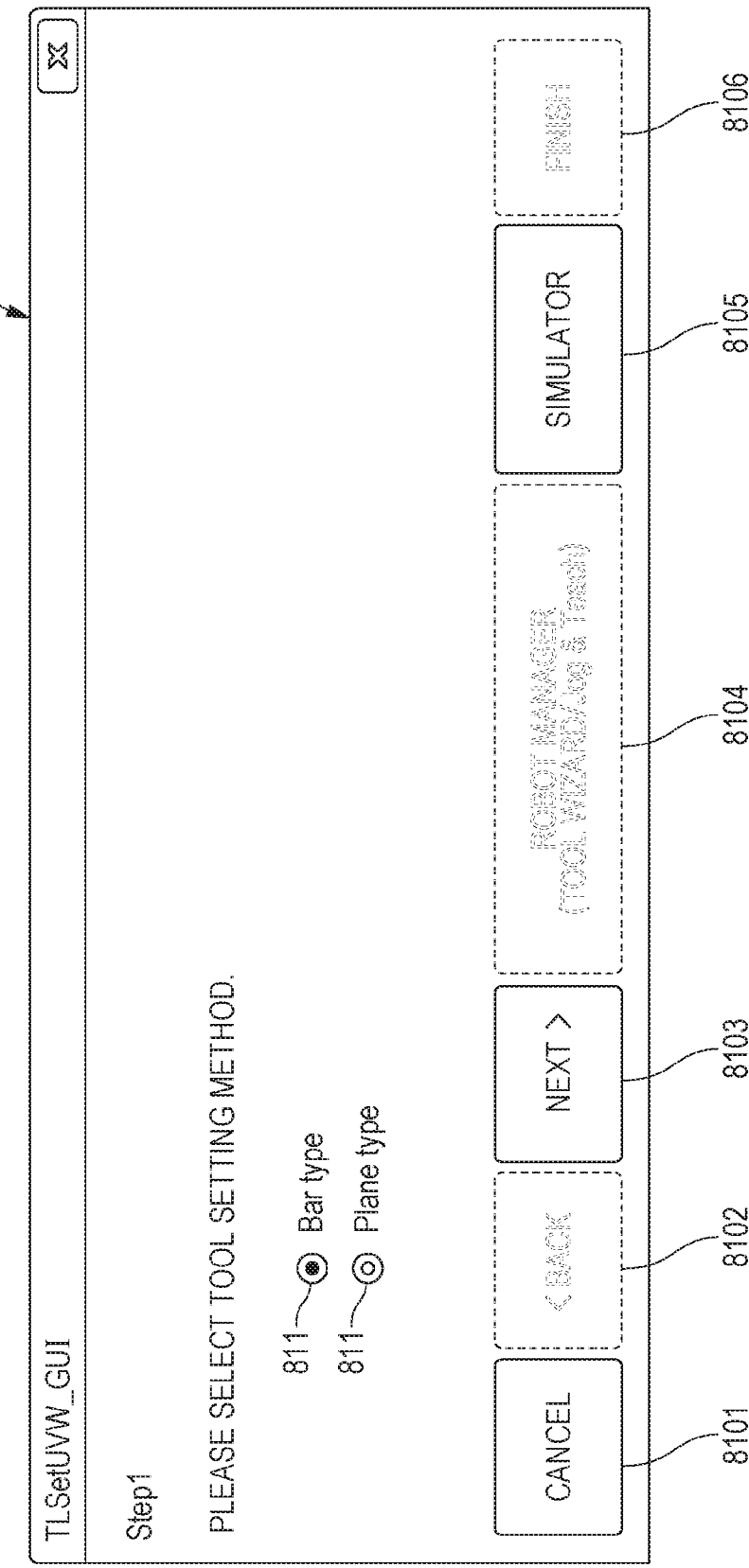
FIG. 59 is a posture setting guide screen of the robot vision system according to the second embodiment of the invention.

First, the image processing sequence editing unit 1115 performs an instruction (order) to output a first posture setting guide screen 81a (posture setting guide screen 81) illustrated in FIG. 59 (step S711), the display control unit 114 displays the first posture setting guide screen 81a illustrated in FIG. 59 on the display device 41 (display unit) in the main window 50 illustrated in FIG. 17.

The first posture setting guide screen 81a is a screen for guiding input in step 1, and the posture setting guide screen 81a displays description (comment) of an operation illustrated in FIG. 59.

The posture setting guide screen 81a displays two radio buttons 811 of "Bar type" and "Plane type", a button 8101 (icon) displayed as "cancel", a button 8102 (icon) displayed as "<back", a button 8103 (icon) displayed as "next>", a button 8104 (icon) displayed as "the robot manager (tool wizard/Jog & Teach)", a button 8105 (icon) displayed as "simulator", and a button 8106 (icon) displayed as "finish". In the posture setting guide screen 81a, operation instructions (selections) are enabled to the buttons 8101, 8103, and 8105 among the buttons 8101 to 8106.

The two radio buttons 811 of "Bar type" and "Plane type" are radio buttons for selecting a setting method (setting mode) according to the shape of the tool. The "Bar type" is selected in a case of the tool setting for the bar-shaped tool 37, and the "Plane type" is selected in a case of the tool setting for the planar-shaped tool 38.

First, the tool setting for the bar-shaped tool 37 will be described.

The user selects "Bar type" with the radio button 811 in the posture setting guide screen 81a and performs an operation instruction with respect to the button 8103. When the input control unit 115 receives the operation instruction with respect to the button 8103 by the user, that is, the selection ("Bar type") of the tool setting method (step S712), the image processing sequence editing unit 1115 performs an instruction to output a second posture setting guide screen 81b illustrated in FIG. 60 (step S713), and the display control unit 114 displays the second posture setting guide screen 81b illustrated in FIG. 60 on the display device 41 instead of the posture setting guide screen 81a.

Figure 60:
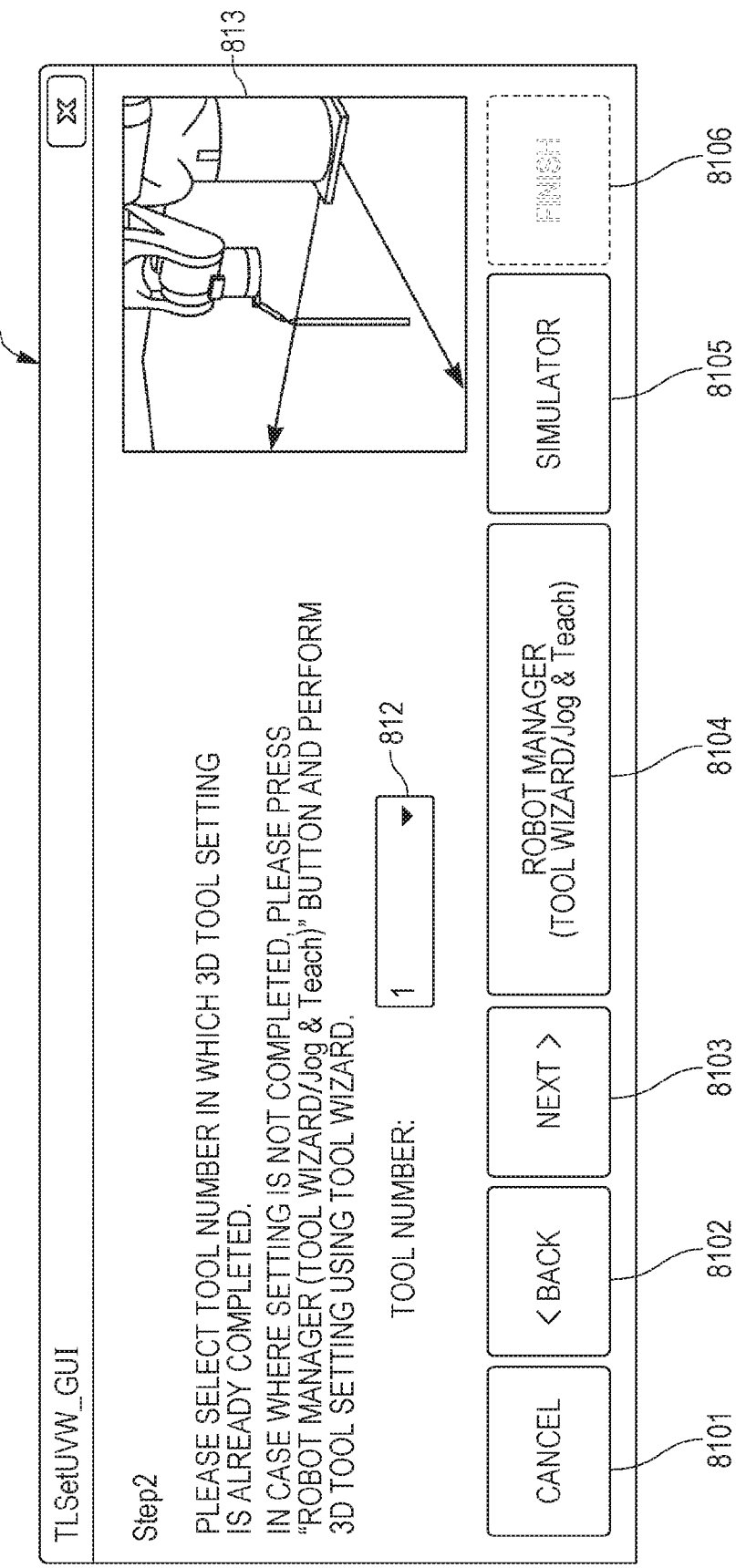
FIG. 60 is a posture setting guide screen of the robot vision system according to the second embodiment of the invention.

The second posture setting guide screen 81b is a screen for guiding input in step 2, and the posture setting guide screen 81b displays description of an operation illustrated in FIG. 60.

The posture setting guide screen 81b displays a drop-down list 812 for selecting a tool number, a picture image display unit 813, and the buttons 8101 to 8106. In the posture setting guide screen 81b, operation instructions are enabled to the buttons 8101 to 8105 among the buttons 8101 to 8106. The picture image display unit 813 displays an image illustrated in FIG. 60. The user can easily grasp what kind of input operation is required to be performed in step 2 based on the image displayed on the picture image display unit 813.

The button 8104 is a button (calling unit) for calling a position setting guide screen (not illustrated) that guides information input for obtaining the position offset of the tool 37.

In this manner, the display control unit 114 (computer 11) displays the button 8104 (calling unit) for calling the position setting guide screen (not illustrated) that guides the information input for obtaining the position offset of the tool 37 in the posture setting guide screen 81b. The position offset of the tool 37 refers to a deviation amount of an actual position of tool 37 with respect to a preset reference position. Accordingly, the user can easily and quickly perform the operation to input the information for obtaining the position offset of tool 37. The button 8104 for calling the position setting guide screen may be configured so as to be displayed on a screen other than the posture setting guide screens 81a to 81f.

In a case where the position offset of the tool 37 is already set, the user selects an already set tool number in the drop-down list 812 and presses the button 8103.

In a case where the position offset of the tool 37 is not yet set, the user presses the button 8104 and sets the position offset of the tool 37.

When the input control unit 115 receives the operation instruction with respect to the button 8104 by the user, the control unit 111 starts display processing of a group of guide screens (screen group) for position setting for displaying a plurality of position setting guide screens (instruction screen which is sub-window) in an interactive manner with the user. The detail description thereof will be omitted, but one example of one position setting guide screen of the plurality of position setting guide screens includes, for example, the jog operation group 521 illustrated in FIG. 17, the jog panel 54 illustrated in FIG. 18, and the like. The method of obtaining the position offset of the tool 37 is not particularly limited. For example, in a state where the tip end 372 of the tool 37 is positioned at the tip end 361 of the teaching tool 36 (refer to FIG. 71), the posture of the tool 37 is changed, for example, is set to three different postures, and the position offset of the tool 37 is obtained based on information in each posture.

In the following description, the case where the position offset of the tool 37 is already set will be continuously described as the example.

The user performs the predetermined operation in the posture setting guide screen 81b and then performs the operation instruction with respect to the button 8103. When the input control unit 115 receives the operation instruction with respect to the button 8103 by the user, that is, the selection of the tool number and the like (step S714), the image processing sequence editing unit 1115 performs an instruction to output a third posture setting guide screen 81c illustrated in FIG. 61 (step S715), and the display control unit 114 displays the third posture setting guide screen 81c illustrated in FIG. 61 on the display device 41 instead of the posture setting guide screen 81b.

Figure 61:
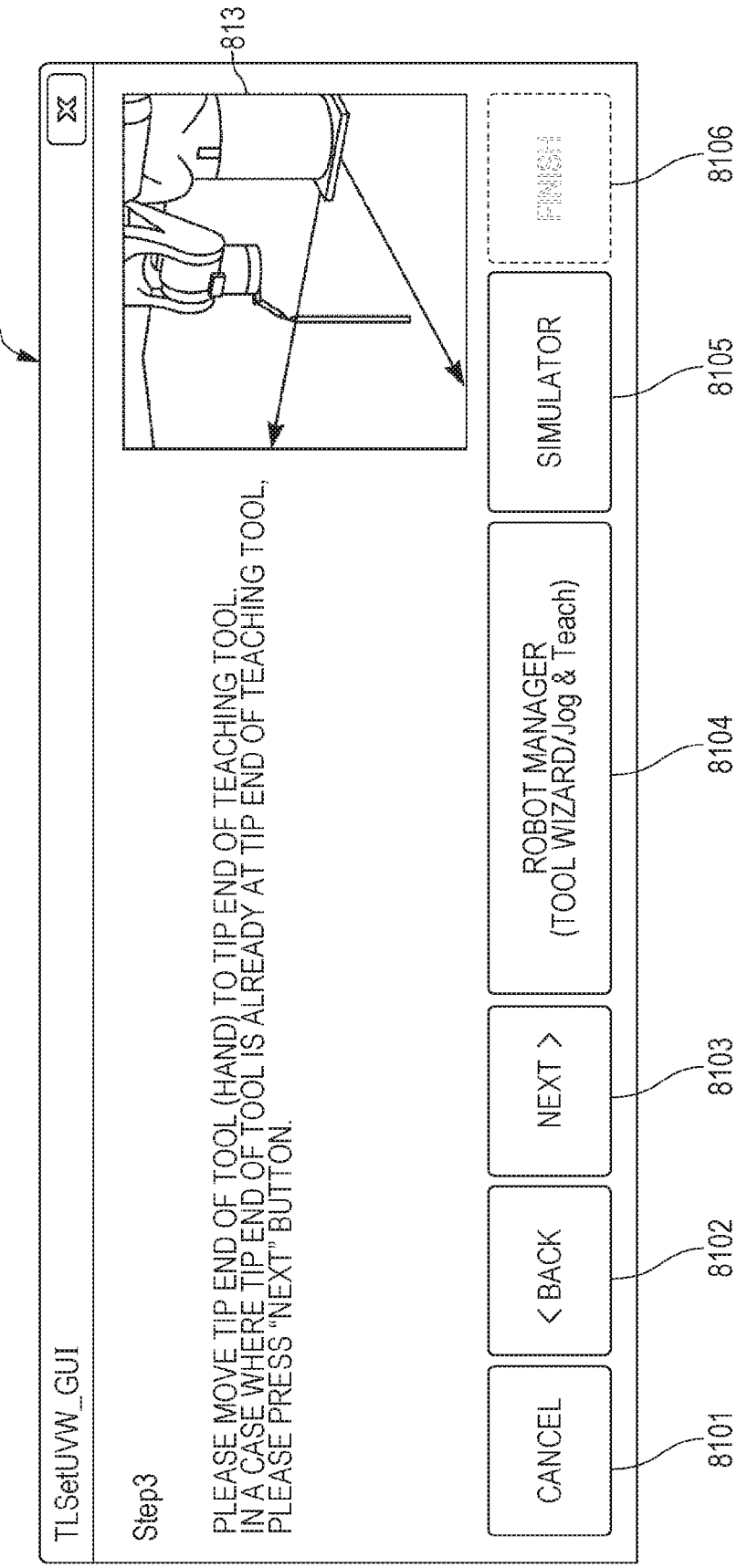
FIG. 61 is a posture setting guide screen of the robot vision system according to the second embodiment of the invention.

The third posture setting guide screen 81c is a screen for guiding input in step 3, and the posture setting guide screen 81c displays description of an operation illustrated in FIG. 61.

The posture setting guide screen 81c displays the buttons 8101 to 8106. In the posture setting guide screen 81c, operation instructions are enabled to the buttons 8101 to 8105 among the buttons 8101 to 8106. The picture image display unit 813 displays the image illustrated in FIG. 61. The user can easily grasp what kind of input operation is required to be performed in step 3 based on the image displayed on the picture image display unit 813.

As illustrated in FIG. 71, the user operates the robot 2a and moves the tip end 372 of the tool 37 to the tip end 361 of the teaching tool 36. In the case, an axial direction of the rotation axis O6 (refer to FIG. 56) and the vertical direction may coincide with each other or may not coincide, but coincide with each other in the embodiment.

The user performs the predetermined operation in the posture setting guide screen 81c and then performs the operation instruction with respect to the button 8103. When the input control unit 115 receives the operation instruction with respect to the button 8103 by the user, that is, that the movement of the tip end 372 (first point) of the tool 37 to the tip end 361 of the teaching tool 36 is finished (step S716), the image processing sequence editing unit 1115 performs an instruction to output a fourth posture setting guide screen 81d illustrated in FIG. 62 (step S717), and the display control unit 114 displays the fourth posture setting guide screen 81d illustrated in FIG. 62 on the display device 41 instead of the posture setting guide screen 81c.

Figure 62:
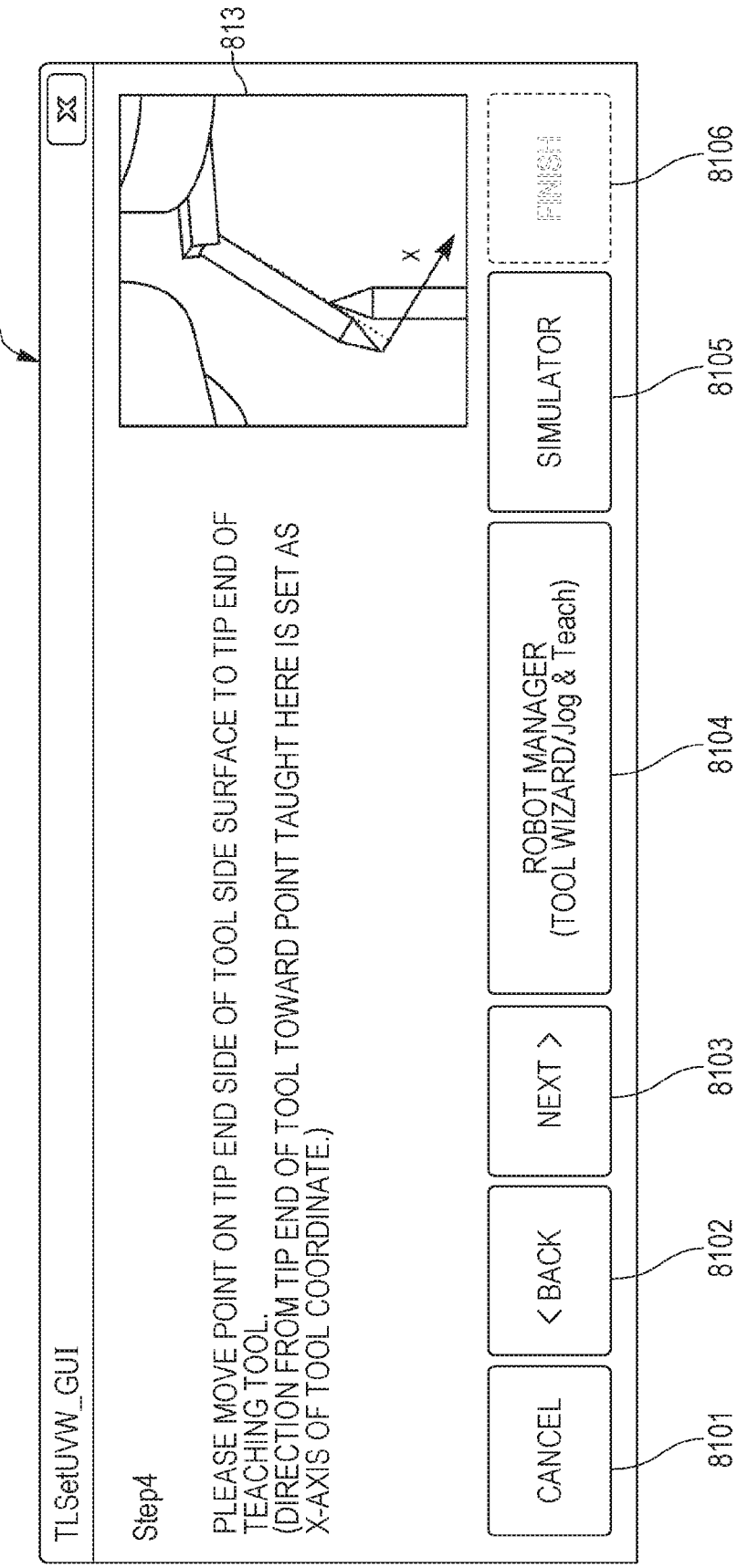
FIG. 62 is a posture setting guide screen of the robot vision system according to the second embodiment of the invention.

The fourth posture setting guide screen 81d is a screen for guiding input in step 4, and the posture setting guide screen 81d displays description of an operation illustrated in FIG. 62.

The posture setting guide screen 81d displays the buttons 8101 to 8106. In the posture setting guide screen 81d, operation instructions are enabled to the buttons 8101 to 8105 among the buttons 8101 to 8106. The picture image display unit 813 displays an image illustrated in FIG. 62. The user can easily grasp what kind of input operation is required to be performed in step 4 based on the image displayed on the picture image display unit 813.

Figure 72:
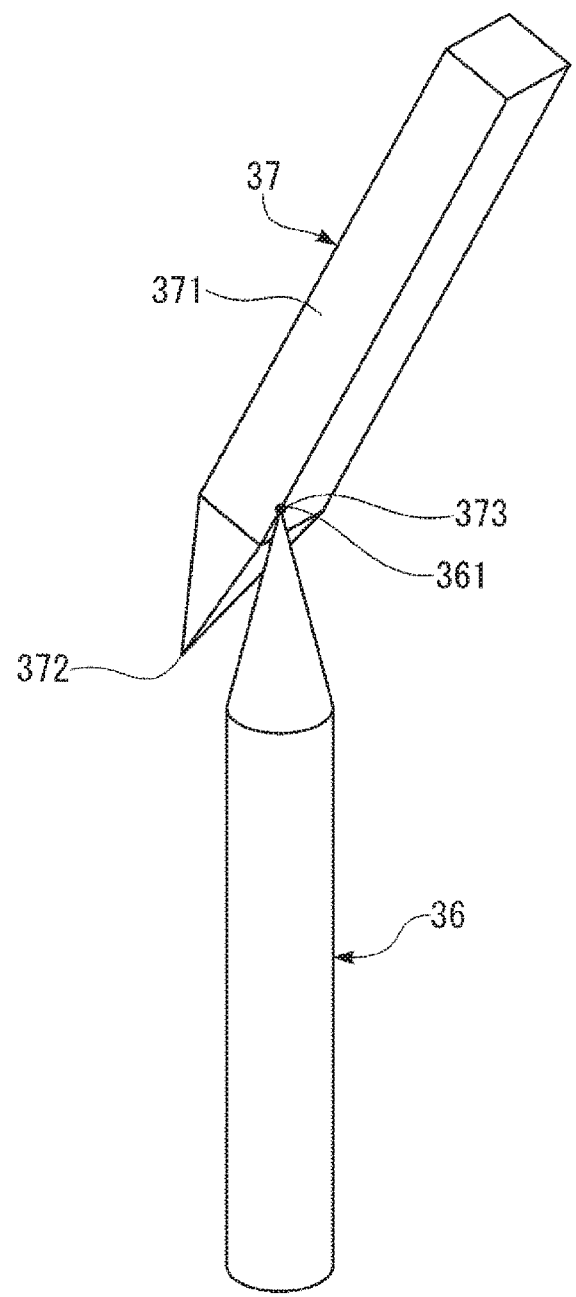
FIG. 72 is a diagram for describing the tool setting of the robot vision system according to the second embodiment of the invention.

As illustrated in FIG. 72, the user operates the robot 2a and moves a point 373 on the tip end side of the side surface of the tool 37 to the tip end 361 of the teaching tool 36.

The user performs the predetermined operation in the posture setting guide screen 81d and then performs the operation instruction with respect to the button 8103. When the input control unit 115 receives the operation instruction with respect to the button 8103 by the user, that is, that the movement of the point 373 (second point) on the tip end side of the side surface of the tool 37 to the tip end 361 of the teaching tool 36 is finished (step S718), the image processing sequence editing unit 1115 performs an instruction to output a fifth posture setting guide screen 81e illustrated in FIG. 63 (step S719), and the display control unit 114 displays the fifth posture setting guide screen 81e illustrated in FIG. 63 on the display device 41 instead of the posture setting guide screen 81d.

Figure 63:
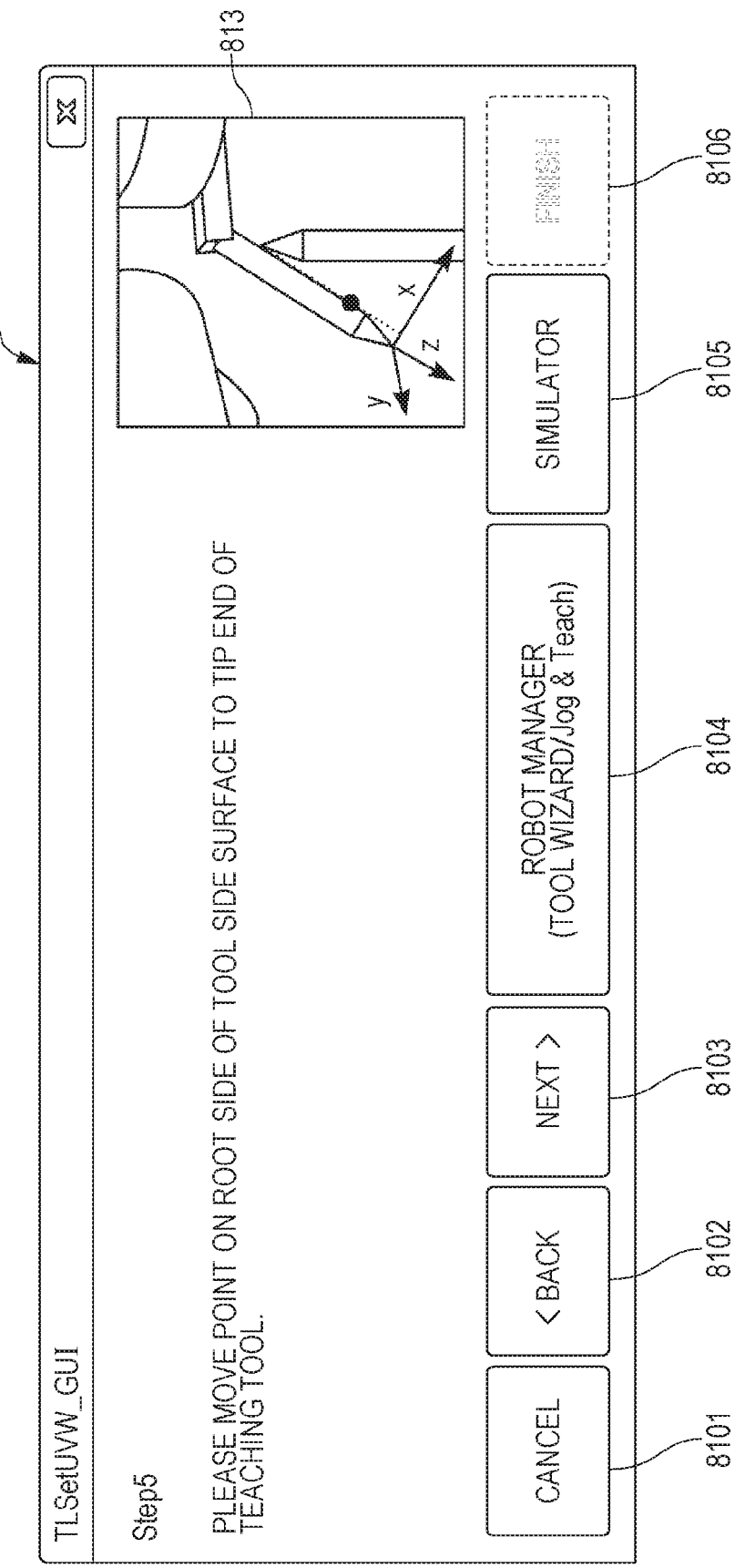
FIG. 63 is a posture setting guide screen of the robot vision system according to the second embodiment of the invention.

The fifth posture setting guide screen 81e is a screen for guiding input in step 5, and the posture setting guide screen 81e displays description of an operation illustrated in FIG. 63.

The posture setting guide screen 81e displays the buttons 8101 to 8106. In the posture setting guide screen 81e, operation instructions are enabled to the buttons 8101 to 8105 among the buttons 8101 to 8106. The picture image display unit 813 displays an image illustrated in FIG. 63. The user can easily grasp what kind of input operation is required to be performed in step 5 based on the image displayed on the picture image display unit 813.

Figure 73:
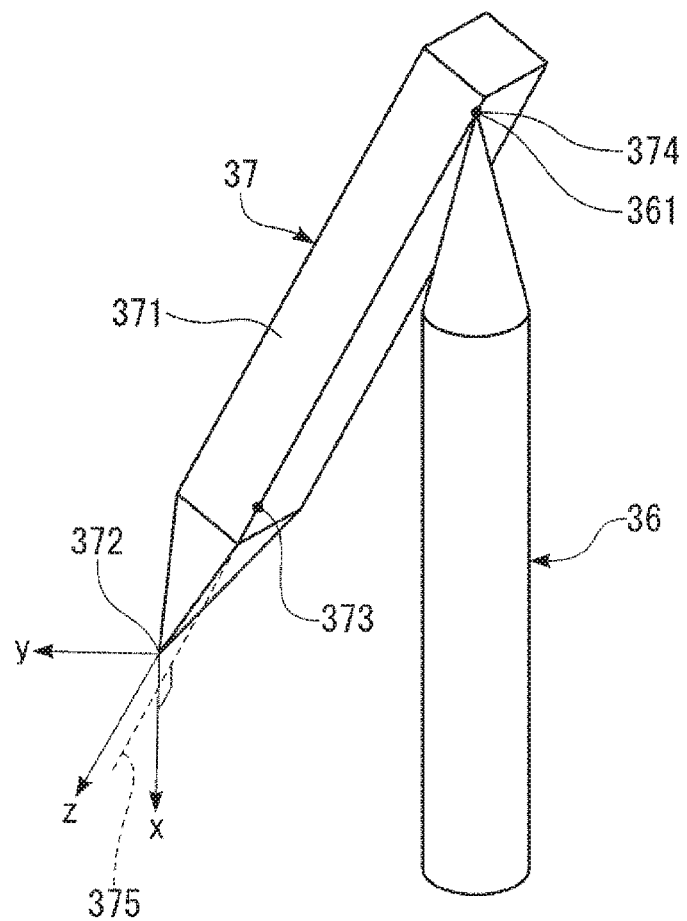
FIG. 73 is a diagram for describing the tool setting of the robot vision system according to the second embodiment of the invention.

As illustrated in FIG. 73, the user operates the robot 2a and moves a point 374 on the base end side of the side surface of the tool 37 to the tip end 361 of the teaching tool 36. The point 374 is the different point from the point 373 and is a point on the same side as the side on which the point 373 is positioned.

The user performs the predetermined operation in the posture setting guide screen 81e and then performs the operation instruction with respect to the button 8103. When the input control unit 115 receives the operation instruction with respect to the button 8103 by the user, that is, that the movement of the point 374 (third point) on the base end side (root side) of the side surface of the tool 37 to the tip end 361 of the teaching tool 36 is finished (step S720), the control unit 111 obtains the posture offset of the tool 37 based on each piece of information input so far, the image processing sequence editing unit 1115 performs an instruction to output a sixth posture setting guide screen 81f illustrated in FIG. 64 (step S721), and the display control unit 114 displays the sixth posture setting guide screen 81f illustrated in FIG. 64 on the display device 41 instead of the posture setting guide screen 81e.

Figure 64:
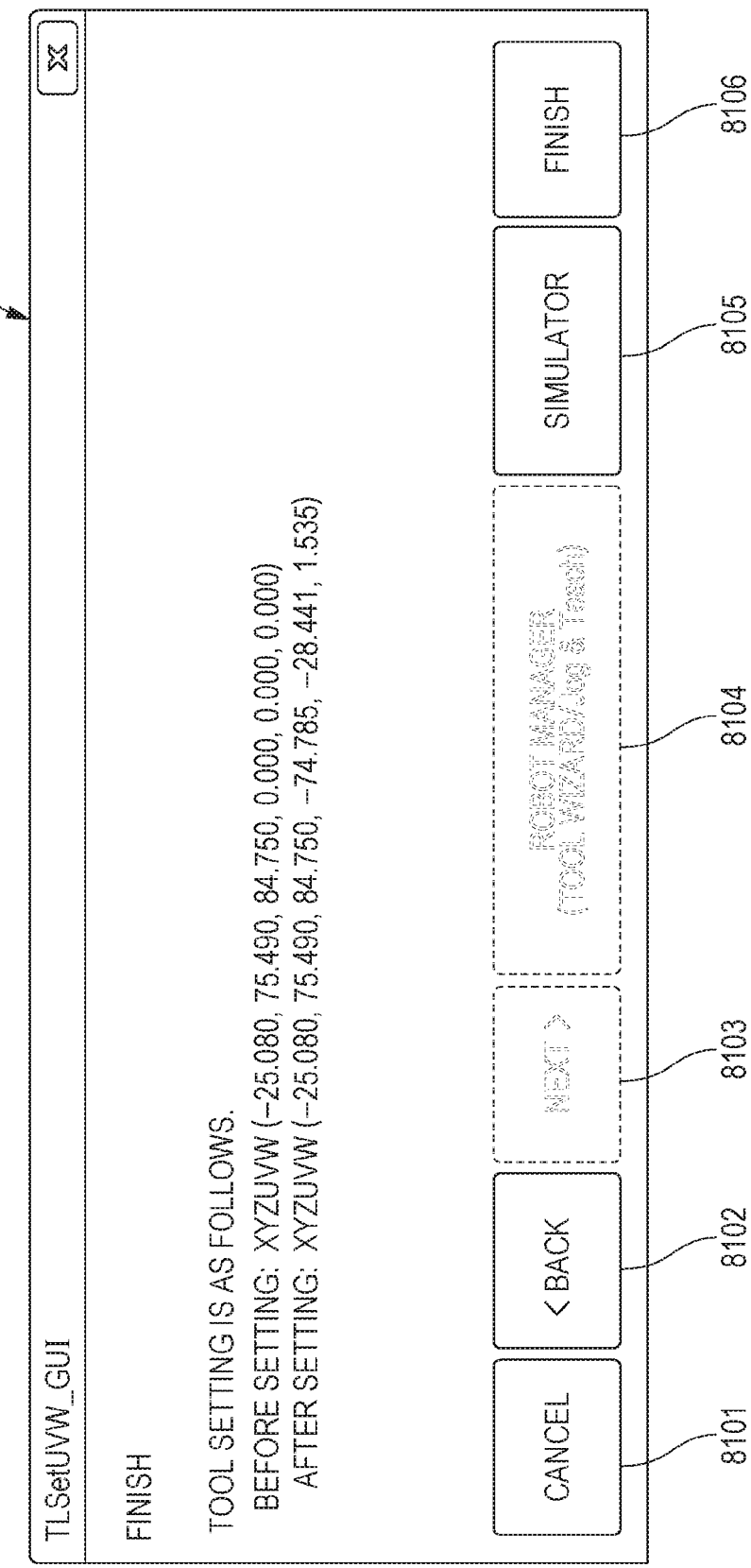
FIG. 64 is a posture setting guide screen of the robot vision system according to the second embodiment of the invention.

The sixth posture setting guide screen 81f is a screen for guiding input in a confirmation step (final step), and the posture setting guide screen 81f displays information before and after the setting of the posture offset of the tool 37 illustrated in FIG. 64. That is, in the example, it is displayed that a setting value (X, Y, Z, U, V, W) of the offset of the tool 37 is (−25.080, 75.490, 84.750, 0.000, 0.000, 0.000) before the setting (current state) of the posture offset of the tool 37, and a setting value (X, Y, Z, U, V, W) of the offset of the tool 37 is changed to (−25.080, 75.490, 84.750, −74.785, −28.441, 1.535) after the setting of the posture offset of the tool 37.

When the posture offset of the tool 37 is set, a tool coordinate system which is the three-dimensional orthogonal coordinate system having mutually orthogonal x-axis, y-axis, and z-axis illustrated in FIG. 73 is set.

In the case, the original point of the tool coordinate system is the tip end 372 of the tool 37. The x-axis is orthogonal to a straight line 375 passing through the point 373 and the point 374, and passes through the tip end 372 of the tool 37. The z-axis is parallel to or coincident with the straight line 375 (parallel in the example illustrated in FIG. 73) and passes through the tip end 372 of the tool 37. The y-axis is orthogonal to x-axis and z-axis, and is an axis obtained by rotating x-axis clockwise by 90° when viewed in the positive direction of z-axis from the original point.

The posture setting guide screen 81f displays the buttons 8101 to 8106. In the posture setting guide screen 81f, operation instructions are enabled to the buttons 8101, 8102, 8105, and 8106 among the buttons 8101 to 8106.

The user confirms the information before and after the tool setting in the posture setting guide screen 81f and performs an operation instruction with respect to the button 8106. When the input control unit 115 receives the operation instruction with respect to the button 8106 by the user, that is, a setting instruction (step S722), the control unit 111 performs the tool setting (step S723). The posture offset of the tool 37 has been set.

Next, the tool setting of the planar-shaped tool 38 will be described. The differences from the tool setting of the tool 37 described above will be mainly described, and description of the same matters will be omitted.

Figure 65:
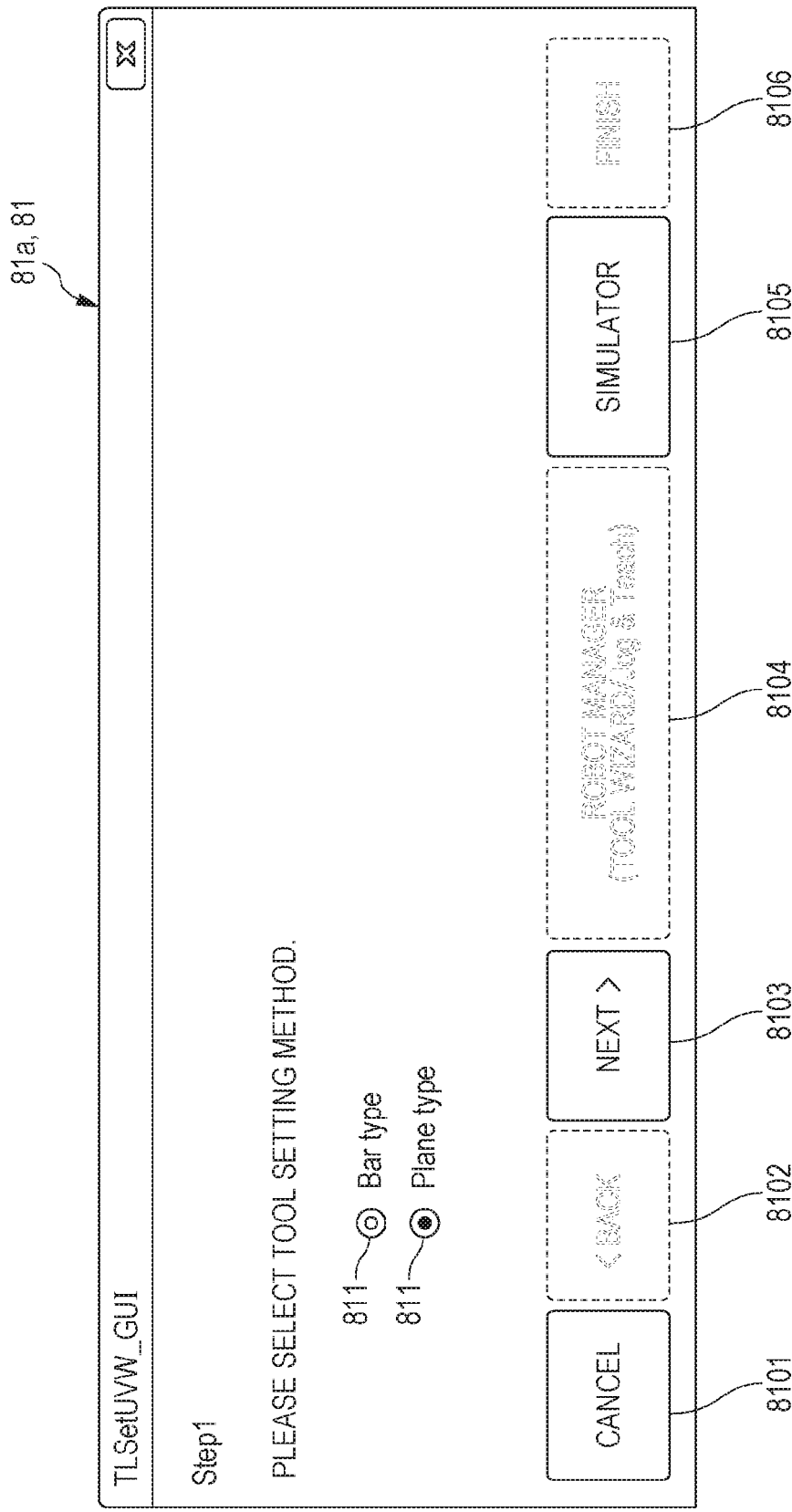
FIG. 65 is a posture setting guide screen of the robot vision system according to the second embodiment of the invention.

The user selects "Plane type" with the radio button 811 in the first posture setting guide screen 81a illustrated in FIG. 65 and performs the operation instruction with respect to the button 8103. When the input control unit 115 receives the operation instruction with respect to the button 8103 by the user, that is, the selection ("Plane type") of the tool setting method (step S712), the image processing sequence editing unit 1115 performs an instruction to output a second posture setting guide screen 81g illustrated in FIG. 66 (step S713), and the display control unit 114 displays the second posture setting guide screen 81g illustrated in FIG. 66 on the display device 41 instead of the posture setting guide screen 81a.

Figure 66:
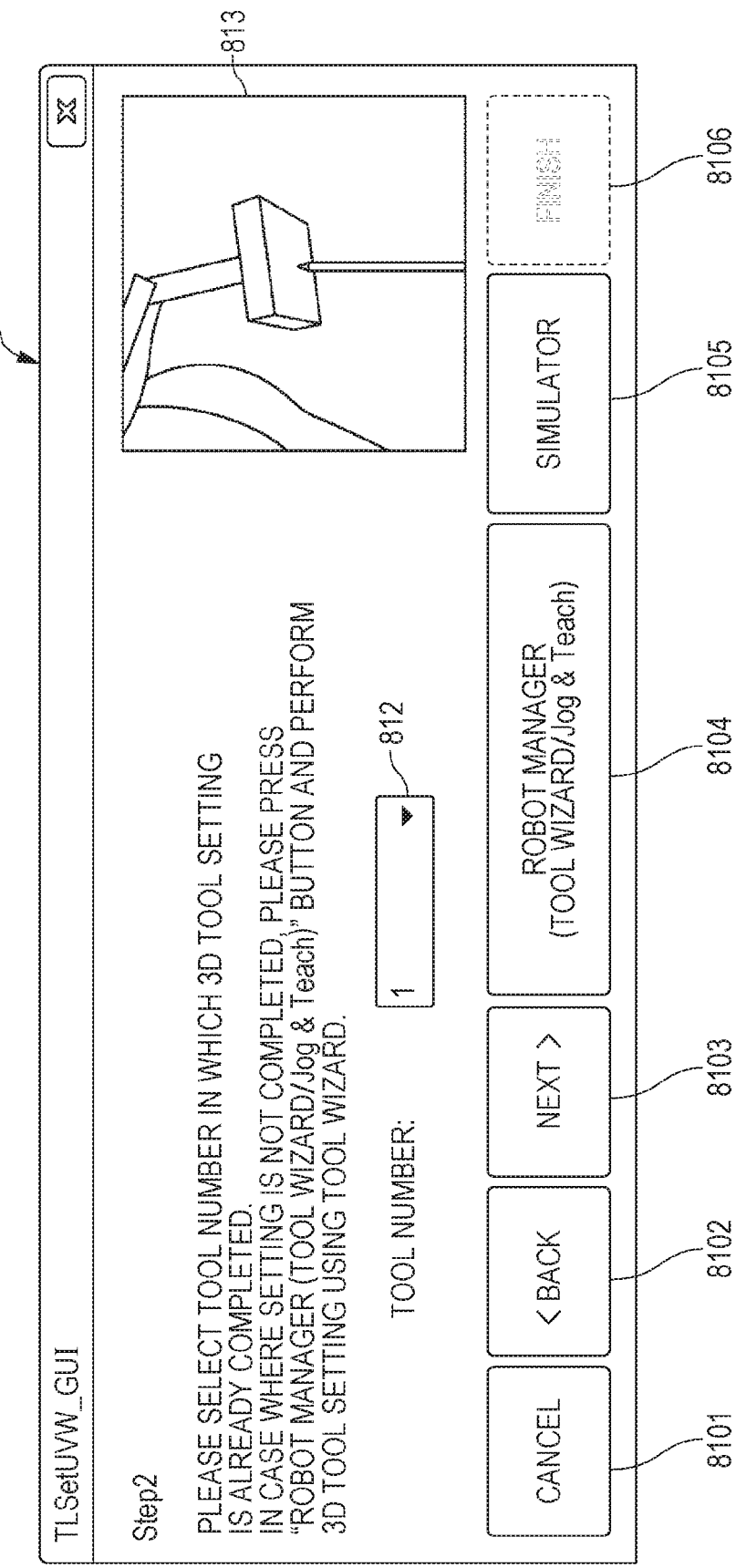
FIG. 66 is a posture setting guide screen of the robot vision system according to the second embodiment of the invention.

The second posture setting guide screen 81g is a screen for guiding input in step 2, and the posture setting guide screen 81g displays description of an operation illustrated in FIG. 66.

The posture setting guide screen 81g displays the drop-down list 812 for selecting a tool number, the picture image display unit 813, and the buttons 8101 to 8106. In the posture setting guide screen 81g, operation instructions are enabled to the buttons 8101 to 8105 among the buttons 8101 to 8106. The picture image display unit 813 displays an image illustrated in FIG. 66. The user can easily grasp what kind of input operation is required to be performed in step 2 based on the image displayed on the picture image display unit 813.

In a case where the position offset of the tool 38 is already set, the user selects an already set tool number in the drop-down list 812 and presses the button 8103.

In a case where the position offset of the tool 38 is not yet set, the user presses the button 8104 and sets the position offset of the tool 38.

In the following description, the case where the position offset of the tool 38 is already set will be continuously described as the example.

The user performs the predetermined operation in the posture setting guide screen 81g and then performs the operation instruction with respect to the button 8103. When the input control unit 115 receives the operation instruction with respect to the button 8103 by the user, that is, the selection of the tool number and the like (step S714), the image processing sequence editing unit 1115 performs an instruction to output a third posture setting guide screen 81h illustrated in FIG. 67 (step S715), and the display control unit 114 displays the third posture setting guide screen 81h illustrated in FIG. 67 on the display device 41 instead of the posture setting guide screen 81g.

Figure 67:
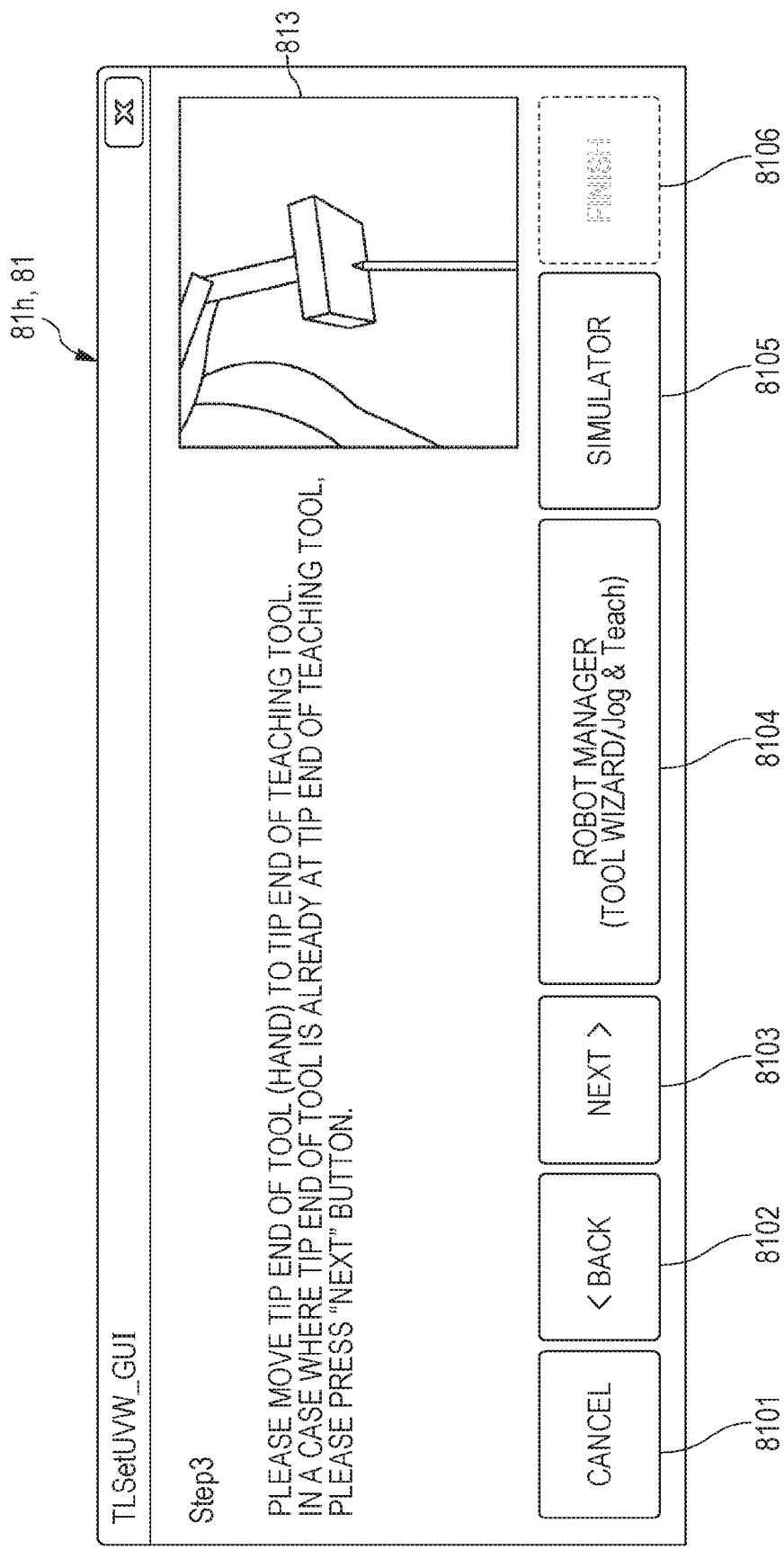
FIG. 67 is a posture setting guide screen of the robot vision system according to the second embodiment of the invention.

The third posture setting guide screen 81h is a screen for guiding input in step 3, and the posture setting guide screen 81h displays description of an operation illustrated in FIG. 67.

The posture setting guide screen 81h displays the buttons 8101 to 8106. In the posture setting guide screen 81h, operation instructions are enabled to the buttons 8101 to 8105 among the buttons 8101 to 8106. The picture image display unit 813 displays the image illustrated in FIG. 67. The user can easily grasp what kind of input operation is required to be performed in step 3 based on the image displayed on the picture image display unit 813.

As illustrated in FIG. 74, the user operates the robot 2a and moves the center point 383 at the front end surface 382 of the tool 38 to the tip end 361 of the teaching tool 36. In the case, an axial direction of the rotation axis O6 (refer to FIG. 57) and the vertical direction may coincide with each other or may not coincide, but coincide with each other in the embodiment.

The user performs the predetermined operation in the posture setting guide screen 81h and then performs the operation instruction with respect to the button 8103. When the input control unit 115 receives the operation instruction with respect to the button 8103 by the user, that is, that the movement of the center point 383 (first point) at the front end surface 382 of the tool 38 to the tip end 361 of the teaching tool 36 is finished (step S716), the image processing sequence editing unit 1115 performs an instruction to output a fourth posture setting guide screen 81i illustrated in FIG. 68 (step S717), and the display control unit 114 displays the fourth posture setting guide screen 81i illustrated in FIG. 68 on the display device 41 instead of the posture setting guide screen 81h.

Figure 68:
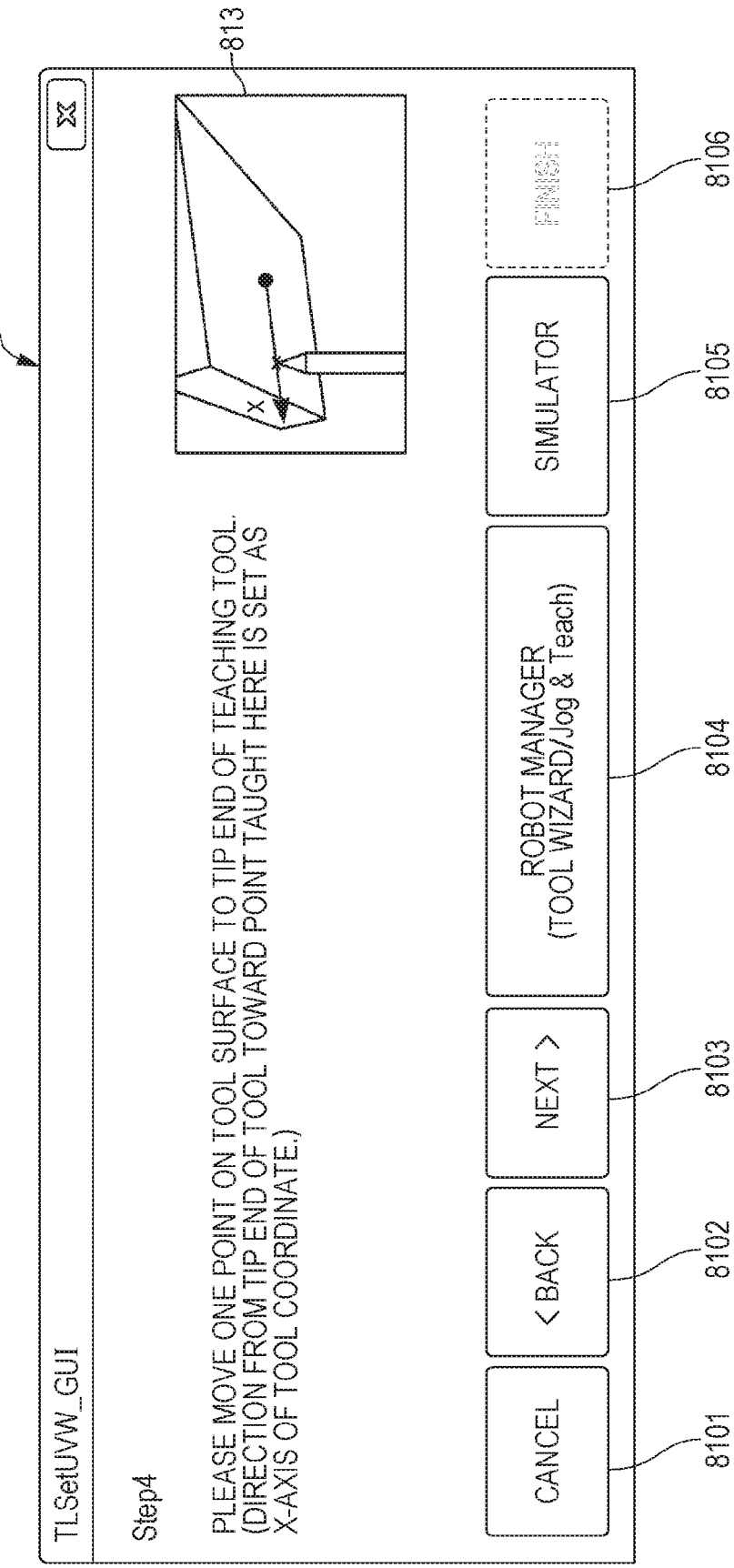
FIG. 68 is a posture setting guide screen of the robot vision system according to the second embodiment of the invention.

The fourth posture setting guide screen 81i is a screen for guiding input in step 4, and the posture setting guide screen 81i displays description of an operation illustrated in FIG. 68.

The posture setting guide screen 81i displays the buttons 8101 to 8106. In the posture setting guide screen 81i, operation instructions are enabled to the buttons 8101 to 8105 among the buttons 8101 to 8106. The picture image display unit 813 displays an image illustrated in FIG. 68. The user can easily grasp what kind of input operation is required to be performed in step 4 based on the image displayed on the picture image display unit 813.

Figure 75:
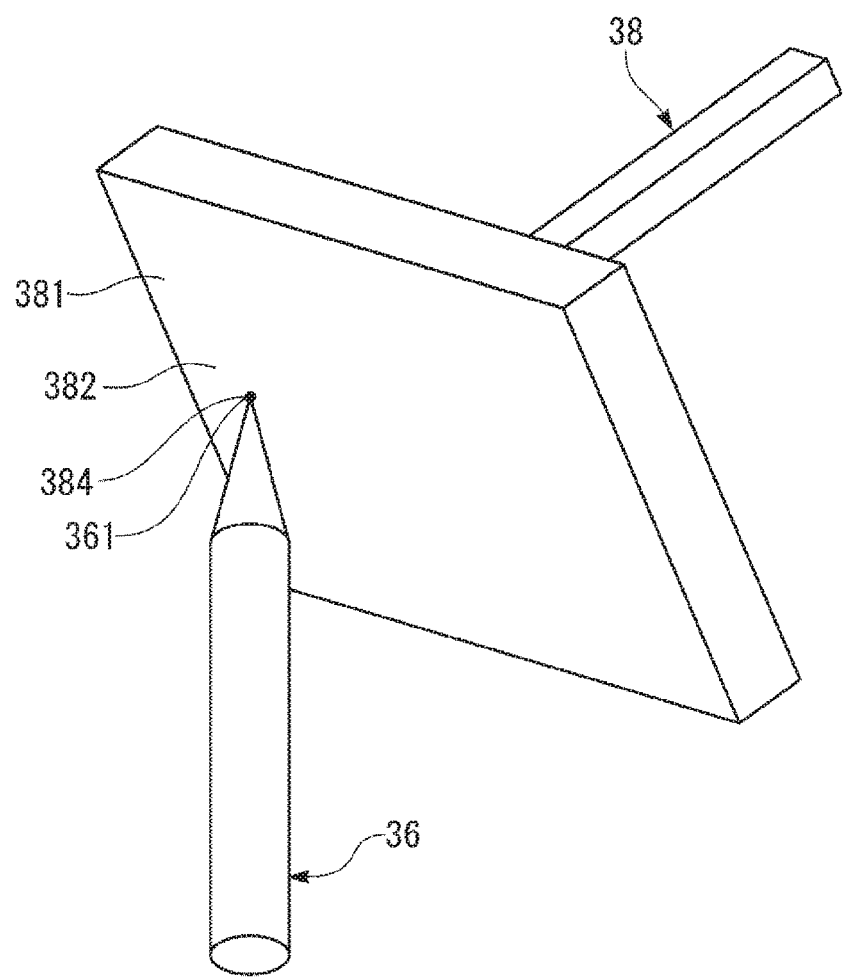
FIG. 75 is a diagram for describing the tool setting of the robot vision system according to the second embodiment of the invention.

As illustrated in FIG. 75, the user operates the robot 2a and moves a point 384 different from the center point 383 at the front end surface 382 of the tool 38 to the tip end 361 of the teaching tool 36. A position of the point 384 is not particularly limited as long as the position is different from the position of the point 383, but in the embodiment, is a position deviated from the center of a side (side extending in horizontal direction of FIG. 75) orthogonal to the side at the center of a predetermined side (side extending in vertical direction of FIG. 75) of the front end surface 382.

The user performs the predetermined operation in the posture setting guide screen 81i and then performs the operation instruction with respect to the button 8103. When the input control unit 115 receives the operation instruction with respect to the button 8103 by the user, that is, that the movement of the point 384 (second point) of the front end surface 382 of the tool 38 to the tip end 361 of the teaching tool 36 is finished (step S718), the image processing sequence editing unit 1115 performs an instruction to output a fifth posture setting guide screen 81*j* illustrated in FIG. 69 (step S719), and the display control unit 114 displays the fifth posture setting guide screen 81*j* illustrated in FIG. 69 on the display device 41 instead of the posture setting guide screen 81*i*.

Figure 69:
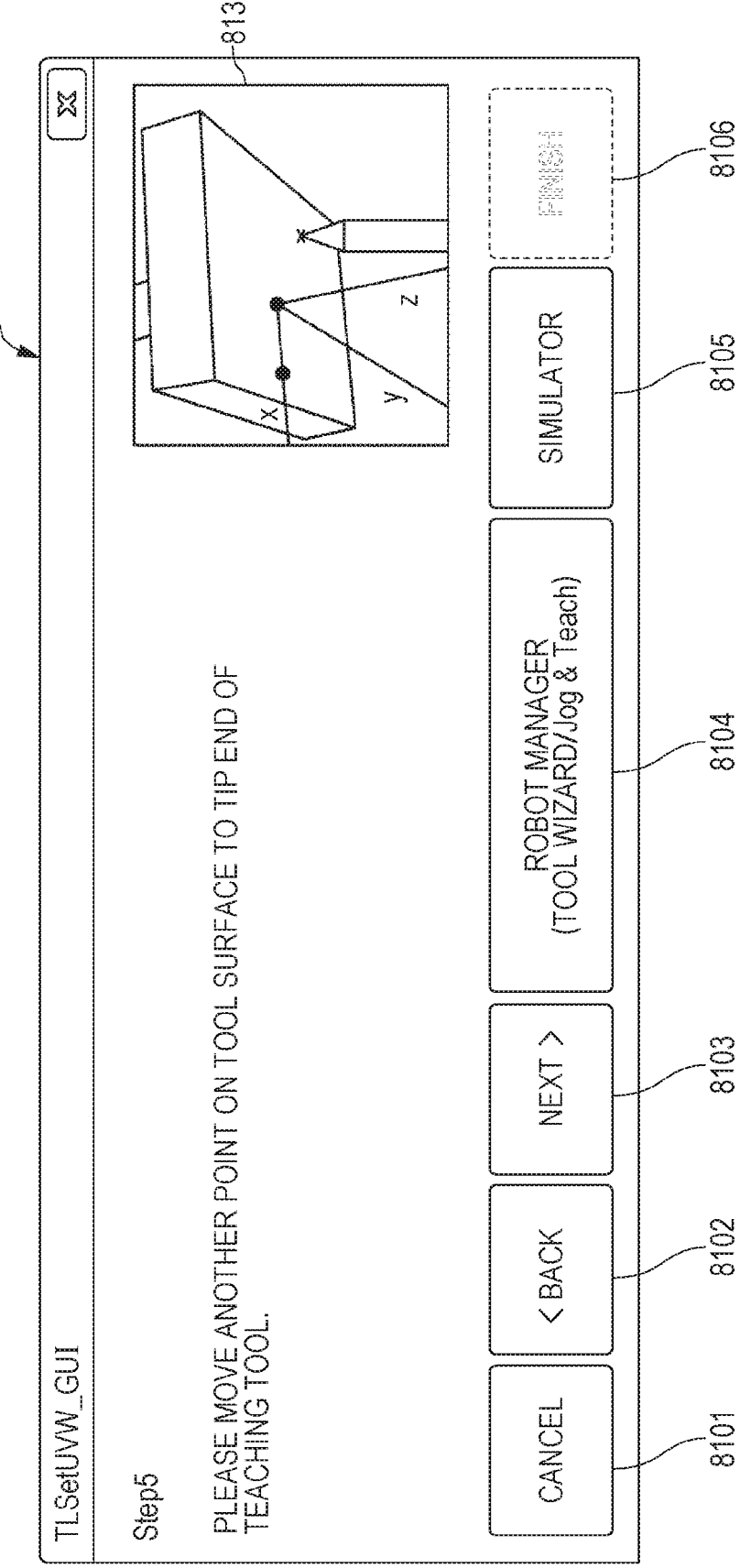
FIG. 69 is a posture setting guide screen of the robot vision system according to the second embodiment of the invention.

The fifth posture setting guide screen 81*j* is a screen for guiding input in step 5, and the posture setting guide screen 81*j* displays description of an operation illustrated in FIG. 69.

The posture setting guide screen 81*j* displays the buttons 8101 to 8106. In the posture setting guide screen 81*j*, operation instructions are enabled to the buttons 8101 to 8105 among the buttons 8101 to 8106. The picture image display unit 813 displays an image illustrated in FIG. 69. The user can easily grasp what kind of input operation is required to be performed in step 5 based on the image displayed on the picture image display unit 813.

Figure 76:
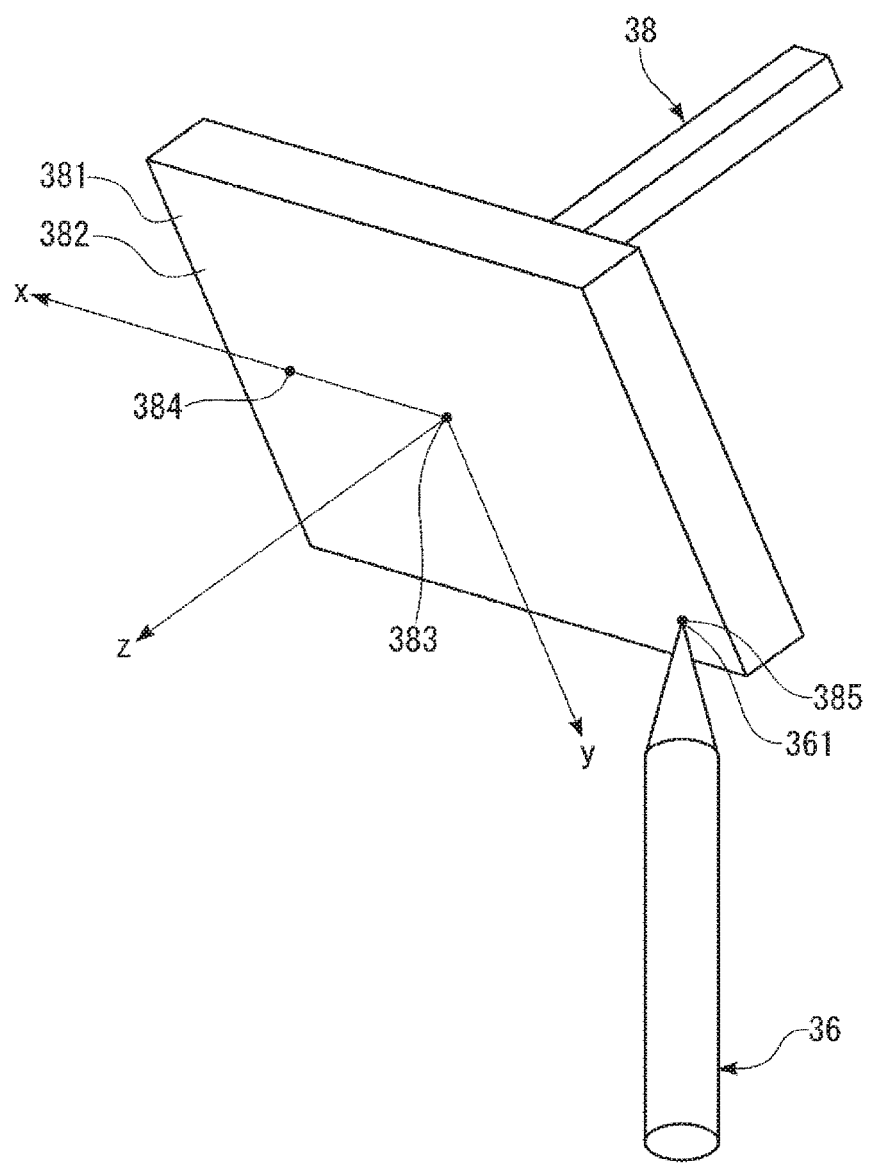
FIG. 76 is a diagram for describing the tool setting of the robot vision system according to the second embodiment of the invention.

As illustrated in FIG. 76, the user operates the robot 2*a* and moves a point 385 different from the center point 383 at the front end surface 382 of the tool 38 and the point 384 to the tip end 361 of the teaching tool 36. A position of the point 385 is not particularly limited as long as the position is different from the respective positions of the point 383 and point 384 and is not on a straight line passing through the point 383 and point 384, and is appropriately set.

The user performs the predetermined operation in the posture setting guide screen 81*j* and then performs the operation instruction with respect to the button 8103. When the input control unit 115 receives the operation instruction with respect to the button 8103 by the user, that is, that the movement of the point 385 (third point) of the front end surface 382 of the tool 38 to the tip end 361 of the teaching tool 36 is finished (step S720), the control unit 111 obtains the posture offset of the tool 37 based on each piece of information input so far, the image processing sequence editing unit 1115 performs an instruction to output a sixth posture setting guide screen 81*k* illustrated in FIG. 70 (step S721), and the display control unit 114 displays the sixth posture setting guide screen 81*k* illustrated in FIG. 70 on the display device 41 instead of the posture setting guide screen 81*j*.

Figure 70:
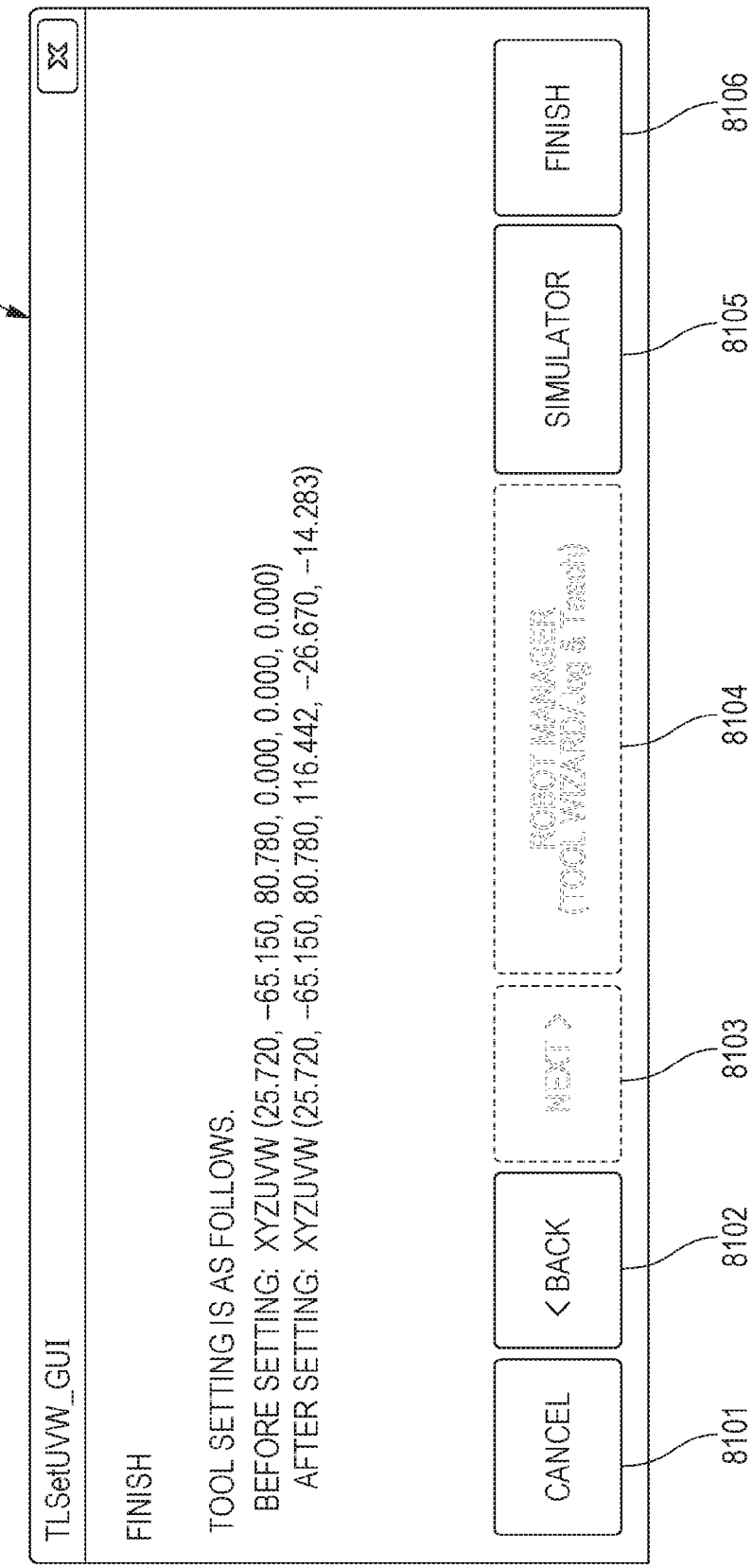
FIG. 70 is a posture setting guide screen of the robot vision system according to the second embodiment of the invention.

The sixth posture setting guide screen 81*k* is a screen for guiding input in a confirmation step (final step), and the posture setting guide screen 81*k* displays information before and after the setting of the posture offset of the tool 38 illustrated in FIG. 70. That is, in the example, it is displayed that a setting value (X, Y, Z, U, V, W) of the offset of the tool 38 is (25.720, −65.150, 80.780, 0.000, 0.000, 0.000) before the setting (current state) of the posture offset of the tool 38, and a setting value (X, Y, Z, U, V, W) of the offset of the tool 38 is changed to (25.720, −65.150, 80.780, 116.442, −26.670, −14.283) after the setting of the posture offset of the tool 38.

When the posture offset of the tool 38 is set, a tool coordinate system which is the three-dimensional orthogonal coordinate system having mutually orthogonal x-axis, y-axis, and z-axis illustrated in FIG. 76 is set.

In the case, the original point of the tool coordinate system is the center point 383 at the front end surface 382 of the tool 38. The x-axis passes through the point 383 and the point 384. The z-axis is perpendicular to the front end surface 382 and passes through the point 383. The y-axis is orthogonal to x-axis and z-axis, and is an axis obtained by rotating x-axis clockwise by 90° when viewed in the positive direction of z-axis from the original point.

The posture setting guide screen 81*k* displays the buttons 8101 to 8106. In the posture setting guide screen 81*k*, operation instructions are enabled to the buttons 8101, 8102, 8105, and 8106 among the buttons 8101 to 8106.

The user confirms the information before and after the tool setting in the posture setting guide screen 81*k* and performs an operation instruction with respect to the button 8106. When the input control unit 115 receives the operation instruction with respect to the button 8106 by the user, that is, a setting instruction (step S722), the control unit 111 performs the tool setting (step S723). The posture offset of the tool 38 has been set.

According to such second embodiment, the same effects as those of the embodiment described above can be exerted.

It is possible to easily and quickly perform the operation to input the information for obtaining the posture offsets of tools 37 and 38.

It is possible to easily and accurately set the tools 37 and 38 in a desired posture according to postures of the tools 37 and 38 with respect to the robot arm 20 by obtaining the posture offsets of the tools 37 and 38 in addition to the position offsets of the tools 37 and 38.

In the embodiment, the case where the tip end 372 of the tool 37 is different from the point 373 on the tip end side of the side surface of the tool 37, and the tip end 372 of the tool 37, the point 373 on the tip end side of the side surface of the tool 37, and the point 374 on the base end side of the side surface of the tool 37 are not positioned on the same straight line is described in the setting of the posture offset of the bar-shaped tool 37.

However, it is possible to set the posture offset of the bar-shaped tool even in a case other than such configuration. Hereinafter, other configuration examples for setting the posture offset of the bar-shaped tool will be described.

Configuration 1

In a case where the tip end of a tool and a point on the tip end side of the side surface of the tool coincide with each other, and in a case where the tip end of the tool, the point on the tip end side of the side surface of the tool, and a point on the base end side of the side surface of the tool are positioned on the same straight line, any one of posture offsets U, V, and W of the tool is set to "0".

Configuration 2

In a case where the tip end of a tool and a point on the tip end side of the side surface of the tool coincide with each other, and in a case where the tip end of the tool, the point on the tip end side of the side surface of the tool, and a point on the base end side of the side surface of the tool are positioned on the same straight line, the user can set any one of posture offsets U, V, and W of the tool to a predetermined value.

The control device, the robot, and the robot system according to an aspect of the invention have been described based on the illustrated embodiments. However, the invention is not limited thereto, and the configuration of each unit can be replaced by any configuration having the same function. Another predetermined constituent may be added. The invention may be a combination of any two or more configurations (features) of respective embodiments described above.

The entire disclosure of Japanese Patent Application No. 2017-084801, filed Apr. 21, 2017 is expressly incorporated by reference herein.

What is claimed is:

1. A control device that controls driving of a robot, the robot having an end effector holding a tool for working with a target object on a work base, the control device comprising:
　a memory configured to store computer-executable instructions, a robot coordinate system of the robot, and an original tool coordinate system of the tool; and
　a processor configured to execute the computer-executable instructions so as to:
　　cause the end effector holding the tool to move to a first position in which a tip of a teaching tool disposed on the work base contacts a first point of the tool;
　　measure a first coordinate of the first point of the tool and a first posture of the tool with respect to the robot coordinate system and the original tool coordinate system when the end effector is located at the first position;
　　cause the end effector holding the tool to move to a second position in which the tip of the teaching tool contacts a second point of the tool;
　　measure a second coordinate of the second point of the tool and a second posture of the tool with respect to the robot coordinate system and the original tool coordinate system when the end effector is located at the second position;
　　cause the end effector holding the tool to move to a third position in which the tip of the teaching tool contacts a third point of the tool;
　　measure a third coordinate of the third point of the tool and a third posture of the tool with respect to the robot coordinate system and the original tool coordinate system when the end effector is located at the third position;
　　calibrate the original tool coordinate system based on the measured first, second, and third coordinates of the tool and the measured first, second, and third postures of the tool and create a calibrated tool coordinate system of the tool; and
　　control the driving of the robot based on the robot coordinate system and the calibrated tool coordinate system to cause the tool to work with the target object.

2. The control device according to claim 1,
wherein in the calibration of the original tool coordinate system, the processor is configured to compare between the measured first, second, and third postures of the tool and corresponding first, second, and third predetermined reference postures of the tool and to obtain deviation amount values therebetween, respectively, and
the processor is configured to create the calibrated tool coordinate system based on the deviation amount values.

3. The control device according to claim 1,
wherein the tool is in either a bar shape or a planar shape.

4. The control device according to claim 1,
wherein the processor is configured to receive instructions via an input interface from an operator, and
the instructions correspond to the first, second, and third positions to which the end effector holding the tool moves.

5. The control device according to claim 2,
wherein the processor is configured to receive instructions via an input interface from an operator, and
the instructions correspond to the first, second, and third positions to which the end effector holding the tool moves.

6. The control device according to claim 3,
wherein the processor is configured to receive instructions via an input interface from an operator, and
the instructions correspond to the first, second, and third positions to which the end effector holding the tool moves.

7. The control device according to claim 1,
wherein the processor is configured to display first and second information on a display, and the first and second information correspond to the original tool coordinate system and the calibrated tool coordinate system, respectively.

8. The control device according to claim 2,
wherein the processor is configured to display first and second information on a display, and the first and second information correspond to the original tool coordinate system and the calibrated tool coordinate system, respectively.

9. The control device according to claim 3,
wherein the processor is configured to display first and second information on a display, and the first and second information correspond to the original tool coordinate system and the calibrated tool coordinate system, respectively.

10. The control device according to claim 4,
wherein the processor is configured to display first and second information on a display, and the first and second information correspond to the original tool coordinate system and the calibrated tool coordinate system, respectively.

11. A robot system comprising:
　a robot;
　an input interface configured to receive instructions from an operator;
　a display; and
　a control device, the control device including:
　　a memory configured to store computer-executable instructions, a robot coordinate system of the robot, and an original tool coordinate system of the tool; and
　　a processor configured to execute the computer-executable instructions so as to:
　wherein the processor is configured to:
　　cause the end effector holding the tool to move to a first position in which a tip of a teaching tool disposed on the work base contacts a first point of the tool;
　　measure a first coordinate of the first point of the tool and a first posture of the tool with respect to the robot coordinate system and the original tool coordinate system when the end effector is located at the first position;
　　cause the end effector holding the tool to move to a second position in which the tip of the teaching tool contacts a second point of the tool;
　　measure a second coordinate of the second point of the tool and a second posture of the tool with respect to the robot coordinate system and the original tool coordinate system when the end effector is located at the second position;
　　cause the end effector holding the tool to move to a third position in which the tip of the teaching tool contacts a third point of the tool;
　　measure a third coordinate of the third point of the tool and a third posture of the tool with respect to the robot coordinate system and the original tool coordinate system when the end effector is located at the third position;

calibrate the original tool coordinate system based on the measured first, second, and third coordinates of the tool and the measured first, second, and third postures of the tool and create a calibrated tool coordinate system of the tool; and control the driving of the robot based on the robot coordinate system and the calibrated tool coordinate system to cause the tool to work with the target object.

12. The robot system according to claim 11, wherein in the calibration of the original tool coordinate system, the processor is configured to compare between the measured first, second, and third postures of the tool and corresponding first, second, and third predetermined reference postures of the tool and to obtain deviation amount values therebetween, respectively, and the processor is configured to create the calibrated tool coordinate system based on the deviation amount values.

13. The robot system according to claim 11, wherein the tool is in either a bar shape or a planar shape.

14. The robot system according to claim 11, wherein the processor is configured to receive instructions via an input interface from an operator, and the instructions correspond to the first, second, and third positions to which the end effector holding the tool moves.

15. The robot system according to claim 12, wherein the processor is configured to receive instructions via an input interface from an operator, and the instructions correspond to the first, second, and third positions to which the end effector holding the tool moves.

16. The robot system according to claim 13, wherein the processor is configured to receive instructions via an input interface from an operator, and the instructions correspond to the first, second, and third positions to which the end effector holding the tool moves.

17. The robot system according to claim 11, wherein the processor is configured to display first and second information on a display, and the first and second information correspond to the original tool coordinate system and the calibrated tool coordinate system, respectively.

18. The robot system according to claim 12, wherein the processor is configured to display first and second information on a display, and the first and second information correspond to the original tool coordinate system and the calibrated tool coordinate system, respectively.

19. The robot system according to claim 13, wherein the processor is configured to display first and second information on a display, and the first and second information correspond to the original tool coordinate system and the calibrated tool coordinate system, respectively.

20. The robot system according to claim 14, wherein the processor is configured to display first and second information on a display, and the first and second information correspond to the original tool coordinate system and the calibrated tool coordinate system, respectively.

* * * * *